US007225153B2

(12) United States Patent
Lange

(10) Patent No.: US 7,225,153 B2
(45) Date of Patent: May 29, 2007

(54) DIGITAL OPTIONS HAVING DEMAND-BASED, ADJUSTABLE RETURNS, AND TRADING EXCHANGE THEREFOR

(75) Inventor: Jeffrey Lange, New York, NY (US)

(73) Assignee: Longitude LLC, New York, NY (US)

( * ) Notice: Subject to any disclaimer, the term of this patent is extended or adjusted under 35 U.S.C. 154(b) by 1402 days.

(21) Appl. No.: 09/809,025

(22) Filed: Mar. 16, 2001

(65) Prior Publication Data

US 2002/0099640 A1     Jul. 25, 2002

Related U.S. Application Data

(63) Continuation-in-part of application No. 09/744,816, filed as application No. PCT/US00/19447 on Jul. 18, 2000, which is a continuation-in-part of application No. 09/448,822, filed on Nov. 24, 1999, now Pat. No. 6,321,212.

(60) Provisional application No. 60/144,890, filed on Jul. 21, 1999.

(51) Int. Cl.
*G06Q 40/00* (2006.01)
(52) U.S. Cl. .............................. 705/37; 705/35; 705/36
(58) Field of Classification Search ............ 705/35–37; 370/242; 463/16; 473/274
See application file for complete search history.

(56) References Cited

U.S. PATENT DOCUMENTS

| 4,903,201 A | 2/1990 | Wagner |
| 5,101,353 A | 3/1992 | Lupien et al. |
| 5,275,400 A | 1/1994 | Weingardt et al. |
| 5,749,785 A | 5/1998 | Rossides |
| 5,794,207 A | 8/1998 | Walker et al. |
| 5,806,048 A | 9/1998 | Kiron et al. |
| 5,819,237 A | 10/1998 | Garman |

(Continued)

FOREIGN PATENT DOCUMENTS

WO     WO 00/08567    * 2/2000

OTHER PUBLICATIONS

M. Pagano, et al., "Transparency and Liquidity: A Comparison of Auction and Dealer Markets with Informed Trading", *Journal Of Finance*, pp. 579-611, 1996.

(Continued)

*Primary Examiner*—Frantzy Poinvil
*Assistant Examiner*—Harish T. Dass
(74) *Attorney, Agent, or Firm*—Kenyon & Kenyon LLP

(57) ABSTRACT

This invention provides methods and systems for trading and investing in groups of demand-based adjustable return ("DBAR") contingent claims, including digital options, and for establishing markets and exchanges for such claims. The advantages of the present invention, as applied to the establishment and operation of a DBAR digital options exchange, include the ability to offer investments whose profit and loss scenarios are comparable to those for digital options or other derivatives in traditional securities markets, without the need for options or derivatives sellers or order-matching of conventional markets. A DBAR digital options exchange of the present invention can also offer conditional investments, or limit orders, in which an investment in a state of a DBAR contingent claim (such as the price of an underlying asset or index) can be executed or withdrawn in response to the implied probability of the occurrence of that state.

22 Claims, 18 Drawing Sheets

U.S. PATENT DOCUMENTS

| | | | |
|---|---|---|---|
| 5,845,266 | A | 12/1998 | Lupien et al. |
| 5,873,782 | A | 2/1999 | Hall |
| 5,911,136 | A | 6/1999 | Atkins |
| 5,970,479 | A | 10/1999 | Shepherd |
| 6,085,175 | A | 7/2000 | Gugel et al. |
| 6,134,536 | A | 10/2000 | Shepherd |
| 6,317,728 | B1 | 11/2001 | Kane |
| 6,321,212 | B1 | 11/2001 | Lange |
| 6,408,282 | B1 | 6/2002 | Buist |
| 2001/0051540 | A1 | 12/2001 | Hindman et al. ............. 463/25 |

OTHER PUBLICATIONS

A. Madhaven, "Trading Mechanisms in Securities Market", *Journal of Finance*, 47, pp. 607-641, 1992.

C. Schnitzlein, "Call and Continuous Trading Mechanisms Under Asymmetric Information", *Journal of Finance*, 51, pp. 613-636, 1996.

N. Economides, et al., "Electronic Call Market Trading", *Journal of Portfolio Management*, pp. 10-18, Spring 1995.

C.R. Plott, et al, "Parimutuel Betting Markets as Information Aggregation Devices: Experimental Results", *Caltech Social Science Working Paper 986*, Apr. 1997.

W. Takahiro, "A Parimutuel System with Two Horses and a Continuum of Bettors", *Journal of Mathematical Economics*, 28, pp. 85-100, 1997.

L. Shapley, et al., "Trade Using One Commodity as a Means of Payment", *Journal of Political Economy 85*, pp. 937-968, 1977.

B. Bahra, "Implied Risk-Neutral Probability Density Functions From Option Prices: Theory and Application", Bank of England, ISSN 1368-5562, 1997.

S. Athanasoulis, et. al., "Macro Markets and Financial Security", *FRBNY Economic Policy Review*, pp. 21-39, Apr. 1999.

T. Watanabe, et al., "A Model of a General Parimutuel System: Characterizations and Equilibrium Selection", *International Journal of Game Theory* 23, pp. 237-260, 1994.

Robert A. Schwartz, "Integrating Call and Continuous Markets", *Securities Traders' Monthly*, pp. 14-16, Sep. 1991.

K. Garbade, et al., "Structural Organization of Secondary Markets: Clearing Frequency, Dealer Activity, and Liquidity Risk", *Journal of Finance* 34. pp. 577-593, 1979.

S.L. Mintz, Measuring up: What CEOs look for in their chief financial officers, pp. 1-5, Feb. 1994.

Jonathan Karp, River Runs Dry, pp. 1-2, Nov. 1992.

Sun Hong, Japanese investment posts strong momentum, pp. 1-2, Feb. 1997.

Lack of debt trades stunts market—HSBC, Businessworld, Manila, pp. 1-2, Sep. 1998.

Tatiana Helenius, Real bonds, real-time, real fast, Wall Street & Technology, pp. 1-4, Apr. 1998.

W.J. Hurley, On the use of Martingales in Monte Carlo approaches to multiperiod parameter uncertainty in capital investment risk analysis, pp. 1-6, Jan. 1998.

Randhawa et al., Financial risk analysis using Financial Risk simulation Prog, pp. 1-4, Sep. 1993.

D.F. Kocaoglu, et al., Constrained moments simulation healthcare capital acquisitions, p. 1, Jan. 1997.

Smith Terry Ross, A Statistical model for characterizing price variability with application to dairy investment analysis, pp. 1-2, Jan. 1980.

R. Merton, Continuous-Time Finance (1990) pp. 441.

L. Williams, "Information Efficiency In Betting Markets: A Survey", *Bulletin of Economic Research*, 1999, pp. 1-30, vol. 51 -No. 1, Blackwell Publishers, Malden, MA.

A. Bruce, et al, "Investigating the Roots of the Favourite-Longshot Bias: An Analysis of Decision Making by Supply- and Demand Side Agents in Parallel Betting Markets", *Journal of Behavioral Decision Making*, 2000, pp. 413-430, vol. 13-No. 4, John Wiley & Sons, Ltd.

A. Bruce, et al, "Market Efficiency Analysis Requires a Sensitivity to Market Characteristics: Some Observations on a Recent Study of Betting Market Efficiency", *Applied Economics Letters*, 2000, pp. 199-202, No. 7, Taylor and Francis Ltd.

K. Busche, et al, "Decision Costs and Betting Market Efficiency", *Rationality and Society*, 2000, pp. 477-492, vol. 12-No. 4, Sage Publications, Thousand Oaks, CA.

E. Eisenberg, "Consensus of Subjective Probabilities: The Pari-Mutuel Method", *Annals of Mathematical Statistics*, Mar. 1959, pp. 165-168, vol. 30-No. 1, Institute of Mathematical Statistics.

D. Hausch, et al, *Efficiency of Racetrack Betting Markets*, 1994, Academic Press, New York, NY.

J. Ingersoll, Jr., "Digital Contracts: Simple Tools for Pricing Complex Derivatives", *Journal of Business*, 2000, pp. 67-87, vol. 73-No. 1, The University of Chicago, Chicago, IL.

J. Johnson, "An Empirical Study of the Impact of the Impact of Complexity on Participation in Horserace Betting", *Journal of Gambling Studies*, Summer 1997, pp. 159-172, vol. 13-No. 2, Human Sciences Press, Inc.

G. Owen, "Parimutuel as a System of Aggregation of Information", *Game Theoretical Applications to Economics and Operations Research*, 1997, pp. 183-195, Kluwer Academic Publishers, The Netherlands.

D. Peel, et al, "Product Bunding and a Rule of Thumb versus the Harville Formulae: Can Each Way Bets with UK Bookmakers Generate Abnormal Returns", *Applied Economics*, 2000, pp. 1737-1744, NO. 32, Taylor & Francis Ltd.

R. Phatarfod, "Betting Strategies in Horse Races", *Asia-Pacific Journal of Operational Research*, 1999, pp. 87-98, No. 16.

K. Rhoda, et al, "Risk Preferences And Information Flows In Racetrack Betting Markets", *The Journal of Financial Research*, Fall 1999, pp. 265-285, vol. 22-No. 3.

H. Shin, "Measuring the Incidence of Insider Trading in a Market for State-Contingent Claims", *The Economic Journal*, Sep. 1993, pp. 1141-1153, vol. 103-No. 402, The Royal Economic Society.

H. Shin, "Optimal Betting Odds Against Insider Traders", *The Economic Journal*, Sep. 1991, pp. 1179-1185, vol. 101-No. 408, Royal Economic Society.

D.Tek, et al, "Optimal Betting and Efficiency in Parimutuel Betting Markets with Information Costs", *The Economic Journal*, Jul. 1996, pp. 1-18, vol. 106-No. 437, Blackwell Publishers, Malden, MA.

Garahi et al., U.S. Appl. No. 2001/0047291, published Nov. 29, 2001.

Burton, U.S. Appl. No. 2002/0052819, published May 2, 2002.

\* cited by examiner

Implied Liquidity Effects: Percentage Changes to Implied State Probabilities Between "Offer" and "Bid" as a Function of Proposed Investment Amount (as a percentage, p, of existing investment)

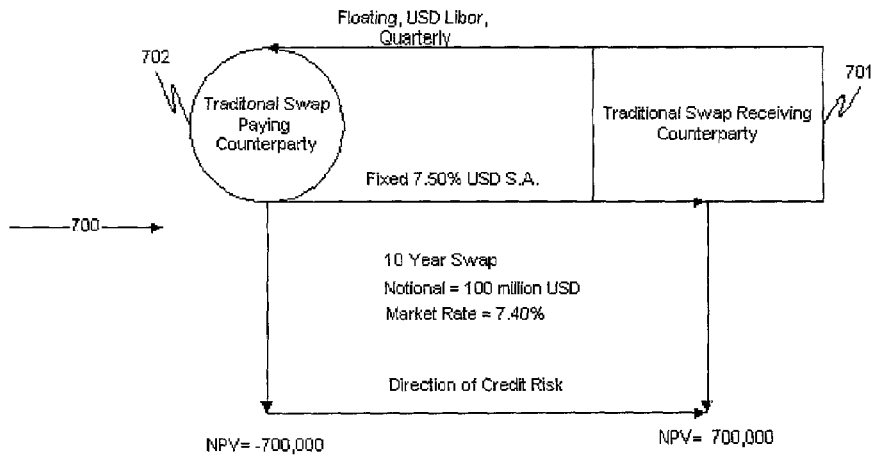
FIG. 9a: Traditional Swap Counterparties
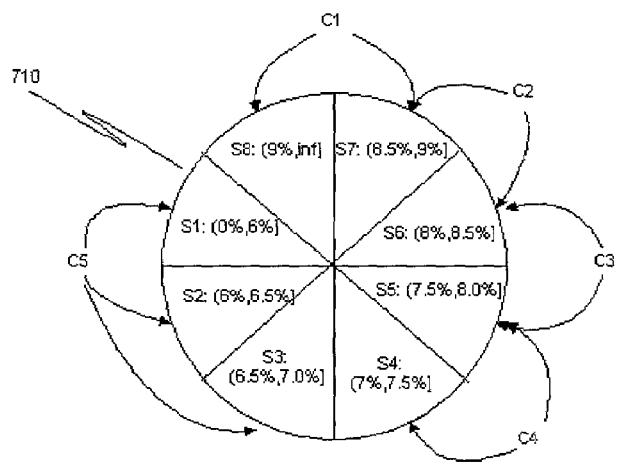
FIG. 9b: Illustrative Trader Relationships In DBAR Contingent Claims
720
States for Swap Rate
| Counterparty and Credit Rating | | S1 | S2 | S3 | S4 | S5 | S6 | S7 | S8 |
|---|---|---|---|---|---|---|---|---|---|
| | C1, AAA | | | | | | | 50,000 | 100,000 |
| | C2, AA | | | | | | 40,000 | 25,000 | |
| | C3, AA | | | | | 100,000 | 60,000 | | |
| | C4, A+ | | | | 150,000 | 100,000 | | | |
| | C5, A | 100,000 | 50,000 | 80,000 | | | | | |
FIG 9c: Margin Loans by Trader, Credit Rating, and Defined State

FIG. 11

```
struct {
    int       numStates;           // Number of states in contract
    double    totalInvested;       // Total amount invested in contract
    double    poTrade[];           // Profile trade investments per state
    double    poReturn[];          // Profile pay out per state
    double    stateTotal[];        // Aggregated investment per state
    int       numOrders;           // Number of submitted orders in contract
    ORDER     orders[];            // List of composite orders
} contract;
```
1101

```
struct {
    double   orderAmount;                    // Amount of trade to transact. Represents
                                             amount to to be invested for buys and amount
                                             of payout to be sold for sells
    double   invest[contract.numStates];     // Calculated amount to invest per
                                             state
    int      buySell;                        // Indicates whether order is a buy (=1) or a
                                             "sell" (=-1)
    int      marketLimit;                    // Indicates whether order is market order (=1)
                                             or a limit order (=0)
    double   limitPrice;                     // Price below (above) which buy (sale) should
                                             be executed
    double   price;                          // the current equilibrium price for the digital
                                             option, spread or strip specified in the order
    int      ratio[contract.numStates];      // the relative payout ratio requested should
                                             each constituent state of order occur
    double   filled;                         // the amount of the order filled in equilibrium
    double   fee;                            // the total transaction fee charged for the
                                             order
    double   payout;                         // the payout of the order net of fees after the
                                             event has occurred and the realized state is
                                             known
    double profilePayout[contract.numStates];  // for a profile type order, the amount of
                                             desired payout should state i occur
} order;
```
1102

DIGITAL OPTIONS HAVING DEMAND-BASED, ADJUSTABLE RETURNS, AND TRADING EXCHANGE THEREFOR

RELATED APPLICATIONS

This application is a continuation-in-part of U.S. application Ser. No. 09/744,816, filed Apr. 3, 2001 which is the United States national stage application under 35 U.S.C. § 371 of Patent Cooperation Treaty application serial number PCT/US00/19447, filed Jul. 18, 2000, and which is a continuation-in-part of U.S. application Ser. No. 09/448,822, filed Nov. 24, 1999 now U.S. Pat. No. 6,321,212. This application also claims priority to Patent Cooperation Treaty application serial number PCT/US00/19447, filed Jul. 18, 2000; and U.S. provisional application Ser. No. 60/144,890, filed Jul. 21, 1999. Each of the applications referred to in this paragraph is incorporated by reference into this application.

COPYRIGHT NOTICE

This document contains material which is subject to copyright protection. The applicant has no objection to the facsimile reproduction of this patent document, as it appears in the U.S. Patent and Trademark Office (PTO) patent file or records or in any publication by the PTO or counterpart foreign or international instrumentalities. The applicant otherwise reserves all copyright rights whatsoever.

FIELD OF THE INVENTION

This invention relates to systems and methods for demand-based trading. More specifically, this invention relates to methods and systems for trading financial products, including digital options, having demand-based adjustable returns, and systems and methods for determining those returns.

BACKGROUND OF THE INVENTION

With the rapid increase in usage and popularity of the public Internet, the growth of electronic Internet-based trading of securities has been dramatic. In the first part of 1999, online trading via the Internet was estimated to make up approximately 15% of all stock trades. This volume has been growing at an annual rate of approximately 50%. High growth rates are projected to continue for the next few years, as increasing volumes of Internet users use online trading accounts.

Online trading firms such as E-Trade Group, Charles Schwab, and Ameritrade have all experienced significant growth in revenues due to increases in online trading activity. These companies currently offer Internet-based stock trading services, which provide greater convenience and lower commission rates for many retail investors, compared to traditional securities brokerage services. Many expect online trading to expand to financial products other than equities, such as bonds, foreign exchange, and financial instrument derivatives.

Financial products such as stocks, bonds, foreign exchange contracts, exchange traded futures and options, as well as contractual assets or liabilities such as reinsurance contracts or interest-rate swaps, all involve some measure of risk. The risks inherent in such products are a function of many factors, including the uncertainty of events, such as the Federal Reserve's determination to increase the discount rate, a sudden increase in commodity prices, the change in value of an underlying index such as the Dow Jones Industrial Average, or an overall increase in investor risk aversion. In order to better analyze the nature of such risks, financial economists often treat the real-world financial products as if they were combinations of simpler, hypothetical financial products. These hypothetical financial products typically are designed to pay one unit of currency, say one dollar, to the trader or investor if a particular outcome among a set of possible outcomes occurs. Possible outcomes may be said to fall within "states," which are typically constructed from a distribution of possible outcomes (e.g., the magnitude of the change in the Federal Reserve discount rate) owing to some real-world event (e.g., a decision of the Federal Reserve regarding the discount rate). In such hypothetical financial products, a set of states is typically chosen so that the states are mutually exclusive and the set collectively covers or exhausts all possible outcomes for the event. This arrangement entails that, by design, exactly one state always occurs based on the event outcome.

These hypothetical financial products (also known as Arrow-Debreu securities, state securities, or pure securities) are designed to isolate and break-down complex risks into distinct sources, namely, the risk that a distinct state will occur. Such hypothetical financial products are useful since the returns from more complicated securities, including real-world financial products, can be modeled as a linear combination of the returns of the hypothetical financial products. See, e.g., R. Merton, *Continuous-Time Finance* (1990), pp. 441 ff. Thus, such hypothetical financial products are frequently used today to provide the fundamental building blocks for analyzing more complex financial products.

In recent years, the growth in derivatives trading has also been enormous. According to the Federal Reserve, the annualized growth rate in foreign exchange and interest rate derivatives turnover alone is running at about 20%. Corporations, financial institutions, farmers, and even national governments and agencies are all active in the derivatives markets, typically to better manage asset and liability portfolios, hedge financial market risk, and minimize costs of capital funding. Money managers also frequently use derivatives to hedge and undertake economic exposure where there are inherent risks, such as risks of fluctuation in interest rates, foreign exchange rates, convertibility into other securities or outstanding purchase offers for cash or exchange offers for cash or securities.

Derivatives are traded on exchanges, such as the option and futures contracts traded on the Chicago Board of Trade ("CBOT"), as well as off-exchange or over-the-counter ("OTC") between two or more derivative counterparties. On the major exchanges which operate trading activity in derivatives, orders are typically either transmitted electronically or via open outcry in pits to member brokers who then execute the orders. These member brokers then usually balance or hedge their own portfolio of derivatives to suit their own risk and return criteria. Hedging is customarily accomplished by trading in the derivatives' underlying securities or contracts (e.g., a futures contract in the case of an option on that future) or in similar derivatives (e.g., futures expiring in different calendar months). For OTC derivatives, brokers or dealers customarily seek to balance their active portfolios of derivatives in accordance with the trader's risk management guidelines and profitability criteria.

Broadly speaking then, there are two widely utilized means by which derivatives are currently traded: (1) order-matching and (2) principal market making. Order matching is a model followed by exchanges such as the CBOT or the Chicago Mercantile Exchange and some newer online exchanges. In order matching, the exchange coordinates the activities of buyers and sellers so that "bids" to buy (i.e., demand) can be paired off with "offers" to sell (i.e., supply). Orders may be matched both electronically and through the primary market making activities of the exchange members. Typically, the exchange itself takes no market risk and covers its own cost of operation by selling memberships to brokers. Member brokers may take principal positions, which are often hedged across their portfolios.

In principal market making, a bank or brokerage firm, for example, establishes a derivatives trading operation, capitalizes it, and makes a market by maintaining a portfolio of derivatives and underlying positions. The market maker usually hedges the portfolio on a dynamic basis by continually changing the composition of the portfolio as market conditions change. In general, the market maker strives to cover its cost of operation by collecting a bid-offer spread and through the scale economies obtained by simultaneously hedging a portfolio of positions. As the market maker takes significant market risk, its counterparties are exposed to the risk that it may go bankrupt. Additionally, while in theory the principal market making activity could be done over a wide area network, in practice derivatives trading is today usually accomplished via the telephone. Often, trades are processed laboriously, with many manual steps required from the front office transaction to the back office processing and clearing.

In theory—that is, ignoring very real transaction costs (described below)—derivatives trading is, in the language of game theory, a "zero sum" game. One counterparty's gain on a transaction should be exactly offset by the corresponding counterparty's loss, assuming there are no transaction costs. In fact, it is the zero sum nature of the derivatives market which first allowed the well-known Black-Scholes pricing model to be formulated by noting that a derivative such as an option could be paired with an exactly offsetting position in the underlying security so as to eliminate market risk over short periods of time. It is this "no arbitrage" feature, which allows market participants, using sophisticated valuation models, to mitigate market risk by continually adjusting their portfolios. Stock markets, by contrast, do not have this zero sum feature, as the total stock or value of the market fluctuates due to factors such as interest rates and expected corporate earnings, which are "external" to the market in the sense that they cannot readily be hedged.

The return to a trader of a traditional derivative product is, in most cases, largely determined by the value of the underlying security, asset, liability or claim on which the derivative is based. For example, the value of a call option on a stock, which gives the holder the right to buy the stock at some future date at a fixed strike price, varies directly with the price of the underlying stock. In the case of non-financial derivatives such as reinsurance contracts, the value of the reinsurance contract is affected by the loss experience on the underlying portfolio of insured claims. The prices of traditional derivative products are usually determined by supply and demand for the derivative based on the value of the underlying security (which is itself usually determined by supply and demand, or, as in the case of insurance, by events insured by the insurance or reinsurance contract).

Currently, the costs of trading derivative securities (both on and off the exchanges) and transferring insurance risk are considered to be high for a number of reasons, including:

(1) Credit Risk: A counterparty to a derivatives (or insurance contract) transaction typically assumes the risk that its counterparty will go bankrupt during the life of the derivatives (or insurance) contract. Margin requirements, credit monitoring, and other contractual devices, which may be costly, are customarily employed to manage derivatives and insurance counterparty credit risk.

(2) Regulatory Requirements: Regulatory bodies, such as the Federal Reserve, Comptroller of the Currency, the Commodities Futures Trading Commission, and international bodies that promulgate regulations affecting global money center banks (e.g., Basle Committee guidelines) generally require institutions dealing in derivatives to meet capital requirements and maintain risk management systems. These requirements are considered by many to increase the cost of capital and barriers to entry for some entrants into the derivatives trading business, and thus to increase the cost of derivatives transactions for both dealers and end users. In the United States, state insurance regulations also impose requirements on the operations of insurers, especially in the property-casualty lines where capital demands may be increased by the requirement that insurers reserve for future losses without regard to interest rate discount factors.

(3) Liquidity: Derivatives traders typically hedge their exposures throughout the life of the derivatives contract. Effective hedging usually requires that an active or liquid market exist, throughout the life of the derivative contract, for both the underlying security and the derivative. Frequently, especially in periods of financial market shocks and disequilibria, liquid markets do not exist to support a well-functioning derivatives market.

(4) Transaction Costs: Dynamic hedging of derivatives often requires continual transactions in the market over the life of the derivative in order to reduce, eliminate, and manage risk for a derivative or portfolio of derivative securities. This usually means paying bid-offers spreads for each hedging transaction, which can add significantly to the price of the derivative security at inception compared to its theoretical price in absence of the need to pay for such spreads and similar transaction costs.

(5) Settlement and Clearing Costs: The costs of executing, electronically booking, clearing, and settling derivatives transactions can be large, sometimes requiring analytical and database software systems and personnel knowledgeable in such transactions. While a goal of many in the securities processing industry is to achieve "straight-through-processing" of derivatives transactions, many derivatives counterparties continue to manage the processing of these transactions using a combination of electronic and manual steps which are not particularly integrated or automated and therefore add to costs.

(6) Event Risk: Most traders understand effective hedging of derivatives transactions to require markets to be liquid and to exhibit continuously fluctuating prices without sudden and dramatic "gaps." During periods of financial crises and disequilibria, it is not uncommon to observe dramatic repricing of underlying securities by 50% or more in a period of hours. The event risk of such crises and disequilibria are therefore customarily factored into derivatives prices by dealers, which increases the cost of derivatives in excess of the theoretical prices indicated by derivatives valuation models. These costs are usually spread across all derivatives users.

(7) Model Risk: Derivatives contracts can be quite difficult to value, especially those involving interest rates or features which allow a counterparty to make decisions throughout the life of the derivative (e.g., American options allow a counterparty to realize the value of the derivative at any time during its life). Derivatives dealers will typically add a premium to derivatives prices to insure against the possibility that the valuation models may not adequately reflect market factors or other conditions throughout the life of the contract. In addition, risk management guidelines may require firms to maintain additional capital supporting a derivatives dealing operation where model risk is determined to be a significant factor. Model risk has also been a large factor in well-known cases where complicated securities risk management systems have provided incorrect or incomplete information, such as the Joe Jett/Kidder Peabody losses of 1994.

(8) Asymmetric Information: Derivatives dealers and market makers customarily seek to protect themselves from counterparties with superior information. Bid-offer spreads for derivatives therefore usually reflect a built-in insurance premium for the dealer for transactions with counterparties with superior information, which can lead to unprofitable transactions. Traditional insurance markets also incur costs due to asymmetric information. In property-casualty lines, the direct writer of the insurance almost always has superior information regarding the book of risks than does the assuming reinsurer. Much like the market maker in capital markets, the reinsurer typically prices its informational disadvantage into the reinsurance premiums.

(9) Incomplete Markets: Traditional capital and insurance markets are often viewed as incomplete in the sense that the span of contingent claims is limited, i.e., the markets may not provide opportunities to hedge all of the risks for which hedging opportunities are sought. As a consequence, participants typically either bear risk inefficiently or use less than optimal means to transfer or hedge against risk. For example, the demand by some investors to hedge inflation risk has resulted in the issuance by some governments of inflation-linked bonds which have coupons and principal amounts linked to Consumer Price Index (CPI) levels. This provides a degree of insurance against inflation risk. However, holders of such bonds frequently make assumptions as to the future relationship between real and nominal interest rates. An imperfect correlation between the contingent claim (in this case, inflation-linked bond) and the contingent event (inflation) gives rise to what traders call "basis risk," which is risk that, in today's markets, cannot be perfectly insured or hedged.

Currently, transaction costs are also considerable in traditional insurance and reinsurance markets. In recent years, considerable effort has been expended in attempting to securitize insurance risk such as property-casualty catastrophe risk. Traditional insurance and reinsurance markets in many respects resemble principal market-maker securities markets and suffer from many of the same shortcomings and incur similar costs of operation. Typically, risk is physically transferred contractually, credit status of counterparties is monitored, and sophisticated risk management systems are deployed and maintained. Capitalization levels to support insurance portfolios of risky assets and liabilities may be dramatically out of equilibrium at any given time due to price stickiness, informational asymmetries and costs, and regulatory constraints. In short, the insurance and reinsurance markets tend to operate according to the same market mechanisms that have prevailed for decades, despite large market shocks such as the Lloyds crisis in the late 1980's and early 1990's.

Accordingly, a driving force behind all the contributors to the costs of derivatives and insurance contracts is the necessity or desirability of risk management through dynamic hedging or contingent claim replication in continuous, liquid, and informationally fair markets. Hedging is used by derivatives dealers to reduce their exposure to excessive market risk while making transaction fees to cover their cost of capital and ongoing operations; and effective hedging requires liquidity.

Recent patents have addressed the problem of financial market liquidity in the context of an electronic order-matching systems (e.g., U.S. Pat. No. 5,845,266). The principal techniques disclosed to enhance liquidity are to increase participation and traded volume in the system and to solicit trader preferences about combinations of price and quantity for a particular trade of a security. There are shortcomings to these techniques, however. First, these techniques implement order-matching and limit order book algorithms, which can be and are effectively employed in traditional "brick and mortar" exchanges. Their electronic implementation, however, primarily serves to save on transportation and telecommunication charges. No fundamental change is contemplated to market structure for which an electronic network may be essential. Second, the disclosed techniques appear to enhance liquidity at the expense of placing large informational burdens on the traders (by soliciting preferences, for example, over an entire price-quantity demand curve) and by introducing uncertainty as to the exact price at which a trade has been transacted or is "filled." Finally, these electronic order matching systems contemplate a traditional counterparty pairing, which means physical securities are frequently transferred, cleared, and settled after the counterparties are identified and matched. In other words, techniques disclosed in the context of electronic order-matching systems are technical elaborations to the basic problem of how to optimize the process of matching arrays of bids and offers.

Patents relating to derivatives, such as U.S. Pat. No. 4,903,201, disclose an electronic adaptation of current open-outcry or order matching exchanges for the trading of futures is disclosed. Another recent patent, U.S. Pat. No. 5,806,048, relates to the creation of open-end mutual fund derivative securities to provide enhanced liquidity and improved availability of information affecting pricing. This patent, however, does not contemplate an electronic derivatives exchange which requires the traditional hedging or replicating portfolio approach to synthesizing the financial derivatives. Similarly, U.S. Pat. No. 5,794,207 proposes an electronic means of matching buyers' bids and sellers' offers, without explaining the nature of the economic price equilibria achieved through such a market process.

SUMMARY OF THE INVENTION

The present invention is directed to systems and methods of trading, and financial products, having a goal of reducing transaction costs for market participants who hedge against or otherwise make investments in contingent claims relating to events of economic significance. The claims are contingent in that their payout or return depends on the outcome of an observable event with more than one possible outcome. An example of such a contingent claim is a digital option, such as a digital call option, where the investor receives a payout if the underlying asset, stock or index expires at or above a specified strike price and receives no payout if the underlying asset, stock or other index expires below the strike price. The contingent claims relate to events of economic significance in that an investor or trader in a contingent claim typically is not economically indifferent to the outcome of the event, even if the investor or trader has not invested in or traded a contingent claim relating to the event.

Intended users of preferred and other embodiments are typically institutional investors, such as financial institutions including banks, investment banks, primary insurers and reinsurers, and corporate treasurers. Users can also include any individual or entity with a need for risk allocation services. As used in this specification, the terms "user," "trader" and "investor" are used interchangeably to mean any institution, individual or entity that desires to trade or invest in contingent claims or other financial products described in this specification.

The contingent claims pertaining to an event have a trading period in order to finalize a return for each defined state, which includes an outcome or set of outcomes for the event, and another period for observing the event upon which the contingent claim is based. The returns to the contingent claims of the present invention adjust during the trading period with changes in the distribution of amounts invested in each of the states. The returns payable for each of the states are finalized after the conclusion of each relevant trading period. In a preferred embodiment, the total amount invested, less a transaction fee to an exchange, is equal to the total amount of the payouts. In other words, in theory, the returns on all of the contingent claims established during a particular trading period and pertaining to a particular event are essentially zero sum, as are the traditional derivatives markets.

The process by which returns are finalized in the present invention is demand-based, and does not in any substantial way depend on supply. By contrast, traditional markets set prices through the interaction of supply and demand by crossing bids to buy and offers to sell ("bid/offer"). The demand-based contingent claim mechanism of the present invention sets returns by financing returns to successful investments with losses from unsuccessful investments. Thus, in a preferred embodiment, the returns to successful investments are determined by the total and relative amounts of all investments placed on each of the defined states for the specified observable event.

As used in this specification, the term "contingent claim" shall have the meaning customarily ascribed to it in the securities, trading, insurance and economics communities. "Contingent claims" thus include, for example, stocks, bonds and other such securities, derivative securities, insurance contracts and reinsurance agreements, and any other financial products, instruments, contracts, assets, or liabilities whose value depends upon or reflects economic risk due to the occurrence of future, real-world events. These events may be financial-related events, such as changes in interest rates, or non-financial-related events such as changes in weather conditions, demand for electricity, and fluctuations in real estate prices. Contingent claims also include all economic or financial interests, whether already traded or not yet traded, which have or reflect inherent risk or uncertainty due to the occurrence of future real-world events. Examples of contingent claims of economic or financial interest which are not yet traded on traditional markets are financial products having values that vary with the fluctuations in corporate earnings or changes in real estate values and rentals. The term "contingent claim" as used in this specification encompasses both hypothetical financial products of the Arrow-Debreu variety, as well as any risky asset, contract or product which can be expressed as a combination or portfolio of the hypothetical financial products.

For the purposes of this specification, an "investment" in or "trade" of a contingent claim is the act of putting an amount (in the units of value defined by the contingent claim) at risk, with a financial return depending on the outcome of an event of economic significance underlying the group of contingent claims pertaining to that event.

"Derivative security" (used interchangeably with "derivative") also has a meaning customarily ascribed to it in the securities, trading, insurance and economics communities. This includes a security or contract whose value depends on such factors as the value of an underlying security, index, asset or liability, or on a feature of such an underlying security, such as interest rates or convertibility into some other security. A derivative security is one example of a contingent claim as defined above. Financial futures on stock indices such as the S&P 500 or options to buy and sell such futures contracts are highly popular exchange-traded financial derivatives. An interest-rate swap, which is an example of an off-exchange derivative, is an agreement between two counterparties to exchange series of cashflows based on underlying factors, such as the London Interbank Offered Rate (LIBOR) quoted daily in London for a large number of foreign currencies. Like the exchange-traded futures and options, off-exchange agreements can fluctuate in value with the underlying factors to which they are linked or derived. Derivatives may also be traded on commodities, insurance events, and other events, such as the weather.

In this specification, the function for computing and allocating returns to contingent claims is termed the Demand Reallocation Function (DRF). A DRF is demand-based and involves reallocating returns to investments in each state after the outcome of the observable event is known in order to compensate successful investments from losses on unsuccessful investments (after any transaction or exchange fee). Since an adjustable return based on variations in amounts invested is a key aspect of the invention, contingent claims implemented using a DRF will be referred to as demand-based adjustable return (DBAR) contingent claims.

Preferred features of a trading system for a group of DBAR contingent claims (i.e., group of claims pertaining to the same event) include the following: (1) an entire distribution of states is open for investment, not just a single price as in the traditional markets; (2) returns are adjustable and determined mathematically based on invested amounts in each of the states available for investment, (3) invested amounts are preferably non-decreasing (as explained below), providing a commitment of offered liquidity to the market over the distribution of states, and (4) information is available in real-time across the distribution of states, including, in particular, information on the amounts invested across the distribution of all states (commonly known as a "limit order book"). Other consequences of preferred embodiments of the present invention include (1) elimination of order-matching or crossing of the bid and offer sides of the market; (2) reduction of the need for a market maker to conduct dynamic hedging and risk management; (3) more opportunities for hedging and insuring events of economic significance (i.e., greater market "completeness"); and (4) the ability to offer investments in contingent claims whose profit and loss scenarios are comparable to these for digital options or other derivatives in traditional markets, but can be implemented using the DBAR systems and methods of the present invention, for example without the need for sellers of such options or derivatives as they function in conventional markets.

Other preferred embodiments of the present invention can accommodate realization of profits and losses by traders at multiple points before all of the criteria for terminating a group of contingent claims are known. This is accomplished by arranging a plurality of trading periods, each having its own set of finalized returns. Profit or loss can be realized or "locked-in" at the end of each trading period, as opposed to waiting for the final outcome of the event on which the relevant contingent claims are based. Such lock-in can be achieved by placing hedging investments in successive trading periods as the returns change, or adjust, from period to period. In this way, profit and loss can be realized on an evolving basis (limited only by the frequency and length of the periods), enabling traders to achieve the same or perhaps higher frequency of trading and hedging than available in traditional markets.

If desired, an issuer such as a corporation, investment bank, underwriter or other financial intermediary can create a security having returns that are driven in a comparable manner to the DBAR contingent claims of the present invention. For example, a corporation may issue a bond with returns that are linked to insurance risk. The issuer can solicit trading and calculate the returns based on the amounts invested in contingent claims corresponding to each level or state of insurance risks.

In a preferred embodiment of the present invention, changes in the return for investments in one state will affect the return on investments in another state in the same distribution of states for a group of contingent claims. Thus, traders' returns will depend not only on the actual outcome of a real-world, observable event but also on trading choices from among the distribution of states made by other traders. This aspect of DBAR markets, in which returns for one state are affected by changes in investments in another state in the same distribution, allows for the elimination of order-crossing and dynamic market maker hedging. Price-discovery in preferred embodiments of the present invention can be supported by a one-way market (i.e., demand, not supply) for DBAR contingent claims. By structuring derivatives and insurance trading according to DBAR principles, the high costs of traditional order matching and principal market making market structures can be reduced substantially. Additionally, a market implemented by systems and methods of the present invention is especially amenable to electronic operation over a wide network, such as the Internet.

In its preferred embodiments, the present invention mitigates derivatives transaction costs found in traditional markets due to dynamic hedging and order matching. A preferred embodiment of the present invention provides a system for trading contingent claims structured under DBAR principles, in which amounts invested in on each state in a group of DBAR contingent claims are reallocated from unsuccessful investments, under defined rules, to successful investments after the deduction of exchange transaction fees. In particular, the operator of such a system or exchange provides the physical plant and electronic infrastructure for trading to be conducted, collects and aggregates investments, calculates the returns that result from such investments, and then allocates to the successful investments returns that are financed by the unsuccessful investments, after deducting a transaction fee for the operation of the system.

In preferred embodiments, where the successful investments are financed with the losses from unsuccessful investments, returns on all trades are correlated and traders make investments against each other as well as assuming the risk of chance outcomes. All traders for a group of DBAR contingent claims depending on a given event become counterparties to each other, leading to a mutualization of financial interests. Furthermore, in preferred embodiments of the present invention, projected returns prevailing at the time an investment is made may not be the same as the final payouts or returns after the outcome of the relevant event is known.

Traditional derivatives markets by contrast, operate largely under a house "banking" system. In this system, the market-maker, which typically has the function of matching buyers and sellers, customarily quotes a price at which an investor may buy or sell. If a given investor buys or sells at the price, the investor's ultimate return is based upon this price, i.e., the price at which the investor later sells or buys the original position, along with the original price at which the position was traded, will determine the investor's return. As the market-maker may not be able perfectly to offset buy and sell orders at all times or may desire to maintain a degree of risk in the expectation of returns, it will frequently be subject to varying degrees of market risk (as well as credit risk, in some cases). In a traditional derivatives market, market-makers which match buy and sell orders typically rely upon actuarial advantage, bid-offer spreads, a large capital base, and "coppering" or hedging (risk management) to minimize the chance of bankruptcy due to such market risk exposures.

Each trader in a house banking system typically has only a single counterparty—the market-maker, exchange, or trading counterparty (in the case, for example, of over-the-counter derivatives). By contrast, because a market in DBAR contingent claims may operate according to principles whereby unsuccessful investments finance the returns on successful investments, the exchange itself is exposed to reduced risk of loss and therefore has reduced need to transact in the market to hedge itself. In preferred embodiments of DBAR contingent claims of the present invention, dynamic hedging or bid-offer crossing by the exchange is generally not required, and the probability of the exchange or market-maker going bankrupt may be reduced essentially to zero. Such a system distributes the risk of bankruptcy away from the exchange or market-maker and among all the traders in the system. The system as a whole provides a great degree of self-hedging and substantial reduction of the risk of market failure for reasons related to market risk. A DBAR contingent claim exchange may also "self-clearing" and require little clearing infrastructure (such as clearing agents, custodians, nostro/vostro bank accounts, and transfer and register agents). A derivatives trading system or exchange structured according to DBAR contingent claim principles therefore offers many advantages over current derivatives markets governed by house banking principles.

The present invention also differs from electronic or parimutuel betting systems disclosed in the prior art (e.g., U.S. Pat. Nos. 5,873,782 and 5,749,785). In betting systems or games of chance, in the absence of a wager the bettor is economically indifferent to the outcome (assuming the bettor does not own the casino or the racetrack or breed the racing horses, for example). The difference between games of chance and events of economic significance is well known and understood in financial markets.

In summary, the present invention provides systems and methods for conducting demand-based trading. A preferred embodiment of a method of the present invention for conducting demand-based trading includes the steps of (a) establishing a plurality of defined states and a plurality of predetermined termination criteria, wherein each of the defined states corresponds to at least one possible outcome of an event of economic significance; (b) accepting investments of value units by a plurality of traders in the defined states; and (c) allocating a payout to each investment. The allocating step is responsive to the total number of value units invested in the defined states, the relative number of value units invested in each of the defined states, and the identification of the defined state that occurred upon fulfillment of all of the termination criteria.

An additional preferred embodiment of a method for conducting demand-based trading also includes establishing, accepting, and allocating steps. The establishing step in this embodiment includes establishing a plurality of defined states and a plurality of predetermined termination criteria. Each of the defined states corresponds to a possible state of a selected financial product when each of the termination criteria is fulfilled. The accepting step includes accepting investments of value units by multiple traders in the defined states. The allocating step includes allocating a payout to each investment. This allocating step is responsive to the total number of value units invested in the defined states, the relative number of value units invested in each of the defined states, and the identification of the defined state that occurred upon fulfillment of all of the termination criteria.

In preferred embodiments of a method for conducting demand-based trading of the present invention, the payout to each investment in each of the defined states that did not occur upon fulfillment of all of the termination criteria is zero, and the sum of the payouts to all of the investments is not greater than the value of the total number of the value units invested in the defined states. In a further preferred embodiment, the sum of the values of the payouts to all of the investments is equal to the value of all of the value units invested in defined states, less a fee.

In preferred embodiments of a method for conducting demand-based trading, at least one investment of value units designates a set of defined states and a desired return-on-investment from the designated set of defined states. In these preferred embodiments, the allocating step is further responsive to the desired return-on-investment from the designated set of defined states.

In another preferred embodiment of a method for conducting demand-based trading, the method further includes the step of calculating Capital-At-Risk for at least one investment of value units by at least one trader. In alternative further preferred embodiments, the step of calculating Capital-At-Risk includes the use of the Capital-At-Risk Value-At-Risk method, the Capital-At-Risk Monte Carlo Simulation method, or the Capital-At-Risk Historical Simulation method.

In preferred embodiments of a method for conducting demand-based trading, the method further includes the step of calculating Credit-Capital-At-Risk for at least one investment of value units by at least one trader. In alternative further preferred embodiments, the step of calculating Credit-Capital-At-Risk includes the use of the Credit-Capital-At-Risk Value-At-Risk method, the Credit-Capital-At-Risk Monte Carlo Simulation method, or the Credit-Capital-At-Risk Historical Simulation method.

In preferred embodiments of a method for conducting demand-based trading of the present invention, at least one investment of value units is a multi-state investment that designates a set of defined states. In a further preferred embodiment, at least one multi-state investment designates a set of desired returns that is responsive to the designated set of defined states, and the allocating step is further responsive to the set of desired returns. In a further preferred embodiment, each desired return of the set of desired returns is responsive to a subset of the designated set of defined states. In an alternative preferred embodiment, the set of desired returns approximately corresponds to expected returns from a set of defined states of a prespecified investment vehicle such as, for example, a particular call option.

In preferred embodiments of a method for conducting demand-based trading of the present invention, the allocating step includes the steps of (a) calculating the required number of value units of the multi-state investment that designates a set of desired returns, and (b) distributing the value units of the multi-state investment that designates a set of desired returns to the plurality of defined states. In a further preferred embodiment, the allocating step includes the step of solving a set of simultaneous equations that relate traded amounts to unit payouts and payout distributions; and the calculating step and the distributing step are responsive to the solving step.

In preferred embodiments of a method for conducting demand-based trading of the present invention, the solving step includes the step of fixed point iteration. In further preferred embodiments, the step of fixed point iteration includes the steps of (a) selecting an equation of the set of simultaneous equations described above, the equation having an independent variable and at least one dependent variable; (b) assigning arbitrary values to each of the dependent variables in the selected equation; (c) calculating the value of the independent variable in the selected equation responsive to the currently assigned values of each the dependent variables; (d) assigning the calculated value of the independent variable to the independent variable; (e) designating an equation of the set of simultaneous equations as the selected equation; and (f) sequentially performing the calculating the value step, the assigning the calculated value step, and the designating an equation step until the value of each of the variables converges.

A preferred embodiment of a method for estimating state probabilities in a demand-based trading method of the present invention includes the steps of: (a) performing a demand-based trading method having a plurality of defined states and a plurality of predetermined termination criteria, wherein an investment of value units by each of a plurality of traders is accepted in at least one of the defined states, and at least one of these defined states corresponds to at least one possible outcome of an event of economic significance; (b) monitoring the 0 relative number of value units invested in each of the defined states; and (c) estimating, responsive to the monitoring step, the probability that a selected defined state will be the defined state that occurs upon fulfillment of all of the termination criteria.

An additional preferred embodiment of a method for estimating state probabilities in a demand-based trading method also includes performing, monitoring, and estimating steps. The performing step includes performing a demand-based trading method having a plurality of defined states and a plurality of predetermined termination criteria, wherein an investment of value units by each of a plurality of traders is accepted in at least one of the defined states; and wherein each of the defined states corresponds to a possible state of a selected financial product when each of the termination criteria is fulfilled. The monitoring step includes monitoring the relative number of value units invested in each of the defined states. The estimating step includes estimating, responsive to the monitoring step, the probability that a selected defined state will be the defined state that occurs upon fulfillment of all of the termination criteria.

A preferred embodiment of a method for promoting liquidity in a demand-based trading method of the present invention includes the step of performing a demand-based trading method having a plurality of defined states and a plurality of predetermined termination criteria, wherein an investment of value units by each of a plurality of traders is accepted in at least one of the defined states and wherein any investment of value units cannot be withdrawn after acceptance. Each of the defined states corresponds to at least one possible outcome of an event of economic significance. A further preferred embodiment of a method for promoting liquidity in a demand-based trading method includes the step of hedging. The hedging step includes the hedging of a trader's previous investment of value units by making a new investment of value units in one or more of the defined states not invested in by the previous investment.

An additional preferred embodiment of a method for promoting liquidity in a demand-based trading method includes the step of performing a demand-based trading method having a plurality of defined states and a plurality of predetermined termination criteria, wherein an investment of value units by each of a plurality of traders is accepted in at least one of the defined states and wherein any investment of value units cannot be withdrawn after acceptance, and each of the defined states corresponds to a possible state of a selected financial product when each of the termination criteria is fulfilled. A further preferred embodiment of such a method for promoting liquidity in a demand-based trading method includes the step of hedging. The hedging step includes the hedging of a trader's previous investment of value units by making a new investment of value units in one or more of the defined states not invested in by the previous investment.

A preferred embodiment of a method for conducting quasi-continuous demand-based trading includes the steps of: (a) establishing a plurality of defined states and a plurality of predetermined termination criteria, wherein each of the defined states corresponds to at least one possible outcome of an event; (b) conducting a plurality of trading cycles, wherein each trading cycle includes the step of accepting, during a predefined trading period and prior to the fulfillment of all of the termination criteria, an investment of value units by each of a plurality of traders in at least one of the defined states; and (c) allocating a payout to each investment. The allocating step is responsive to the total number of the value units invested in the defined states during each of the trading periods, the relative number of the value units invested in each of the defined states during each of the trading periods, and an identification of the defined state that occurred upon fulfillment of all of the termination criteria. In a further preferred embodiment of a method for conducting quasi-continuous demand-based trading, the predefined trading periods are sequential and do not overlap.

Another preferred embodiment of a method for conducting demand-based trading includes the steps of: (a) establishing a plurality of defined states and a plurality of predetermined termination criteria, wherein each of the defined states corresponds to one possible outcome of an event of economic significance (or a financial instrument); (b) accepting, prior to fulfillment of all of the termination criteria, an investment of value units by each of a plurality of traders in at least one of the plurality of defined states, with at least one investment designating a range of possible outcomes corresponding to a set of defined states; and (c) allocating a payout to each investment. In such a preferred embodiment, the allocating step is responsive to the total number of value units invested in the plurality of defined states, the relative number of value units invested in each of the defined states, and an identification of the defined state that occurred upon the fulfillment of all of the termination criteria. Also in such a preferred embodiment, the allocation is done so that substantially the same payout is allocated to each state of the set of defined states. This embodiment contemplates, among other implementations, a market or exchange for contingent claims of the present invention that provides—without traditional sellers—profit and loss scenarios comparable to those expected by traders in derivative securities known as digital options, where payout is the same if the option expires anywhere in the money, and where there is no payout if the option expires out of the money.

Another preferred embodiment of the present invention provides a method for conducting demand-based trading including: (a) establishing a plurality of defined states and a plurality of predetermined termination criteria, wherein each of the defined states corresponds to one possible outcome of an event of economic significance (or a financial instrument); (b) accepting, prior to fulfillment of all of the termination criteria, a conditional investment order by a trader in at least one of the plurality of defined states; (c) computing, prior to fulfillment of all of the termination criteria a probability corresponding to each defined state; and (d) executing or withdrawing, prior to the fulfillment of all of the termination criteria, the conditional investment responsive to the computing step. In such embodiments, the computing step is responsive to the total number of value units invested in the plurality of defined states and the relative number of value units invested in each of the plurality of defined states. Such embodiments contemplate, among other implementations, a market or exchange (again without traditional sellers) in which investors can make and execute conditional or limit orders, where an order is executed or withdrawn in response to a calculation of a probability of the occurrence of one or more of the defined states.Preferred embodiments of the system of the present invention involve the use of electronic technologies, such as computers, computerized databases and telecommunications systems, to implement methods for conducting demand-based trading of the present invention.

A preferred embodiment of a system of the present invention for conducting demand-based trading includes (a) means for accepting, prior to the fulfillment of all predetermined termination criteria, investments of value units by a plurality of traders in at least one of a plurality of defined states, wherein each of the defined states corresponds to at least one possible outcome of an event of economic significance; and (b) means for allocating a payout to each investment. This allocation is responsive to the total number of value units invested in the defined states, the relative number of value units invested in each of the defined states, and the identification of the defined state that occurred upon fulfillment of all of the termination criteria.

An additional preferred embodiment of a system of the present invention for conducting demand-based trading includes (a) means for accepting, prior to the fulfillment of all predetermined termination criteria, investments of value units by a plurality of traders in at least one of a plurality of defined states, wherein each of the defined states corresponds to a possible state of a selected financial product when each of the termination criteria is fulfilled; and (b) means for allocating a payout to each investment. This allocation is responsive to the total number of value units invested in the defined states, the relative number of value units invested in each of the defined states, and the identification of the defined state that occurred upon fulfillment of all of the termination criteria.

A preferred embodiment of a demand-based trading apparatus of the present invention includes (a) an interface processor communicating with a plurality of traders and a market data system; and (b) a demand-based transaction processor, communicating with the interface processor and having a trade status database. The demand-based transaction processor maintains, responsive to the market data system and to a demand-based transaction with one of the plurality of traders, the trade status database, and processes, responsive to the trade status database, the demand-based transaction.

In further preferred embodiments of a demand-based trading apparatus of the present invention, maintaining the trade status database includes (a) establishing a contingent claim having a plurality of defined states, a plurality of predetermined termination criteria, and at least one trading period, wherein each of the defined states corresponds to at least one possible outcome of an event of economic significance; (b) recording, responsive to the demand-based transaction, an investment of value units by one of the plurality of traders in at least one of the plurality of defined states; (c) calculating, responsive to the total number of the value units invested in the plurality of defined states during each trading period and responsive to the relative number of the value units invested in each of the plurality of defined states during each trading period, finalized returns at the end of each trading period; and (d) determining, responsive to an identification of the defined state that occurred upon the fulfillment of all of the termination criteria and to the finalized returns, payouts to each of the plurality of traders; and processing the demand-based transaction includes accepting, during the trading period, the investment of value units by one of the plurality of traders in at least one of the plurality of defined states;

In an alternative further preferred embodiment of a demand-based trading apparatus of the present invention, maintaining the trade status database includes (a) establishing a contingent claim having a plurality of defined states, a plurality of predetermined termination criteria, and at least one trading period, wherein each of the defined states corresponds to a possible state of a selected financial product when each of the termination criteria is fulfilled; (b) recording, responsive to the demand-based transaction, an investment of value units by one of the plurality of traders in at least one of the plurality of defined states; (c) calculating, responsive to the total number of the value units invested in the plurality of defined states during each trading period and responsive to the relative number of the value units invested in each of the plurality of defined states during each trading period, finalized returns at the end of each trading period; and (d) determining, responsive to an identification of the defined state that occurred upon the fulfillment of all of the termination criteria and to the finalized returns, payouts to each of the plurality of traders; and processing the demand-based transaction includes accepting, during the trading period, the investment of value units by one of the plurality of traders in at least one of the plurality of defined states;

In further preferred embodiments of a demand-based trading apparatus of the present invention, maintaining the trade status database includes calculating return estimates; and processing the demand-based transaction includes providing, responsive to the demand-based transaction, the return estimates.

In further preferred embodiments of a demand-based trading apparatus of the present invention, maintaining the trade status database includes calculating risk estimates; and processing the demand-based transaction includes providing, responsive to the demand-based transaction, the risk estimates.

In further preferred embodiments of a demand-based trading apparatus of the present invention, the demand-based transaction includes a multi-state investment that specifies a desired payout distribution and a set of constituent states; and maintaining the trade status database includes allocating, responsive to the multi-state investment, value units to the set of constituent states to create the desired payout distribution. Such demand-based transactions may also include multi-state investments that specify the same payout if any of a designated set of states occurs upon fulfillment of the termination criteria. Other demand-based transactions executed by the demand-based trading apparatus of the present invention include conditional investments in one or more states, where the investment is executed or withdrawn in response to a calculation of a probability of the occurrence of one or more states upon the fulfillment of the termination criteria.

An object of the present invention is to provide systems and methods to support and facilitate a market structure for contingent claims related to observable events of economic significance, which includes one or more of the following advantages, in addition to those described above:

1. ready implementation and support using electronic computing and networking technologies;
2. reduction or elimination of the need to match bids to buy with offers to sell in order to create a market for derivatives;
3. reduction or elimination of the need for a derivatives intermediary to match bids and offers;
4. mathematical and consistent calculation of returns based on demand for contingent claims;
5. increased liquidity;
6. statistical diversification of credit risk through the mutualization of multiple derivatives counterparties;
7. improved scalability by reducing the traditional linkage between the method of pricing for contingent claims and the quantity of the underlying claims available for investment;
8. increased price transparency;
9. improved efficiency of information aggregation mechanisms;
10. reduction of event risk, such as the risk of discontinuous market events such as crashes;
11. opportunities for binding offers of liquidity to the market; and
12. reduced incentives for strategic behavior by traders.

A further object of the present invention is to provide systems and methods for the electronic exchange of contingent claims related to observable events of economic significance, which includes one or more of the following advantages:

1. reduced transaction costs, including settlement and clearing costs, associated with derivatives transactions and insurable claims;
2. reduced dependence on complicated valuation models for trading and risk management of derivatives;
3. reduced need for an exchange or market maker to manage market risk by hedging;
4. increased availability to traders of accurate and up-to-date information on the trading of contingent claims, including information regarding the aggregate amounts invested across all states of events of economic significance, and including over varying time periods;
5. reduced exposure of the exchange to credit risk;
6. increased availability of information on credit risk and market risk borne by traders of contingent claims;
7. increased availability of information on marginal returns from trades and investments that can be displayed instantaneously after the returns adjust during a trading period;
8. reduced need for a derivatives intermediary or exchange to match bids and offers;
9. increased ability to customize demand-based adjustable return (DBAR) payouts to permit replication of traditional financial products and their derivatives; and
10. comparability of profit and loss scenarios to those expected by traders for purchases and sales of digital options and other derivatives, without conventional sellers.

Additional objects and advantages of the invention are set forth in part in the description which follows, and in part are obvious from the description, or may be learned by practice of the invention. The objects and advantages of the invention may also be realized and attained by means of the instrumentalities, systems, methods and steps set forth in the appended claims.

BRIEF DESCRIPTION OF THE DRAWINGS

The accompanying drawings, which are incorporated in and from a part of the specification, illustrate the embodiments of the present invention and, together with the description, serve to explain the principles of the invention.

FIG. 9a is a schematic representation of a traditional interest rate swap transaction.

FIG. 9b is a schematic of investor relationships for an illustrative group of DBAR contingent claims.

FIG. 9c shows a tabulation of credit ratings and margin trades for each investor in to an illustrative group of DBAR contingent claims.

FIG. 11 depicts illustrative DBAR data structures for use in a preferred embodiment of a Demand-Based Adjustable Return Digital Options Exchange of the present invention.

Figure 1:
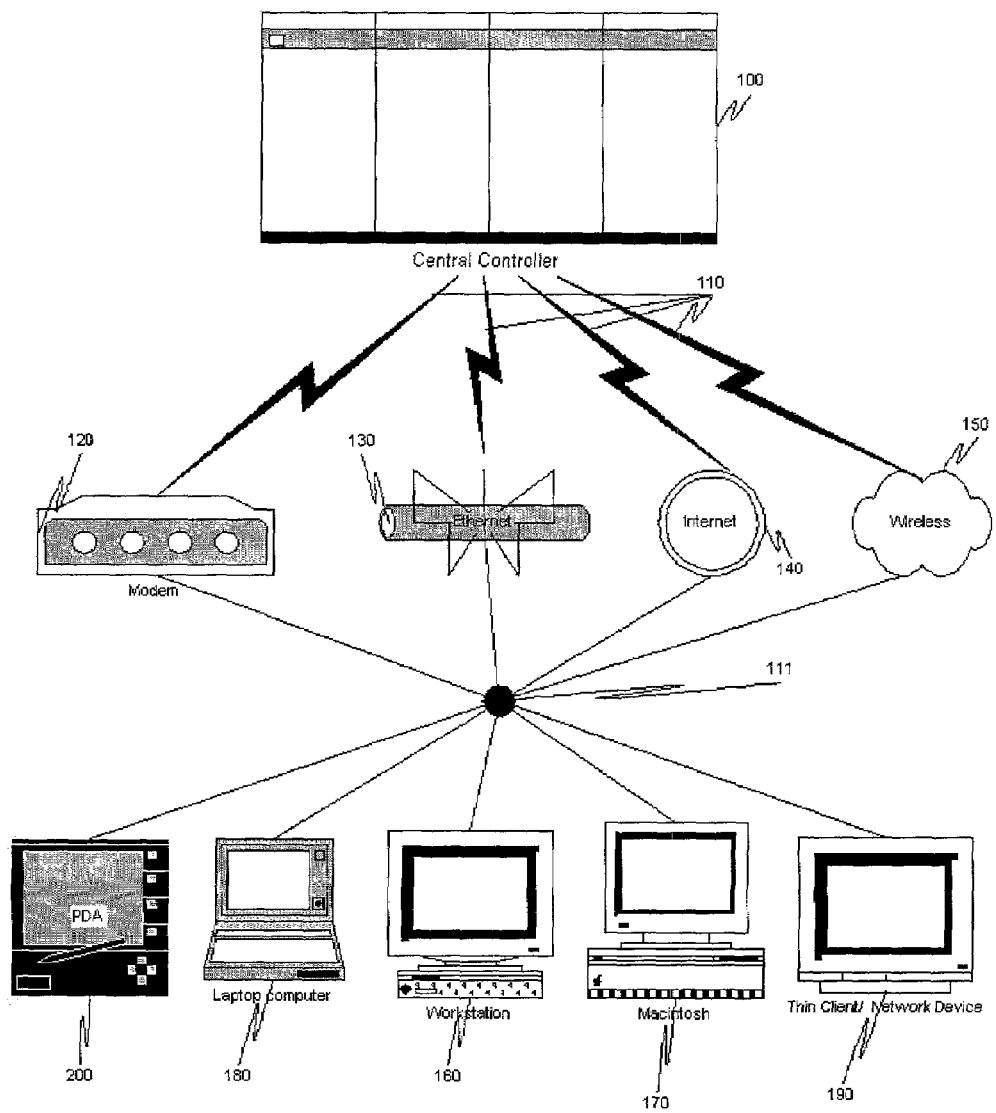
FIG. 1 is a schematic view of various forms of telecommunications between DBAR trader clients and a preferred embodiment of a DBAR contingent claims exchange implementing the present invention.

DETAILED DESCRIPTION OF PREFERRED EMBODIMENTS le;.5qThis Detailed Description of Preferred Embodiments is organized into nine sections. The first section provides an overview of systems and methods for trading or investing in groups of DBAR contingent claims. The second section describes in detail some of the important features of systems and methods for trading or investing in groups of DBAR contingent claims. The third section of this Detailed Description of Preferred Embodiments provides detailed descriptions of two preferred embodiments of the present invention: investments in a group of DBAR contingent claims, and investments in a portfolio of groups of such claims. The fourth section discusses methods for calculating risks attendant on investments in groups and portfolios of groups of DBAR contingent claims. The fifth section of this Detailed Description addresses liquidity and price/quantity relationships in preferred embodiments of systems and methods of the present invention. The sixth section provides a detailed description of a DBAR Digital Options Exchange. The seventh section presents a detailed description of the figures accompanying this specification. The eighth section of this Detailed Description discusses some of the salient advantages of the methods and systems of the present invention. The last section is a Technical Appendix providing additional information on the multistate allocation method of the present invention.

More specifically, this Detailed Description of the Preferred Embodiments is organized as follows:

1 Overview: Exchanges and Markets for DBAR Contingent Claims
   1.1 Exchange Design
   1.2 Market Operation
   1.3 Network Implementation 2 Features of DBAR Contingent Claims
  2.1 DBAR Contingent claim Notation
  2.2 Units of Investment and Payouts
  2.3 Canonical Demand Reallocation Functions
  2.4 Computing Investment Amounts to Achieve Desired Payouts
  2.5 A Canonical DRF Example
  2.6 Interest Considerations
  2.7 Returns and Probabilities
  2.8 Computations When Invested Amounts are Large
3 Examples of Groups of DBAR Contingent Claims
  3.1 DBAR Range Derivatives (including 21 examples)
  3.2 DBAR Portfolios
4 Risk Calculations in Groups of DBAR Contingent Claims
  4.1 Market Risk
    4.1.1 Capital-At-Risk Determinations
    4.1.2 Capital-At-Risk Determinations Using Monte Carlo Simulation Techniques
    4.1.3 Capital-At-Risk Determinations Using Historical Simulation Techniques
  4.2 Credit Risk
    4.2.1 Credit-Capital-At-Risk Determinations
    4.2.2 Credit-Capital-At-Risk Determinations using Monte Carlo Simulation Techniques
    4.2.3 Credit-Capital-At-Risk Historical Simulation Techniques
5 Liquidity and Price/Quantity Relationships
6 DBAR Digital Options Exchange
  6.1 Representation of Digital Options as DBAR Contingent Claims
  6.2 Construction of Digital Options Using DBAR Methods and Systems
  6.3 Digital Option Spreads
  6.4 Digital Option Strips
  6.5 Multistate Allocation Algorithm for Replicating "Sell" Trades
  6.6 Clearing and Settlement
  6.7 Contract Initialization
  6.8 Conditional Investments, or Limit Orders
  6.9 Sensitivity Analysis and Depth of Limit Order Book
  6.10 Networking of DBAR Digital Options Exchanges
7 Detailed Description of the Drawings
8 Advantages of Preferred Embodiments
9 Technical Appendix In this specification, including the description of preferred embodiments of the present invention, specific terminology will be used for the sake of clarity. However, the invention is not intended to be limited to the specific terms so used, and it is to be understood that each specific term includes all equivalents.

1. Overview: Exchanges and Markets For DBAR Contingent Claims 1.1 Exchange Design This section describes preferred methods for structuring DBAR contingent claims and for designing exchanges for the trading of such claims. The design of the exchange is important for effective contingent claims investment in accordance with the present invention. Preferred embodiments of such systems include processes for establishing defined states and allocating returns, as described below.

(a) Establishing Defined States: In a preferred embodiment, a distribution of possible outcomes for an observable event is partitioned into defined ranges or states. In a preferred embodiment, one state always occurs because the states are mutually exclusive and collectively exhaustive. Traders in such an embodiment invest on their expectation of a return resulting from the occurrence of a particular outcome within a selected state. Such investments allow traders to hedge the possible outcomes of real-world events of economic significance represented by the states. In a preferred embodiment of a group of DBAR contingent claims, unsuccessful trades or investments finance the successful trades or investments. In such an embodiment the states for a given contingent claim preferably are defined in such a way that the states are mutually exclusive and form the basis of a probability distribution, namely, the sum of the probabilities of all the uncertain outcomes is unity. For example, states corresponding to stock price closing values can be established to support a group DBAR contingent claims by partitioning the distribution of possible closing values for the stock on a given future date into ranges. The distribution of future stock prices, discretized in this way into defined states, forms a probability distribution in the sense that each state is mutually exclusive, and the sum of the probabilities of the stock closing within each defined state at the given date is unity.

In a preferred embodiment, traders can simultaneously invest in selected multiple states within a given distribution, without immediately breaking up their investment to fit into each defined states selected for investment. Traders thus may place multi-state investments in order to replicate a desired distribution of returns from a group of contingent claims. This may be accomplished in a preferred embodiment of a DBAR exchange through the use of suspense accounts in which multi-state investments are tracked and reallocated periodically as returns adjust in response to amounts invested during a trading period. At the end of a given trading period, a multi-state investment may be reallocated to achieve the desired distribution of payouts based upon the final invested amounts across the distribution of states. Thus, in such a preferred embodiment, the invested amount allocated to each of the selected states, and the corresponding respective returns, are finalized only at the closing of the trading period. An example of a multi-state investment illustrating the use of such a suspense account is provided in Example 3.1.2, below. Other examples of multi-state investments are provided in Section 6, below, which describes embodiments of the present invention that implement DBAR Digital Options Exchanges.

(b) Allocating Returns: In a preferred embodiment of a group of DBAR contingent claims according to the present invention, returns for each state are specified. In such an embodiment, while the amount invested for a given trade may be fixed, the return is adjustable. Determination of the returns for a particular state can be a simple function of the amount invested in that state and the total amount invested for all of the defined states for a group of contingent claims. However, alternate preferred embodiments can also accommodate methods of return determination that include other factors in addition to the invested amounts. For example, in a group of DBAR contingent claims where unsuccessful investments fund returns to successful investments, the returns can be allocated based on the relative amounts invested in each state and also on properties of the outcome, such as the magnitude of the price changes in underlying securities. An example in section 3.2 below illustrates such an embodiment in the context of a securities portfolio.

1.2 Market Operation (a) Termination Criteria: In a preferred embodiment of a method of the present invention, returns to investments in the plurality of defined states are allocated after the fulfillment of predetermined termination criteria. In preferred embodiments, these criteria include the expiration of a "trading period" and the determination of the outcome of the relevant event after an "observation period." In the trading period, traders invest on their expectation of a return resulting from the occurrence of a particular outcome within a selected defined state, such as the state that IBM stock will close between 120 and 125 on Jul. 6, 1999. In a preferred embodiment, the duration of the trading period is known to all participants; returns associated with each state vary during the trading period with changes in invested amounts; and returns are allocated based on the total amount invested in all states relative to the amounts invested in each of the states as at the end of the trading period.

The observation period can be provided as a time period during which the contingent events are observed and the relevant outcomes determined for the purpose of allocating returns. In a preferred embodiment, no trading occurs during the observation period.

The expiration date, or "expiration," of a group of DBAR contingent claims as used in this specification occurs when the termination criteria are fulfilled for that group of DBAR contingent claims. In a preferred embodiment, the expiration is the date, on or after the occurrence of the relevant event, when the outcome is ascertained. This expiration is similar to well-known expiration features in traditional options or futures in which a future date, i.e., the expiration date, is specified as the date upon which the value of the option or future will be determined by reference to the value of the underlying financial product on the expiration date.

The duration of a contingent claim as defined for purposes of this specification is simply the amount of time remaining until expiration from any given reference date. A trading start date ("TSD") and a trading end date ("TED"), as used in the specification, refer to the beginning and end of a time period ("trading period") during which traders can make investments in a group of DBAR contingent claims. Thus, the time during which a group of DBAR contingent claims is open for investment or trading, i.e., the difference between the TSD and TED, may be referred to as the trading period. In preferred embodiments, there can be one or many trading periods for a given expiration date, opening successively through time. For example, one trading period's TED may coincide exactly with the subsequent trading period's TSD, or in other examples, trading periods may overlap.

The relationship between the duration of a contingent claim, the number of trading periods employed for a given event, and the length and timing of the trading periods, can be arranged in a variety of ways to maximize trading or achieve other goals. In preferred embodiments at least one trading period occurs— that is, starts and ends—prior in time to the identification of the outcome of the relevant event. In other words, in preferred embodiments, the trading period will most likely temporally precede the event defining the claim. This need not always be so, since the outcome of an event may not be known for some time thereby enabling trading periods to end (or even start) subsequent to the occurrence of the event, but before its outcome is known.

A nearly continuous or "quasi-continuous" market can be made available by creating multiple trading periods for the same event, each having its own closing returns. Traders can make investments during successive trading periods as the returns change. In this way, profits-and-losses can be realized at least as frequently as in current derivatives markets. This is how derivatives traders currently are able to hedge options, futures, and other derivatives trades. In preferred embodiments of the present invention, traders may be able to realize profits and at varying frequencies, including more frequently than daily.

(b) Market Efficiency and Fairness: Market prices reflect, among other things, the distribution of information available to segments of the participants transacting in the market. In most markets, some participants will be better informed than others. In house-banking or traditional markets, market makers protect themselves from more informed counterparties by increasing their bid-offer spreads.

In preferred embodiments of DBAR contingent claim markets, there may be no market makers as such who need to protect themselves. It may nevertheless be necessary to put in place methods of operation in such markets in order to prevent manipulation of the outcomes underlying groups of DBAR contingent claims or the returns payable for various outcomes. One such mechanism is to introduce an element of randomness as to the time at which a trading period closes. Another mechanism to minimize the likelihood and effects of market manipulation is to introduce an element of randomness to the duration of the observation period. For example, a DBAR contingent claim might settle against an average of market closing prices during a time interval that is partially randomly determined, as opposed to a market closing price on a specific day.

Additionally, in preferred embodiments incentives can be employed in order to induce traders to invest earlier in a trading period rather than later. For example, a DRF may be used which allocates slightly higher returns to earlier investments in a successful state than later investments in that state. Earlier investments may be valuable in preferred embodiments since they work to enhance liquidity and promote more uniformly meaningful price information during the trading period.

(c) Credit Risk: In preferred embodiments of a DBAR contingent claims market, the dealer or exchange is substantially protected from primary market risk by the fundamental principle underlying the operation of the system—that returns to successful investments are funded by losses from unsuccessful investments. The credit risk in such preferred embodiments is distributed among all the market participants. If, for example, leveraged investments are permitted within a group of DBAR contingent claims, it may not be possible to collect the leveraged unsuccessful investments in order to distribute these amounts among the successful investments.

In almost all such cases there exists, for any given trader within a group of DBAR contingent claims, a non-zero possibility of default, or credit risk. Such credit risk is, of course, ubiquitous to all financial transactions facilitated with credit.

One way to address this risk is to not allow leveraged investments within the group of DBAR contingent claims, which is a preferred embodiment of the system and methods of the present invention. In other preferred embodiments, traders in a DBAR exchange may be allowed to use limited leverage, subject to real-time margin monitoring, including calculation of a trader's impact on the overall level of credit risk in the DBAR system and the particular group of contingent claims. These risk management calculations should be significantly more tractable and transparent than the types of analyses credit risk managers typically perform in conventional derivatives markets in order to monitor counterparty credit risk.

An important feature of preferred embodiments of the present invention is the ability to provide diversification of credit risk among all the traders who invest in a group of DBAR contingent claims. In such embodiments, traders make investments (in the units of value as defined for the group) in a common distribution of states in the expectation of receiving a return if a given state is determined to have occurred. In preferred embodiments, all traders, through their investments in defined states for a group of contingent claims, place these invested amounts with a central exchange or intermediary which, for each trading period, pays the returns to successful investments from the losses on unsuccessful investments. In such embodiments, a given trader has all the other traders in the exchange as counterparties, effecting a mutualization of counterparties and counterparty credit risk exposure. Each trader therefore assumes credit risk to a portfolio of counterparties rather than to a single counterparty.

Preferred embodiments of the DBAR contingent claim and exchange of the present invention present four principal advantages in managing the credit risk inherent in leveraged transactions. First, a preferred form of DBAR contingent claim entails limited liability investing. Investment liability is limited in these embodiments in the sense that the maximum amount a trader can lose is the amount invested. In this respect, the limited liability feature is similar to that of a long option position in the traditional markets. By contrast, a short option position in traditional markets represents a potentially unlimited liability investment since the downside exposure can readily exceed the option premium and is, in theory, unbounded. Importantly, a group of DBAR contingent claims of the present invention can easily replicate returns of a traditional short option position while maintaining limited liability. The limited liability feature of a group of DBAR contingent claims is a direct consequence of the demand-side nature of the market. More specifically, in preferred embodiments there are no sales or short positions as there are in the traditional markets, even though traders in a group of DBAR contingent claims may be able to attain the return profiles of traditional short positions.

Second, in preferred embodiments, a trader within a group of DBAR contingent claims should have a portfolio of counterparties as described above. As a consequence, there should be a statistical diversification of the credit risk such that the amount of credit risk borne by any one trader is, on average (and in all but exceptionally rare cases), less than if there were an exposure to a single counterparty as is frequently the case in traditional markets. In other words, in preferred embodiments of the system and methods of the present invention, each trader is able to take advantage of the diversification effect which is well known in portfolio analysis.

Third, in preferred embodiments of the present invention, the entire distribution of margin loans, and the aggregate amount of leverage and credit risk existing for a group of DBAR contingent claims, can be readily calculated and displayed to traders at any time before the fulfillment of all of the termination criteria for the group of claims. Thus, traders themselves may have access to important information regarding credit risk. In traditional markets such information is not readily available.

Fourth, preferred embodiments of a DBAR contingent claim exchange provide more information about the distribution of possible outcomes than do traditional market exchanges. Thus, as a byproduct of DBAR contingent claim trading according to preferred embodiments, traders have more information about the distribution of future possible outcomes for real-world events, which they can use to manage risk more effectively. For many traders, a significant part of credit risk is likely to be caused by market risk. Thus, in preferred embodiments of the present invention, the ability through an exchange or otherwise to control or at least provide information about market risk should have positive feedback effects for the management of credit risk.

A simple example of a group of DBAR contingent claims with the following assumptions, illustrates some of these features. The example uses the following basic assumptions:

two defined states (with predetermined termination criteria): (i) stock price appreciates in one month; (ii) stock price depreciates in one month; and $100 has been invested in the appreciate state, and $95 in the depreciate state.

If a trader then invests $1 in the appreciate state, if the stock in fact appreciates in the month, then the trader will be allocated a payout of $1.9406 (=196/101)—a return of $0.9406 plus the original $1 investment (ignoring, for the purpose of simplicity in this illustration, a transaction fee). If, before the close of the trading period the trader desires effectively to "sell" his investment in the appreciate state, he has two choices. He could sell the investment to a third party, which would necessitate crossing of a bid and an offer in a two-way order crossing network. Or, in a preferred embodiment of the method of the present invention, the trader can invest in the depreciate state, in proportion to the amount that had been invested in that state not counting the trader's "new" investments. In this example, in order to fully hedge his investment in the appreciate state, the trader can invest $0.95 (95/100) in the depreciate state. Under either possible outcome, therefore, the trader will receive a payout of $1.95, i.e., if the stock appreciates the trader will receive 196.95/101=$1.95 and if the stock depreciates the trader will receive (196.95/95.95)*0.95=$1.95.

1.3 Network Implementation

A market or exchange for groups of DBAR contingent claims market according to the invention is not designed to establish a counterparty-driven or order-matched market. Buyers' bids and sellers' offers do not need to be "crossed." As a consequence of the absence of a need for an order crossing network, preferred embodiments of the present invention are particularly amenable to large-scale electronic network implementation on a wide area network or the public Internet, for example.

Preferred embodiments of an electronic network-based embodiment of the method of trading in accordance with the invention include one or more of the following features.

(a) User Accounts: DBAR contingent claims investment accounts are established using electronic methods.

(b) Interest and Margin Accounts: Trader accounts are maintained using electronic methods to record interest paid to traders on open DBAR contingent claim balances and to debit trader balances for margin loan interest. Interest is typically paid on outstanding investment balances for a group of DBAR contingent claims until the fulfillment of the termination criteria. Interest is typically charged on outstanding margin loans while such loans are outstanding. For some contingent claims, trade balance interest can be imputed into the closing returns of a trading period.

(c) Suspense Accounts: These accounts relate specifically to investments which have been made by traders, during trading periods, simultaneously in multiple states for the same event. Multi-state trades are those in which amounts are invested over a range of states so that, if any of the states occurs, a return is allocated to the trader based on the closing return for the state which in fact occurred. DBAR digital options of the present invention, described in Section 6, provide other examples of multi-state trades.

A trader can, of course, simply break-up or divide the multi-state investment into many separate, single-state investments, although this approach might require the trader to keep rebalancing his portfolio of single state investments as returns adjust throughout the trading period as amounts invested in each state change.

Multi-state trades can be used in order to replicate any arbitrary distribution of payouts that a trader may desire. For example, a trader might want to invest in all states in excess of a given value or price for a security underlying a contingent claim, e.g., the occurrence that a given stock price exceeds 100 at some future date. The trader might also want to receive an identical payout no matter what state occurs among those states. For a group of DBAR contingent claims there may well be many states for outcomes in which the stock price exceeds 100 (e.g., greater than 100 and less than or equal to 101; greater than 101 and less than or equal to 102, etc.). In order to replicate a multi-state investment using single state investments, a trader would need continually to rebalance the portfolio of single-state investments so that the amount invested in the selected multi-states is divided among the states in proportion to the existing amount invested in those states. Suspense accounts can be employed so that the exchange, rather than the trader, is responsible for rebalancing the portfolio of single-state investments so that, at the end of the trading period, the amount of the multi-state investment is allocated among the constituent states in such a way so as to replicate the trader's desired distribution of payouts. Example 3.1.2 below illustrates the use of suspense accounts for multi-state investments.

(d) Authentication: Each trader may have an account that may be authenticated using authenticating data.

(e) Data Security: The security of contingent claims transactions over the network may be ensured, using for example strong forms of public and private key encryption.

(f) Real-time Market Data Server: Real-time market data may be provided to support frequent calculation of returns and to ascertain the outcomes during the observation periods.

(g) Real-time Calculation Engine Server: Frequent calculation of market returns may increase the efficient functioning of the market. Data on coupons, dividends, market interest rates, spot prices, and other market data can be used to calculate opening returns at the beginning of a trading period and to ascertain observable events during the observation period. Sophisticated simulation methods may be required for some groups of DBAR contingent claims in order to estimate expected returns, at least at the start of a trading period.

(h) Real-time Risk Management Server: In order to compute trader margin requirements, expected returns for each trader should be computed frequently. Calculations of "value-at-risk" in traditional markets can involve onerous matrix calculations and Monte Carlo simulations. Risk calculations in preferred embodiments of the present invention are simpler, due to the existence of information on the expected returns for each state. Such information is typically unavailable in traditional capital and reinsurance markets.

(i) Market Data Storage: A DBAR contingent claims exchange in accordance with the invention may generate valuable data as a byproduct of its operation. These data are not readily available in traditional capital or insurance markets. In a preferred embodiment of the present invention, investments may be solicited over ranges of outcomes for market events, such as the event that the 30-year U.S. Treasury bond will close on a given date with a yield between 6.10% and 6.20%. Investment in the entire distribution of states generates data which reflect the expectations of traders over the entire distribution of possible outcomes. The network implementation disclosed in this specification may be used to capture, store and retrieve these data.

(j) Market Evaluation Server: Preferred embodiments of the method of the present invention include the ability to improve the market's efficiency on an ongoing basis. This may readily be accomplished, for example, by comparing the predicted returns on a group of DBAR contingent claims returns with actual realized outcomes. If investors have rational expectations, then DBAR contingent claim returns will, on average, reflect trader expectations, and these expectations will themselves be realized on average. In preferred embodiments, efficiency measurements are made on defined states and investments over the entire distribution of possible outcomes, which can then be used for statistical time series analysis with realized outcomes. The network implementation of the present invention may therefore include analytic servers to perform these analyses for the purpose of continually improving the efficiency of the market.

2. Features of DBAR Contingent Claims

In a preferred embodiment, a group of a DBAR contingent claims related to an observable event includes one or more of the following features:

(1) A defined set of collectively exhaustive states representing possible real-world outcomes related to an observable event. In preferred embodiments, the events are events of economic significance. The possible outcomes can typically be units of measurement associated with the event, e.g., an event of economic interest can be the closing index level of the S&P 500 one month in the future, and the possible outcomes can be entire range of index levels that are possible in one month. In a preferred embodiment, the states are defined to correspond to one or more of the possible outcomes over the entire range of possible outcomes, so that defined states for an event form a countable and discrete number of ranges of possible outcomes, and are collectively exhaustive in the sense of spanning the entire range of possible outcomes. For example, in a preferred embodiment, possible outcomes for the S&P 500 can range from greater than 0 to infinity (theoretically), and a defined state could be those index values greater than 1000 and less than or equal to 1100. In such preferred embodiments, exactly one state occurs when the outcome of the relevant event becomes known.

(2) The ability for traders to place trades on the designated states during one or more trading periods for each event. In a preferred embodiment, a DBAR contingent claim group defines the acceptable units of trade or value for the respective claim. Such units may be dollars, barrels of oil, number of shares of stock, or any other unit or combination of units accepted by traders and the exchange for value.

(3) An accepted determination of the outcome of the event for determining which state or states have occurred. In a preferred embodiment, a group of DBAR contingent claims defines the means by which the outcome of the relevant events is determined. For example, the level that the S&P 500 Index actually closed on a predetermined date would be an outcome observation which would enable the determination of the occurrence of one of the defined states. A closing value of 1050 on that date, for instance, would allow the determination that the state between 1000 and 1100 occurred.

(4) The specification of a DRF which takes the traded amount for each trader for each state across the distribution of states as that distribution exists at the end of each trading period and calculates payouts for each investments in each state conditioned upon the occurrence of each state. In preferred embodiments, this is done so that the total amount of payouts does not exceed the total amount invested by all the traders in all the states. The DRF can be used to show payouts should each state occur during the trading period, thereby providing to traders information as to the collective level of interest of all traders in each state.

(5) Payouts to traders for successful investments based on the total amount of the unsuccessful investments after deduction of the transaction fee and after fulfillment of the termination criteria.

The states corresponding to the range of possible event outcomes are referred to as the "distribution" or "distribution of states." Each DBAR contingent claim group or "contract" is typically associated with one distribution of states. The distribution will typically be defined for events of economic interest for investment by traders having the expectation of a return or a reduction of risk ("hedging"). For example, the distribution can be based upon the values of stocks, bonds, futures, and foreign exchange rates. It can also be based upon the values of commodity indices, economic statistics (e.g., consumer price inflation monthly reports), property-casualty losses, weather patterns for a certain geographical region, and any other measurable or observable occurrence or any other event in which traders would not be economically indifferent even in the absence of a trade on the outcome of the event.

2.1 DBAR Claim Notation

The following notation is used in this specification to facilitate further description of DBAR contingent claims:

m represents the number of traders for a given group of DBAR contingent claims n represents the number of states for a given distribution associated with a given group of DBAR contingent claims A represents a matrix with m rows and n columns, where the element at the i-th row and j-th column, $\alpha_{i,j}$, is the amount that trader i has invested in state j in the expectation of a return should state j occur $\Pi$ represents a matrix with n rows and n columns where element $\pi_{i,j}$ is the payout per unit of investment in state i should state j occur ("unit payouts")

R represents a matrix with n rows and n columns where element $r_{i,j}$ is the return per unit of investment in state i should state j occur, i.e., $r_{i,j}=\pi_{i,j}-1$ ("unit returns")

P represents a matrix with m rows and n columns, where the element at the i-th row and j-th column, $p_{i,j}$, is the payout to be made to trader i should state j occur, i.e., P is equal to the matrix product $A*\Pi$.

$P_{*,j}$ represents the j-th column of P, for j=1 . . . n, which contains the payouts to each investment should state j occur $P_{1,*}$ represents the i-th row of P, for i=1 . . . m, which contains the payouts to trader i $s_i$ where i=1 . . . n, represents a state representing a range of possible outcomes of an observable event.

$T_i$ where i=1 . . . n, represents the total amount traded in the expectation of the occurrence of state i T represents the total traded amount over the entire distribution of states, i.e., $$T = \sum_{i=1...n} T_i$$

f(A,X) represents the exchange's transaction fee, which can depend on the entire distribution of traded amounts placed across all the states as well as other factors, X, some of which are identified below. For reasons of brevity, for the remainder of this specification unless otherwise stated, the transaction fee is assumed to be a fixed percentage of the total amount traded over all the states.

$c_p$ represents the interest rate charged on margin loans.

$c_r$ represents the interest rate paid on trade balances.

t represents time from the acceptance of a trade or investment to the fulfillment of all of the termination criteria for the group of DBAR contingent claims, typically expressed in years or fractions thereof.

X represents other information upon which the DRF or transaction fee can depend such as information specific to a investment or a trader, including for example the time or size of a trade.

In preferred embodiments, a DRF is a function which takes the traded amounts over the distribution of states for a given group of DBAR contingent claims, the transaction fee schedule, and, conditional upon the occurrence of each state, computes the payouts to each trade or investment placed over the distribution of states. In notation, such a DRF is:

$$P=DRF(A,f(A,X),X|s=s_i)=A*\Pi(A,f(A,X),X) \quad \text{(DRF)}$$

In other words, the m traders who have placed trades across the n states, as represented in matrix A, will receive payouts as represented in matrix P should state i occur, also, taking into account the transaction fee f and other factors X. The payouts identified in matrix P can be represented as the product of (a) the payouts per unit traded for each state should each state occur, as identified in the matrix $\Pi$, and (b) the matrix A which identifies the amounts traded or invested by each trader in each state. The following notation may be used to indicate that, in preferred embodiments, payouts should not exceed the total amounts invested less the transaction fee, irrespective of which state occurs:

$$1_m^T * P_{*,j} + f(A, X) <= 1_m^T * A * 1_n$$

for j=1 ... n (DRF Constraint)

where the 1 represents a column vector with dimension indicated by the subscript, the superscript T represents the standard transpose operator and $P_{*,j}$ is the j-th column of the matrix P representing the payouts to be made to each trader should state j occur. Thus, in preferred embodiments, the unsuccessful investments finance the successful investments. In addition, absent credit-related risks discussed below, in such embodiments there is no risk that payouts will exceed the total amount invested in the distribution of states, no matter what state occurs. In short, a preferred embodiment of a group of DBAR contingent claims of the present invention is self-financing in the sense that for any state, the payouts plus the transaction fee do not exceed the inputs (i.e., the invested amounts).

The DRF may depend on factors other than the amount of the investment and the state in which the investment was made. For example, a payout may depend upon the magnitude of a change in the observed outcome for an underlying event between two dates (e.g., the change in price of a security between two dates). As another example, the DRF may allocate higher payouts to traders who initiated investments earlier in the trading period than traders who invested later in the trading period, thereby providing incentives for liquidity earlier in the trading period. Alternatively, the DRF may allocate higher payouts to larger amounts invested in a given state than to smaller amounts invested for that state, thereby providing another liquidity incentive.

In any event, there are many possible functional forms for a DRF that could be used. To illustrate, one trivial form of a DRF is the case in which the traded amounts, A, are not reallocated at all upon the occurrence of any state, i.e., each trader receives his traded amount back in the event that any state occurs, as indicated by the following notation:

$$P=A \text{ if } s=s_i, \text{ for } i=1 \ldots n$$

This trivial DRF is not useful in allocating and exchanging risk among hedgers.

For a meaningful risk exchange to occur, a preferred embodiment of a DRF should effect a meaningful reallocation of amounts invested across the distribution of states upon the occurrence of at least one state. Groups of DBAR contingent claims of the present invention are discussed in the context of a canonical DRF, which is a preferred embodiment in which the amounts invested in states which did not occur are completely reallocated to the state which did occur (less any transaction fee). The present invention is not limited to a canonical DRF, and many other types of DRFs can be used and may be preferred to implement a group of DBAR contingent claims. For example, another DRF preferred embodiment allocates half the total amount invested to the outcome state and rebates the remainder of the total amount invested to the states which did not occur. In another preferred embodiment, a DRF would allocate some percentage to an occurring state, and some other percentage to one or more "nearby" or "adjacent" states with the bulk of the non-occurring states receiving zero payouts. Other DRFs will be apparent to those of skill in the art from review of this specification and practice of the present invention.

2.2 Units of Investments and Payouts

The units of investments and payouts in systems and methods of the present invention may be units of currency, quantities of commodities, numbers of shares of common stock, amount of a swap transaction or any other units representing economic value. Thus, there is no limitation that the investments or payouts be in units of currency or money (e.g., U.S. dollars) or that the payouts resulting from the DRF be in the same units as the investments. Preferably, the same unit of value is used to represent the value of each investment, the total amount of all investments in a group of DBAR contingent claims, and the amounts invested in each state.

It is possible, for example, for traders to make investments in a group of DBAR contingent claims in numbers of shares of common stock and for the applicable DRF to allocate payouts to traders in Japanese Yen or barrels of oil. Furthermore, it is possible for traded amounts and payouts to be some combination of units, such as, for example, a combination of commodities, currencies, and number of shares. In preferred embodiments traders need not physically deposit or receive delivery of the value units, and can rely upon the DBAR contingent claim exchange to convert between units for the purposes of facilitating efficient trading and payout transactions. For example, a DBAR contingent claim might be defined in such a way so that investments and payouts are to be made in ounces of gold. A trader can still deposit currency, e.g., U.S. dollars, with the exchange and the exchange can be responsible for converting the amount invested in dollars into the correct units, e.g., gold, for the purposes of investing in a given state or receiving a payout. In this specification, a U.S. dollar is typically used as the unit of value for investments and payouts. This invention is not limited to investments or payouts in that value unit. In situations where investments and payouts are made in different units or combinations of units, for purpose of allocating returns to each investment the exchange preferably converts the amount of each investment, and thus the total of the investments in a group of DBAR contingent claims, into a single unit of value (e.g., dollars). Example 3.1.20 below illustrates a group of DBAR contingent claims in which investments and payouts are in units of quantities of common stock shares.

2.3 Canonical Demand Reallocation Function

A preferred embodiment of a DRF that can be used to implement a group of DBAR contingent claims is termed a "canonical" DRF. A canonical DRF is a type of DRF which has the following property: upon the occurrence of a given state i, investors who have invested in that state receive a payout per unit invested equal to (a) the total amount traded for all the states less the transaction fee, divided by (b) the total amount invested in the occurring state. A canonical DRF may employ a transaction fee which may be a fixed percentage of the total amount traded, T, although other transaction fees are possible. Traders who made investments in states which not did occur receive zero payout. Using the notation developed above:

$$\pi_{i,j} = \frac{(1-f)*T}{T_i}$$

if i=j, i.e., the unit payout to an investment in state i if state i occurs $\pi_{i,j}=0$ otherwise, i.e., if i≠j, so that the payout is zero to investments in state i if state j occurs.

In a preferred embodiment of a canonical DRF, the unit payout matrix Π as defined above is therefore a diagonal matrix with entries equal to $\pi_{i,j}$ for i=j along the diagonal, and zeroes for all off-diagonal entries. For example, in a preferred embodiment for n=5 states, the unit payout matrix is:

$$\Pi = \begin{bmatrix} \frac{T}{T_1} & 0 & 0 & 0 & 0 \\ 0 & \frac{T}{T_2} & 0 & 0 & 0 \\ 0 & 0 & \frac{T}{T_3} & 0 & 0 \\ 0 & 0 & 0 & \frac{T}{T_4} & 0 \\ 0 & 0 & 0 & 0 & \frac{T}{T_5} \end{bmatrix} *$$

-continued $$(1-f) = \begin{bmatrix} \frac{1}{T_1} & 0 & 0 & 0 & 0 \\ 0 & \frac{1}{T_2} & 0 & 0 & 0 \\ 0 & 0 & \frac{1}{T_3} & 0 & 0 \\ 0 & 0 & 0 & \frac{1}{T_4} & 0 \\ 0 & 0 & 0 & 0 & \frac{1}{T_5} \end{bmatrix} *T*(1-f)$$

For this embodiment of a canonical DRF, the payout matrix is the total amount invested less the transaction fee, multiplied by a diagonal matrix which contains the inverse of the total amount invested in each state along the diagonal, respectively, and zeroes elsewhere. Both T, the total amount invested by all m traders across all n states, and $T_i$, the total amount invested in state i, are functions of the matrix A, which contains the amount each trader has invested in each state:

$$T_i 1_m^T * A * B_n(i)$$

$$T = 1_m^T * A * 1_n$$

where $B_n(i)$ is a column vector of dimension n which has a 1 at the i-th row and zeroes elsewhere. Thus, with n=5 as an example, the canonical DRF described above has a unit payout matrix which is a function of the amounts traded across the states and the transaction fee:

$$\Pi = \begin{bmatrix} \frac{1}{1_m^T*A*B_n(1)} & 0 & 0 & 0 & 0 \\ 0 & \frac{1}{1_m^T*A*B_n(2)} & 0 & 0 & 0 \\ 0 & 0 & \frac{1}{1_m^T*A*B_n(3)} & 0 & 0 \\ 0 & 0 & 0 & \frac{1}{1_m^T*A*B_n(4)} & 0 \\ 0 & 0 & 0 & 0 & \frac{1}{1_m^T*A*B_n(5)} \end{bmatrix} *$$

$$1_m^T * A * 1_n * (1-f)$$

which can be generalized for any arbitrary number of states. The actual payout matrix, in the defined units of value for the group of DBAR contingent claims (e.g., dollars), is the product of the m×n traded amount matrix A and the n×n unit payout matrix Π, as defined above:

$$P = A * \Pi(A, f) \quad \text{(CDRF)}$$

This provides that the payout matrix as defined above is the matrix product of the amounts traded as contained in the matrix A and the unit payout matrix Π, which is itself a function of the matrix A and the transaction fee, f. The expression is labeled CDRF for "Canonical Demand Reallocation Function."

It should be noted that, in this preferred embodiment, any change to the matrix A will generally have an effect on any given trader's payout, both due to changes in the amount invested, i.e., a direct effect through the matrix A in the CDRF, and changes in the unit payouts, i.e., an indirect effect since the unit payout matrix Π is itself a function of the traded amount matrix A.

2.4 Computing Investment Amounts to Achieve Desired Payouts

In preferred embodiments of a group of DBAR contingent claims of the present invention, some traders make investments in states during the trading period in the expectation of a payout upon the occurrence of a given state, as expressed in the CDRF above. Alternatively, a trader may have a preference for a desired payout distribution should a given state occur. DBAR digital options, described in Section 6, are an example of an investment with a desired payout distribution should one or more specified states occur. Such a payout distribution could be denoted $P_{i*}$, which is a row corresponding to trader i in payout matrix P. Such a trader may want to know how much to invest in contingent claims corresponding to a given state or states in order to achieve this payout distribution. In a preferred embodiment, the amount or amounts to be invested across the distribution of states for the CDRF, given a payout distribution, can be obtained by inverting the expression for the CDRF and solving for the traded amount matrix A:

$$A = P * \Pi(A,f)^{-1} \quad \text{(CDRF 2)}$$

In this notation, the −1 superscript on the unit payout matrix denotes a matrix inverse.

Expression CDRF 2 does not provide an explicit solution for the traded amount matrix A, since the unit payout matrix Π is itself a function of the traded amount matrix. CDRF 2 typically involves the use of numerical methods to solve m simultaneous quadratic equations. For example, consider a trader who would like to know what amount, $\alpha$, should be traded for a given state i in order to achieve a desired payout of p. Using the "forward" expression to compute payouts from traded amounts as in CDRF above yields the following equation:

$$p = \left(\frac{T + \alpha}{T_i + \alpha}\right) * \alpha$$

This represents a given row and column of the matrix equation CDRF after cc has been traded for state i (assuming no transaction fee). This expression is quadratic in the traded amount $\alpha$, and can be solved for the positive quadratic root as follows:

$$\alpha = \frac{(p - T) + \sqrt{(p - T)^2 + 4 * p * T_i}}{2} \quad \text{(CDRF 3)}$$

2.5 A Canonical DRF Example

A simplified example illustrates the use of the CDRF with a group of DBAR contingent claims defined over two states (e.g., states "1" and "2") in which four traders make investments. For the example, the following assumptions are made: (1) the transaction fee, f, is zero; (2) the investment and payout units are both dollars; (3) trader 1 has made investments in the amount of $5 in state 1 and $10 state 2; and (4) trader 2 has made an investment in the amount of $7 for state 1 only. With the investment activity so far described, the traded amount matrix A, which as 4 rows and 2 columns, and the unit payout matrix Π which has 2 rows and 2 columns, would be denoted as follows:

$$A = \begin{matrix} 5 & 10 \\ 7 & 0 \\ 0 & 0 \\ 0 & 0 \end{matrix}$$

$$\Pi = \begin{bmatrix} \frac{1}{12} & 0 \\ 0 & \frac{1}{10} \end{bmatrix} * 22$$

The payout matrix P, which contains the payouts in dollars for each trader should each state occur is, the product of A and Π:

$$P = \begin{matrix} 9.167 & 22 \\ 12.833 & 0 \\ 0 & 0 \\ 0 & 0 \end{matrix}$$

The first row of P corresponds to payouts to trader 1 based on his investments and the unit payout matrix. Should state 1 occur, trader 1 will receive a payout of $9.167 and will receive $22 should state 2 occur. Similarly, trader 2 will receive $12.833 should state 1 occur and $0 should state 2 occur (since trader 2 did not make any investment in state 2). In this illustration, traders 3 and 4 have $0 payouts since they have made no investments.

In accordance with the expression above labeled "DRF Constraint," the total payouts to be made upon the occurrence of either state is less than or equal to the total amounts invested. In other words, the CDRF in this example is self-financing so that total payouts plus the transaction fee (assumed to be zero in this example) do not exceed the total amounts invested, irrespective of which state occurs. This is indicated by the following notation:

$$1_m^T * P_{*,1} = 22 \leq 1_m^T * A * 1_n = 22$$
$$1_m^T * P_{*,2} = 22 \leq 1_m^T * A * 1_n = 22$$

Continuing with this example, it is now assumed that traders 3 and 4 each would like to make investments which generate a desired payout distribution. For example, it is assumed that trader 3 would like to receive a payout of $2 should state 1 occur and $4 should state 2 occur, while trader 4 would like to receive a payout of $5 should state 1 occur and $0 should state 2 occur. In the CDRF notation:

$$P_{3,*} = [2 \quad 4]$$
$$P_{4,*} = [5 \quad 0]$$

In a preferred embodiment and this example, payouts are made based upon the invested amounts A, and therefore are also based on the unit payout matrix Π(A,f(A)), given the distribution of traded amounts as they exist at the end of the trading period. For purposes of this example, it is now further assumed (a) that at the end of the trading period traders 1 and 2 have made investments as indicated above, and (b) that the desired payout distributions for traders 3 and 4 have been recorded in a suspense account which is used to determine the allocation of multi-state investments to each state in order to achieve the desired payout distributions for each trader, given the investments by the other traders as they exist at the end of the trading period. In order to determine the proper allocation, the suspense account can be used to solve CDRF 2, for example:

$$\begin{bmatrix} 5 & 10 \\ 7 & 0 \\ \alpha_{3,1} & \alpha_{3,2} \\ \alpha_{4,1} & \alpha_{4,2} \end{bmatrix} = \begin{bmatrix} p_{1,1} & p_{1,2} \\ p_{2,1} & p_{2,2} \\ 2 & 4 \\ 5 & 0 \end{bmatrix} * $$

$$\begin{bmatrix} \frac{1}{(5+7+\alpha_{3,1}+\alpha_{4,1})} & 0 \\ 0 & \frac{1}{(10+0+\alpha_{3,2}+\alpha_{4,2})} \end{bmatrix} *$$

$$(5+10+7+0+\alpha_{3,1}+\alpha_{4,1}+\alpha_{3,2}+\alpha_{4,2})$$

The solution of this expression will yield the amounts that traders 3 and 4 need to invest in for contingent claims corresponding to states 1 and 2 to in order to achieve their desired payout distributions, respectively. This solution will also finalize the total investment amount so that traders 1 and 2 will be able to determine their payouts should either state occur. This solution can be achieved using a computer program which computes an investment amount for each state for each trader in order to generate the desired payout for that trader for that state. In a preferred embodiment, the computer program repeats the process iteratively until the calculated investment amounts converge, i.e., so that the amounts to be invested by traders 3 and 4 no longer materially change with each successive iteration of the computational process. This method is known in the art as fixed point iteration and is explained in more detail in the Technical Appendix. The following table contains a computer code listing of two functions written in Microsoft's Visual Basic which can be used to perform the iterative calculations to compute the final allocations of the invested amounts in this example of a group of DBAR contingent claims with a Canonical Demand Reallocation Function:

TABLE 1

Illustrative Visual Basic Computer Code for Solving CDRF 2

```
Function allocatetrades(A_mat, P_mat) As Variant
Dim A_final
Dim trades As Long
Dim states As Long
trades = P_mat.Rows.Count
states = P_mat.Columns.Count
ReDim A_final(1 To trades, 1 To states)
ReDim statedem(1 To states)
Dim i As Long
Dim totaldemand As Double
Dim total desired As Double
Dim iterations As Long
iterations = 10
For i = 1 To trades
    For j = 1 To states
        statdem(j) = A_mat(i, j) + statedem(j)
        A_final(1, j) = A_mat(i, j)
    Next j
Next i
For i = 1 To states
    totaldemand = totaldemand + statedem(i)
Next i
For i = 1 To iterations
    For j = 1 To trades
        For z = 1 To states
            If A_mat(j, z) = 0 Then
            totaldemand = totaldemand - A_final(j, z)
            statedem(z) = statedem(z) - A_final(j, z)
            tempalloc = A_final(j, z)
            A_final(j, z) = stateall(totaldemand, P_mat(j, z), statedem(z))
            totaldemand = A_final(j, z) + totaldemand
            statedem(z) = A_final(j, z) + statedem(z)
            End If
        Next z
    Next j
Next i
allocatetrades = A_final
End Function
Function stateall(totdemex, despaystate, totstateex)
    Dim soll As Double
    soll = (-(totdemex - despaystate) + ((totdemex - despaystate) ^ 2 + 4 * despaystate * totstateex) ^ 0.5) / 2
    stateall soll
End Function
```

For this example involving two states and four traders, use of the computer code represented in Table 1 produces an investment amount matrix A, as follows:

$$A = \begin{matrix} 5 & 10 \\ 7 & 0 \\ 1.1574 & 1.6852 \\ 2.8935 & 0 \end{matrix}$$

The matrix of unit payouts, $\Pi$, can be computed from A as described above and is equal to:

$$\Pi = \begin{matrix} 1.728 & 0 \\ 0 & 2.3736 \end{matrix}$$

The resulting payout matrix P is the product of A and $\Pi$ and is equal to:

$$P = \begin{matrix} 8.64 & 23.7361 \\ 12.0961 & 0 \\ 2 & 4 \\ 5 & 0 \end{matrix}$$

It can be noted that the sum of each column of P, above is equal to 27.7361, which is equal (in dollars) to the total amount invested so, as desired in this example, the group of DBAR contingent claims is self-financing. The allocation is said to be in equilibrium, since the amounts invested by traders 1 and 2 are undisturbed, and traders 3 and 4 receive their desired payouts, as specified above, should each state occur.

2.6 Interest Considerations

When investing in a group of DBAR contingent claims, traders will typically have outstanding balances invested for periods of time and may also have outstanding loans or margin balances from the exchange for periods of time. Traders will typically be paid interest on outstanding investment balances and typically will pay interest on outstanding margin loans. In preferred embodiments, the effect of trade balance interest and margin loan interest can be made explicit in the payouts, although in alternate preferred embodiments these items can be handled outside of the payout structure, for example, by debiting and crediting user accounts. So, if a fraction $\beta$ of a trade of one value unit is made with cash and the rest on margin, the unit payout $\pi_i$ in the event that state i occurs can be expressed as follows:

$$\pi_i = \frac{(1-f)*T}{T_i} + \beta*(c_r)*t_b - (1-\beta)*(c_p)*t_l$$

where the last two terms express the respective credit for trade balances per unit invested for time $t_b$ and debit for margin loans per unit invested for time $t_l$.

2.7 Returns and Probabilities

In a preferred embodiment of a group of DBAR contingent claims with a canonical DRF, returns which represent the percentage return per unit of investment are closely related to payouts. Such returns are also closely related to the notion of a financial return familiar to investors. For example, if an investor has purchased a stock for $100 and sells it for $110, then this investor has realized a return of 10% (and a payout of $110).

In a preferred embodiment of a group of DBAR contingent claims with a canonical DRF, the unit return, $r_i$, should state i occur may be expressed as follows:

$$r_i = \frac{(1-f)*\sum_{i=1...n} T_i - T_i}{T_i}$$

if state i occurs $$r_i = -1$$

otherwise, i.e., if state i does not occur

In such an embodiment, the return per unit investment in a state that occurs is a function of the amount invested in that state, the amount invested in all the other states and the exchange fee. The unit return is −100% for a state that does not occur, i.e., the entire amount invested in the expectation of receiving a return if a state occurs is forfeited if that state fails to occur. A −100% return in such an event has the same return profile as, for example, a traditional option expiring "out of the money." When a traditional option expires out of the money, the premium decays to zero, and the entire amount invested in the option is lost.

For purposes of this specification, a payout is defined as one plus the return per unit invested in a given state multiplied by the amount that has been invested in that state. The sum of all payouts Ps, for a group of DBAR contingent claims corresponding to all n possible states can be expressed as follows:

$$P_s = (1+r_i)*T_i + \sum_{j, j \neq i} (1+r_j)*T_j \qquad i,j = 1...n$$

In a preferred embodiment employing a canonical DRF, the payout Ps may be found for the occurrence of state i by substituting the above expressions for the unit return in any state:

$$P_s =$$

$$\left( \frac{(1-f)*\sum_{i=1...n} T_i - T_i}{T_i} + 1 \right) * T_i + \sum_{j,j \neq i} (-1+1)*T_j = (1-f)*\sum_{i=1...n} T_i$$

Accordingly, in such a preferred embodiment, for the occurrence of any given state, no matter what state, the aggregate payout to all of the traders as a whole is one minus the transaction fee paid to the exchange (expressed in this preferred embodiment as a percentage of total investment across all the states), multiplied by the total amount invested across all the states for the group of DBAR contingent claims. This means that in a preferred embodiment of a group of the DBAR contingent claims, and assuming no credit or similar risks to the exchange, (1) the exchange has zero probability of loss in any given state; (2) for the occurrence of any given state, the exchange receives an exchange fee and is not exposed to any risk; (3) payouts and returns are a function of demand flow, i.e., amounts invested; and (4) transaction fees or exchange fees can be a simple function of aggregate amount invested.

Other transaction fees can be implemented. For example, the transaction fee might have a fixed component for some level of aggregate amount invested and then have either a sliding or fixed percentage applied to the amount of the investment in excess of this level. Other methods for determining the transaction fee are apparent to those of skill in the art, from this specification or based on practice of the present invention.

In a preferred embodiment, the total distribution of amounts invested in the various states also implies an assessment by all traders collectively of the probabilities of occurrence of each state. In a preferred embodiment of a group of DBAR contingent claims with a canonical DRF, the expected return $E(r_i)$ for an investment in a given state i (as opposed to the return actually received once outcomes are known) may be expressed as the probability weighted sum of the returns:

$$E(r_i) = q_i * r_i + (1-q_i) * -1 = q_i * (1+r_i) - 1$$

Where $q_i$ is the probability of the occurrence of state i implied by the matrix A (which contains all of the invested amounts for all states in the group of DBAR contingent claims). Substituting the expression for $r_i$ from above yields:

$$E(r_i) = q_i * \left( \frac{(1-f) * \sum_i T_i}{T_i} \right) - 1$$

In an efficient market, the expected return $E(r_i)$ across all states is equal to the transaction costs of trading, i.e., on average, all traders collectively earn returns that do not exceed the costs of trading. Thus, in an efficient market for a group of DBAR contingent claims using a canonical, where $E(r_i)$ equals the transaction fee, $-f$, the probability of the occurrence of state i implied by matrix A is computed to be:

$$q_i = \frac{T_i}{\sum_i T_i}$$

Thus, in such a group of DBAR contingent claims, the implied probability of a given state is the ratio of the amount invested in that state divided by the total amount invested in all states. This relationship allows traders in the group of DBAR contingent claims (with a canonical DRF) readily to calculate the implied probability which traders attach to the various states.

Information of interest to a trader typically includes the amounts invested per state, the unit return per state, and implied state probabilities. An advantage of the DBAR exchange of the present invention is the relationship among these quantities. In a preferred embodiment, if the trader knows one, the other two can be readily determined.

For example, the relationship of unit returns to the occurrence of a state and the probability of the occurrence of that state implied by A can be expressed as follows:

$$q_i = \frac{(1-f)}{(1+r_i)}$$

The expressions derived above show that returns and implied state probabilities may be calculated from the distribution of the invested amounts, $T_i$, for all states, $i=1 \ldots n$. In the traditional markets, the amount traded across the distribution of states (limit order book), is not readily available. Furthermore, in traditional markets there are no such ready mathematical calculations which relate with any precision invested amounts or the limit order book to returns or prices which clear the market, i.e., prices at which the supply equals the demand. Rather, in the traditional markets, specialist brokers and market makers typically have privileged access to the distribution of bids and offers, or the limit order book, and frequently use this privileged information in order to set market prices which balance supply and demand at any given time in the judgment of the market maker.

2.8 Computations When Invested Amounts are Large

In a preferred embodiment of a group of DBAR contingent claims using a canonical DRF, when large amounts are invested across the distribution of states, it may be possible to perform approximate investment allocation calculations in order to generate desired payout distributions. The payout, p, should state i occur for a trader who considers making an investment of size $\alpha$ in state i has been shown above to be:

$$p = \left( \frac{T + \alpha}{T_i + \alpha} \right) * \alpha$$

If $\alpha$ is small compared to both the total invested in state i and the total amount invested in all the states, then adding $\alpha$ to state i will not have a material effect on the ratio of the total amount invested in all the states to the total amount invested in state i. In these circumstances, $$\frac{T + \alpha}{T_i + \alpha} \approx \frac{T}{T_i}$$

Thus, in preferred embodiments where an approximation is acceptable, the payout to state i may be expressed as:

$$p \approx \frac{T}{T_i} * \alpha$$

In these circumstances, the investment needed to generate the payout p is:

$$\alpha \approx \frac{T_i}{T} * p = q_i * p$$

These expressions indicate that in preferred embodiments, the amount to be invested to generate a desired payout is approximately equal to the ratio of the total amount invested in state i to the total amount invested in all states, multiplied by the desired payout. This is equivalent to the implied probability multiplied by the desired payout. Applying this approximation to the expression CDRF 2, above, yields the following:

$$A \approx P * \Pi^{-1} = P * Q$$

where the matrix Q, of dimension n×n, is equal to the inverse of unit payouts Π, and has along the diagonals $q_i$ for i=1 ... n. This expression provides an approximate but more readily calculable solution to CDRF 2 as the expression implicitly assumes that an amount invested by a trader has approximately no effect on the existing unit payouts or implied probabilities. This approximate solution, which is linear and not quadratic, will sometimes be used in the following examples where it can be assumed that the total amounts invested are large in relation to any given trader's particular investment.

3. Examples of Groups of DBAR Contingent Claims
   3.1 DBAR Range Derivatives

A DBAR Range Derivative (DBAR RD) is a type of group of DBAR contingent claims implemented using a canonical DRF described above. In a DBAR RD, a range of possible outcomes associated with an observable event of economic significance is partitioned into defined states. In a preferred embodiment, the states are defined as discrete ranges of possible outcomes so that the entire distribution of states covers all the possible outcomes—that is, the states are collectively exhaustive. Furthermore, in a DBAR RD, states are preferably defined so as to be mutually exclusive as well, meaning that the states are defined in such a way so that exactly one state occurs. If the states are defined to be both mutually exclusive and collectively exhaustive, the states form the basis of a probability distribution defined over discrete outcome ranges. Defining the states in this way has many advantages as described below, including the advantage that the amount which traders invest across the states can be readily converted into implied probabilities representing the collective assessment of traders as to the likelihood of the occurrence of each state.

The system and methods of the present invention may also be applied to determine projected DBAR RD returns for various states at the beginning of a trading period. Such a determination can be, but need not be, made by an exchange. In preferred embodiments of a group of DBAR contingent claims the distribution of invested amounts at the end of a trading period determines the returns for each state, and the amount invested in each state is a function of trader preferences and probability assessments of each state. Accordingly, some assumptions typically need to be made in order to determine preliminary or projected returns for each state at the beginning of a trading period.

An illustration is provided to explain further the operation of DBAR RDs. In the following illustration, it is assumed that all traders are risk neutral so that implied probabilities for a state are equal to the actual probabilities, and so that all traders have identical probability assessments of the possible outcomes for the event defining the contingent claim. For convenience in this illustration, the event forming the basis for the contingent claims is taken to be a closing price of a security, such as a common stock, at some future date; and the states, which represent the possible outcomes of the level of the closing price, are defined to be distinct, mutually exclusive and collectively exhaustive of the range of (possible) closing prices for the security. In this illustration, the following notation is used:

τ represents a given time during the trading period at which traders are making investment decisions θ represents the time corresponding to the expiration of the contingent claim $V_\tau$ represents the price of underlying security at time τ

$V_\theta$ represents the price of underlying security at time θ

Z(τ,θ) represents the present value of one unit of value payable at time θ evaluated at time τ

D(τ,θ) represents dividends or coupons payable between time τ and θ

$\sigma_t$ represents annualized volatility of natural logarithm returns of the underlying security dz represents the standard normal variate Traders make choices at a representative time, τ, during a trading period which is open, so that time τ is temporally subsequent to the current trading period's TSD.

In this illustration, and in preferred embodiments, the defined states for the group of contingent claims for the final closing price $V_\theta$ are constructed by discretizing the full range of possible prices into possible mutually exclusive and collectively exhaustive states. The technique is similar to forming a histogram for discrete countable data. The endpoints of each state can be chosen, for example, to be equally spaced, or of varying spacing to reflect the reduced likehood of extreme outcomes compared to outcomes near the mean or median of the distribution. States may also be defined in other manners apparent to one of skill in the art. The lower endpoint of a state can be included and the upper endpoint excluded, or vice versa. In any event, in preferred embodiments, the states are defined (as explained below) to maximize the attractiveness of investment in the group of DBAR contingent claims, since it is the invested amounts that ultimately determine the returns that are associated with each defined state.

The procedure of defining states, for example for a stock price, can be accomplished by assuming lognormality, by using statistical estimation techniques based on historical time series data and cross-section market data from options prices, by using other statistical distributions, or according to other procedures known to one of skill in the art or learned from this specification or through practice of the present invention. For example, it is quite common among derivatives traders to estimate volatility parameters for the purpose of pricing options by using the econometric techniques such as GARCH. Using these parameters and the known dividend or coupons over the time period from τ to θ, for example, the states for a DBAR RD can be defined.

A lognormal distribution is chosen for this illustration since it is commonly employed by derivatives traders as a distributional assumption for the purpose of evaluating the prices of options and other derivative securities. Accordingly, for purposes of this illustration it is assumed that all traders agree that the underlying distribution of states for the security are lognormally distributed such that:

$$\tilde{V}_\theta = \left( \frac{V_\tau}{Z(\tau,\theta)} - \frac{D(\tau,\theta)}{Z(\tau,\theta)} \right) * e^{-\sigma^2/2*(\theta-\tau)} * e^{\sigma*\sqrt{\theta-\tau}*dz}$$

where the "tilde" on the left-hand side of the expression indicates that the final closing price of the value of the security at time θ is yet to be known. Inversion of the expression for dz and discretization of ranges yields the following expressions:

$$dz = \ln\left(\frac{V_\theta * e^{\frac{\sigma^2}{2}*(\theta-\tau)}}{\left(\frac{V_\tau}{Z(\tau,\theta)} - \frac{D(\tau,\theta)}{Z(\tau,\theta)}\right)}\right) \bigg/ \left(\sigma * \sqrt{\theta-\tau}\right)$$

$$q_i(V_i <= V_\theta < V_{i+1}) = cdf(dz_{i+1}) - cdf(dz_i)$$

$$r_i(V_i <= V_\theta <_{i+1}) = \frac{(1-f)}{q_i(V_i <= V_\theta < V_{i+1})} - 1$$

where cdf(dz) is the cumulative standard normal function.

The assumptions and calculations reflected in the expressions presented above can also be used to calculate indicative returns ("opening returns"), $r_i$ at a beginning of the trading period for a given group of DBAR contingent claims. In a preferred embodiment, the calculated opening returns are based on the exchange's best estimate of the probabilities for the states defining the claim and therefore may provide good indications to traders of likely returns once trading is underway. In another preferred embodiment, described with respect to DBAR digital options in Section 6, a very small number of value units may be used in each state to initialize the contract or group of contingent claims. Of course, opening returns need not be provided at all, as traded amounts placed throughout the trading period allows the calculation of actual expected returns at any time during the trading period.

The following examples of DBAR range derivatives and other contingent claims serve to illustrate their operation, their usefulness in connection with events of economic significance involving inherent risk or uncertainty, the advantages of exchanges for groups of DBAR contingent claims, and, more generally, systems and methods of the present invention. Section 6 also provides examples of DBAR contingent claims of the present invention that provide profit and loss scenarios comparable to those provided by digital options in conventional options markets.

In each of the examples in this Section, a state is defined to include a range of possible outcomes of an event of economic significance (e.g., the price of a stock). A curved brace "(" or ")" denotes strict inequality (e.g., "greater than" or "less than," respectively) and a square brace "]" or "[" shall denote weak inequality (e.g., "less than or equal to" or "greater than or equal to," respectively). For simplicity, and unless otherwise stated, the following examples also assume that the exchange transaction fee, f, is zero.

EXAMPLE 3.1.1

DBAR Contingent Claim On Underlying Common Stock

Underlying Security: Microsoft Corporation Common Stock ("MSFT")
Date: Aug. 18, 1999
Spot Price: 85
Market Volatility: 50% annualized
Trading Start Date: Aug. 18, 1999, Market Open
Trading End Date: Aug. 18, 1999, Market Close
Expiration: Aug. 19, 1999, Market Close
Event: MSFT Closing Price Price at Expiration
Trading Time: 1 day
Duration to TED: 1 day
Dividends Payable to Expiration: 0
Interbank short-term interest rate to Expiration: 5.5% (Actual/360 daycount)
Present Value factor to Expiration: 0.999847
Investment and Payout Units: U.S. Dollars ("USD")

In this Example 3.11, the predetermined termination criteria are the investment in a contingent claim during the trading period and the closing of the market for Microsoft common stock on Aug. 19, 1999.

If all traders agree that the underlying distribution of closing prices is lognormally distributed with volatility of 50%, then an illustrative "snapshot" distribution of invested amounts and returns for $100 million of aggregate investment can be readily calculated to yield the following table.

TABLE 3.1.1-1

| States | Investment in State ('000) | Return Per Unit if State Occurs |
|---|---|---|
| (0,80] | 1,046.58 | 94.55 |
| (80,80.5] | 870.67 | 113.85 |
| (80.5,81] | 1,411.35 | 69.85 |
| (81,81.5] | 2,157.85 | 45.34 |
| (81.5,82] | 3,115.03 | 31.1 |
| (82,82.5] | 4,250.18 | 22.53 |
| (82.5,83] | 5,486.44 | 17.23 |
| (83,83.5] | 6,707.18 | 13.91 |
| (83.5,84] | 7,772.68 | 11.87 |
| (84,84.5] | 8,546.50 | 10.7 |
| (84.5,85] | 8,924.71 | 10.2 |
| (85,85.5] | 8,858.85 | 10.29 |
| (85.5,86] | 8,366.06 | 10.95 |
| (86,86.5] | 7,523.13 | 12.29 |
| (86.5,87] | 6,447.26 | 14.51 |
| (87,87.5] | 5,270.01 | 17.98 |
| (87.5,88] | 4,112.05 | 23.31 |
| (88,88.5] | 3,065.21 | 31.62 |
| (88.5,89] | 2,184.5 | 44.78 |
| (89,89.5] | 1,489.58 | 66.13 |
| (89.5,90] | 972.56 | 101.82 |
| (90,∞] | 1,421.61 | 69.34 |

Consistent with the design of a preferred embodiment of a group of DBAR contingent claims, the amount invested for any given state is inversely related to the unit return for that state.

In preferred embodiments of groups of DBAR contingent claims, traders can invest in none, one or many states. It may be possible in preferred embodiments to allow traders efficiently to invest in a set, subset or combination of states for the purposes of generating desired distributions of payouts across the states. In particular, traders may be interested in replicating payout distributions which are common in the traditional markets, such as payouts corresponding to a long stock position, a short futures position, a long option straddle position, a digital put or digital call option.

If in this Example 3.1.1 a trader desired to hedge his exposure to extreme outcomes in MSFT stock, then the trader could invest in states at each end of the distribution of possible outcomes. For instance, a trader might decide to invest $100,000 in states encompassing prices from $0 up to and including $83 (i.e., (0,83]) and another $100,000 in states encompassing prices greater than $86.50 (i.e., (86.5, ∞]). The trader may further desire that no matter what state actually occurs within these ranges (should the state occur in either range) upon the fulfillment of the predetermined termination criteria, an identical payout will result. In this Example 3.1.1, a multi-state investment is effectively a group of single state investments over each multi-state range, where an amount is invested in each state in the range in proportion to the amount previously invested in that state. If, for example, the returns provided in Table 3.1.1-1 represent finalized projected returns at the end of the trading period, then each multi-state investment may be allocated to its constituent states on a pro-rata or proportional basis according to the relative amounts invested in the constituent states at the close of trading. In this way, more of the multi-state investment is allocated to states with larger investments and less allocated to the states with smaller investments.

Other desired payout distributions across the states can be generated by allocating the amount invested among the constituent states in different ways so as achieve a trader's desired payout distribution. A trader may select, for example, both the magnitude of the payouts and how those payouts are to be distributed should each state occur and let the DBAR exchange's multi-state allocation methods determine (1) the size of the amount invested in each particular constituent state; (2) the states in which investments will be made, and (3) how much of the total amount to be invested will be invested in each of the states so determined. Other examples below demonstrate how such selections may be implemented.

Since in preferred embodiments the final projected returns are not known until the end of a given trading period, in such embodiments a previous multi-state investment is reallocated to its constituent states periodically as the amounts invested in each state (and therefore returns) change during the trading period. At the end of the trading period when trading ceases and projected returns are finalized, in a preferred embodiment a final reallocation is made of all the multi-state investments. In preferred embodiments, a suspense account is used to record and reallocate multi-state investments during the course of trading and at the end of the trading period.

Referring back to the illustration assuming two multi-state trades over the ranges (0,83] and (86.5,∞] for MSFT stock, Table 3.1.1-2 shows how the multi-state investments in the amount of $100,000 each could be allocated according to a preferred embodiment to the individual states over each range in order to achieve a payout for each multi-state range which is identical regardless of which state occurs within each range. In particular, in this illustration the multi-state investments are allocated in proportion to the previously invested amount in each state, and the multi-state investments marginally lower returns over (0,83] and (86.5,∞], but marginally increase returns over the range (83, 86.5], as expected.

To show that the allocation in this example has achieved its goal of delivering the desired payouts to the trader, two payouts for the (0, 83] range are considered. The payout, if constituent state (80.5, 81] occurs, is the amount invested in that state ($7.696) multiplied by one plus the return per unit if that state occurs, or (1+69.61)*7.696=$543.40. A similar analysis for the state (82.5, 83] shows that, if it occurs, the payout is equal to (1+17.162)*29.918=$543.40. Thus, in this illustration, the trader receives the same payout no matter which constituent state occurs within the multi-state investment. Similar calculations can be performed for the range [86.5,∞]. For example, under the same assumptions, the payout for the constituent state [86.5,87] would receive a payout of $399.80 if the stock price fill in that range after the fulfillment of all of the predetermined termination criteria. In this illustration, each constituent state over the range [86.5, ∞] would receive a payout of $399.80, no matter which of those states occurs.

TABLE 3.1.1-2

| States | Traded Amount in State ('000) | Return Per Unit if State Occurs | Multi-State Allocation ('000) |
|---|---|---|---|
| (0,80] | 1052.29 | 94.22 | 5.707 |
| (80,80.5] | 875.42 | 113.46 | 4.748 |
| (80.5,81] | 1,419.05 | 69.61 | 7.696 |
| (81,81.5] | 2,169.61 | 45.18 | 11.767 |
| (81.5,82] | 3,132.02 | 30.99 | 16.987 |
| (82,82.5] | 4,273.35 | 22.45 | 23.177 |
| (82.5,83] | 5,516.36 | 17.16 | 29.918 |
| (83,83.5] | 6,707.18 | 13.94 | |
| (83.5,84] | 7,772.68 | 11.89 | |
| (84,84.5] | 8,546.50 | 10.72 | |
| (84.5,85] | 8,924.71 | 10.23 | |
| (85,85.5] | 8,858.85 | 10.31 | |
| (85.5,86] | 8,366.06 | 10.98 | |
| (86,86.5] | 7,523.13 | 12.32 | |
| (86.5,87] | 6,473.09 | 14.48 | 25.828 |
| (87,87.5] | 5,291.12 | 17.94 | 21.111 |
| (87.5,88] | 4,128.52 | 23.27 | 16.473 |
| (88,88.5] | 3,077.49 | 31.56 | 12.279 |
| (88.5,89] | 2,193.25 | 44.69 | 8.751 |
| (89,89.5] | 1,495.55 | 66.00 | 5.967 |
| (89.5,90] | 976.46 | 101.62 | 3.896 |
| (90,∞] | 1,427.31 | 69.20 | 5.695 |

Example 3.1.2

Multiple Multi-state Investments

If numerous multi-state investments are made for a group of DBAR contingent claims, then in a preferred embodiment an iterative procedure can be employed to allocate all of the multi-state investments to their respective constituent states. In preferred embodiments, the goal would be to allocate each multi-state investment in response to changes in amounts invested during the trading period, and to make a final allocation at the end of the trading period so that each multi-state investment generates the payouts desired by the respective trader. In preferred embodiments, the process of allocating multi-state investments can be iterative, since allocations depend upon the amounts traded across the distribution of states at any point in time. As a consequence, in preferred embodiments, a given distribution of invested amounts will result in a certain allocation of a multi-state investment. When another multi-state investment is allocated, the distribution of invested amounts across the defined states may change and therefore necessitate the reallocation of any previously allocated multi-state investments. In such preferred embodiments, each multi-state allocation is re-performed so that, after a number of iterations through all of the pending multi-state investments, both the amounts invested and their allocations among constituent states in the multi-state investments no longer change with each successive iteration and a convergence is achieved. In preferred embodiments, when convergence is achieved, further iteration and reallocation among the multi-state investments do not change any multi-state allocation, and the entire distribution of amounts invested across the states remains stable and is said to be in equilibrium. Computer code, as illustrated in Table 1 above or related code readily apparent to one of skill in the art, can be used to implement this iterative procedure.

A simple example demonstrates a preferred embodiment of an iterative procedure that may be employed. For purposes of this example, a preferred embodiment of the following assumptions are made: (i) there are four defined states for the group of DBAR contingent claims; (ii) prior to the allocation of any multi-state investments, $100 has been invested in each state so that the unit return for each of the four states is 3; (iii) each desires that each constituent state in a multi-state investment provides the same payout regardless of which constituent state actually occurs; and (iv) that the following other multi-state investments have been made:

TABLE 3.1.2-1

| Investment Number | State 1 | State 2 | State 3 | State 4 | Invested Amount, $ |
|---|---|---|---|---|---|
| 1001 | X | X | O | O | 100 |
| 1002 | X | O | X | X | 50 |
| 1003 | X | X | O | O | 120 |
| 1004 | X | X | X | O | 160 |
| 1005 | X | X | X | O | 180 |
| 1006 | O | O | X | X | 210 |
| 1007 | X | X | X | O | 80 |
| 1008 | X | O | X | X | 950 |
| 1009 | X | X | X | O | 1000 |
| 1010 | X | X | O | X | 500 |
| 1011 | X | O | O | X | 250 |
| 1012 | X | X | O | O | 100 |
| 1013 | X | O | X | O | 500 |
| 1014 | O | X | O | X | 1000 |
| 1015 | O | X | X | O | 170 |
| 1016 | O | X | O | X | 120 |
| 1017 | X | O | X | O | 1000 |
| 1018 | O | O | X | X | 200 |
| 1019 | X | X | X | O | 250 |
| 1020 | X | X | O | X | 300 |
| 1021 | O | X | X | X | 100 |
| 1022 | X | O | X | X | 400 | where an "X" in each state represents a constituent state of the multi-state trade. Thus, as depicted in Table 3.1.2-1, trade number 1001 in the first row is a multi-state investment of $100 to be allocated among constituent states 1 and 2, trade number 1002 in the second row is another multi-state investment in the amount of $50 to be allocated among constituent states 1, 3, and 4; etc.

Applied to the illustrative multi-state investment described above, the iterative produced described above and embodied in the illustrative computer code in Table 1, results in the following allocations:

TABLE 3.1.2-2

| Investment Number | State 1($) | State 2($) | State 3($) | State4($) |
|---|---|---|---|---|
| 1001 | 73.8396 | 26.1604 | 0 | 0 |
| 1002 | 26.66782 | 0 | 12.53362 | 10.79856 |
| 1003 | 88.60752 | 31.39248 | 0 | 0 |
| 1004 | 87.7059 | 31.07308 | 41.22096 | 0 |
| 1005 | 98.66921 | 34.95721 | 46.37358 | 0 |
| 1006 | 0 | 0 | 112.8081 | 97.19185 |
| 1007 | 43.85298 | 15.53654 | 20.61048 | 0 |
| 1008 | 506.6886 | 0 | 238.1387 | 205.1726 |
| 1009 | 548.1623 | 194.2067 | 257.631 | 0 |
| 1010 | 284.2176 | 100.6946 | 0 | 115.0878 |
| 1011 | 177.945 | 0 | 0 | 72.055 |
| 1012 | 73.8396 | 26.1604 | 0 | 0 |
| 1013 | 340.1383 | 0 | 159.8617 | 0 |
| 1014 | 0 | 466.6488 | 0 | 533.3512 |
| 1015 | 0 | 73.06859 | 96.93141 | 0 |
| 1016 | 0 | 55.99785 | 0 | 64.00215 |
| 1017 | 680.2766 | 0 | 319.7234 | 0 |
| 1018 | 0 | 0 | 107.4363 | 92.56367 |
| 1019 | 137.0406 | 48.55168 | 64.40774 | 0 |
| 1020 | 170.5306 | 60.41675 | 0 | 69.05268 |
| 1021 | 0 | 28.82243 | 38.23529 | 32.94229 |
| 1022 | 213.3426 | 0 | 100.2689 | 86.38848 |

In Table 3.1.2-2 each row shows the allocation among the constituent states of the multi-state investment entered into the corresponding row of Table 3.1.2-1, the first row of Table 3.1.2-2 that investment number 1001 in the amount of $100 has been allocated $73.8396 to state 1 and the reminder to state 2.

It may be shown that the multi-state allocations identified above result in payouts to traders which are desired by the traders—that is, in this example the desired payouts are the same regardless of which state occurs among the constituent states of a given multi-state investment. Based on the total amount invested as reflected in Table 3.1.2-2 and assuming a zero transaction fee, the unit returns for each state are:

| | State 1 | State 2 | State 3 | State 4 |
|---|---|---|---|---|
| Return Per Dollar Invested | 1.2292 | 5.2921 | 3.7431 | 4.5052 |

Consideration of Investment 1022 in this example, illustrates the uniformity of payouts for each state in which an investment is made (i.e., states 1, 3 and 4). If state 1 occurs, the total payout to the trader is the unit return for state 1—1.2292—multiplied by the amount traded for state 1 in trade 1022—$213.3426—plus the initial trade—$213.3426. This equals 1.2292*213.3426+213.3426=$475.58. If state 3 occurs, the payout is equal to 3.7431*100.2689+100.2689=$475.58. Finally, if state 4 occurs, the payout is equal to 4.5052*86.38848+86.38848=$475.58. So a preferred embodiment of a multi-state allocation in this example has effected an allocation among the constituent states so that (1) the desired payout distributions in this example are achieved, i.e., payouts to constituent states are the same no matter which constituent state occurs, and (2) further reallocation iterations of multi-state investments do not change the relative amounts invested across the distribution of states for all the multi-state trades.

Example 3.1.3

Alternate Price Distributions

Assumptions regarding the likely distribution of traded amounts for a group of DBAR contingent claims may be used, for example, to compute returns for each defined state per unit of amount invested at the beginning of a trading period ("opening returns"). For various reasons, the amount actually invested in each defined state may not reflect the assumptions used to calculate the opening returns. For instance, investors may speculate that the empirical distribution of returns over the time horizon may differ from the no-arbitrage assumptions typically used in option pricing. Instead of a lognormal distribution, more investors might make investments expecting returns to be significantly positive rather than negative (perhaps expecting favorable news). In Example 3.1.1, for instance, if traders invested more in states above $85 for the price of MSFT common stock, the returns to states below $85 could therefore be significantly higher than returns to states above $85.

In addition, it is well known to derivatives traders that traded option prices indicate that price distributions differ markedly from theoretical lognormality or similar theoretical distributions. The so-called volatility skew or "smile" refers to out-of-the-money put and call options trading at higher implied volatilities than options closer to the money. This indicates that traders often expect the distribution of prices to have greater frequency or mass at the extreme observations than predicted according to lognormal distributions. Frequently, this effect is not symmetric so that, for example, the probability of large lower price outcomes are higher than for extreme upward outcomes. Consequently, in a group of DBAR contingent claims of the present invention, investment in states in these regions may be more prevalent and, therefore, finalized returns on outcomes in those regions lower. For example, using the basic DBAR contingent claim information from Example 3.1.1, the following returns may prevail due to investor expectations of return distributions that have more frequent occurrences than those predicted by a lognormal distribution, and thus are skewed to the lower possible returns. In statistical parlance, such a distribution exhibits higher kurtosis and negative skewness in returns than the illustrative distribution used in Example 3.1.1 and reflected in Table 3.1.1-1.

TABLE 3.1.3-1

DBAR Contingent Claim Returns Illustrating Negative Skewed and Leptokurtotic Return Distribution

| States | Amount Invested in State ('000) | Occurs Return Per Unit if States |
|---|---|---|
| (80,80] | 3,150 | 30.746 |
| (80,80.5] | 1,500 | 65.667 |
| (80.5,81] | 1,600 | 61.5 |
| (81,81.5] | 1,750 | 56.143 |
| (81.5,82] | 2,100 | 46.619 |
| (82,82.5] | 2,550 | 38.216 |
| (82.5,83] | 3,150 | 30.746 |
| (83,83.5] | 3,250 | 29.769 |
| (83.5,84] | 3,050 | 31.787 |
| (84,84.5] | 8,800 | 10.363 |
| (84.5,85] | 14,300 | 5.993 |
| (85,85.5] | 10,950 | 8.132 |
| (85.5,86] | 11,300 | 7.85 |
| (86,86.5] | 10,150 | 8.852 |
| (86.5,87] | 11,400 | 7.772 |
| (87,87.5] | 4,550 | 20.978 |
| (87.5,88] | 1,350 | 73.074 |
| (88,88.5] | 1,250 | 79.0 |

TABLE 3.1.3-1-continued

DBAR Contingent Claim Returns Illustrating Negative Skewed and Leptokurtotic Return Distribution

| States | Amount Invested in State ('000) | Occurs Return Per Unit if States |
|---|---|---|
| (88.5,89] | 1,150 | 85.957 |
| (89,89.5] | 700 | 141.857 |
| (89.5,90] | 650 | 152.846 |
| (90,∞] | 1,350 | 73.074 |

The type of complex distribution illustrated in Table 3.1.3-1 is prevalent in the traditional markets. Derivatives traders, actuaries, risk managers and other traditional market participants typically use sophisticated mathematical and analytical tools in order to estimate the statistical nature of future distributions of risky market outcomes. These tools often rely on data sets (e.g., historical time series, options data) that may be incomplete or unreliable. An advantage of the systems and methods of the present invention is that such analyses from historical data need not be complicated, and the full outcome distribution for a group of DBAR contingent claims based on any given event is readily available to all traders and other interested parties nearly instantaneously after each investment.

Example 3.1.4

States Defined for Return Uniformity

It is also possible in preferred embodiments of the present invention to define states for a group of DBAR contingent claims with irregular or unevenly distributed intervals, for example, to make the traded amount across the states more liquid or uniform. States can be constructed from a likely estimate of the final distribution of invested amounts in order to make the likely invested amounts, and hence the returns for each state, as uniform as possible across the distribution of states. The following table illustrates the freedom, using the event and trading period from Example 3.1.1, to define states so as to promote equalization of the amount likely to be invested in each state.

TABLE 3.1.4-1

State Definition to Make Likely Demand Uniform Across States

| States | Invested Amount in State ('000) | Return Per Unit if State Occurs |
|---|---|---|
| (0,81.403] | 5,000 | 19 |
| (81.403,82.181] | 5,000 | 19 |
| (82.181,82.71] | 5,000 | 19 |
| (82.71,83.132] | 5,000 | 19 |
| (83.132,83.497] | 5,000 | 19 |
| (83.497,83.826] | 5,000 | 19 |
| (83.826,84.131] | 5,000 | 19 |
| (84.131,84.422] | 5,000 | 19 |
| (84.422,84.705] | 5,000 | 19 |
| (84.705,84.984] | 5,000 | 19 |
| (84.984,85.264] | 5,000 | 19 |
| (85.264,85.549] | 5,000 | 19 |
| (85.549,85.845] | 5,000 | 19 |
| (85.845,86.158] | 5,000 | 19 |
| (86.158,86.497] | 5,000 | 19 |
| (86.497,86.877] | 5,000 | 19 |
| (86.877,87.321] | 5,000 | 19 |
| (87.321,87.883] | 5,000 | 19 |
| (87.883,88.722] | 5,000 | 19 |
| (88.722, ∞] | 5,000 | 19 |

If investor expectations coincide with the often-used assumption of the lognormal distribution, as reflected in this example, then investment activity in the group of contingent claims reflected in Table 3.1.4-1 will converge to investment of the same amount in each of the 20 states identified in the table. Of course, actual trading will likely yield final market returns which deviate from those initially chosen for convenience using a lognormal distribution.

Example 3.1.5

Government Bond—Uniformly Constructed States

The event, defined states, predetermined termination criteria and other relevant data for an illustrative group of DBAR contingent claims based on a U.S. Treasury Note are set forth below:

Underlying Security: United States Treasury Note, 5.5%, May 31, 2003
Bond Settlement Date: Jun. 25, 1999
Bond Maturity Date: May 31, 2003
Contingent claim Expiration: Jun. 2, 1999, Market Close, 4:00 p.m. EST
Trading Period Start Date: Jun. 25, 1999, 4:00 p.m., EST
Trading Period End Date: Jun. 28, 1999, 4:00 p.m., EST
Next Trading Period Open: Jun. 28, 1999, 4:00 p.m., EST
Next Trading Period Close Jun. 29, 1999, 4:00 p.m., EST
Event: Closing Composite Price as reported on Bloomberg at Claim
Expiration
Trading Time: 1 day
Duration from TED: 5 days
Coupon: 5.5%
Payment Frequency: Semiannual
Daycount Basis: Actual/Actual
Dividends Payable over Time Horizon: 2.75 per 100 on Jun. 30, 1999
Treasury note repo rate over Time Horizon: 4.0% (Actual/360 daycount)
Spot Price: 99.8125
Forward Price at Expiration: 99.7857
Price Volatility: 4.7%
Trade and Payout Units: U.S. Dollars
Total Demand in Current Trading Period: $50 million
Transaction Fee: 25 basis points (0.0025%)

TABLE 3.1.5-1

DBAR Contingent Claims on U.S. Government Note

| States | Investment in State ($) | Unit Return if State Occurs |
|---|---|---|
| (0,98] | 139690.1635 | 356.04 |
| (98,98.25] | 293571.7323 | 168.89 |
| (98.25,98.5] | 733769.9011 | 66.97 |
| (98.5,98.75] | 1574439.456 | 30.68 |
| (98.75,99] | 2903405.925 | 16.18 |
| (99,99.1] | 1627613.865 | 29.64 |
| (99.1, 99.2] | 1914626.631 | 25.05 |
| (99.2, 99.3] | 2198593.057 | 21.68 |
| (99.3, 99.4] | 2464704.885 | 19.24 |
| (99.4, 99.5] | 2697585.072 | 17.49 |
| (99.5, 99.6] | 2882744.385 | 16.30 |
| (99.6, 99.7] | 3008078.286 | 15.58 |
| (99.7, 99.8] | 3065194.576 | 15.27 |
| (99.8, 99.9] | 3050276.034 | 15.35 |
| (99.9,100] | 2964602.039 | 15.82 |
| (100, 100.1] | 2814300.657 | 16.72 |
| (100.1, 100.2] | 2609637.195 | 18.11 |
| (100.2, 100.3] | 2363883.036 | 20.10 |
| (100.3, 100.4] | 2091890.519 | 22.84 |

TABLE 3.1.5-1-continued

DBAR Contingent Claims on U.S. Government Note

| States | Investment in State ($) | Unit Return if State Occurs |
|---|---|---|
| (100.4, 100.5] | 1808629.526 | 26.58 |
| (100.5, 100.75] | 3326547.254 | 13.99 |
| (100.75,101] | 1899755.409 | 25.25 |
| (101,101.25] | 941506.1374 | 51.97 |
| (101.25,101.5] | 405331.6207 | 122.05 |
| (101.5, ∞] | 219622.6373 | 226.09 |

This Example 3.1.5 and Table 3.1.5-1 illustrate how readily the methods and systems of the present invention may be adapted to sources of risk, whether from stocks, bonds, or insurance claims. Table 3.1.5-1 also illustrates a distribution of defined states which is irregularly spaced—in this case finer toward the center of the distribution and coarser at the ends—in order to increase the amount invested in the extreme states.

Example 3.1.6

Outperformance Asset Allocation—Uniform Range

One of the advantages of the systems and methods of the present invention is the ability to construct groups of DBAR contingent claims based on multiple events and their interrelationships. For example, many index fund money managers often have a fundamental view as to whether indices of high quality fixed income securities will outperform major equity indices. Such opinions normally are contained within a manager's model for allocating funds under management between the major asset classes such as fixed income securities, equities, and cash.

This Example 3.1.6 illustrates the use of a preferred embodiment of the systems and methods of the present invention to hedge the real-world event that one asset class will outperform another. The illustrative distribution of investments and calculated opening returns for the group of contingent claims used in this example are based on the assumption that the levels of the relevant asset-class indices are jointly lognormally distributed with an assumed correlation. By defining a group of DBAR contingent claims on a joint outcome of two underlying events, traders are able to express their views on the co-movements of the underlying events as captured by the statistical correlation between the events. In this example, the assumption of a joint lognormal distribution means that the two underlying events are distributed as follows:

$$\tilde{V}_\theta^1 = \left(\frac{V_\tau^1}{Z^1(\tau,\theta)} - \frac{D^1(\tau,\theta)}{Z^1(\tau,\theta)}\right) * e^{-\sigma_1^2/2*(\theta-\tau)} e^{\sigma_1^* \sqrt{\theta-\tau} * dz_1}$$

$$\tilde{V}_\theta^2 = \left(\frac{V_\tau^2}{Z^2(\tau,\theta)} - \frac{D^2(\tau,\theta)}{Z^1(\tau,\theta)}\right) * e^{-\sigma_2^2/2*(\theta-\tau)} e^{\sigma_2^* \sqrt{\theta-\tau} * dz_2}$$

$$g(dz_1, dz_2) = \frac{1}{2*\pi*\sqrt{1-\rho^2}} * \exp\left(-\frac{(dz_1^2 + dz_2^2 - 2*\rho*dz_1*dz_1)}{2*(1-\rho^2)}\right)$$

where the subscripts and superscripts indicate each of the two events, and $g(dz_1,dz_2)$ is the bivariate normal distribution with correlation parameter $\rho$, and the notation otherwise corresponds to the notation used in the description above of DBAR Range Derivatives.

The following information includes the indices, the trading periods, the predetermined termination criteria, the total amount invested and the value units used in this Example 3.1.6:

Asset Class 1: JP Morgan United States Government Bond Index ("JPMGBI")
Asset Class 1 Forward Price at Observation: 250.0
Asset Class 1 Volatility: 5%
Asset Class 2: S&P 500 Equity Index ("SP500")
Asset Class 2 Forward Price at Observation: 1410
Asset Class 2 Volatility: 18%
Correlation Between Asset Classes: 0.5
Contingent claim Expiration: Dec. 31, 1999
Trading Start Date: Jun. 30, 1999
Current Trading Period Start Date: Jul. 1, 1999
Current Trading Period End Date: Jul. 30, 1999
Next Trading Period Start Date: Aug. 2, 1999
Next Trading Period End Date: Aug. 31, 1999
Current Date: Jun. 12, 1999
Last Trading Period End Date: Dec. 30, 1999
Aggregate Investment for Current Trading Period: $100 million
Trade and Payout Value Units: U.S. Dollars Table 3.1.6 shows the illustrative distribution of state returns over the defined states for the joint outcomes based on this information, with the defined states as indicated.

TABLE 3.1.6-1

Unit Returns for Joint Performance of S&P 500 and JPMGBI

| | State | (0, 233] | (233, 237] | (237, 241] | (241, 244] | (244, 246] | JPMGBI (246, 248] | (248, 250] | (250, 252] | (252, 255] | (255, 257] | (257, 259] | (259, 264] | (264, 268] | (268, ∞) |
|---|---|---|---|---|---|---|---|---|---|---|---|---|---|---|---|
| | (0, 1102] | 246 | 240 | 197 | 413 | 475 | 591 | 798 | 1167 | 1788 | 3039 | 3520 | 2330 | 11764 | 18518 |
| | (1102, 1174] | 240 | 167 | 110 | 197 | 205 | 230 | 281 | 373 | 538 | 841 | 1428 | 1753 | 7999 | 11764 |
| | (1174, 1252] | 197 | 110 | 61 | 99 | 94 | 98 | 110 | 135 | 180 | 259 | 407 | 448 | 1753 | 5207 |
| | (1252, 1292] | 413 | 197 | 99 | 145 | 130 | 128 | 136 | 157 | 197 | 269 | 398 | 407 | 1428 | 5813 |
| | (1292, 1334] | 475 | 205 | 94 | 130 | 113 | 106 | 108 | 120 | 144 | 189 | 269 | 259 | 841 | 3184 |
| | (1334, 1377] | 591 | 230 | 98 | 128 | 106 | 95 | 93 | 99 | 115 | 144 | 197 | 180 | 538 | 1851 |
| SP500 | (1377, 1421] | 798 | 281 | 110 | 136 | 108 | 93 | 88 | 89 | 99 | 120 | 157 | 135 | 373 | 1167 |
| | (1421, 1467] | 1167 | 373 | 135 | 157 | 120 | 99 | 89 | 88 | 93 | 108 | 136 | 110 | 281 | 798 |
| | (1467, 1515] | 1851 | 538 | 180 | 197 | 144 | 115 | 99 | 93 | 95 | 106 | 128 | 98 | 230 | 591 |
| | (1515, 1564] | 3184 | 841 | 259 | 269 | 189 | 144 | 120 | 108 | 106 | 113 | 130 | 94 | 205 | 475 |
| | (1564, 1614] | 5813 | 1428 | 407 | 398 | 269 | 197 | 157 | 136 | 128 | 130 | 145 | 99 | 197 | 413 |
| | (1614, 1720] | 5207 | 1753 | 448 | 407 | 259 | 180 | 135 | 110 | 98 | 94 | 99 | 61 | 110 | 197 |
| | (1720, 1834] | 11764 | 7999 | 1753 | 1428 | 841 | 538 | 373 | 281 | 230 | 205 | 197 | 110 | 167 | 240 |
| | (1834, ∞] | 18518 | 11764 | 2330 | 3520 | 3039 | 1788 | 1167 | 798 | 591 | 475 | 413 | 197 | 240 | 246 |

In Table 3.1.6-1, each cell contains the unit returns to the joint state reflected by the row and column entries. For example, the unit return to investments in the state encompassing the joint occurrence of the JPMGBI closing on expiration at 249 and the SP500 closing at 1380 is 88. Since the correlation between two indices in this example is assumed to be 0.5, the probability both indices will change in the same direction is greater that the probability that both indices will change in opposite directions. In other words, as represented in Table 3.1.6-1, unit returns to investments in states represented in cells in the upper left and lower right of the table—i.e., where the indices are changing in the same direction—are lower, reflecting higher implied probabilities, than unit returns to investments to states represented in cells in the lower left and upper right of Table 3.1.6-1—i.e., where the indices are changing in opposite directions.

As in the previous examples and in preferred embodiments, the returns illustrated in Table 3.1.6-1 could be calculated as opening indicative returns at the start of each trading period based on an estimate of what the closing returns for the trading period are likely to be. These indicative or opening returns can serve as an "anchor point" for commencement of trading in a group of DBAR contingent claims. Of course, actual trading and trader expectations may induce substantial departures from these indicative values.

Example 3.1.7

Corporate Bond Credit Risk

Groups of DBAR contingent claims can also be constructed on credit events, such as the event that one of the major credit rating agencies (e.g., Standard and Poor's, Moodys) changes the rating for some or all of a corporation's outstanding securities. Indicative returns at the outset of trading for a group of DBAR contingent claims oriented to a credit event can readily be constructed from publicly available data from the rating agencies themselves. For example, Table 3.1.7-1 contains indicative returns for an assumed group of DBAR contingent claims based on the event that a corporation's Standard and Poor's credit rating for a given security will change over a certain period of time. In this example, states are defined using the Standard and Poor's credit categories, ranging from AAA to D (default).

Using the methods of the present invention, the indicative returns are calculated using historical data on the frequency of the occurrence of these defined states. In this example, a transaction fee of 1% is charged against the aggregate amount invested in the group of DBAR contingent claims, which is assumed to be $100 million.

TABLE 3.1.7-1

Illustrative Returns for Credit DBAR Contingent Claims with 1% Transaction Fee

| Current Rating | To New Rating | Historical Probability | Invested in State ($) | Indicative Return to State |
|---|---|---|---|---|
| A− | AAA | 0.0016 | 160,000 | 617.75 |
| A− | AA+ | 0.0004 | 40,000 | 2474.00 |
| A− | AA | 0.0012 | 120,000 | 824.00 |
| A− | AA− | 0.003099 | 309,900 | 318.46 |
| A− | A+ | 0.010897 | 1,089,700 | 89.85 |

TABLE 3.1.7-1-continued

Illustrative Returns for Credit DBAR Contingent Claims with 1% Transaction Fee

| Current Rating | To New Rating | Historical Probability | Invested in State ($) | Indicative Return to State |
|---|---|---|---|---|
| A– | A | 0.087574 | 8,757,400 | 10.30 |
| A– | A– | 0.772868 | 77,286,800 | 0.28 |
| A– | BBB+ | 0.068979 | 6,897,900 | 13.35 |
| A– | BBB | 0.03199 | 3,199,000 | 29.95 |
| A– | BBB– | 0.007398 | 739,800 | 132.82 |
| A– | BB+ | 0.002299 | 229,900 | 429.62 |
| A– | BB | 0.004999 | 499,900 | 197.04 |
| A– | BB– | 0.002299 | 229,900 | 429.62 |
| A– | B+ | 0.002699 | 269,900 | 365.80 |
| A– | B | 0.0004 | 40,000 | 2474.00 |
| A– | B– | 0.0004 | 40,000 | 2474.00 |
| A– | CCC | 1E-04 | 10,000 | 9899.00 |
| A– | D | 0.0008 | 80,000 | 1236.50 |

In Table 3.1.7-1, the historical probabilities over the mutually exclusive and collectively exhaustive states sum to unity. As demonstrated above in this specification, in preferred embodiments, the transaction fee affects the probability implied for each state from the unit return for that state.

Actual trading is expected almost always to alter illustrative indicative returns based on historical empirical data. This Example 3.1.7 indicates how efficiently groups of DBAR contingent claims can be constructed for all traders or firms exposed to particular credit risk in order to hedge that risk. For example, in this Example, if a trader has significant exposure to the A– rated bond issue described above, the trader could want to hedge the event corresponding to a downgrade by Standard and Poor's. For example, this trader may be particularly concerned about a downgrade corresponding to an issuer default or "D" rating. The empirical probabilities suggest a payout of approximately $1,237 for each dollar invested in that state. If this trader has $100,000,000 of the corporate issue in his portfolio and a recovery of ratio of 0.3 can be expected in the event of default, then, in order to hedge $70,000,000 of default risk, the trader might invest in the state encompassing a "D" outcome. To hedge the entire amount of the default risk in this example, the amount of the investment in this state should be $70,000,000/$1,237 or $56,589. This represents approximately 5.66 basis points of the trader's position size in this bond (i.e., $56,589/$100,000,000=0.00056)] which probably represents a reasonable cost of credit insurance against default. Actual investments in this group of DBAR contingent claims could alter the return on the "D" event over time and additional insurance might need to be purchased.

Example 3.1.8

Economic Statistics

Another advantage of the methods and systems of the present invention is that they allow market participants to hedge possible outcomes over events which cannot be hedged directly in traditional derivatives markets. For example, traders often hedge inflation risk by trading in bond futures or, where they exist, inflation-protected floating rate bonds. A group of DBAR contingent claims can readily be constructed to allow traders to express expectations about the distribution of uncertain economic statistics measuring, for example, the rate of inflation or other relevant variables. The following information describes such a group of claims:

Economic Statistic: United States Non-Farm Payrolls
Announcement Date: May 31, 1999
Last Announcement Date: Apr. 30, 1999
Expiration: Announcement Date, May 31, 1999
Trading Start Date: May 1, 1999
Current Trading Period Start Date: May 10, 1999
Current Trading Period End Date: May 14, 1999
Current Date: May 11, 1999
Last Announcement: 128,156 ('000)
Source: Bureau of Labor Statistics
Consensus Estimate: 130,000 (+1.2 %)
Aggregate Amount Invested in Current Period: $100 million
Transaction Fee: 2.0% of Aggregate Traded amount Using methods and systems of the present invention, states can be defined and indicative returns can be constructed from, for example, consensus estimates among economists for this index. These estimates can be expressed in absolute values or, as illustrated, in Table 3.1.8-1 in percentage changes from the last observation as follows:

TABLE 3.1.8-1

Illustrative Returns For Non-Farm Payrolls Release with 2% Transaction Fee

| % Chg. In Index State | Investment in State ('000) | State Returns | Implied State Probability |
|---|---|---|---|
| [–100, –5] | 100 | 979 | 0.001 |
| (–5, –3] | 200 | 489 | 0.002 |
| (–3, –1] | 400 | 244 | 0.004 |
| (–1, –.5] | 500 | 195 | 0.005 |
| (–.5, 0] | 1000 | 97 | 0.01 |
| (0, .5] | 2000 | 48 | 0.02 |
| (.5, .7] | 3000 | 31.66667 | 0.03 |
| (.7, .8] | 4000 | 23.5 | 0.04 |
| (.8, .9] | 5000 | 18.6 | 0.05 |
| (.9, 1.0] | 10000 | 8.8 | 0.1 |
| (1.0, 1.1] | 14000 | 6 | 0.14 |
| (1.1, 1.2] | 22000 | 3.454545 | 0.22 |
| (1.2, 1.25] | 18000 | 4.444444 | 0.18 |
| (1.25, 1.33] | 9000 | 9.888889 | 0.09 |
| (1.3, 1.35] | 6000 | 15.33333 | 0.06 |
| (1.35, 1.40] | 3000 | 31.66667 | 0.03 |
| (1.40, 1.45] | 200 | 489 | 0.002 |
| (1.45, 1.5] | 600 | 162.3333 | 0.006 |
| (1.5, 1.6] | 400 | 244 | 0.004 |
| (1.6, 1.7] | 100 | 979 | 0.001 |
| (1.7, 1.8] | 80 | 1224 | 0.0008 |
| (1.8, 1.9] | 59 | 1660.017 | 0.00059 |
| (1.9, 2.0] | 59 | 1660.017 | 0.00059 |
| (2.0, 2.1] | 59 | 1660.017 | 0.00059 |
| (2.1, 2.2] | 59 | 1660.017 | 0.00059 |
| (2.2, 2.4] | 59 | 1660.017 | 0.00059 |
| (2.4, 2.6] | 59 | 1660.017 | 0.00059 |
| (2.6, 3.0] | 59 | 1660.017 | 0.00059 |
| (3.0, ∞] | 7 | 13999 | 0.00007 |

As in examples, actual trading prior to the trading end date would be expected to adjust returns according to the amounts invested in each state and the total amount invested for all the states.

Example 3.1.9

Corporate Events

Corporate actions and announcements are further examples of events of economic significance which are usually unhedgable or uninsurable in traditional markets but which can be effectively structured into groups of DBAR contingent claims according to the present invention.

Examples of such corporate events are earnings announcements, which typically occur quarterly for publicly traded companies. Many data services, such as IBES and FirstCall, currently publish estimates by analysts and a consensus estimate in advance of quarterly earnings announcements. Such estimates can form the basis for indicative opening returns at the commencement of trading as illustrated below. For this example, a transaction fee of zero is assumed.

Underlying security: IBM
Earnings Announcement Date: Jul. 21, 1999
Consensus Estimate: 0.879/share
Expiration: Announcement, Jul. 21, 1999
First Trading Period Start Date: Apr. 19, 1999
First Trading Period End Date May 19, 1999
Current Trading Period Start Date: Jul. 16, 1999
Current Trading Period End Date: Jul. 9, 1999
Next Trading Period Start Date: Jul. 9, 1999
Next Trading Period End Date: Jul. 16, 1999
Total Amount Invested in Current Trading Period: $100 million

TABLE 3.1.9-1

Illustrative Returns For IBM Earnings Announcement

| Earnings State0 | Invested in State ('000 $) | Unit Returns | Implied State Probability |
|---|---|---|---|
| (−∞, .5] | 70 | 1,427.57 | 0.0007 |
| (.5, .6] | 360 | 276.78 | 0.0036 |
| (.6, .65] | 730 | 135.99 | 0.0073 |
| (.65, .7] | 1450 | 67.97 | 0.0145 |
| (.7, .74] | 2180 | 44.87 | 0.0218 |
| (.74, .78] | 3630 | 26.55 | 0.0363 |
| (.78, ..8] | 4360 | 21.94 | 0.0436 |
| (.8, .82] | 5820 | 16.18 | 0.0582 |
| (.82, .84] | 7270 | 12.76 | 0.0727 |
| (.84, .86] | 8720 | 10.47 | 0.0872 |
| (.86, .87] | 10900 | 8.17 | 0.109 |
| (.87, .88] | 18170 | 4.50 | 0.1817 |
| (.88, .89] | 8720 | 10.47 | 0.0872 |
| (.89, .9] | 7270 | 12.76 | 0.0727 |
| (.9, .91] | 5090 | 18.65 | 0.0509 |
| (.91, .92] | 3630 | 26.55 | 0.0363 |
| (.92, .93] | 2910 | 33.36 | 0.0291 |
| (.93, .95] | 2180 | 44.87 | 0.0218 |
| (.95, .97] | 1450 | 67.97 | 0.0145 |
| (.97, .99] | 1310 | 75.34 | 0.0131 |
| (.99, 1.1] | 1160 | 85.21 | 0.0116 |
| (1.1, 1.3] | 1020 | 97.04 | 0.0102 |
| (1.3, 1.5] | 730 | 135.99 | 0.0073 |
| (1.5, 1.7] | 360 | 276.78 | 0.0036 |
| (1.7, 1.9] | 220 | 453.55 | 0.0022 |
| (1.9, 2.1] | 150 | 665.67 | 0.0015 |
| (2.1, 2.3] | 70 | 1,427.57 | 0.0007 |
| (2.3, 2.5] | 40 | 2,499.00 | 0.0004 |
| (2.5, ∞] | 30 | 3,332.33 | 0.0003 |

Consistent with the consensus estimate, the state with the largest investment encompasses the range (0.87, 0.88].

Example 3.1.10

Real Assets

Another advantage of the methods and systems of the present invention is the ability to structure liquid claims on illiquid underlying assets such a real estate. As previously discussed, traditional derivatives markets customarily use a liquid underlying market in order to function properly. With a group of DBAR contingent claims all that is usually required is a real-world, observable event of economic significance. For example, the creation of contingent claims tied to real assets has been attempted at some financial institutions over the last several years. These efforts have not been credited with an appreciable impact, apparently because of the primary liquidity constraints inherent in the underlying real assets.

A group of DBAR contingent claims according to the present invention can be constructed based on an observable event related to real estate. The relevant information for an illustrative group of such claims is as follows:

| | |
|---|---|
| Real Asset Index: | Colliers ABR Manhattan Office Rent Rates |
| Bloomberg Ticker: | COLAMANR |
| Update Frequency: | Monthly |
| Source: | Colliers ABR, Inc. |
| Announcement Date: | Jul. 31, 1999 |
| Last Announcement Date: | Jun. 30, 1999 |
| Last Index Value: | $45.39/sq. ft. |
| Consensus Estimate: | $45.50 |
| Expiration: | Announcement Jul. 31, 1999 |
| Current Trading Period Start: | Jun. 30, 1999 |
| Current Trading Period End: | Jul. 7, 1999 |
| Next Trading Period Start | Jul. 7, 1999 |
| Next Trading Period End | Jul. 14, 1999 |

For reasons of brevity, defined states and opening indicative or illustrative returns resulting from amounts invested in the various states for this example are not shown, but can be calculated or will emerge from actual trader investments according to the methods of the present invention as illustrated in Examples 3.1.1-3.1.9.

Example 3.1.11

Energy Supply Chain

A group of DBAR contingent claims can also be constructed using the methods and systems of the present invention to provide hedging vehicles on non-tradable quantities of great economic significance within the supply chain of a given industry. An example of such an application is the number of oil rigs currently deployed in domestic U.S. oil production. The rig count tends to be a slowly adjusting quantity which is sensitive to energy prices. Thus, appropriately structured groups of DBAR contingent claims based on rig counts could enable suppliers, producers and drillers to hedge exposure to sudden changes in energy prices and could provide a valuable risk-sharing device.

For example, a group of DBAR contingent claims depending on the rig count could be constructed according to the present invention using the following information (e.g., data source, termination criteria, etc).

| | |
|---|---|
| Asset Index: | Baker Hughes Rig Count U.S. Total |
| Bloomberg Ticker: | BAKETOT |
| Frequency: | Weekly |
| Source: | Baker Hughes, Inc. |
| Announcement Date: | Jul. 16, 1999 |
| Last Announcement Date: | Jul. 9, 1999 |
| Expiration Date: | Jul. 16, 1999 |
| Trading Start Date: | Jul. 9, 1999 |
| Trading End Date: | Jul. 15, 1999 |
| Last: | 570 |
| Consensus Estimate: | 580 |

For reasons of brevity, defined states and opening indicative or illustrative returns resulting from amounts invested in the various states for this example are not shown, but can be readily calculated or will emerge from actual trader investments according to the methods of the present invention, as illustrated in Examples 3.1.1–3.1.9.

Example 3.1.12

Mortgage Prepayment Risk

Real estate mortgages comprise an extremely large fixed income asset class with hundreds of billions in market capitalization. The mortgage market is generally understood to be subject not only to interest rate risk but also to the risk that borrowers will exercise options to refinance their mortgages or otherwise "prepay" their existing mortgage loans. The owner of a mortgage security therefore bears the risk that he will be "called" out of his position when the mortgage interest rate levels are declining. This risk cannot readily be hedged directly in existing markets. This risk could, however be hedged or insured with groups of DBAR contingent claims structured according to the present invention. Such a group of contingent claims could, for example, be structured based on the following information:

| | |
|---|---|
| Asset Index: | FNMA Conventional 30 year One-Month Historical Aggregate Prepayments |
| Coupon: | 6.5% |
| Frequency: | Monthly |
| Source: | Bloomberg |
| Announcement Date: | Aug. 1, 1999 |
| Last Announcement Date: | Jul. 1, 1999 |
| Expiration: | Announcement Date, Aug. 1, 1999 |
| Current Trading Period Start Date: | Jul. 1, 1999 |
| Current Trading Period End Date: | Jul. 9, 1999 |
| Last: | 303 Public Securities Association Prepayment Speed ("PSA") |
| Consensus Estimate: | 310 PSA |

For reasons of brevity, defined states and opening indicative or illustrative returns resulting from amounts invested in the various states for this example are not shown, but can be readily calculated or will emerge from actual trader investments according to the methods of the present invention, as illustrated in Examples 3.1.1–3.1.9.

Example 3.1.13

Insurance Industry Loss Warranty ("ILW")

Groups of DBAR contingent claims can also be structured using the system and methods of the present invention to provide insurance and reinsurance facilities for property and casualty, life, health and other traditional lines of insurance. The following information provides information to structure a group of DBAR contingent claims related to large property losses from hurricane damage:

| | |
|---|---|
| Event: | PCS Eastern Excess $5 billion Index |
| Source: | Property Claim Services (PCS) |
| Frequency: | Monthly |
| Announcement Date: | Oct. 1, 1999 |
| Last Announcement Date: | Jul. 1, 1999 |
| Last Index Value: | No events |
| Consensus Estimate: | $1 billion (claims excess of $5 billion) |
| Expiration: | Announcement Date, Oct. 1, 1999 |
| Trading Period Start Date: | Jul. 1, 1999 |
| Trading Period End Date: | Sep. 30, 1999 |

For reasons of brevity, defined states and opening indicative or illustrative returns resulting from amounts invested in the various states for this example are not shown, but can be readily calculated or will emerge from actual trader investments according to the methods of the present invention, as illustrated in Examples 3.1.1–3.1.9.

In preferred embodiments of groups of DBAR contingent claims related to property-casualty catastrophe losses, the frequency of claims and the distributions of the severity of losses are assumed and convolutions are performed in order to post indicative returns over the distribution of defined states. This can be done, for example, using compound frequency-severity models, such as the Poisson-Pareto model, familiar to those of skill in the art, which predict, with greater probability than a normal distribution, when losses will be extreme. As indicated previously, in preferred embodiments market activity is expected to alter the posted indicative returns, which serve as informative levels at the commencement of trading.

Example 3.1.14

Conditional Events

As discussed above, advantage of the systems and methods of the present invention is the ability to construct groups of DBAR contingent claims related to events of economic significance for which there is great interest in insurance and hedging, but which are not readily hedged or insured in traditional capital and insurance markets.

Another example of such an event is one that occurs only when some related event has previously occurred. For purposes of illustration, these two events may be denoted A and B.

$$q\langle A \mid B \rangle = \frac{q(A \cap B)}{q(B)}$$

where q denotes the probability of a state, q<A|B> represents the conditional probability of state A given the prior occurrence of state and B, and q(A∩B) represents the occurrence of both states A and B.

For example, a group of DBAR contingent claims may be constructed to combine elements of "key person" insurance and the performance of the stock price of the company managed by the key person. Many firms are managed by people whom capital markets perceive as indispensable or particularly important, such as Warren Buffett of Berkshire Hathaway. The holders of Berkshire Hathaway stock have no ready way of insuring against the sudden change in management of Berkshire, either due to a corporate action such as a takeover or to the death or disability of Warren Buffett. A group of conditional DBAR contingent claims can be constructed according to the present invention where the defined states reflect the stock price of Berkshire Hathaway conditional on Warren Buffet's leaving the firm's management. Other conditional DBAR contingent claims that could attract significant amounts for investment can be constructed using the methods and systems of the present invention, as apparent to one of skill in the art.

Example 3.1.15

Securitization Using a DBAR Contingent Claim Mechanism

The systems and methods of the present invention can also be adapted by a financial intermediary or issuer for the issuance of securities such as bonds, common or preferred stock, or other types of financial instruments. The process of creating new opportunities for hedging underlying events through the creation of new securities is known as "securitization." Well-known examples of securitization include the mortgage and asset-backed securities markets, in which portfolios of financial risk are aggregated and then recombined into new sources of financial risk. The systems and methods of the present invention can be used within the securitization process by creating securities, or portfolios of securities, whose risk, in whole or part, is tied to an associated or embedded group of DBAR contingent claims. In a preferred embodiment, a group of DBAR contingent claims is associated with a security much like options are currently associated with bonds in order to create callable and putable bonds in the traditional markets.

This example illustrates how a group of DBAR contingent claims according to the present invention can be tied to the issuance of a security in order to share risk associated with an identified future event among the security holders. In this example, the security is a fixed income bond with an embedded group of DBAR contingent claims whose value depends on the possible values for hurricane losses over some time period for some geographic region.

Issuer: Tokyo Fire and Marine

Underwriter: Goldman Sachs

DBAR Event: Total Losses on a Saffir-Simpson Category 4 Hurricane

Geographic: Property claims Services Eastern North America

Date: Jul. 1, 1999–Nov. 1, 1999

Size of Issue: 500 million USD.

Issue Date: Jun. 1, 1999

DBAR Trading Period: Jun. 1, 1999–Jul. 1, 1999

In this example, the underwriter Goldman Sachs issues the bond, and holders of the issued bond put bond principal at risk over the entire distribution of amounts of Category 4 losses for the event. Ranges of possible losses comprise the defined states for the embedded group of DBAR contingent claims. In a preferred embodiment, the underwriter is responsible for updating the returns to investments in the various states, monitoring credit risk, and clearing and settling, and validating the amount of the losses. When the event is determined and uncertainty is resolved, Goldman is "put" or collects the bond principal at risk from the unsuccessful investments and allocates these amounts to the successful investments. The mechanism in this illustration thus includes:

(1) An underwriter or intermediary which implements the mechanism, and (2) A group of DBAR contingent claims directly tied to a security or issue (such as the catastrophe bond above).

For reasons of brevity, defined states and opening indicative or illustrative returns resulting from amounts invested in the various states for this example are not shown, but can be readily calculated or will emerge from actual trader investments according to the methods of the present invention, as illustrated in Examples 3.1.1–3.1.9.

Example 3.1.16

Exotic Derivatives

The securities and derivatives communities frequently use the term "exotic derivatives" to refer to derivatives whose values are linked to a security, asset, financial product or source of financial risk in a more complicated fashion than traditional derivatives such as futures, call options, and convertible bonds. Examples of exotic derivatives include American options, Asian options, barrier options, Bermudan options, chooser and compound options, binary or digital options, lookback options, automatic and flexible caps and floors, and shout options.

Many types of exotic options are currently traded. For example, barrier options are rights to purchase an underlying financial product, such as a quantity of foreign currency, for a specified rate or price, but only if, for example, the underlying exchange rate crosses or does not cross one or more defined rates or "barriers." For example, a dollar call/yen put on the dollar/yen exchange rate, expiring in three months with strike price 110 and "knock-out" barrier of 105, entitles the holder to purchase a quantity of dollars at 110 yen per dollar, but only if the exchange rate did not fall below 105 at any point during the three month duration of the option. Another example of a commonly traded exotic derivative, an Asian option, depends on the average value of the underlying security over some time period. Thus, a class of exotic derivatives is commonly referred to as "path-dependent" derivatives, such as barrier and Asian options, since their values depend not only on the value of the underlying financial product at a given date, but on a history of the value or state of the underlying financial product.

The properties and features of exotic derivatives are often so complex so as to present a significant source of "model risk" or the risk that the tools, or the assumptions upon which they are based, will lead to significant errors in pricing and hedging. Accordingly, derivatives traders and risk managers often employ sophisticated analytical tools to trade, hedge, and manage the risk of exotic derivatives.

One of the advantages of the systems and methods of the present invention is the ability to construct groups of DBAR contingent claims with exotic features which are more manageable and transparent than traditional exotic derivatives. For example, a trader might be solely interested in the earliest time the yen/dollar exchange rate crosses 95 over the next three months. A traditional barrier option, or portfolio of such exotic options, might suffice to approximate the source of risk of interest to this trader. A group of DBAR contingent claims, in contrast, can be constructed to isolate this risk and present relatively transparent opportunities for hedging. A risk to be isolated is the distribution of possible outcomes for what barrier derivatives traders term the "first passage time," or, in this example, the first time that the yen/dollar exchange rate crosses 95 over the next three months.

The following illustration shows how such a group of DBAR contingent claims can be constructed to address this risk. In this example, it is assumed that all traders in the group of claims agree that the underlying exchange rate is lognormally distributed. This group of claims illustrates how traders would invest in states and thus express opinions regarding whether and when the forward yen/dollar exchange rate will cross a given barrier over the next 3 months:

| | |
|---|---|
| Underlying Risk: | Japanese/U.S. Dollar Yen Exchange Rate |
| Current Date: | Sep. 15, 1999 |
| Expiration: | Forward Rate First Passage Time, as defined, between Sep. 16, 1999 to Dec. 16, 1999 |
| Trading Start Date: | Sep. 15, 1999 |
| Trading End Date: | Sep. 16, 1999 |
| Barrier: | 95 |
| Spot JPY/USD: | 104.68 |
| Forward JPY/USD | 103.268 |
| Assumed (Illustrative) Market Volatility: | 20% annualized |
| Aggregate Traded Amount: | 10 million USD |

TABLE 3.1.16-1

First Passage Time for Yen/Dollar Dec. 16, 1999 Forward Exchange Rate

| Time in Year Fractions | Invested in State ('000) | Return Per Unit if State Occurs |
|---|---|---|
| (0,.005] | 229.7379 | 42.52786 |
| (.005, .01] | 848.9024 | 10.77992 |
| (.01, .015] | 813.8007 | 11.28802 |
| (.015, .02] | 663.2165 | 14.07803 |
| (.02, .025] | 536.3282 | 17.6453 |
| (.025 .03] | 440.5172 | 21.70059 |
| (.03, .035] | 368.4647 | 26.13964 |
| (.035, .04] | 313.3813 | 30.91 |
| (.04, .045] | 270.4207 | 35.97942 |
| (.045, .05] | 236.2651 | 41.32534 |
| (.05, .075] | 850.2595 | 10.76112 |
| (.075, .1] | 540.0654 | 17.51627 |
| (.1, .125] | 381.3604 | 25.22191 |
| (.125, .15] | 287.6032 | 33.77013 |
| (.15, .175] | 226.8385 | 43.08423 |
| (.175, .2] | 184.8238 | 53.10558 |
| (.2, .225] | 154.3511 | 63.78734 |
| (.225, .25] | 131.4217 | 75.09094 |
| Did Not Hit Barrier | 2522.242 | 2.964727 |

As with other examples, and in preferred embodiments, actual trading will likely generate traded amounts and therefore returns that depart from the assumptions used to compute the illustrative returns for each state.

Example 3.1.17

Hedging Markets for Real Goods, Commodities and Services

Investment and capital budgeting choices faced by firms typically involve inherent economic risk (e.g., future demand for semiconductors), large capital investments (e.g., semiconductor fabrication capacity) and timing (e.g., a decision to invest in a plant now, or defer for some period of time). Many economists who study such decisions under uncertainty have recognized that such choices involve what they term "real options." This characterization indicates that the choice to invest now or to defer an investment in goods or services or a plant, for example, in the face of changing uncertainty and information, frequently entails risks similar to those encountered by traders who have invested in options which provide the opportunity to buy or sell an underlying asset in the capital markets. Many economists and investors recognize the importance of real options in capital budgeting decisions and of setting up markets to better manage their uncertainty and value. Natural resource and extractive industries, such as petroleum exploration and production, as well as industries requiring large capital investments such as technology manufacturing, are prime examples of industries where real options analysis is increasingly used and valued.

Groups of DBAR contingent claims according to the present invention can be used by firms within a given industry to better analyze capital budgeting decisions, including those involving real options. For example, a group of DBAR contingent claims can be established which provides hedging opportunities over the distribution of future semiconductor prices. Such a group of claims would allow producers of semiconductors to better hedge their capital budgeting decisions and provide information as to the market's expectation of future prices over the entire distribution of possible price outcomes. This information about the markets expectation of future prices could then also be used in the real options context in order to better evaluate capital budgeting decisions. Similarly, computer manufacturers could use such groups of DBAR contingent claims to hedge against adverse semiconductor price changes.

Information providing the basis for constructing an illustrative group of DBAR contingent claims on semiconductor prices is as follows:

Underlying Event: Semiconductor Monthly Sales

Index: Semiconductor Industry Association Monthly Global Sales

Release

Current Date: Sep. 15, 1999

Last Release Date: Sep. 2, 1999

Last Release Month: July, 1999

Last Release Value: 11.55 Billion, USD

Next Release Date: Approx. Oct. 1, 1999

Next Release Month: August 1999

Trading Start Date: Sep. 2, 1999

Trading End Date: Sep. 30, 1999

For reasons of brevity, defined states and opening indicative or illustrative returns resulting from amounts invested in the various states for this example are not shown, but can be readily calculated or will emerge from actual trader investments according to the methods of the present invention, as illustrated in previous examples.

Groups of DBAR contingent claims according to the present invention can also be used to hedge arbitrary sources of risk due to price discovery processes. For example, firms involved in competitive bidding for goods or services, whether by sealed bid or open bid auctions, can hedge their investments and other capital expended in preparing the bid by investing in states of a group of DBAR contingent claims comprising ranges of mutually exclusive and collectively exhaustive auction bids. In this way, the group of DBAR contingent claim serves as a kind of "meta-auction," and allows those who will be participating in the auction to invest in the distribution of possible auction outcomes, rather than simply waiting for the single outcome representing the auction result. Auction participants could thus hedge themselves against adverse auction developments and outcomes, and, importantly, have access to the entire probability distribution of bids (at least at one point in time) before submitting a bid into the real auction. Thus, a group of DBAR claims could be used to provide market data over the entire distribution of possible bids. Preferred embodiments of the present invention thus can help avoid the so-called Winner's Curse phenomenon known to economists, whereby auction participants fail rationally to take account of the information on the likely bids of their auction competitors.

Example 3.1.18

DBAR Hedging

Another feature of the systems and methods of the present invention is the relative ease with which traders can hedge risky exposures. In the following example, it is assumed that a group of DBAR contingent claims has two states (state 1 and state 2, or $s_1$ or $s_2$), and amounts $T_1$, and $T_2$ are invested in state 1 and state 2, respectively. The unit payout $\pi_1$ for state 1 is therefore $T_2/T_1$ and for state 2 it is $T_1/T_2$. If a trader then invests amount $\alpha_1$ in state 1, and state 1 then occurs, the trader in this example would receive the following payouts, P, indexed by the appropriate state subscripts:

$$P_1 = \alpha_1 * \left(\frac{T_2}{T_1 + \alpha_1} + 1\right)$$

If state 2 occurs the trader would receive $$P_2 = 0$$

If, at some point during the trading period, the trader desires to hedge his exposure, the investment in state 2 to do so is calculated as follows:

$$\alpha_2 = \frac{\alpha_1 * T_2}{T_1}$$

This is found by equating the state payouts with the proposed hedge trade, as follows:

$$P_1 = \alpha_1 * \left(\frac{T_2 + \alpha_2}{T_1 + \alpha_1} + 1\right) = P_2 = \alpha_2 * \left(\frac{T_1 + \alpha_1}{T_2 + \alpha_2} + 1\right)$$

Compared to the calculation required to hedge traditional derivatives, these expressions show that, in appropriate groups of DBAR contingent claims of the present invention, calculating and implementing hedges can be relatively straightforward.

The hedge ratio, $\alpha_2$, just computed for a simple two state example can be adapted to a group of DBAR contingent claims which is defined over more than two states. In a preferred embodiment of a group of DBAR contingent claims, the existing investments in states to be hedged can be distinguished from the states on which a future hedge investment is to be made. The latter states can be called the "complement" states, since they comprise all the states that can occur other than those in which investment by a trader has already been made, i.e., they are complementary to the invested states. A multi-state hedge in a preferred embodiment includes two steps: (1) determining the amount of the hedge investment in the complement states, and (2) given the amount so determined, allocating the amount among the complement states. The amount of the hedge investment in the complement states pursuant to the first step is calculated as:

$$\alpha_C = \frac{\alpha_H * T_C}{T_H}$$

where $\alpha_C$ is amount of the hedge investment in the complement states, $\alpha_H$ is the amount of the existing investment in the states to be hedged, $T_C$ is the existing amount invested in the complement states, and $T_H$ is the amount invested in states to be hedged, exclusive of $\alpha_H$. The second step involves allocating the hedge investment among the complement states, which can be done by allocating $\alpha_C$ among the complement states in proportion to the existing amounts already invested in each of those states. An example of a four-state group of DBAR contingent claims according to the present invention illustrates this two-step hedging process. For purposes of this example, the following assumptions are made: (i) there are four states, numbered 1 through 4, respectively; (ii) $50, $80, $70 and $40 is invested in each state, (iii) a trader has previously placed a multi-state investment in the amount of $10 ($\alpha H$ as defined above) for states 1 and 2; and (iv) the allocation of this multi-state investment in states 1 and 2 is $3.8462 and $6.15385, respectively. The amounts invested in each state, excluding the trader's invested amounts, are therefore $46.1538, $73.84615, $70, and $40 for states 1 through 4, respectively. It is noted that the amount invested in the states to be hedged, i.e., states 1 and 2, exclusive of the multi-state investment of $10, is the quantity $T_H$ as defined above.

The first step in a preferred embodiment of the two-step hedging process is to compute the amount of the hedge investment to be made in the complement states. As derived above, the amount of the new hedge investment is equal to the amount of the existing investment multiplied by the ratio of the amount invested in the complement states to the amount invested in the states to be hedged, excluding the trader's existing trades, i.e., $10*($70+$40)/($46.1538+$73.84615)=$9.16667. The second step in this process is to allocate this amount between the two complement states, i.e., states 3 and 4.

Following the procedures discussed above for allocating multi-state investments, the complement state allocation is accomplished by allocating the hedge investment amount—$9.16667 in this example—in proportion to the existing amount previously invested in the complement states, i.e., $9.16667*$70/$110=$5.83333 for state 3 and $9.16667*$40/$110=$3.3333 for state 4. Thus, in this example, the trader now has the following amounts invested in states 1 through 4: ($3.8462, $6.15385, $5.8333, $3.3333); the total amount invested in each of the four states is $50, $80, $75.83333, and $43.3333); and the returns for each of the four states, based on the total amount invested in each of the four states, would be, respectively, (3.98333, 2.1146, 2.2857, and 4.75). In this example, if state 1 occurs the trader will receive a payout, including the amount invested in state 1, of 3.98333*$3.8462+$3.8462=$19.1667 which is equal to the sum invested, so the trader is fully hedged against the occurrence of state 1. Calculations for the other states yield the same results, so that the trader in this example would be fully hedged irrespective of which state occurs.

As returns can be expected to change throughout the trading period, the trader would correspondingly need to rebalance both the amount of his hedge investment for the complement states as well as the multi-state allocation among the complement states. In a preferred embodiment, a DBAR contingent claim exchange can be responsible for reallocating multi-state trades via a suspense account, for example, so the trader can assign the duty of reallocating the multi-state investment to the exchange. Similarly, the trader can also assign to an exchange the responsibility of determining the amount of the hedge investment in the complement states especially as returns change as a result of trading. The calculation and allocation of this amount can be done by the exchange in a similar fashion to the way the exchange reallocates multi-state trades to constituent states as investment amounts change.

Example 3.1.19

Quasi-continuous Trading

Preferred embodiments of the systems and methods of the present invention include a trading period during which returns adjust among defined states for a group of DBAR contingent claims, and a later observation period during which the outcome is ascertained for the event on which the group of claims is based. In preferred embodiments, returns are allocated to the occurrence of a state based on the final distribution of amounts invested over all the states at the end of the trading period. Thus, in each embodiments a trader will not know his returns to a given state with certainty until the end of a given trading period. The changes in returns or "price discovery" which occur during the trading period prior to "locking-in" the final returns may provide useful information as to trader expectations regarding finalized outcomes, even though they are only indications as to what the final returns are going to be. Thus, in some preferred embodiments, a trader may not be able to realize profits or losses during the trading period. The hedging illustration of Example 3.1.18, for instance, provides an example of risk reduction but not of locking-in or realizing profit and loss.

In other preferred embodiments, a quasi-continuous market for trading in a group of DBAR contingent claims may be created. In preferred embodiments, a plurality of recurring trading periods may provide traders with nearly continuous opportunities to realize profit and loss. In one such embodiment, the end of one trading period is immediately followed by the opening of a new trading period, and the final invested amount and state returns for a prior trading period are "locked in" as that period ends, and are allocated accordingly when the outcome of the relevant event is later known. As a new trading period begins on the group of DBAR contingent claims related to the same underlying event, a new distribution of invested amounts for states can emerge along with a corresponding new distribution of state returns. In such embodiments, as the successive trading periods are made to open and close more frequently, a quasi-continuous market can be obtained, enabling traders to hedge and realize profit and loss as frequently as they currently do in the traditional markets.

An example illustrates how this feature of the present invention may be implemented. The example illustrates the hedging of a European digital call option on the yen/dollar exchange rate (a traditional market option) over a two day period during which the underlying exchange rate changes by one yen per dollar. In this example, two trading periods are assumed for the group of DBAR contingent claims

| Traditional Option: | European Digital Option |
|---|---|
| Payout of Option: | Pays 100 million USD if exchange rate equals or exceeds strike price at maturity or expiration |
| Underlying Index: | Yen/dollar exchange rate |
| Option Start: | Aug. 12, 1999 |
| Option Expiration: | Aug. 15, 2000 |
| Assumed Volatility: | 20% annualized |
| Strike Price: | 120 |
| Notional: | 100 million USD |

In this example, two dates are analyzed, Aug. 12, 1999 and Aug. 13, 1999:

TABLE 3.1.19-1

Change in Traditional Digital Call Option Value Over Two Days

| | | |
|---|---|---|
| Observation Date | Aug. 12, 1999 | Aug. 13, 1999 |
| Spot Settlement Date | Aug. 16, 1999 | Aug. 17, 1999 |
| Spot Price for Settlement Date | 115.55 | 116.55 |
| Forward Settlement Date | Aug. 15, 2000 | Aug. 15, 2000 |
| Forward Price | 109.217107 | 110.1779 |
| Option Premium | 28.333% of Notional | 29.8137% of Notional |

Table 3.1.19-1 shows how the digital call option struck at 120 could, as an example, change in value with an underlying change in the yen/dollar exchange rate. The second column shows that the option is worth 28.333% or $28.333 million on a $100 million notional on Aug. 12, 1999 when the underlying exchange rate is 115.55. The third column shows that the value of the option, which pays $100 million should dollar yen equal or exceed 120 at the expiration date, increases to 29.8137% or $29.8137 million per $100 million when the underlying exchange rate has increased by 1 yen to 116.55. Thus, the traditional digital call option generates a profit of $29.81377−$28.333=$1.48077 million.

This example shows how this profit also could be realized in trading in a group of DBAR contingent claims with two successive trading periods. It is also assumed for purposes of this example that there are sufficient amounts invested, or liquidity, in both states such that the particular trader's investment does not materially affect the returns to each state. This is a convenient but not necessary assumption that allows the trader to take the returns to each state "as given" without concern as to how his investment will affect the closing returns for a given trading period. Using information from Table 3.1.19-1, the following closing returns for each state can be derived:

Trading Period 1:

| Current trading period end date: | Aug. 12, 1999 |
|---|---|
| Underlying Event: | Closing level of yen/dollar exchange rate for Aug. 15, 2000 settlements 4 pm EDT |
| Spot Price for Aug. 16, 1999 Settlement: | 115.55 |

| State | JPY/USD < 120 for Aug. 15, 2000 | JPY/USD ≧ 120 for Aug. 15, 2000 |
|---|---|---|
| Closing Returns | 0.39533 | 2.5295 |

For purposes of this example, it is assumed that an illustrative trader has $28.333 million invested in the state that the yen/dollar exchange rate equals or exceeds 120 for Aug. 15, 2000 settlement.

Trading Period 2:

| Current trading period end date: | Aug. 13, 1999 |
|---|---|
| Underlying Event: | Closing level of dollar/yen exchange rate for Aug. 15, 2000 settlement, 4 pm EDT |
| Spot Price for Aug. 17, 1999 Settlement: | 116.55 |

| State | JPY/USD < 120 for Aug. 15, 2000 | JPY/USD ≧ 120 for Aug. 15, 2000 |
|---|---|---|
| Closing State Returns | .424773 | 2.3542 |

For purposes of this example, it is also assumed that the illustrative trader has a $70.18755 million hedging investment in the state that the yen/dollar exchange rate is less than 120 for Aug. 15, 2000 settlement. It is noted that, for the second period, the closing returns are lower for the state that the exchange equals or exceeds 120. This is due to the change represented in Table 3.1.19-1 reflecting an assumed change in the underlying market, which would make that state more likely.

The trader now has an investment in each trading period and has locked in a profit of $1.4807 million, as shown below:

| State | JPY/USD < 120 for Aug. 15, 2000 | JPY/USD ≧ 120 for Aug. 15, 2000 |
|---|---|---|
| Profit and Loss (000.000) | $70.18755*.424773 − $28.333 = $1.48077 | $−70.18755 + 28.333*$2.5295 = $1.48077 |

The illustrative trader in this example has therefore been able to lock-in or realize the profit no matter which state finally occurs. This profit is identical to the profit realized in the traditional digital option, illustrating that systems and methods of the present invention can be used to provide at least daily if not more frequent realization of profits and losses, or that risks can be hedged in virtually real time.

In preferred embodiments, a quasi-continuous time hedge can be accomplished, in general, by the following hedge investment, assuming the effect of the size of the hedge trade does not materially effect the returns:

$$H = \alpha_t * \frac{1 + r_t}{1 + r^c_{t+1}}$$

where $r_t$:=closing returns a state in which an investment was originally made at time t $\alpha_t$:=amount originally invested in the state at time t $r^C_{t+1}$:=closing returns at time t+1 to state or states other than the state in which the original investment was made (i.e., the so-called complement states which are all states other than the state or states originally traded which are to be hedged)

H:=the amount of the hedge investment

If H is to be invested in more than one state, then a multi-state allocation among the constituent states can be performed using the methods and procedures described above. This expression for H allows investors in DBAR contingent claims to calculate the investment amounts for hedging transactions. In the traditional markets, such calculations are often complex and quite difficult.

Example 3.1.20

Value Units For Investments and Payouts

As previously discussed in this specification, the units of investments and payouts used in embodiments of the present invention can be any unit of economic value recognized by investors, including, for example, currencies, commodities, number of shares, quantities of indices, amounts of swap transactions, or amounts of real estate. The invested amounts and payouts need not be in the same units and can comprise a group or combination of such units, for example 25% gold, 25% barrels of oil, and 50% Japanese Yen. The previous examples in this specification have generally used U.S. dollars as the value units for investments and payouts.

This Example 3.1.20 illustrates a group of DBAR contingent claims for a common stock in which the invested units and payouts are defined in quantities of shares. For this example, the terms and conditions of Example 3.1.1 are generally used for the group of contingent claims on MSFT common stock, except for purposes of brevity, only three states are presented in this Example 3.1.20: (0,83], (83, 88], and (88,∞]. Also in this Example 3.1.20, invested amounts are in numbers of shares for each state and the exchange makes the conversion for the trader at the market price prevailing at the time of the investment. In this example, payouts are made according to a canonical DRF in which a trader receives a quantity of shares equal to the number of shares invested in states that did not occur, in proportion to the ratio of number of shares the trader has invested in the state that did occur, divided by the total number of shares invested in that state. An indicative distribution of trader demand in units of number of shares is shown below, assuming that the total traded amount is 100,000 shares:

| State | Amount Traded in Number of Share | Return Per Share if State Occurs Unit Reutrns in Number of Shares |
|---|---|---|
| (0,83] | 17,803 | 4.617 |
| (83,88] | 72,725 | .37504 |
| (88, ∞] | 9,472 | 9.5574 |

If, for instance, MSFT closes at 91 at expiration, then in this example the third state has occurred, and a trader who had previously invested 10 shares in that state would receive a payout of 10*9.5574+10=105.574 shares which includes the trader's original investment. Traders who had previously invested in the other two states would lose all of their shares upon application of the canonical DRF of this example.

An important feature of investing in value units other than units of currency is that the magnitude of the observed outcome may well be relevant, as well as the state that occurs based on that outcome. For example, if the investments in this example were made in dollars, the trader who has a dollar invested in state (88,∞] would not care, at least in theory, whether the final price of MSFT at the close of the observation period were 89 or 500. However, if the value units are numbers of shares of stock, then the magnitude of the final outcome does matter, since the trader receives as a payout a number of shares which can be converted to more dollars at a higher outcome price of $91 per share. For instance, for a payout of 105.574 shares, these shares are worth 105.574*$91=$9,607.23 at the outcome price. Had the outcome price been $125, these shares would have been worth 105.574*125=$13,196.75.

A group of DBAR contingent claims using value units of commodity having a price can therefore possess additional features compared to groups of DBAR contingent claims that offer fixed payouts for a state, regardless of the magnitude of the outcome within that state. These features may prove useful in constructing groups of DBAR contingent claims which are able to readily provide risk and return profiles similar to those provided by traditional derivatives. For example, the group of DBAR contingent claims described in this example could be of great interest to traders who transact in traditional derivatives known as "asset-or-nothing digital options" and "supershares options."

Example 3.1.21

Replication of An Arbitrary Payout Distribution

An advantage of the systems and methods of the present invention is that, in preferred embodiments, traders can generate an arbitrary distribution of payouts across the distribution of defined states for a group of DBAR contingent claims. The ability to generate a customized payout distribution may be important to traders, since they may desire to replicate contingent claims payouts that are commonly found in traditional markets, such as those corresponding to long positions in stocks, short positions in bonds, short options positions in foreign exchange, and long option straddle positions, to cite just a few examples. In addition, preferred embodiments of the present invention may enable replicated distributions of payouts which can only be generated with difficulty and expense in traditional markets, such as the distribution of payouts for a long position in a stock that is subject to being "stopped out" by having a market-maker sell the stock when it reaches a certain price below the market price. Such stop-loss orders are notoriously difficult to execute in traditional markets, and traders are frequently not guaranteed that the execution will occur exactly at the pre-specified price.

In preferred embodiments, and as discussed above, the generation and replication of arbitrary payout distributions across a given distribution of states for a group of DBAR contingent claims may be achieved through the use of multi-state investments. In such embodiments, before making an investment, traders can specify a desired payout for each state or some of the states in a given distribution of states. These payouts form a distribution of desired payouts across the distribution of states for the group of DBAR contingent claims. In preferred embodiments, the distribution of desired payouts may be stored by an exchange, which may also calculate, given an existing distribution of investments across the distribution of states, (1) the total amount required to be invested to achieve the desired payout distribution; (2) the states into which the investment is to be allocated; and (3) how much is to be invested in each state so that the desired payout distribution can be achieved. In preferred embodiments, this multi-state investment is entered into a suspense account maintained by the exchange, which reallocates the investment among the states as the amounts invested change across the distribution of states. In preferred embodiments, as discussed above, a final allocation is made at the end of the trading period when returns are finalized.

The discussion in this specification of multi-state investments has included examples in which it has been assumed that an illustrative trader desires a payout which is the same no matter which state occurs among the constituent states of a multi-state investment. To achieve this result, in preferred embodiments the amount invested by the trader in the multi-state investment can be allocated to the constituent state in proportion to the amounts that have otherwise been invested in the respective constituent states. In preferred embodiments, these investments are reallocated using the same procedure throughout the trading period as the relative proportion of amounts invested in the constituent states changes.

In other preferred embodiments, a trader may make a multi-state investment in which the multi-state allocation is not intended to generate the same payout irrespective of which state among the constituent state occurs. Rather, in such embodiments, the multi-state investment may be intended to generate a payout distribution which matches some other desired payout distribution of the trader across the distribution of states, such as, for example, for certain digital strips, as discussed in Section 6. Thus, the systems and methods of the present invention do not require amounts invested in multi-state investments to be allocated in proportion of the amounts otherwise invested in the constituent states of the multi-statement investment.

Notation previously developed in this specification is used to describe a preferred embodiment of a method by which replication of an arbitrary distribution of payouts can be achieved for a group of DBAR contingent claims according to the present invention. The following additional notation, is also used:

$A_{i,*}$ denotes the i-th row of the matrix A containing the invested amounts by trader i for each of the n states of the group of DBAR contingent claims In preferred embodiments, the allocation of amounts invested in all the states which achieves the desired payouts across the distribution of states can be calculated using, for example, the computer code listing in Table 1 (or functional equivalents known to one of skill in the art), or, in the case where a trader's multi-state investment is small relative to the total investments already made in the group of DBAR contingent claims, the following approximation:

$$A_{i,*}^T = \Pi^{-1} * P_{i,*}^T$$

where the −1 superscript on the matrix Π denotes a matrix inverse operation. Thus, in these embodiments, amounts to be invested to produce an arbitrary distribution payouts can approximately be found by multiplying (a) the inverse of a diagonal matrix with the unit payouts for each state on the diagonal (where the unit payouts are determined from the amounts invested at any given time in the trading period) and (b) a vector containing the trader's desired payouts. The equation above shows that the amounts to be invested in order to produce a desired payout distribution are a function of the desired payout distribution itself ($P_{i,*}$) and the amounts otherwise invested across the distribution of states (which are used to form the matrix Π, which contains the payouts per unit along its diagonals and zeroes along the off-diagonals). Therefore, in preferred embodiments, the allocation of the amounts to be invested in each state will change if either the desired payouts change or if the amounts otherwise invested across the distribution change. As the amounts otherwise invested in various states can be expected to change during the course of a trading period, in preferred embodiments a suspense account is used to reallocate the invested amounts, $A_{i,*}$, in response to these changes, as described previously. In preferred embodiments, at the end of the trading period a final allocation is made using the amounts otherwise invested across the distribution of states. The final allocation can typically be performed using the iterative quadratic solution techniques embodied in the computer code listing in Table 1.

Example 3.1.21 illustrates a methodology for generating an arbitrary payout distribution, using the event, termination criteria, the defined states, trading period and other relevant information, as appropriate, from Example 3.1.1, and assuming that the desired multi-state investment is small in relation to the total amount of investments already made. In Example 3.1.1 above, illustrative investments are shown across the distribution of states representing possible closing prices for MSFT stock on the expiration date of Aug. 19, 1999. In that example, the distribution of investment is illustrated for Aug. 18, 1999, one day prior to expiration, and the price of MSFT on this date is given as 85. For purposes of this Example 3.1.21, it is assumed that a trader would like to invest in a group of DBAR contingent claims according to the present invention in a way that approximately replicates the profits and losses that would result from owning one share of MSFT (i.e., a relatively small amount) between the prices of 80 and 90. In other words, it is assumed that the trader would like to replicate a traditional long position in MSFT with the restrictions that a sell order is to be executed when MSFT reaches 80 or 90. Thus, for example, if MSFT closes at 87 on Aug. 19, 1999 the trader would expect to have $2 of profit from appropriate investments in a group of DBAR contingent claims. Using the defined states identified in Example 3.1.1, this profit would be approximate since the states are defined to include a range of discrete possible closing prices.

In preferred embodiments, an investment in a state receives the same return regardless of the actual outcome within the state. It is therefore assumed for purposes of this Example 3.1.21 that a trader would accept an appropriate replication of the traditional profit and loss from a traditional position, subject to only "discretization" error. For purposes of this Example 3.1.21, and in preferred embodiments, it is assumed that the profit and loss corresponding to an actual outcome within a state is determined with reference to the price which falls exactly in between the upper and lower bounds of the state as measured in units of probability, i.e., the "state average." For this Example 3.1.21, the following desired payouts can be calculated for each of the states the amounts to be invested in each state and the resulting investment amounts to achieve those payouts:

TABLE 3.1.21-1

| States | State Average ($) | Desired Payout ($) | Investment Which Generates Desired Payout ($) |
|---|---|---|---|
| (0,80] | NA | 80 | 0.837258 |
| (80,80.5] | 80.33673 | 80.33673 | 0.699493 |
| (80.5,81] | 80.83349 | 80.83349 | 1.14091 |
| (81,81.5] | 81.33029 | 81.33029 | 1.755077 |
| (81.5,82] | 81.82712 | 81.82712 | 2.549131 |
| (82,82.5] | 82.32401 | 82.32401 | 3.498683 |
| (82.5,83] | 82.82094 | 82.82094 | 4.543112 |
| (83,83.5] | 83.31792 | 83.31792 | 5.588056 |
| (83.5,84] | 83.81496 | 83.81496 | 6.512429 |
| (84,84.5] | 84.31204 | 84.31204 | 7.206157 |
| (84.5,85] | 84.80918 | 84.80918 | 7.572248 |
| (85,85.5] | 85.30638 | 85.30638 | 7.555924 |
| (85.5,86] | 85.80363 | 85.80363 | 7.18022 |
| (86,86.5] | 86.30094 | 86.30094 | 6.493675 |
| (86.5,87] | 86.7983 | 86.7983 | 5.59628 |
| (87,87.5] | 87.29572 | 87.29572 | 4.599353 |
| (87.5,88] | 87.7932 | 87.7932 | 3.611403 |
| (88,88.5] | 88.29074 | 88.29074 | 2.706645 |
| (88.5,89] | 88.78834 | 88.78834 | 1.939457 |
| (89,89.5] | 89.28599 | 89.28599 | 1.330046 |
| (89.5,90] | 89.7837 | 89.7837 | 0.873212 |
| (90,∞] | NA | 90 | 1.2795 |

The far right column of Table 3.1.21-1 is the result of the matrix computation described above. The payouts used to construct the matrix Π for this Example 3.1.21 are one plus the returns shown in Example 3.1.1 for each state.

Pertinently the systems and methods of the present invention may be used to achieve almost any arbitrary payout or return profile, e.g., a long position, a short position, an option "straddle", etc., while maintaining limited liability and the other benefits of the invention described in this specification.

As discussed above, if many traders make multi-state investments, in a preferred embodiment an iterative procedure is used to allocate all of the multi-state investments to their respective constituent states. Computer code, as previously described and apparent to one of skill in the art, can be implemented to allocate each multi-state investment among the constituent states depending upon the distribution of amounts otherwise invested and the trader's desired payout distribution.

3.2 DBAR Portfolios

It may be desirable to combine a number of groups of DBAR contingent claims based on different events into a single portfolio. In this way, traders can invest amounts within the distribution of defined states corresponding to a single event as well as across the distributions of states corresponding to all the groups of contingent claims in the portfolio. In preferred embodiments, the payouts to the amounts invested in this fashion can therefore be a function of a relative comparison of all the outcome states in the respective groups of DBAR contingent claims to each other. Such a comparison may be based upon the amount invested in each outcome state in the distribution for each group of contingent claims as well as other qualities, parameters or characteristics of the outcome state (e.g., the magnitude of change for each security underlying the respective groups of contingent claims). In this way, more complex and varied payout and return profiles can be achieved using the systems and methods of the present invention. Since a preferred embodiment of a demand reallocation function (DRF) can operate on a portfolio of DBAR contingent claims, such a portfolio is referred to as a DBAR Portfolio, or DBARP. A DBARP is a preferred embodiment of DBAR contingent claims according to the present invention based on a multi-state, multi-event DRF.

In a preferred embodiment of a DBARP involving different events relating to different financial products, a DRF is employed in which returns for each contingent claim in the portfolio are determined by (i) the actual magnitude of change for each underlying financial product and (ii) how much has been invested in each state in the distribution. A large amount invested in a financial product, such as a common stock, on the long side will depress the returns to defined states on the long side of a corresponding group of DBAR contingent claims. Given the inverse relationship in preferred embodiments between amounts invested in and returns from a particular state, one advantage to a DBAR portfolio is that it is not prone to speculative bubbles. More specifically, in preferred embodiments a massive influx of long side trading, for example, will increase the returns to short side states, thereby increasing returns and attracting investment in those states.

The following notation is used to explain further preferred embodiments of DBARP:

$\mu_i$ is the actual magnitude of change for financial product i $W_i$ is the amount of successful investments in financial product i $L_i$ is the amount of unsuccessful investments in financial product i f is the system transaction fee L is the aggregate losses=

$$\sum_i L_i$$

$\gamma_i$ is the normalized returns for successful trades=

$$\frac{|\mu_i|}{\sum_i |\mu_i|}$$

$\pi^p_i$ is the payout per value unit invested in financial product i for a successful investment $r^p_i$ is the return per unit invested in financial product i for a successful investment The payout principle of a preferred embodiment of a DBARP is to return to a successful investment a portion of aggregate losses scaled by the normalized return for the successful investment, and to return nothing to unsuccessful investments. Thus, in a preferred embodiment a large actual return on a relatively lightly traded financial product will benefit from being allocated a high proportion of the unsuccessful investments.

$$\pi^p_i = \frac{\gamma_i * L}{W_i}$$

$$r^p_i = \frac{\gamma_i * L}{W_i} - 1$$

As explained below, the correlations of returns across securities is important in preferred embodiments to determine payouts and returns in a DBARP.

An example illustrates the operation of a DBARP according to the present invention. For purposes of this example, it is assumed that a portfolio contains two stocks, IBM and MSFT (Microsoft) and that the following information applies (e.g., predetermined termination criteria):

Trading start date: Sep. 1, 1999
Expiration date: Oct. 1, 1999
Current trading period start date: Sep. 1, 1999
Current trading period end date: Sep. 5, 1999
Current date: Sep. 2, 1999
IBM start price: 129
MSFT start price: 96
Both IBM and MSFT Ex-dividends
No transaction fee In this example, states can be defined so that traders can invest for IBM and MSFT to either depreciate or appreciate over the period. It is also assumed that the distribution of amounts invested in the various states is the following at the close of trading for the current trading period:

| Financial Product | Depreciate State | Appreciate State |
|---|---|---|
| MSFT | $100 million | $120 million |
| IBM | $80 million | $65 million |

The amounts invested express greater probability assessments that MSFT will likely appreciate over the period and IBM will likely depreciate.

For purposes of this example, it is further assumed that on the expiration date of Oct. 1, 1999, the following actual outcomes for prices are observed:

MSFT: 106 (appreciated by 10.42%)
IBM 127 (depreciated by 1.55%)

In this example, there is $100+$65=$165 million to distribute from the unsuccessful investments to the successful investments, and, for the successful investments, the relative performance of MSFT (10/42/(10.42+1.55)=0.871) is higher than for IBM (1.55/10.42+1.55)=0.229). In a preferred embodiment, 87.1% of the available returns is allocated to the successful MSFT traders, with the remainder due the successful IBM traders, and with the following returns computed for each state:

MSFT: $120 million of successful investment produces a payout of 0.871*$165 million=$143.72 million for a return to the successful traders of $$\frac{120M + 143.72M}{120M} - 1 = 119.77\%$$

IBM: $80 million in successful investment produces a payout of (1−0.871)*$165 million=$21.285 million, for a return to the successful traders of $$\frac{80M + 21.285M}{80M} - 1 = 26.6\%$$

The returns in this example and in preferred embodiments are a function not only of the amounts invested in each group of DBAR contingent claims, but also the relative magnitude of the changes in prices for the underlying financial products or in the values of the underlying events of economic performance. In this specific example, the MSFT traders receive higher returns since MSFT significantly outperformed IBM. In other words, the MSFT longs were "more correct" than the IBM shorts.

The operation of a DBARP is further illustrated by assuming instead that the prices of both MSFT and IBM changed by the same magnitude, e.g., MSFT went up 10%, and IBM went down 10%, but otherwise maintaining the assumptions for this example. In this scenario, $165 million of returns would remain to distribute from the unsuccessful investments but these are allocated equally to MSFT and IBM successful investments, or $82.5 million to each. Under this scenario the returns are:

$$MSFT: \frac{120M + 82.5M}{120\ M} - 1 = 68.75\%$$

$$IBM: \frac{80M + 82.5M}{80M} - 1 = 103.125\%$$

The IBM returns in this scenario are 1.5 times the returns to the MFST investments, since less was invested in the IBM group of DBAR contingent claims than in the MSFT group.

This result confirms that preferred embodiments of the systems and methods of the present invention provide incentives for traders to make large investments, i.e. promote liquidity, where it is needed in order to have an aggregate amount invested sufficient to provide a fair indication of trader expectations.

The payouts in this example depend upon both the magnitude of change in the underlying stocks as well as the correlations between such changes. A statistical estimate of these expected changes and correlations can be made in order to compute expected returns and payouts during trading and at the close of each trading period. While making such an investment may be somewhat more complicated that in a DBAR range derivative, as discussed above, it is still readily apparent to one of skill in the art from this specification or from practice of the invention.

The preceding example of a DBARP has been illustrated with events corresponding to closing prices of underlying securities. DBARPs of the present invention are not so limited and may be applied to any events of economic significance, e.g., interest rates, economic statistics, commercial real estate rentals, etc. In addition, other types of DRFs for use with DBARPs are apparent to one of ordinary skill in the art, based on this specification or practice of the present invention.

4. Risk Calculations

Another advantage of the groups of DBAR contingent claims according to the present invention is the ability to provide transparent risk calculations to traders, market risk managers, and other interested parties. Such risks can include market risk and credit risk, which are discussed below.

4.1 Market Risk

Market risk calculations are typically performed so that traders have information regarding the probability distribution of profits and losses applicable to their portfolio of active trades. For all trades associated with a group of DBAR contingent claims, a trader might want to know, for example, the dollar loss associated with the bottom fifth percentile of profit and loss. The bottom fifth percentile corresponds to a loss amount which the trader knows, with a 95% statistical confidence, would not be exceeded. For the purposes of this specification, the loss amount associated with a given statistical confidence (e.g., 95%, 99%) for an individual investment is denoted the capital-at-risk ("CAR"). In preferred embodiments of the present invention, a CAR can be computed not only for an individual investment but also for a plurality of investments related to for the same event or for multiple events.

In the financial industry, there are three common methods that are currently employed to compute CAR: (1) Value-at-Risk ("VAR"); (2) Monte Carlo Simulation ("MCS"); and (3) Historical Simulation ("HS").

4.1.1 Capital-At-Risk Determinations Using Value-At-Risk Techniques

VAR is a method which commonly relies upon calculations of the standard deviations and correlations of price changes for a group of trades. These standard deviations and correlations are typically computed from historical data. The standard deviation data are typically used to compute the CAR for each trade individually.

To illustrate the use of VAR with a group of DBAR contingent claims of the present invention, the following assumptions are made: (i) a trader has made a traditional purchase of a stock, say $100 of IBM; (ii) using previously computed standard deviation data, it is determined that the annual standard deviation for IBM is 30%; (iii) as is commonly the case, the price changes for IBM have a normal distribution; and (iv) the percentile of loss to be used is the bottom fifth percentile. From standard normal tables, the bottom fifth percentile of loss corresponds to approximately 1.645 standard deviations, so the CAR in this example—that is, loss for the IBM position that would not be exceeded with 95% statistical confidence—is 30%*1.645*$100, or $49.35. A similar calculation, using similar assumptions, has been made for a $200 position in GM, and the CAR computed for GM is $65.50. If, in this example, the computed correlation, $\zeta$, between the prices of IBM and GM stock is 0.5, the CAR for the portfolio containing both the IBM and GM positions may be expressed as:

$$CAR = \sqrt{(1.645\, \alpha_{IBM}\, \sigma_{IBM})^2 + (1.645\, \alpha_{GM}\, \sigma_{GM})^2 + 2\zeta 1.645\, \alpha_{IBM} * 1.645\, \alpha_{GM}\, \sigma_{GM}}$$

$$= \sqrt{49.35^2 + 65.50^2 + 2*.5*49.35*65.5} = 99.79$$

where $\alpha$ is the investment in dollars, $\sigma$ is the standard deviation, and $\zeta$ is the correlation.

These computations are commonly represented in matrix form as:

C is the correlation matrix of the underlying events, w is the vector containing the CAR for each active position in the portfolio, and $w^T$ is the transpose of W.

In preferred embodiments, C is a y×y matrix, where y is the number of active positions in the portfolio, and where the elements of C are:

$c_{i,j}=1$ when i=j i.e., has 1's on the diagonal, and otherwise $c_{i,j}=$ the correlation between the ith and jth events $$CAR = \sqrt{w^T * C * w} = \sqrt{(49.35\ 65.5)\begin{pmatrix} 1 & .5 \\ .5 & 1 \end{pmatrix}\begin{pmatrix} 49.35 \\ 65.5 \end{pmatrix}}$$

In preferred embodiments, several steps implement the VAR methodology for a group of DBAR contingent claims of the present invention. The steps are first listed, and details of each step are then provided. The steps are as follows:

(1) beginning with a distribution of defined states for a group of DBAR contingent claims, computing the standard deviation of returns in value units (e.g., dollars) for each investment in a given state;

(2) performing a matrix calculation using the standard deviation of returns for each state and the correlation matrix of returns for the states within the same distribution of states, to obtain the standard deviation of returns for all investments in a group of DBAR contingent claims;

(3) adjusting the number resulting from the computation in step (2) for each investment so that it corresponds to the desired percentile of loss;

(4) arranging the numbers resulting from step (3) for each distinct DBAR contingent claim in the portfolio into a vector, w, having dimension equal to the number of distinct DBAR contingent claims;

(5) creating a correlation matrix including the correlation of each pair of the underlying events for each respective DBAR contingent claim in the portfolio; and (6) calculating the square root of the product of w, the correlation matrix created in step (5), and the transpose of w.

The result is CAR using the desired percentile of loss, for all the groups of DBAR contingent claims in the portfolio.

In preferred embodiments, the VAR methodology of steps (1)–(6) above can be applied to an arbitrary group of DBAR contingent claims as follows. For purposes of illustrating this methodology, it is assumed that all investments are made in DBAR range derivatives using a canonical DRF as previously described. Similar analyses apply to other forms of DRFs.

In step (1), the standard deviation of returns per unit of amount invested for each state i for each group of DBAR contingent claim is computed as follows:

$$\sigma_i = \sqrt{\frac{T}{T_i} - 1} = \sqrt{\frac{(1-q_i)}{q_i}} = \sqrt{r_i}$$

where $\sigma_i$ is the standard deviation of returns per unit of amount invested in each state i, $T_i$ is the total amount invested in state i; T is the sum of all amounts invested across the distribution of states; $q_i$ is the implied probability of the occurrence of state i derived from T and $T_i$; and $r_i$ is the return per unit of investment in state i. In this preferred embodiment, this standard deviation is a function of the amount invested in each state and total amount invested across the distribution of states, and is also equal to the square root of the unit return for the state. If $\alpha_i$ is the amount invested in state i, $\alpha_i * \sigma_i$ is the standard deviation in units of the amount invested (e.g., dollars) for each state i.

Step (2) computes the standard deviation for all investments in a group of DBAR contingent claims. This step (2) begins by calculating the correlation between each pair of states for every possible pair within the same distribution of states for a group of DBAR contingent claims. For a canonical DRF, these correlations may be computed as follows:

$$\rho_{i,j} = -\frac{\sqrt{T_i * T_j}}{\sqrt{(T-T_i)*(T-T_j)}} = -\sqrt{\frac{q_i * q_j}{(1-q_i)*(1-q_j)}} = \frac{-1}{\sqrt{r_i * r_j}} = \frac{-1}{\sigma_i * \sigma_j}$$

where $\rho_{i,j}$ is the correlation between state i and state j. In preferred embodiments, the returns to each state are negatively correlated since the occurrence of one state (a successful investment) precludes the occurrence of other states (unsuccessful investments). If there are only two states in the distribution of states, then $T_j = T - T_i$ and the correlation $\rho_{i,j}$ is −1, i.e., an investment in state i is successful and in state j is not, or vice versa, if i and j are the only two states. In preferred embodiments where there are more than two states, the correlation falls in the range between 0 and −1 (the correlation is exactly 0 if and only if one of the states has implied probability equal to one). In step (2) of the VAR methodology, the correlation coefficients $\rho_{i,j}$ are put into a matrix $C_s$ (the subscript s indicating correlation among states for the same event) which contains a number of rows and columns equal to the number of defined states for the group of DBAR contingent claims. The correlation matrix contains 1's along the diagonal, is symmetric, and the element at the i-th row and j-th column of the matrix is equal to $\rho_{i,j}$. From step (1) above, a n×1 vector U is constructed having a dimension equal to the number of states n, in the group of DBAR contingent claims, with each element of U being equal to $\alpha_i * \sigma_i$. The standard deviation, $w_k$, of returns for all investments in states within the distribution of states defining the kth group of DBAR contingent claims can be calculated as follows:

$$w_k = \sqrt{U^T * C_s * U}$$

Step (3) involves adjusting the previously computed standard deviation, $w_k$, for every group of DBAR contingent claims in a portfolio by an amount corresponding to a desired or acceptable percentile of loss. For purposes of illustration, it is assumed that investment returns have a normal distribution function; that a 95% statistical confidence for losses is desirable; and that the standard deviations of returns for each group of DBAR contingent claims, $w_k$, can be multiplied by 1.645, i.e., the number of standard deviations in the standard normal distribution corresponding to the bottom fifth percentile. A normal distribution is used for illustrative purposes, and other types of distributions (e.g., the Student T distribution) can be used to compute the number of standard deviations corresponding to the any percentile of interest. As discussed above, the maximum amount that can be lost in preferred embodiments of canonical DRF implementation of a group of DBAR contingent claims is the amount invested.

Accordingly, for this illustration the standard deviations $w_k$ are adjusted to reflect the constraint that the most that can be lost is the smaller of (a) the total amount invested and (b) the percentile loss of interest associated with the CAR calculation for the group of DBAR contingent claims, i.e.:

$$w_k = \min\left(1.645 * w_k, \sum_{i=1,n} \alpha_i\right)$$

In effect, this updates the standard deviation for each event by substituting for it a CAR value that reflects a multiple of the standard deviation corresponding to an extreme loss percentile (e.g., bottom fifth) or the total invested amount, whichever is smaller.

Step (4) involves taking the adjusted $W_k$, as developed in step (4) for each of m groups of DBAR contingent claims, and arranging them into an y×1 dimensional column vector, w, each element of which contains $w_k$, k=1 . . . y.

Step (5) involves the development of a symmetric correlation matrix, $C_e$, which has a number of rows and columns equal to the number of groups of DBAR contingent claims, y. in which the trader has one or more investments. Correlation matrix $C_e$ can be estimated from historical data or may be available more directly, such as the correlation matrix among foreign exchange rates, interest rates, equity indices, commodities, and other financial products available from JP Morgan's RiskMetrics database. Other sources of the correlation information for matrix $C_e$ are known to those of skill in the art. Along the diagonals of the correlation matrix $C_e$ are 1's, and the entry at the i-th row and j-th column of the matrix contains the correlation between the i-th and j-th events which define the i-th and j-th DBAR contingent claim for all such possible pairs among the m active groups of DBAR contingent claims in the portfolio.

In Step (6), the CAR for the entire portfolio of m groups of DBAR contingent claims is found by performing the following matrix computation, using each $w_k$ from step (4) arrayed into vector w and its transpose $w^T$:

$$CAR = \sqrt{w^T * C_e * w}$$

This CAR value for the portfolio of groups of DBAR contingent claims is an amount of loss which will not be exceeded with the associated statistical confidence used in Steps (1)–(6) above (e.g., in this illustration, 95%).

Example 4.1.1-1

VAR-based CAR Calculation

An example further illustrates the calculation of a VAR-based CAR for a portfolio containing two groups of DBAR range derivative contingent claims (i.e., y=2) with a canonical DRF on two common stocks, IBM and GM. For this example, the following assumptions are made: (i) for each of the two groups of DBAR contingent claims, the relevant underlying event upon which the states are defined is the respective closing price of each stock one month forward; (ii) there are only three states defined for each event: "low", "medium", and "high," corresponding to ranges of possible closing prices on that date; (iii) the posted returns for IBM and GM respectively for the three respective states are, in U.S. dollars, (4, 0.6667, 4) and (2.333, 1.5, 2.333); (iv) the exchange fee is zero; (v) for the IBM group of contingent claims, the trader has one dollar invested in the state "low", three dollars invested in the state "medium," and two dollars invested in the state "high"; (vi) for the GM group of contingent claims, the trader has a single investment in the amount of one dollar in the state "medium"; (vii) the desired or acceptable percentile of loss in the fifth percentile, assuming a normal distribution; and (viii) the estimated correlation of the price changes of IBM and GM is 0.5 across the distribution of states for each stock.

Steps (1)–(6), described above, are used to implement VAR in order to compute CAR for this example. From Step (1), the standard deviations of state returns per unit of amount invested in each state for the IBM and GM groups of contingent claims are, respectively, (2, 0.8165, 2) and (1.5274, 1.225, 1.5274). In further accordance with Step (1) above, the amount invested in each state in the respective group of contingent claims, $\alpha_i$; is multiplied by the previously calculated standard deviation of state returns per investment, $\sigma_i$, so that the standard deviation of returns per state in dollars for each claim equals, for the IBM group: (2, 2.4495, 4) and, for the GM group, (0, 1.225, 0).

In accordance with Step (2) above, for each of the two groups of DBAR contingent claims in this example, a correlation matrix between any pair of states, $C_s$, is constructed, as follows:

$$C_s^{IBM} = \begin{matrix} 1 & -.6124 & -.25 \\ -.6124 & 1 & -.6124 \\ -.25 & -.6124 & 1 \end{matrix}$$

$$C_s^{GM} = \begin{matrix} 1 & -.5345 & -.4286 \\ -.5345 & 1 & -.5345 \\ -.4286 & -.5345 & 1 \end{matrix}$$

where the left matrix is the correlation between each pair of state returns for the IBM group of contingent claims and the right matrix is the corresponding matrix for the GM group of contingent claims.

Also according to step (2) above, for each of the two groups of contingent claims, the standard deviation of returns per state in dollars, $\alpha_i \sigma_i$, for each investment in this example can be arranged in a vector with dimension equal to three (i.e., the number of states):

$$U_{IBM} = \begin{matrix} 2 \\ 2.4495 \\ 4 \end{matrix} \qquad U_{GM} = \begin{matrix} 0 \\ 1.225 \\ 0 \end{matrix}$$

where the vector on the left contains the standard deviation in dollars of returns per state for the IBM group of contingent claims, and the vector on the right contains the corresponding information for the GM group of contingent claims. Further in accordance with Step (2) above, a matrix calculation can be performed to compute the total standard deviation for all investments in each of the two groups of contingent claims, respectively:

$$w_1 = \sqrt{U_{IBM}^T * C_s^{IBM} * U_{IBM}} = 2$$
$$w_2 = \sqrt{U_{GM}^T * C_s^{GM} * U_{GM}} = 1.225$$

where the quantity on the left is the standard deviation for all investments in the distribution of the IBM group of contingent claims, and the quantity on the right is the corresponding standard deviation for the GM group of contingent claims.

In accordance with step (3) above, $w_1$ and $w_2$ are adjusted by multiplying each by 1.645 (corresponding to a CAR loss percentile of the bottom fifth percentile assuming a normal distribution) and then taking the lower of (a) that resulting value and (b) the maximum amount that can be lost, i.e., the amount invested in all states for each group of contingent claims:

$$w_1 = \min(2*1.645, 6) = 3.29$$

$$w_2 = \min(2*1.225, 1) = 1$$

where the left quantity is the adjusted standard deviation of returns for all investments across the distribution of the IBM group of contingent claims, and the right quantity is the corresponding amount invested in the GM group of contingent claims. These two quantities, $w_1$ and $w_2$, are the CAR values for the individual groups of DBAR contingent claims respectively, corresponding to a statistical confidence of 95%. In other words, if the normal distribution assumptions that have been made with respect to the state returns are valid, then a trader, for example, could be 95% confident that losses on the IBM groups of contingent claims would not exceed $3.29.

Proceeding now with Step (4) in the VAR process described above, the quantities $w_1$ and $w_2$ are placed into a vector which has a dimension of two, equal to the number of groups of DBAR contingent claims in the illustrative trader's portfolio:

$$w = \begin{matrix} 3.29 \\ 1 \end{matrix}$$

According to Step (5), a correlation matrix $C_e$ with two rows and two columns, is either estimated from historical data or obtained from some other source (e.g., RiskMetrics), as known to one of skill in the art. Consistent with the assumption for this illustration that the estimated correlation between the price changes of IBM and GM is 0.5, the correlation matrix for the underlying events is as follows:

$$C_e = \begin{matrix} 1 & .5 \\ .5 & 1 \end{matrix}$$

Proceeding with Step (6), a matrix multiplication is performed by pre- and post-multiplying $C_e$ by the transpose of w and by w, and taking the square root of the resulting product:

$$CAR = \sqrt{w^T * C_e * w} = 3.8877$$

This means that for the portfolio in this example, comprising the three investments in the IBM group of contingent claims and the single investment in the GM group of contingent claims, the trader can have a 95% statistical confidence he will not have losses in excess of $3.89.

4.1.2 Capital-at-risk Determinations Using Monte Carlo Simulation Techniques

Monte Carlo Simulation ("MCS") is another methodology that is frequently used in the financial industry to compute CAR. MCS is frequently used to simulate many representative scenarios for a given group of financial products, compute profits and losses for each representative scenario, and then analyze the resulting distribution of scenario profits and losses. For example, the bottom fifth percentile of the distribution of the scenario profits and losses would correspond to a loss for which a trader could have a 95% confidence that it would not be exceeded. In a preferred embodiment, the MCS methodology can be adapted for the computation of CAR for a portfolio of DBAR contingent claims as follows.

Step (1) of the MCS methodology involves estimating the statistical distribution for the events underlying the DBAR contingent claims using conventional econometric techniques, such as GARCH. If the portfolio being analyzed has more than one group of DBAR contingent claim, then the distribution estimated will be what is commonly known as a multivariate statistical distribution which describes the statistical relationship between and among the events in the portfolio. For example, if the events are underlying closing prices for stocks and stock price changes have a normal distribution, then the estimated statistical distribution would be a multivariate normal distribution containing parameters relevant for the expected price change for each stock, its standard deviation, and correlations between every pair of stocks in the portfolio. Multivariate statistical distribution is typically estimated from historical time series data on the underlying events (e.g., history of prices for stocks) using conventional econometric techniques.

Step (2) of the MCS methodology involves using the estimated statistical distribution of Step (1) in order to simulate the representative scenarios. Such simulations can be performed using simulation methods contained in such reference works as *Numerical Recipes in C* or by using simulation software such as @Risk package available from Palisade, or using other methods known to one of skill in the art. For each simulated scenario, the DRF of each group of DBAR contingent claims in the portfolio determines the payouts and profits and losses on the portfolio computed.

Using the above two stock example involving GM and IBM used above to demonstrate VAR techniques for calculating CAR, a scenario simulated by MCS techniques might be "High" for IBM and "Low" for GM, in which case the trader with the above positions would have a four dollar profit for the IBM contingent claim and a one dollar loss for the GM contingent claim, and a total profit of three dollars. In step (2), many such scenarios are generated so that a resulting distribution of profit and loss is obtained. The resulting profits and losses can be arranged into ascending order so that, for example, percentiles corresponding to any given profit and loss number can be computed. A bottom fifth percentile, for example, would correspond to a loss for which the trader could be 95% confident would not be exceeded, provided that enough scenarios have been generated to provide an adequate representative sample. This number could be used as the CAR value computed using MCS for a group of DBAR contingent claims. Additionally, statistics such as average profit or loss, standard deviation, skewness, kurtosis and other similar quantities can be computed from the generated profit and loss distribution, as known by one of skill in the art.

4.1.3 Capital-at-risk Determination Using Historical Simulation Techniques

Historical Simulation ("HS") is another method used to compute CAR values. HS is comparable to that of MCS in that it relies upon the use of representative scenarios in order to compute a distribution of profit and loss for a portfolio. Rather than rely upon simulated scenarios from an estimated probability distribution, however, HS uses historical data for the scenarios. In a preferred embodiment, HS can be adapted to apply to a portfolio of DBAR contingent claims as follows.

Step (1) involves obtaining, for each of the underlying events corresponding to each group of DBAR contingent claims, a historical time series of outcomes for the events. For example, if the events are stock closing prices, time series of closing prices for each stock can be obtained from a historical database such as those available from Bloomberg, Reuters, or Datastream or other data sources known to someone of skill in the art.

Step (2) involves using each observation in the historical data from Step (1) to compute payouts using the DRF for each group of DBAR contingent claims in the portfolio. From the payouts for each group for each historical observation, a portfolio profit and loss can be computed. This results in a distribution of profits and losses corresponding to the historical scenarios, i.e., the profit and loss that would have been obtained had the trader held the portfolio throughout the period covered by the historical data sample.

Step (3) involves arranging the values for profit and loss from the distribution of profit and loss computed in Step (2) in ascending order. A profit and loss can therefore be computed corresponding to any percentile in the distribution so arranged, so that, for example, a CAR value corresponding to a statistical confidence of 95% can be computed by reference to the bottom fifth percentile.

4.2 Credit Risk

In preferred embodiments of the present invention, a trader may make investments in a group of DBAR contingent claims using a margin loan. In preferred embodiments of the present invention implementing DBAR digital options, an investor may make an investment with a profit and loss scenario comparable to a sale of a digital put or call option and thus have some loss if the option expires "in the money," as discussed in Section 6, below. In preferred embodiments, credit risk may be measured by estimating the amount of possible loss that other traders in the group of contingent claims could suffer owing to the inability of a given trader to repay a margin loan or otherwise cover a loss exposure. For example, a trader may have invested $1 in a given state for a group of DBAR contingent claims with $.50 of margin. Assuming a canonical DRF for this example, if the state later fails to occur, the DRF collects $1 from the trader (ignoring interest) which would require repayment of the margin loan. As the trader may be unable to repay the margin loan at the required time, the traders with successful trades may potentially not be able to receive the full amounts owing them under the DRF, and may therefore receive payouts lower than those indicated by the finalized returns for a given trading period for the group of contingent claims. Alternatively, the risk of such possible losses due to credit risk may be insured, with the cost of such insurance either borne by the exchange or passed on to the traders. One advantage of the system and method of the present invention is that, in preferred embodiments, the amount of credit risk associated with a group of contingent claims can readily be calculated.

In preferred embodiments, the calculation of credit risk for a portfolio of groups of DBAR contingent claims involves computing a credit-capital-at-risk ("CCAR") figure in a manner analogous to the computation of CAR for market risk, as described above.

The computation of CCAR involves the use of data related to the amount of margin used by each trader for each investment in each state for each group of contingent claims in the portfolio, data related to the probability of each trader defaulting on the margin loan (which can typically be obtained from data made available by credit rating agencies, such as Standard and Poors, and data related to the correlation of changes in credit ratings or default probabilities for every pair of traders (which can be obtained, for example, from JP Morgan's CreditMetrics database).

In preferred embodiments, CCAR computations can be made with varying levels of accuracy and reliability. For example, a calculation of CCAR which is substantially accurate but could be improved with more data and computational effort may nevertheless be adequate, depending upon the group of contingent claims and the desires of traders for credit risk related information. The VAR methodology, for example, can be adapted to the computation of CCAR for a group of DBAR contingent claims, although it is also possible to use MCS and HS related techniques for such computations. The steps that can be used in a preferred embodiment to compute CCAR using VAR-based, MCS-based, and HS-based methods are described below.

4.2.1 CCAR Method for DBAR Contingent claims Using the VAR-based Methodology Step (i) of the VAR-based CCAR methodology involves obtaining, for each trader in a group of DBAR contingent claims, the amount of margin used to make each trade or the amount of potential loss exposure from trades with profit and loss scenarios comparable to sales of options in conventional markets.

Step (ii) involves obtaining data related to the probability of default for each trader who has invested in the groups of DBAR contingent claims. Default probabilities can be obtained from credit rating agencies, from the JP Morgan CreditMetrics database, or from other sources as known to one of skill in the art. In addition to default probabilities, data related to the amount recoverable upon default can be obtained. For example, an AA-rated trader with $1 in margin loans may be able to repay $0.80 dollars in the event of default.

Step (iii) involves scaling the standard deviation of returns in units of the invested amounts. This scaling step is described in step (1) of the VAR methodology described above for estimating market risk. The standard deviation of each return, determined according to Step (1) of the VAR methodology previously described, is scaled by (a) the percentage of margin [or loss exposure] for each investment; (b) the probability of default for the trader; and (c) the percentage not recoverable in the event of default.

Step (iv) of this VAR-based CCAR methodology involves taking from step (iii) the scaled values for each state for each investment and performing the matrix calculation described in Step (2) above for the VAR methodology for estimating market risk, as described above. In other words, the standard deviations of returns in units of invested amounts which have been scaled as described in Step (iii) of this CCAR methodology are weighted according to the correlation between each possible pair of states (matrix $C_s$, as described above). The resulting number is a credit-adjusted standard deviation of returns in units of the invested amounts for each trader for each investment on the portfolio of groups of DBAR contingent claims. For a group of DBAR contingent claims, the standard deviations of returns that have been scaled in this fashion are arranged into a vector whose dimension equals the number of traders.

Step (v) of this VAR-based CCAR methodology involves performing a matrix computation, similar to that performed in Step (5) of the VAR methodology for CAR described above. In this computation, the vector of credit-scaled standard deviations of returns from step (iv) are used to pre- and post-multiply a correlation matrix with rows and columns equal to the number of traders, with 1's along the diagonal, and with the entry at row i and column j containing the statistical correlation of changes in credit ratings described above. The square root of the resulting matrix multiplication is an approximation of the standard deviation of losses, due to default, for all the traders in a group of DBAR contingent claims. This value can be scaled by a number of standard deviations corresponding to a statistical confidence of the credit-related loss not to be exceeded, as discussed above.

In a preferred embodiment, any given trader may be omitted from a CCAR calculation. The result is the CCAR facing the given trader due to the credit risk posed by other traders who have invested in a group of DBAR contingent claims. This computation can be made for all groups of DBAR contingent claims in which a trader has a position, and the resulting number can be weighted by the correlation matrix for the underlying events, $C_e$, as described in Step (5) for the VAR-based CAR calculation. The result corresponds to the risk of loss posed by the possible defaults of other traders across all the states of all the groups of DBAR contingent claims in a trader's portfolio.

4.2.2 CCAR Method for DBAR Contingent claims Using the Monte Carlo Simulation (MCS) Methodology As described above, MCS methods are typically used to simulate representative scenarios for a given group of financial products, compute profits and losses for each representative scenario, then analyze the resulting distribution of scenario profits and losses. The scenarios are designed to be representative in that they are supposed to be based, for instance, on statistical distributions which have been estimated, typically using econometric time series techniques, to have a great degree of relevance for the future behavior of the financial products. A preferred embodiment of MCS methods to estimate CCAR for a portfolio of DBAR contingent claims of the present invention, involves two steps, as described below.

Step (i) of the MCS methodology is to estimate a statistical distribution of the events of interest. In computing CCAR for a group of DBAR contingent claims, the events of interest may be both the primary events underlying the groups of DBAR contingent claims, including events that may be fitted to multivariate statistical distributions to compute CAR as described above, as well as the events related to the default of the other investors in the groups of DBAR contingent claims. Thus, in a preferred embodiment, the multivariate statistical distribution to be estimated relates to the market events (e.g., stock price changes, changes in interest rates) underlying the groups of DBAR contingent claims being analyzed as well as the event that the investors in those groups of DBAR contingent claims, grouped by credit rating or classification will be unable to repay margin loans for losing investments.

For example, a multivariate statistical distribution to be estimated might assume that changes in the market events and credit ratings or classifications are jointly normally distributed. Estimating such a distribution would thus entail estimating, for example, the mean changes in the underlying market events (e.g., expected changes in interest rates until the expiration date), the mean changes in credit ratings expected until expiration, the standard deviation for each market event and credit rating change, and a correlation matrix containing all of the pairwise correlations between every pair of events, including market and credit event pairs. Thus, a preferred embodiment of MCS methodology as it applies to CCAR estimation for groups of DBAR contingent claims of the present invention typically requires some estimation as to the statistical correlation between market events (e.g., the change in the price of a stock issue) and credit events (e.g., whether an investor rated A− by Standard and Poors is more likely to default or be downgraded if the price of a stock issue goes down rather than up).

It is sometimes difficult to estimate the statistical correlations between market-related events such as changes in stock prices and interest rates, on the one hand, and credit-related events such as counterparty downgrades and defaults, on the other hand. These difficulties can arise due to the relative infrequency of credit downgrades and defaults. The infrequency of such credit-related events may mean that statistical estimates used for MCS simulation can only be supported with low statistical confidence. In such cases, assumptions can be employed regarding the statistical correlations between the market and credit-related events. For example, it is not uncommon to employ sensitivity analysis with regard to such correlations, i.e., to assume a given correlation between market and credit-related events and then vary the assumption over the entire range of correlations from −1 to 1 to determine the effect on the overall CCAR.

A preferred approach to estimating correlation between events is to use a source of data with regard to credit-related events which does not typically suffer from a lack of statistical frequency. Two methods can be used in this preferred approach. First, data can be obtained which provide greater statistical confidence with regard to credit-related events. For example, expected default frequency data can be purchased from such companies as KMV Corporation. These data supply probabilities of default for various parties which can be updated as frequently as daily. Second, more frequently observed default probabilities can be estimated from market interest rates. For example, data providers such as Bloomberg and Reuters typically provide information on the additional yield investors require for investments in bonds of varying credit ratings, e.g., AAA, AA, A, A−. Other methods are readily available to one skilled in the art to provide estimates regarding default probabilities for various entities. Such estimates can be made as frequently as daily so that it is possible to have greater statistical confidence in the parameters typically needed for MCS, such as the correlation between changes in default probabilities and changes in stock prices, interest rates, and exchange rates.

The estimation of such correlations is illustrated assuming two groups of DBAR contingent claims of interest, where one group is based upon the closing price of IBM stock in three months, and the other group is based upon the closing yield of the 30-year U.S. Treasury bond in three months. In this illustration, it is also assumed that the counterparties who have made investments on margin in each of the groups can be divided into five distinct credit rating classes. Data on the daily changes in the price of IBM and the bond yield may be readily obtained from such sources as Reuters or Bloomberg. Frequently changing data on the expected default probability of investors can be obtained, for example, from KMV Corporation, or estimated from interest rate data as described above. As the default probability ranges between 0 and 1, a statistical distribution confined to this interval is chosen for purposes of this illustration. For example, for purposes of this illustration, it can be assumed that the expected default probability of the investors follows a logistic distribution and that the joint distribution of changes in IBM stock and the 30-year bond yield follows a bivariate normal distribution. The parameters for the logistic distribution and the bivariate normal distribution can be estimated using econometric techniques known to one skilled in the art.

Step (ii) of a MCS technique, as it may be applied to estimating CCAR for groups of DBAR contingent claims, involves the use of the multivariate statistical distributions estimated in Step (i) above in order to simulate the representative scenarios. As described above, such simulations can be performed using methods and software readily available and known to those of skill in the art. For each simulated scenario, the simulated default rate can be multiplied by the amount of losses an investor faces based upon the simulated market changes and the margin, if any, the investor has used to make losing investments. The product represents an estimated loss rate due to investor defaults. Many such scenarios can be generated so that a resulting distribution of credit-related expected losses can be obtained. The average value of the distribution is the mean loss. The lowest value of the top fifth percentile of the distribution, for example, would correspond to a loss for which a given trader could be 95% confident would not be exceeded, provided that enough scenarios have been generated to provide a statistically meaningful sample. In preferred embodiments, the selected value in the distribution, corresponding to a desired or adequate confidence level, is used as the CCAR for the groups of DBAR contingent claims being analyzed.

4.2.3 CCAR Method for DBAR Contingent Claims Using the Historical Simulation ("HS") Methodology As described above, Historical Simulation (HS) is comparable to MCS for estimating CCAR in that HS relies on representative scenarios in order to compute a distribution of profit and loss for a portfolio of groups of DBAR contingent claim investments. Rather than relying on simulated scenarios from an estimated multivariate statistical distribution, however, HS uses historical data for the scenarios. In a preferred embodiment, HS methodology for calculating CCAR for groups of DBAR contingent claims uses three steps, described below.

Step (i) involves obtaining the same data for the market-related events as described above in the context of CAR. In addition, to use HS to estimate CCAR, historical time series data are also used for credit-related events such as downgrades and defaults. As such data are typically rare, methods described above can be used to obtain more frequently observed data related to credit events. For example, in a preferred embodiment, frequently-observed data on expected default probabilities can be obtained from KMV Corporation. Other means for obtaining such data are known to those of skill in the art.

Step (ii) involves using each observation in the historical data from the previous step (i) to compute payouts using the DRF for each group of DBAR contingent claims being analyzed. The amount of margin to be repaid for the losing trades, or the loss exposure for investments with profit and loss scenarios comparable to digital option "sales," can then be multiplied by the expected default probability to use HS to estimate CCAR, so that an expected loss number can be obtained for each investor for each group of contingent claims. These losses can be summed across the investment by each trader so that, for each historical observation data point, an expected loss amount due to default can be attributed to each trader. The loss amounts can also be summed across all the investors so that a total expected loss amount can be obtained for all of the investors for each historical data point.

Step (iii) involves arranging, in ascending order, the values of loss amounts summed across the investors for each data point from the previous step (iii). An expected loss amount due to credit-related events can therefore be computed corresponding to any percentile in the distribution so arranged. For example, a CCAR value corresponding to a 95% statistical confidence level can be computed by reference to $95^{th}$ percentile of the loss distribution.

5. Liquidity and Price/Quantity Relationships

In the trading of contingent claims, whether in traditional markets or using groups of DBAR contingent claims of the present invention, it is frequently useful to distinguish between the fundamental value of the claim, on the one hand, as determined by market expectations, information, risk aversion and financial holdings of traders, and the deviations from such value due to liquidity variations, on the other hand. For example, the fair fundamental value in the traditional swap market for a five-year UK swap (i.e., swapping fixed interest for floating rate payments based on UK LIBOR rates) might be 6.79% with a 2 basis point bid/offer (i.e., 6.77% receive, 6.81% pay). A large trader who takes the market's fundamental mid-market valuation of 6.79% as correct or fair might want to trade a swap for a large amount, such as 750 million pounds. In light of likely liquidity available according to current standards of the traditional market, the large amount of the transaction could reduce the likely offered rate to 6.70%, which is a full 7 basis points lower than the average offer (which is probably applicable to offers of no more than 100 million pounds) and 9 basis points away from the fair mid-market value.

The difference in value between a trader's position at the fair or mid-market value and the value at which the trade can actually be completed, i.e. either the bid or offer, is usually called the liquidity charge. For the illustrative five-year UK swap, a 1 basis point liquidity charge is approximately equal to 0.04% of the amount traded, so that a liquidity charge of 9 basis points equals approximately 2.7 million pounds. If no new information or other fundamental shocks intrude into or "hit" the market, this liquidity charge to the trader is almost always a permanent transaction charge for liquidity—one that also must be borne when the trader decides to liquidate the large position. Additionally, there is no currently reliable way to predict, in the traditional markets, how the relationship between price and quantity may deviate from the posted bid and offers, which are usually applicable only to limited or representative amounts. Price and quantity relationships can be highly variable, therefore, due to liquidity variations. Those relationships can also be non-linear. For instance, it may cost more than twice as much, in terms of a bid/offer spread, to trade a second position that is only twice as large as a first position.

From the point of view of liquidity and transactions costs, groups of DBAR contingent claims of the present invention offer advantages compared to traditional markets. In preferred embodiments, the relationship between price (or returns) and quantity invested (i.e., demanded) is determined mathematically by a DRF. In a preferred embodiment using a canonical DRF, the implied probability $q_i$ for each state i increases, at a decreasing rate, with the amount invested in that state:

$$q_i = \frac{T_i}{T}$$

$$\frac{\partial q_i}{\partial T_i} = \frac{T - T_i}{T^2}$$

$$\frac{\partial^2 q_i}{\partial T_i^2} = -2 * \frac{T - T_i}{T^3}$$

$$\frac{\partial q_i}{\partial T_{j, j \neq i}} = -\frac{T_i}{T^2} = -\frac{q_i}{T}$$

where T is the total amount invested across all the states of the group of DBAR contingent claims and $T_i$ is the amount invested in the state i. As a given the amount gets very large, the implied probability of that state asymptotically approaches one. The last expression immediately above shows that there is a transparent relationship, available to all traders, between implied probabilities and the amount invested in states other than a given state i. The expression shows that this relationship is negative, i.e., as amounts invested in other states increase, the implied probability for the given state i decreases. Since, in preferred embodiments of the present invention, adding investments to states other than the given state is equivalent to selling the given state in the market, the expression for $$\frac{\partial q_i}{\partial T_{j, j \neq i}}$$

above shows how, in a preferred embodiment, the implied probability for the given state changes as a quantity for that state is up for sale, i.e., what the market's "bid" is for the quantity up for sale. The expression for $$\frac{\partial q_i}{\partial T_i}$$

above shows, in a preferred embodiment, how the probability for the given state changes when a given quantity is demanded or desired to be purchased, i.e., what the market's "offer" price is to purchasers of the desired quantity.

In a preferred embodiment, for each set of quantities invested in the defined states of a group of DBAR contingent claims, a set of bid and offer curves is available as a function of the amount invested.

In the groups of DBAR contingent claims of the present invention, there are no bids or offers per se. The mathematical relationships above are provided to illustrate how the systems and methods of the present invention can, in the absence of actual bid/offer relationships, provide groups of DBAR contingent claims with some of the functionality of bid/offer relationships.

Economists usually prefer to deal with demand and cross-demand elasticities, which are the percentage changes in prices due to percentage changes in quantity demanded for a given good (demand elasticity) or its substitute (cross-demand elasticity). In preferred embodiments of the systems and methods of the present invention, and using the notation developed above, $$\frac{\Delta q_i}{q_i} \bigg/ \frac{\Delta T_i}{T_i} = 1 - q_i$$

$$\frac{\Delta q_i}{q_i} \frac{\Delta T_j}{T_j} = -q_j$$

The first of the expressions immediately above shows that small percentage changes in the amount invested in state i have a decreasing percentage effect on the implied probability for state i, as state i becomes more likely (i.e., as $q_i$ increases to 1). The second expression immediately above shows that a percentage change in the amount invested in a state j other than state i will decrease the implied probability for state i in proportion to the implied probability for the other state j.

In preferred embodiments, in order to effectively "sell" a state, traders need to invest or "buy" complement states, i.e., states other than the one they wish to "sell." Thus, in a preferred embodiment involving a group of DBAR claims with two states, a "seller" of state 1 will "buy" state 2, and vice versa. In order to "sell" state 1, state 2 needs to be "bought" in proportion to the ratio of the amount invested in state 2 to the amount invested in state 1. In a state distribution which has more than two states, the "complement" for a given state to be "sold" are all of the other states for the group of DBAR contingent claims. Thus, "selling" one state involves "buying" a multi-state investment, as described above, for the complement states.

Viewed from this perspective, an implied offer is the resulting effect on implied probabilities from making a small investment in a particular state. Also from this perspective, an implied bid is the effect on implied probabilities from making a small multi-state investment in complement states. For a given state in a preferred embodiment of a group of DBAR contingent claims, the effect of an invested amount on implied probabilities can be stated as follows:

$$\text{Implied "Bid"} = q_i - \frac{(1 - q_i)}{T} * \Delta T_i$$

$$\text{Implied "Offer"} = q_i + q_i * \left(\frac{1}{T_i} - \frac{1}{T}\right) * \Delta T_i$$

where $\Delta T_i$ (considered here to be small enough for a first-order approximation) is the amount invested for the "bid" or "offer." These expressions for implied "bid" and implied "offer" can be used for approximate computations. The expressions indicate how possible liquidity effects within a group of DBAR contingent claims can be cast in terms familiar in traditional markets. In the traditional markets, however, there is no ready way to compute such quantities for any given market.

The full liquidity effect—or liquidity response function—between two states in a group of DBAR contingent claims can be expressed as functions of the amounts invested in a given state, $T_i$, and amounts invested in the complement states, denoted $T^c_i$, as follows:

Implied "Bid" Demand Response $$q_i^B(\Delta T_i) = \frac{T_i}{T_i + T_i^c + \Delta T_i * \left(\frac{T_i^c}{T_i - \Delta T_i}\right)}$$

Implied "Offer" Demand Response $\quad q_i^O(\Delta T_i) = \frac{T_i + \Delta T_i}{T_i + T_i^c + \Delta T_i}$ The implied "bid" demand response function shows the effect on the implied state probability of an investment made to hedge an investment of size $\Delta T_i$. The size of the hedge investment in the complement states is proportional to the ratio of investments in the complement states to the amount of investments in the state or states to be hedged, excluding the investment to be hedged (i.e., the third term in the denominator). The implied "offer" demand response function above shows the effect on the implied state probability from an incremental investment of size $\Delta T_i$ in a particular defined state.

In preferred embodiments of systems and methods of the present invention, only the finalized returns for a given trading period are applicable for computing payouts for a group of DBAR contingent claims. Thus, in preferred embodiments, unless the effect of a trade amount on returns is permanent, i.e., persists through the end of a trading period, a group of DBAR contingent claims imposes no permanent liquidity charge, as the traditional markets typically do. Accordingly, in preferred embodiments, traders can readily calculate the effect on returns from investments in the DBAR contingent claims, and unless these calculated effects are permanent, they will not affect closing returns and can, therefore, be ignored in appropriate circumstances. In other words, investing in a preferred embodiment of a group of DBAR contingent claims does not impose a permanent liquidity charge on traders for exiting and entering the market, as the traditional markets typically do.

The effect of a large investment may, of course, move intra-trading period returns in a group of DBAR contingent claims as indicated by the previous calculations. In preferred embodiments, these effects could well be counteracted by subsequent investments that move the market back to fair value (in the absence of any change in the fundamental or fair value). In traditional markets, by contrast, there is usually a "toll booth" effect in the sense that a toll or change is usually exacted every time a trader enters and exits the market. This toll is larger when there is less "traffic" or liquidity and represents a permanent loss to the trader. By contrast, other than an exchange fee, in preferred embodiments of groups of DBAR contingent claims, there is no such permanent liquidity tax or toll for market entry or exit.

Liquidity effects may be permanent from investments in a group of DBAR contingent claims if a trader is attempting to make a relatively very large investment near the end of a trading period, such that the market may not have sufficient time to adjust back to fair value. Thus, in preferred embodiments, there should be an inherent incentive not to hold back large investments until the end of the trading period, thereby providing incentives to make large investments earlier, which is beneficial overall to liquidity and adjustment of returns. Nonetheless, a trader can readily calculate the effects on returns to a investment which the trader thinks might be permanent (e.g., at the end of the trading period), due to the effect on the market from a large investment amount.

For example, in the two period hedging example (Example 3.1.19) above, it was assumed that the illustrated trader's investments had no material effect on the posted returns, in other words, that this trader was a "price taker." The formula for the hedge trade H in the second period of that example above reflects this assumption. The following equivalent expression for H takes account of the possibly permanent effect that a large trade investment might have on the closing returns (because, for example, the investment is made very close to the end of the trading period):

$$H = \frac{P_t - T_{t+1} + \sqrt{T_{t+1}^2 - 2*T_{t+1}*P_t + P_t^2 + 4*P_t*T_{t+1}^c}}{2}$$

where $P_t = \alpha_t*(1+r_t)$ in the notation used in Example 3.1.19, above, and $T_{t+1}$ is the total amount invested in period t+1 and $T^c_{t+1}$ is the amount invested in the complement state in period t+1. The expression for H is the quadratic solution which generates a desired payout, as described above but using the present notation. For example, if $1 billion is the total amount, T, invested in trading period 2, then, according to the above expressions, the hedge trade investment assuming a permanent effect on returns is $70.435 million compared to $70.18755 million in Example 3.1.19. The amount of profit and loss locked-in due to the new hedge is $1.232 million, compared to $1.48077 in Example 3.1.19. The difference represents the liquidity effect, which even in the example where the invested notional is 10% of the total amount invested, is quite reasonable in a market for groups of DBAR contingent claims. There is no ready way to estimate or calculate such liquidity effects in traditional markets.

6. DBAR Digital Options Exchange

In a preferred embodiment, the DBAR methods and systems of the present invention may be used to implement financial products known as digital options and to facilitate an exchange in such products. A digital option (sometimes also known as a binary option) is a derivative security which pays a fixed amount should specified conditions be met (such as the price of a stock exceeding a given level or "strike" price) at the expiration date. If the specified conditions are met, a digital option is often characterized as finishing "in the money." A digital call option, for example, would pay a fixed amount of currency, say one dollar, should the value of the underlying security, index, or variable upon which the option is based expire at or above the strike price of the call option. Similarly, a digital put option would pay a fixed amount of currency should the value of the underlying security, index or variable be at or below the strike price of the put option. A spread of either digital call or put options would pay a fixed amount should the underlying value expire at or between the strike prices. A strip of digital options would pay out fixed ratios should the underlying expire between two sets of strike prices. Graphically, digital calls, puts, spreads, and strips can have simple representations:

TABLE 6.0.1

Digital Call

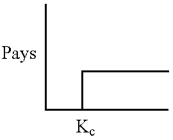

TABLE 6.0.2

Digital Put

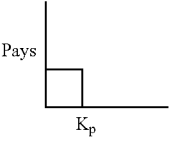

TABLE 6.0.3

Digital Spread

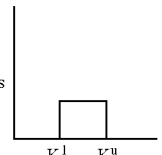

TABLE 6.04

Digital Strip

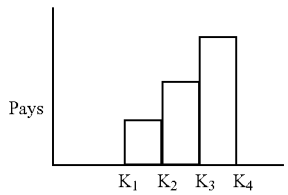

Pays

K₁ K₂ K₃ K₄

As depicted in Tables 6.0.1, 6.0.2, 6.0.3, and 6.04, the strike prices for the respective options are marked using familiar options notation where the subscript "c" indicates a call, the subscript "p" indicates a put, the subscript "s" indicates "spread," and the superscripts "l" and "u" indicate lower and upper strikes, respectively.

A difference between digital options, which are frequently transacted in the OTC foreign currency options markets, and traditional options such as the equity options, which trade on the Chicago Board Options Exchange ("CBOE"), is that digital options have payouts which do not vary with the extent to which the underlying asset, index, or variable ("underlying") finishes in or out of the money. For example, a digital call option at a strike price for the underlying stock at 50 would pay the same amount if, at the fulfillment of all of the termination criteria, the underlying stock price was 51, 60, 75 or any other value at or above 50. In this sense, digital options represent the academic foundations of options theory, since traditional equity options could in theory be replicated from a portfolio of digital spread options whose strike prices are set to provide vanishingly small spreads. (In fact, a "butterfly spread" of the traditional options yields a digital option spread as the strike prices of the traditional options are allowed to converge.) As can be seen from Tables 6.0.1, 6.0.2, 6.0.3, and 6.04, digital options can be constructed from digital option spreads.

The methods and systems of the present invention can be used to create a derivatives market for digital options spreads. In other words, each investment in a state of a mutually exclusive and collectively exhaustive set of states of a group of DBAR contingent claims can be considered to correspond to either a digital call spread or a digital put spread. Since digital spreads can readily and accurately be used to replicate digital options, and since digital options are known, traded and processed in the existing markets, DBAR methods can therefore be represented effectively as a market for digital options—that is, a DBAR digital options market.

6.1 Representation of Digital Options as DBAR Contingent Claims

One advantage of the digital options representation of DBAR contingent claims is that the trader interface of a DBAR digital options exchange (a "DBAR DOE") can be presented in a format familiar to traders, even though the underlying DBAR market structure is quite novel and different from traditional securities and derivatives markets. For example, the main trader interface for a DBAR digital options exchange, in a preferred embodiment, could have the following features:

TABLE 6.1.1

MSFT Digital Options

| | CALLS | | | PUTS | | |
|---|---|---|---|---|---|---|
| STRIKE | IND BID | IND OFFER | IND PAYOUT | IND BID | IND OFFER | IND PAYOUT |
| 30 | 0.9388 | 0.9407 | 1.0641 | 0.0593 | 0.0612 | 16.5999 |
| 40 | 0.7230 | 0.7244 | 1.3818 | 0.2756 | 0.2770 | 3.6190 |
| 50 | 0.4399 | 0.4408 | 2.2708 | 0.5592 | 0.5601 | 1.7869 |
| 60 | 0.2241 | 0.2245 | 4.4582 | 0.7755 | 0.7759 | 1.2892 |
| 70 | 0.1017 | 0.1019 | 9.8268 | 0.8981 | 0.8983 | 1.1133 |
| 80 | 0.0430 | 0.0431 | 23.2456 | 0.9569 | 0.9570 | 1.0450 |

The illustrative interface of Table 6.1.1 contains hypothetical market information on DBAR digital options on Microsoft stock ("MSFT") for a given expiration date. For example, an investor who desires a payout if MSFT stock closes higher than 50 at the expiration or observation date will need to "pay the offer" of $0.4408 per dollar of payout. Such an offer is "indicative" (abbreviated "IND") since the underlying DBAR distribution—that is, the implied probability that a state or set of states will occur may change during the trading period. In a preferred embodiment, the bid/offer spreads presented in Table 6.1.1 are presented in the following manner. The "offer" side in the market reflects the implied probability that underlying value of the stock (in this example MSFT) will finish "in the money." The "bid" side in the market is the "price" at which a claim can be "sold" including the transaction fee. (In this context, the term "sold" reflects the use of the systems and methods of the present invention to implement investment profit and loss scenarios comparable to "sales" of digital options, discussed in detail below.) The amount in each "offer" cell is greater than the amount in the corresponding "bid" cell. The bid/offer quotations for these digital option representations of DBAR contingent claims are presented as percentages of (or implied probabilities for) a one dollar indicative payout.

The illustrative quotations in Table 6.1.1 can be derived as follows. First the payout for a given investment is computed assuming a 10 basis point transaction fee. This payout is equal to the sum of all investments less 10 basis points, divided by the sum of the investments over the range of states corresponding to the digital option. Taking the inverse of this quantity gives the offer side of the market in "price" terms. Performing the same calculation but this time adding 10 basis points to the total investment gives the bid side of the market.

In another preferred embodiment, transaction fees are assessed as a percentage of payouts, rather than as a function of invested amounts. Thus, the offer (bid) side of the market for a given digital option could be, for example, (a) the amount invested over the range of states comprising the digital option, (b) plus (minus) the fee (e.g., 10 basis points) multiplied by the total invested for all of the defined states, (c) divided by the total invested for all of the defined states. An advantage of computing fees based upon the payout is that the bid/offer spreads as a percentage of "price" would be different depending upon the strike price of the underlying, with strikes that are less likely to be "in the money" having a higher percentage fee. Other embodiments in which the exchange or transaction fees, for example, depend on the time of trade to provide incentives for traders to trade early or to trade certain strikes, or otherwise reflect liquidity conditions in the contract, are apparent to those of skill in the art.

As explained in detail below, in preferred embodiments of the systems and methods of the present invention, traders or investors cay buy and "sell" DBAR contingent claims that are represented and behave like digital option puts, calls, spreads, and strips using conditional or "limit" orders. In addition, these digital options can be processed using existing technological infrastructure in place at current financial institutions. For example, Sungard, Inc., has a large subscriber base to many off-the-shelf programs which are capable of valuing, measuring the risk, clearing, and settling digital options. Furthermore, some of the newer middleware protocols such as FINXML (see www.finxml.org) apparently are able to handle digital options and others will probably follow shortly (e.g., FPML). In addition, the transaction costs of a digital options exchange using the methods and systems of the present invention can be represented in a manner consistent with the conventional markets, i.e., in terms of bid/offer spreads.

6.2 Construction of Digital Options Using DBAR Methods and Systems

The methods of multistate trading of DBAR contingent claims previously disclosed can be used to implement investment in a group of DBAR contingent claims that behave like a digital option. In particular, and in a preferred embodiment, this can be accomplished by allocating an investment, using the multistate methods previously disclosed, in such a manner that the same payout is received from the investment should the option expire "in-the-money", e.g., above the strike price of the underlying for a call option and below the strike price of the underlying for a put. In a preferred embodiment, the multistate methods used to allocate the investment need not be made apparent to traders. In such an embodiment, the DBAR methods and systems of the present invention could effectively operate "behind the scenes" to improve the quality of the market without materially changing interfaces and trading screens commonly used by traders. This may be illustrated by considering the DBAR construction of the MSFT Digital Options market activity as represented to the user in Table 6.1.1. For purposes of this illustration, it is assumed that the market "prices" or implied probabilities for the digital put and call options as displayed in Table 6.1.1 result from $100 million in investments. The DBAR states and allocated investments which construct these "prices" are then:

TABLE 6.2.1

| States | State Prob | State Investments |
|---|---|---|
| (0, 30] | 0.0602387 | $6,023,869.94 |
| (30, 40] | 0.2160676 | $21,606,756.78 |
| (40, 50] | 0.2833203 | $28,332,029.61 |
| (50, 60] | 0.2160677 | $21,606,766.30 |
| (60, 70] | 0.1225432 | $12,254,324.67 |
| (70, 80] | 0.0587436 | $5,874,363.31 |
| (80, ∞] | 0.0430189 | $4,301,889.39 |

In Table 6.2.1, the notation (x, y] is used to indicate a single state part of a set of mutually exclusive and collectively exhaustive states which excludes x and includes y on the interval.

(For purposes of this specification a convention is adopted for puts, calls, and spreads which is consistent with the internal representation of the states. For example, a put and a call both struck at 50 cannot both be paid out if the underlying asset, index or variable expires exactly at 50. To address this issue, the following convention could be adopted: calls exclude the strike price, puts include the strike price, and spreads exclude the lower and include the upper strike price. This convention, for example, would be consistent with internal states which are exclusive on the lower boundary and inclusive on the upper boundary. Another preferred convention would have calls including the strike price and puts excluding the strike price, so that the representation of the states would be inclusive on the lower boundary and exclusive on the upper. In any event, related conventions exist in traditional markets. For example, consider the situation of a traditional foreign exchange options dealer who sells an "at the money" digital and an "at the money" put, with strike price of 100. Each is equally likely to expire "in the money," so for every $1.00 in payout, the dealer should collect $0.50. If the dealer has sold a $1.00 digital call and put, and has therefore collected a total of $1.00 in premium, then if the underlying expires exactly at 100, a discontinuous payout of $2.00 is owed. Hence, in a preferred embodiment of the present invention, conventions such as those described above or similar methods may be adopted to avoid such discontinuities.)

A digital call or put may be constructed with DBAR methods of the present invention by using the multistate allocation algorithms previously disclosed. In a preferred embodiment, the construction of a digital option involves allocating the amount to be invested across the constituent states over which the digital option is "in-the-money" (e.g., above the strike for a call, below the strike for a put) in a manner such that the same payout is obtained regardless of which state occurs among the "in the money" constituent states. This is accomplished by allocating the amount invested in the digital option in proportion to the then-existing investments over the range of constituent states for which the option is "in the money." For example, for an additional $1,000,000 investment a digital call struck at 50 from the investments illustrated in Table 6.2.1, the construction of the trade using multistate allocation methods is:

TABLE 6.2.2

| Internal States | $1,000,000.00 |
|---|---|
| (0, 30] | |
| (30, 40] | |
| (40, 50] | |

TABLE 6.2.2-continued

| Internal States | $1,000,000.00 |
|---|---|
| (50, 60] | $490,646.45 |
| (60, 70] | $ 278,271.20 |
| (70, 80] | $133,395.04 |
| (80, ∞] | $97,687.30 |

As other traders subsequently make investments, the distribution of investments across the states comprising the digital option may change, and may therefore require that the multistate investments be reallocated so that, for each digital option, the payout is the same for any of its constituent "in the money" states, regardless of which of these constituent states occurs after the fulfillment of all of the termination criteria, and is zero for any of the other states. When the investments have been allocated or reallocated so that this payout scenario occurs, the group of investments or contract is said to be in equilibrium. A further detailed description of the allocation methods which can be used to achieve this equilibrium is provided in connection with the description of FIGS. 13–14.

6.3 Digital Option Spreads

In a preferred embodiment, a digital option spread trade may be offered to investors which simultaneously execute a buy and a "sell" (in the synthetic or replicated sense of the term, as described below) of a digital call or put option. An investment in such a spread would have the same payout should the underlying outcome expire at any value between the lower and upper strike prices in the spread. If the spread covers one state, then the investment is comparable to an investment in a DBAR contingent claim for that one state. If the spread covers more than one constituent state, in a preferred embodiment the investment is allocated using the multistate investment method previously described so that, regardless of which state occurs among the states included in the spread trade, the investor receives the same payout.

6.4 Digital Option Strips

Traders in the derivatives markets commonly trade related groups of futures or options contracts in desired ratios in order to accomplish some desired purpose. For example, it is not uncommon for traders of LIBOR based interest rate futures on the Chicago Mercantile Exchange ("CME") to execute simultaneously a group of futures with different expiration dates covering a number of years. Such a group, which is commonly termed a "strip," is typically traded to hedge another position which can be effectively approximated with a strip whose constituent contracts are executed in target relative ratios. For example, a strip of LIBOR-based interest rate futures may be used to approximate the risk inherent of an interest rate swap of the same maturity as the latest contract expiration date in the strip.

In a preferred embodiment, the DBAR methods of the present invention can be used to allow traders to construct strips of digital options and digital option spreads whose relative payout ratios, should each option expire in the money, are equal to the ratios specified by the trader. For example, a trader may desire to invest in a strip consisting of the 50, 60, 70, and 80 digital call options on MSFT, as illustrated in Table 6.1.1. Furthermore, and again as an illustrative example, the trader may desire that the payout ratios, should each option expire in the money, be in the following relative ratio: 1:2:3:4. Thus, should the underlying price of MSFT at the expiration date (when the event outcome is observed) be equal to 65, both the 50 and 60 strike digital options are in the money. Since the trader desires that the 60 strike digital call option pay out twice as much as the 50 strike digital call option, a multistate allocation algorithm, as previously disclosed and described in detail, can be used dynamically to reallocate the trader's investments across the states over which these options are in the money (50 and above, and 60 and above, respectively) in such a way as to generate final payouts which conform to the indicated ratio of 1:2. As previously disclosed, the multistate allocation steps may be performed each time new investments are added during the trading period, and a final multistate allocation may be performed after the trading period has expired.

6.5 Multistate Allocation Algorithm for Replicating "Sell" Trades

In a preferred embodiment of a digital options exchange using DBAR methods and systems of the present invention, traders are able to make investments in DBAR contingent claims which correspond to purchases of digital options. Since DBAR methods are inherently demand-based—i.e., a DBAR exchange or market functions without traditional sellers—an advantage of the multistate allocation methods of the present invention is the ability to generate scenarios of profits and losses ("P&L") comparable to the P&L scenarios obtained from selling digital options, spreads, and strips in traditional, non-DBAR markets without traditional sellers or order-matching.

In traditional markets, the act of selling a digital option, spread, or strip means that the investor (in the case of a sale, a seller) receives the cost of the option, or premium, if the option expires worthless or out of the money. Thus, if the option expires out of the money, the investor/seller's profit is the premium. Should the option expire in the money, however, the investor/seller incurs a net liability equal to the digital option payout less the premium received. In this situation, the investor/seller's net loss is the payout less the premium received for selling the option, or the notional payout less the premium. Selling an option, which is equivalent in many respects to the activity of selling insurance, is potentially quite risky, given the large contingent liabilities potentially involved. Nonetheless, option selling is commonplace in conventional, non-DBAR markets.

As indicated above, an advantage of the digital options representation of the DBAR methods of the present invention is the presentation of an interface which displays bids and offers and therefore, by design, allows users to make investments in sets of DBAR contingent claims whose P&L scenarios are comparable to those from traditional "sales" as well as purchases of digital calls, puts, spreads, and strips. Specifically in this context, "selling" entails the ability to achieve a profit and loss profile which is analogous to that achieved by sellers of digital options instruments in non-DBAR markets, i.e., achieving a profit equal to the premium should the digital option expire out of the money, and suffering a net loss equal to the digital option payout (or the notional) less the premium received should the digital option expire in the money.

In a preferred embodiment of a digital options exchange using the DBAR contingent claims methods and systems of the present invention, the mechanics of "selling" involves converting such "sell" orders to complementary buy orders. Thus, a sale of the MSFT digital put options with strike price equal to 50, would be converted, in a preferred DBAR-DOE embodiment, to a complementary purchase of the 50 strike digital call options. A detailed explanation of the conversion process of a "sale" to a complementary buy order is provided in connection with the description of FIG. 15.

The complementary conversion of DBAR-DOE "sales" to buys is facilitated by interpreting the amount to be "sold" in a manner which is somewhat different from the amount to be bought for a DBAR-DOE buy order. In a preferred embodiment, when a trader specifies an amount in an order to be "sold," the amount is interpreted as the total amount of loss that the trader will suffer should the digital option, spread, or strip sold expire in the money. As indicated above, the total amount lost or net loss is equal to the notional payout less the premium from the sale. For example, if the trader "sells" $1,000,000 of the MSFT digital put struck at 50, if the price of MSFT at expiration is 50 or below, then the trader will lose $1,000,000. Correspondingly, in a preferred embodiment of the present invention, the order amount specified in a DBAR-DOE "sell" order is interpreted as the net amount lost should the option, strip, or spread sold expire in the money. In conventional options markets, the amount would be interpreted and termed a "notional" or "notional amount" less the premium received, since the actual amount lost should the option expire in the money is the payout, or notional, less the premium received. By contrast, the amount of a buy order, in a preferred DBAR-DOE embodiment, is interpreted as the amount to be invested over the range of defined states which will generate the payout shape or profile expected by the trader. The amount to be invested is therefore equivalent to the option "premium" in conventional options markets. Thus, in preferred embodiments of the present invention, for DBAR-DOE buy orders, the order amount or premium is known and specified by the trader, and the contingent gain or payout should the option purchased finish in the money is not known until after all trading has ceased, the final equilibrium contingent claim "prices" or implied probabilities are calculated and any other termination criteria are fulfilled. By contrast, for a "sell" order in a preferred DBAR-DOE embodiment of the present invention, the amount specified in the order is the specified net loss (equal to the notional less the premium) which represents the contingent loss should the option expire in the money. Thus, in a preferred embodiment, the amount of a buy order is interpreted as an investment amount or premium which generates an uncertain payout until all predetermined termination criteria have been met; and the amount of a "sell" order is interpreted as a certain net loss should the option expire in the money corresponding to an investment amount or premium that remains uncertain until all predetermined termination criteria have been met. In other words, in a DBAR-DOE preferred embodiment, buy orders are for "premium" while "sell" orders are for net loss should the option expire in the money.

A relatively simple example illustrates the process, in a preferred embodiment of the present invention, of converting a "sale" of a DBAR digital option, strip, or spread to a complementary buy and the meaning of interpreting the amount of a buy order and "sell" order differently. Referring the MSFT example illustrated in Table 6.1.1 and Table 6.2.1 above, assume that a trader has placed a market order (conditional or limit orders are described in detail below) to "sell" the digital put with strike price equal to 50. Ignoring transaction costs, the "price" of the 50 digital put option is equal to the sum of the implied state probabilities spanning the states where the option is in the money (i.e., (0,30],(30, 40], and (40,50]) and is approximately 0.5596266. When the 50 put is in the money, the 50 call is out of the money and vice versa. Accordingly, the 50 digital call is "complementary" to the 50 digital put. Thus, "selling" the 50 digital put for a given amount is equivalent in a preferred embodiment to investing that amount in the complementary call, and that amount is the net loss that would be suffered should the 50 digital put expire in the money (i.e., 50 and below). For example, if a trader places a market order to "sell" 1,000,000 value units of the 50 strike digital put, this 1,000,000 value units are interpreted as the net loss if the digital put option expires in the money, i.e., it corresponds to the notional payout loss plus the premium received from the "sale."

In preferred embodiments of the present investment, the 1,000,000 value units to be "sold" are treated as invested in the complementary 50-strike digital call, and therefore are allocated according to the multistate allocation algorithm described in connection with the description of FIG. 13. The 1,000,000 value units are allocated in proportion to the value units previously allocated to the range of states comprising the 50-strike digital call, as indicated in Table 6.2.2 above. Should the digital put expire in the money, the trader "selling" the digital put loses 1,000,000 value units, i.e., the trader loses the payout or notional less the premium. Should the digital put finish out of the money, the trader will receive a payout approximately equal to 2,242,583.42 value units (computed by taking the total amount of value units invested, or 101,000,000, dividing by the new total invested in each state above 50 where the digital put is out of the money, and multiplying by the corresponding state investment). The payout is the same regardless of which state above 50 occurs upon fulfillment of the termination criteria, i.e., the multistate allocation has achieved the desired payout profile for a digital option. In this illustration, the "sell" of the put will profit by 1,242,583.42 should the option sold expire out of the money. This profit is equivalent to the premium "sold." On the other hand, to achieve a net loss of 1,000,000 value units from a payout of 2,242,583.42, the premium is set at 1,242,583.42 value units.

The trader who "sells" in a preferred embodiment of a DBAR-DOE specifies an amount that is the payout or notional to be sold less the premium to be received, and not the profit or premium to be made should the option expire out of the money. By specifying the payout or notional "sold" less the premium, this amount can be used directly as the amount to be invested in the complementary option, strip, or spread. Thus, in a preferred embodiment, a DBAR digital options exchange can replicate or synthesize the equivalent of trades involving the sale of option payouts or notional (less the premium received) in the traditional market.

In another preferred embodiment, an investor may be able to specify the amount of premium to be "sold." To illustrate this embodiment, quantity of premium to be "sold" can be assigned to the variable x. An investment of quantity y on the states complementary to the range of states being "sold" is related to the premium x in the following manner:

$$\frac{y}{1-p} - y = x$$

where p is the final equilibrium "price", including the "sale" x (and the complementary investment y) of the option being "sold." Rearranging this expression yields the amount of the complementary buy investment y that must be made to effect the "sale" of the premium x:

$$y = x * \frac{(1-p)}{p}$$

From this it can be seen that, given an amount of premium x that is desired to be "sold," the complementary investment that must be bought on the complement states in order for the trader to receive the premium x, should the option "sold" expire out of the money, is a function of the price of the option being "sold." Since the price of the option being "sold" can be expected to vary during the trading period, in a preferred embodiment of a DBAR-DOE of the present invention, the amount y required to be invested in the complementary state as a buy order can also be expected to vary during the trading period.

In a preferred embodiment, traders may specify an amount of notional less the premium to be "sold" as denoted by the variable y. Traders may then specify a limit order "price" (see Section 6.8 below for discussion of limit orders) such that, by the previous equation relating y to x, a trader may indirectly specify a minimum value of x with the specified limit order "price," which may be substituted for p in the preceding equation. In another preferred embodiment, an order containing iteratively revised y amounts, as "prices" change during the trading period are submitted. In another preferred embodiment, recalculation of equilibrium "prices" with these revised y amounts is likely to lead to a convergence of the y amounts in equilibrium. In this embodiment an iterative procedure may be employed to seek out the complementary buy amounts that must be invested on the option, strip, or spread complementary to the range of states comprising the option being "sold" in order to replicate the desired premium that the trader desired to "sell." This embodiment is useful since it aims to make the act of "selling" in a DBAR-DOE more similar to the traditional derivatives markets.

It should be emphasized that the traditional markets differ from the systems and methods of the present invention in as least one fundamental respect. In traditional markets, the sale of an option requires a seller who is willing to sell the option at an agreed-upon price. An exchange of DBAR contingent claims of the present invention, in contrast, does not require or involve such sellers. Rather, appropriate investments may be made (or bought) in contingent claims in appropriate states so that the payout to the investor is the same as if the claim, in a traditional market, had been sold. In particular, using the methods and systems of the present invention, the amounts to be invested in various states can be calculated so that the payout profile replicates the payout profile of a sale of a digital option in a traditional market, but without the need for a seller. These steps are described in detail in connection with FIG. 15.

6.6 Clearing and Settlement

In a preferred embodiment of a digital options exchange using the DBAR contingent claims systems and methods of the present invention, all types of positions may be processed as digital options. This is because at fixing (i.e., the finalization of contingent claim "prices" or implied probabilities at the termination of the trading period or other fulfillment of all of the termination criteria) the profit and loss expectations of all positions in the DBAR exchange are, from the trader's perspective, comparable to if not the same as the profit and loss expectations of standard digital options commonly traded in the OTC markets, such as the foreign exchange options market (but without the presence of actual sellers, who are needed on traditional options exchanges or in traditional OTC derivatives markets). The contingent claims in a DBAR-DOE of the present invention, once finalized at the end of a trading period, may therefore be processed as digital options or combinations of digital options. For example, a MSFT digital option call spread with a lower strike of 40 and upper strike of 60 could be processed as a purchase of the lower strike digital option and a sale of the upper strike digital option.

There are many vendors of back office software which can readily handle the processing of digital options. For example, Sungard, Inc., produces a variety of mature software systems for the processing of derivatives securities, including digital options. Furthermore, in-house derivatives systems currently in use at major banks have basic digital options capability. Since digital options are commonly encountered instruments, many of the middleware initiatives currently underway e.g., FINXML, will likely incorporate a standard protocol for handling digital options. Therefore, an advantage of a preferred embodiment of the DBAR-DOE of the present invention is the ability to integrate with and otherwise use existing technology for such an exchange.

6.7 Contract Initialization

Another advantage of the systems and methods of the present invention is that, as previously noted, digital options positions can be represented internally as composite trades. Composite trades are useful since they help assure that an equilibrium distribution of investments among the states can be achieved. In preferred embodiments, digital option and spreading activity will contribute to an equilibrium distribution. Thus, in preferred embodiments, indicative distributions may be used to initialize trading at the beginning of the trading period.

In a preferred embodiment, these initial distributions may be represented as investments in each of the defined states making up the contract or group of DBAR contingent claims. Since these investments need not be actual trader investments, they may be reallocated among the defined states as actual trading occurs, so long as the initial investments do not change the implicit probabilities of the states resulting from actual investments. In a preferred embodiment, the reallocation of initial investments is performed gradually so as to maximize the stability of digital call and put "prices" (and spreads), as viewed by investors. By the end of the trading period, all of the initial investments may be reallocated in proportion to the investments in each of the defined states made by actual traders. The reallocation process may be represented as a composite trade which has a same payout irrespective of which of the defined states occurs. In preferred embodiments the initial distribution can be chosen using current market indications from the traditional markets to provide guidance for traders, e.g., options prices from traditional option markets can be used to calculate a traditional market consensus probability distribution, using for example, the well-known technique of Breeden and Litzenberger. Other reasonable initial and indicative distributions could be used. Alternatively, in a preferred embodiment, initialization can be performed in such a manner that each defined state is initialized with a very small amount, distributed equally among each of the defined states. For example, each of the defined states could be initialized with $10^{-6}$ value units. Initialization in this manner is designed to start each state with a quantity which is very small, distributed so as to provide a very small amount of information regarding the implied probability of each defined state. Other initialization methods of the defined states are possible and could be implemented by one of skill in the art.

6.8 Conditional Investments or Limit Orders

In a preferred embodiment of the system and methods of the present invention, traders may be able to make investments which are only binding if a certain "price" or implied probability for a given state or digital option (or strip, spread, etc.) is achieved. In this context, the word "price," is used for convenience and familiarity and, in the systems and methods of the present invention, reflects the implied probability of the occurrence of the set of states corresponding to an option—i.e., the implied probability that the option expires "in the money." For instance, in the example reflected in Table 6.2.1, a trader may wish to make an investment in the MSFT digital call options with strike price of 50, but may desire that such an investment actually be made only if the final equilibrium "price" or implied probability is 0.42 or less. Such a conditional investment, which is conditional upon the final equilibrium "price" for the digital option, is sometimes referred to as (in conventional markets) as a "limit order." Limit orders are popular in traditional markets since they provide the means for investors to execute a trade at "their price" or better. Of course, there is no guarantee that such a limit order—which may be placed significantly away from the current market price—will in fact be executed. Thus, in traditional markets, limit orders provide the means to control the price at which a trade is executed, without the trader having to monitor the market continuously. In the systems and method of the present invention, limit orders provide a way for investors to control the likelihood that their orders will be executed at their preferred "prices" (or better), also without having continuously to monitor the market.

In a preferred embodiment of a DBAR-DOE, traders are permitted to buy and sell digital call and put options, digital spreads, and digital strips with limit "prices" attached. The limit "price" indicates that a trader desires that his trade be executed at that indicated limit "price"—actually the implied probability that the option will expire in the money—"or better." In the case of a purchase of a digital option, "better" means at the indicated limit "price" implied probability or lower (i.e., purchasing not higher than the indicated limit "price"). In the case of a "sale" of a DBAR digital option, "better" means at the indicated limit "price" (implied probability) or higher (i.e., selling not lower than the indicated limit "price").

A benefit of a preferred embodiment of a DBAR-DOE of the present invention which includes conditional investments or limit orders is that the placing of limit orders is a well-known mechanism in the financial markets. By allowing traders and investors to interact with a DBAR-DOE of the present invention using limit orders, more liquidity should flow into the DBAR-DOE because of the familiarity of the mechanism, even though the underlying architecture of the DBAR-DOE is different from the underlying architecture of other financial markets.

The present invention also includes novel methods and systems for computing the equilibrium "prices" or implied probabilities, in the presence of limit orders, of DBAR contingent claims in the various states. These methods and systems can be used to arrive at an equilibrium exclusively in the presence of limit orders, exclusively in the presence of market orders, and in the presence of both. In a preferred embodiment, the steps to compute a DBAR-DOE equilibrium for a group of contingent claims including at least one limit order are summarized as follows:

6.8(1) Convert all "sale" orders to complementary buy orders. This is achieved by (i) identifying the states complementary to the states being sold; (ii) using the amount "sold" as the amount to be invested in the complementary states, and; and (iii) for limit orders, adjusting the limit "price" to one minus the original limit "price."

6.8(2) Group the limit orders by placing all of the limit orders which span or comprise the same range of defined states into the same group. Sort each group from the best (highest "price" buy) to the worst (lowest "price" buy). All orders may be processed as buys since any "sales" have previously been converted to complementary buys. For example, in the context of the MSFT Digital Options illustrated in Table 6.2.1, there would be separate groups for the 30 digital calls, the 30 digital puts, the 40 digital calls, the 40 digital puts, etc. In addition, separate groups are made for each spread or strip which spans or comprises a distinct set of defined states.

6.8(3) Initialize the contract or group of DBAR contingent claim. This may be done, in a preferred embodiment, by allocating minimal quantities of value units uniformly across the entire distribution of defined states so that each defined state has a non-zero quantity of value units.

6.8(4) For all limit orders, adjust the limit "prices" of such orders by subtracting from each limit order the order, transaction or exchange fees for the respective contingent claims.

6.8(5) With all orders broken into minimal size unit lots (e.g., one dollar or other small value unit for the group of DBAR contingent claims), identify one order from a group that has a limit "price" better than the current equilibrium "price" for the option, spread, or strip specified in the order.

6.8(6) With the identified order, find the maximum number of additional unit lots ("lots") than can be invested such that the limit "price" is no worse than the equilibrium "price" with the chosen maximum number of unit lots added. The maximum number of lots can be found by (i) using the method of binary search, as described in detail below, (ii) trial addition of those lots to already-invested amounts and (iii) recalculating the equilibrium iteratively.

6.8(7) Identify any orders which have limit "prices" worse than the current calculated equilibrium "prices" for the contract or group of DBAR contingent claims. Pick such an order with the worst limit "price" from the group containing the order. Remove the minimum quantity of unit lots required so that the order's limit "price" is no longer worse than the equilibrium "price" calculated when the unit lots are removed. The number of lots to be removed can be found by (i) using the method of binary search, as described in detail below, (ii) trial subtraction of those lots from already invested amounts and (iii) recalculating the equilibrium iteratively.

6.8(8) Repeat steps 6.8(5) to 6.8(7). Terminate those steps when no further additions or removals are necessary.

6.8(9) Optionally, publish the equilibrium from step 6.9 (8) both during the trading period and the final equilibrium at the end of the trading period. The calculation during the trading period is performed "as if" the trading period were to end at the moment the calculation is performed. All prices resulting from the equilibrium computation are considered mid-market prices, i.e., they do not include the bid and offer spreads owing to transaction fees. Published offer (bid) "prices" are set equal to the mid-market equilibrium "prices" plus (minus) the fee.

In a preferred embodiment, the preceding steps 6.8(1) to 6.8(8) and optionally step 6.8(9) are performed each time the set of orders during the trading or auction period changes. For example, when a new order is submitted or an existing order is cancelled (or otherwise modified) the set of orders changes, steps 6.8(1) to 6.8(8) (and optionally step 6.8(9)) would need to be repeated.

The preceding steps result in an equilibrium of the DBAR contingent claims and executable orders which satisfy typical trader expectations for a market for digital options:

(1) At least some buy ("sell") orders with a limit "price" greater (less) than or equal to the equilibrium "price" for the given option, spread or strip are executed or "filled."

(2) No buy ("sell") orders with limit "prices" less (greater) than the equilibrium "price" for the given option, spread or strip are executed.

(3) The total amount of executed lots equals the total amount invested across the distribution of defined states.

(4) The ratio of payouts should each constituent state of a given option, spread, or strike occur is as specified by the trader, (including equal payouts in the case of digital options), within a tolerable degree of deviation.

(5) Conversion of filled limit orders to market orders for the respective filled quantities and recalculating the equilibrium does not materially change the equilibrium.

(6) Adding one or more lots to any of the filled limit orders converted to market orders in step (5) and recalculating of the equilibrium "prices" results in "prices" which violate the limit "price" of the order to which the lot was added (i.e., no more lots can be "squeaked in" without forcing market prices to go above the limit "prices" of buy orders or below the limit "prices" of sell orders).

The following example illustrates the operation of a preferred embodiment of a DBAR-DOE of the present invention exclusively with limit orders. It is anticipated that a DBAR-DOE will operate and process both limit and non-limit or market orders. As apparent to a person of skill in the art, if a DBAR-DOE can operate with only limit orders, it can also operate with both limit orders and market orders.

Like earlier examples, this example is also based on digital options derived from the price of MSFT stock. To reduce the complexity of the example, it is assumed, for purposes of illustration, that there are illustrative purposes, only three strike prices: $30, $50, and $80.

TABLE 6.8.1

| | Buy Orders | | | | | |
|---|---|---|---|---|---|---|
| Limit "Price" | 30 calls Quantity | Limit "Price" | 50 calls Quantity | Limit "Price" | 80 calls Quantity |
| 0.82 | 10000 | 0.43 | 10000 | 0.1 | 10000 |
| 0.835 | 10000 | 0.47 | 10000 | 0.14 | 10000 |
| 0.84 | 10000 | 0.5 | 10000 | | |
| | 80 puts | | 50 puts | | 30 puts |
| 0.88 | 10000 | 0.5 | 10000 | 0.16 | 10000 |
| 0.9 | 10000 | 0.52 | 10000 | 0.17 | 10000 |
| 0.92 | 10000 | 0.54 | 10000 | | |

TABLE 6.8.2

| | "Sell" Orders | | | | | |
|---|---|---|---|---|---|---|
| Limit "Price" | 30 calls Quantity | Limit "Price" | 50 calls Quantity | Limit "Price" | 80 calls Quantity |
| 0.81 | 5000 | 0.42 | 10000 | 0.11 | 10000 |
| | | 0.44 | 10000 | 0.12 | 10000 |
| | 80 puts | | 50 puts | | 30 puts |
| 0.9 | 20000 | 0.45 | 10000 | 0.15 | 5000 |
| | | 0.50 | 10000 | 0.16 | 10000 |

The quantities entered in the "Sell Orders" table, Table 6.8.2, are the net loss amounts which the trader is risking should the option "sold" expire in the money, i.e., they are equal to the notional less the premium received from the sale, as discussed above.

(i) According to step 6.8(1) of the limit order methodology described above, the "sale" orders are first converted to buy orders. This involves switching the contingent claim "sold" to a buy of the complementary contingent claim and creating a new limit "price" for the converted order equal to one minus the limit "price" of the sale. Converting the "sell" orders in Table 6.8.2 therefore yields the following converted buy orders:

TABLE 6.8.3

"Sale" Orders Converted to Buy Orders

| Limit "Price" | 30 puts Quantity | Limit "Price" | 50 puts Quantity | Limit "Price" | 80 puts Quantity |
|---|---|---|---|---|---|
| 0.19 | 5000 | 0.58 | 10000 | 0.89 | 10000 |
|  |  | 0.56 | 10000 | 0.88 | 10000 |
|  | 80 calls |  | 50 calls |  | 30 calls |
| 0.1 | 20000 | 0.55 | 10000 | 0.85 | 5000 |
|  |  | 0.50 | 10000 | 0.84 | 10000 |

(ii) According to step 6.8(2), the orders are then placed into groupings based upon the range of states which each underlying digital option comprises or spans. The groupings for this illustration therefore are: 30 calls, 50 calls, 80 calls, 30 puts, 50 puts, and 80 puts (iii) In this illustrative example, the initial liquidity in each of the defined states is set at one value unit.

Figure 12:
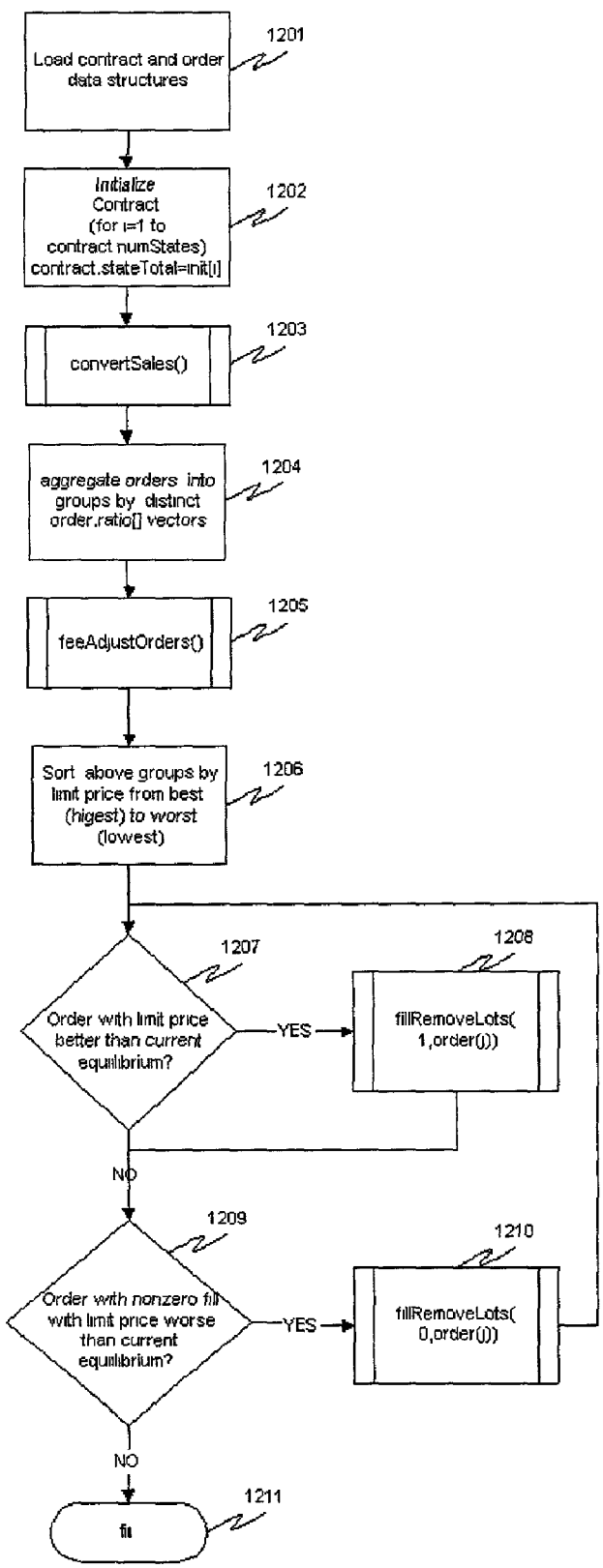
FIG. 12 depicts a preferred embodiment of a method for processing limit and market orders in a Demand-Based Adjustable Return Digital Options Exchange of the present invention.

(iv) According to step 6.8(4), the orders are arranged from worst "price" (lowest for buys) to best "price" (highest for buys). Then, the limit "prices" are adjusted for the effect of transaction or exchange costs. Assuming that the transaction fee for each order is 5 basis points (0.0005 value units), then 0.0005 is subtracted from each limit order price. The aggregated groups for this illustrative example, sorted by adjusted limit prices (but without including the initial one-value-unit investments), are as displayed in the following table:

(v) According to step 6.8(5) and based upon the description of limit order processing in connection with FIG. 12, in this illustrative example an order from Table 6.8.4 is identified which has a limit "price" better or higher than the current market "price" for a given contingent claim. For example, from Table 6.9.4, there is an order for 10000 digital puts struck at 80 with limit "price" equal to 0.9195. The current mid-market "price" for such puts is equal to 0.85714.

(vi) According to step 6.8(6), by the methods described in connection with FIG. 17, the maximum number of lots of the order for the 80 digital puts is added to already-invested amounts without increasing the recalculated mid-market "price," with the added lots, above the limit order price of 0.9195. This process discovers that, when

TABLE 6.8.4

Aggregated, Sorted, Converted, and Adjusted Limit Orders

| Limit "Price" | 30 calls Quantity | Limit "Price" | 50 calls Quantity | Limit "Price" | 80 calls Quantity |
|---|---|---|---|---|---|
| 0.8495 | 5000 | 0.5495 | 10000 | 0.1395 | 10000 |
| 0.8395 | 20000 | 0.4995 | 20000 | 0.0995 | 30000 |
| 0.8345 | 10000 | 0.4695 | 10000 |  |  |
| 0.8195 | 10000 | 0.4295 | 10000 |  |  |
|  | 80 puts |  | 50 puts |  | 30 puts |
| 0.9195 | 10000 | 0.5795 | 10000 | 0.1895 | 5000 |
| 0.8995 | 10000 | 0.5595 | 10000 | 0.1695 | 10000 |
| 0.8895 | 10000 | 0.5395 | 10000 | 0.1595 | 10000 |
| 0.8795 | 20000 | 0.5195 | 10000 |  |  |
|  |  | 0.4995 | 10000 |  |  |

After adding the initial liquidity of one value unit in each state, the initial option prices are as follows:

five lots of the 80 digital put order for 10000 lots and limit "price" of 0.9195 are added, the new mid-market

TABLE 6.8.5

MSFT Digital Options
Initial Prices

| | CALLS | | | PUTS | | |
|---|---|---|---|---|---|---|
| STRIKE | IND MID | IND BID | IND OFFER | IND MID | IND BID | IND OFFER |
| 30 | 0.85714 | 0.85664 | 0.85764 | 0.14286 | 0.14236 | 0.14336 |
| 50 | 0.57143 | 0.57093 | 0.57193 | 0.42857 | 0.42807 | 0.42907 |
| 80 | 0.14286 | 0.14236 | 0.14336 | 0.85714 | 0.85664 | 0.85764 | price is equal to 0.916667. Assuming the distribution of investments for this illustrative example, addition of any more lots will drive the mid-market price above the limit price. With the addition of these lots, the new market prices are:

TABLE 6.8.5

MSFT Digital Options
Prices after addition of five lots of 80 puts

| | CALLS | | | PUTS | | |
|---|---|---|---|---|---|---|
| STRIKE | IND MID | IND BID | IND OFFER | IND MID | IND BID | IND OFFER |
| 30 | 0.84722 | 0.84672 | 0.84772 | 0.15278 | 0.15228 | 0.15328 |
| 50 | 0.54167 | 0.54117 | 0.54217 | 0.45833 | 0.45783 | 0.45883 |
| 80 | 0.08333 | 0.08283 | 0.08383 | 0.91667 | 0.91617 | 0.91717 |

As can be seen from Table 6.8.5, the "prices" of the call options have decreased while the "prices" of the put options have increased as a result of filling five lots of the 80 digital put options, as expected.

Figure 17:
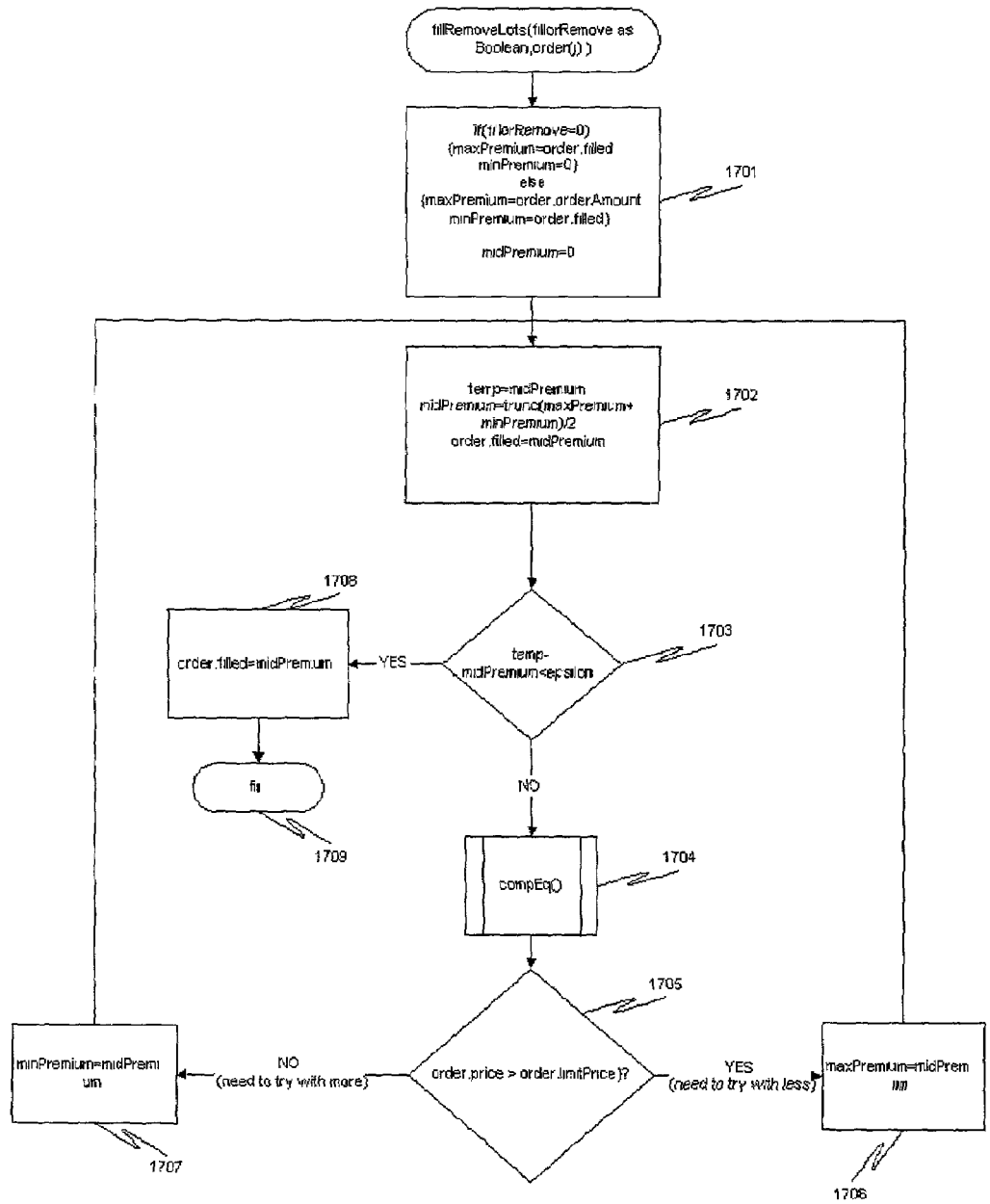
FIG. 17 depicts a preferred embodiment of a method for filling and removing lots of limit orders in a Demand-Based Adjustable Return Digital Options Exchange of the present invention.

(vii) According to step 6.8(7), the next step is to determine, as described in FIG. 17, whether there are any limit orders which have previously been filled whose limit "prices" are now less than the current mid-market "prices," and as such, should be subtracted. Since there are no orders than have been filled other than the just filled 80 digital put, there is no removal or "prune" step required at this stage in the process.

(viii) According to step 6.8(8), the next step is to identify another order which has a limit "price" higher than the current mid-market "prices" as a candidate for lot addition. Such a candidate is the order for 10000 lots of the 50 digital puts with limit price equal to 0.5795. Again the method of binary search is used to determine the maximum number of lots that can be added from this order to already-invested amounts without letting the recalculated mid-market "price" exceed the order's limit price of 0.5795. Using this method, it can be determined that only one lot can be added without forcing the new market "price" including the additional lot above 0.5795. The new prices with this additional lot are then:

Continuing with step 6.9(8), the next step is to identify an order whose limit "price" is now worse (i.e., lower than) the mid-market "prices" from the most recent equilibrium calculation as shown in Table 6.8.6. As can be seen from the table, the mid-market "price" of the 80 digital put options is now 0.923077. The best limit order (highest "priced") is the order for 10000 lots at 0.9195, of which five are currently filled. Thus, the binary search routine determines the minimum number of lots which are to be removed from this order so that the order's limit "price" is no longer worse (i.e., lower than) the newly recalculated market "price." This is the removal or prune part of the equilibrium calculation.

The "add and prune" steps are repeated iteratively with intermediate multistate equilibrium allocations performed. The contract is at equilibrium when no further lots may be added for orders with limit order "prices" better than the market or removed for limit orders with "prices" worse than the market. At this point, the group of DBAR contingent claims (sometimes referred to as the "contract") is in equilibrium, which means that all of the remaining conditional investments or limit orders—i.e., those that did not get removed—receive "prices" in equilibrium which are equal to or better than the limit "price" conditions specified in each order. In the present illustration, the final equilibrium "prices" are:

TABLE 6.8.6

MSFT Digital Options
"Prices" after (i) addition of five lots of 80 puts and
(ii) addition of one lot of 50 puts

| | CALLS | | | PUTS | | |
|---|---|---|---|---|---|---|
| STRIKE | IND MID | IND BID | IND OFFER | IND MID | IND BID | IND OFFER |
| 30 | 0.82420 | 0.82370 | 0.82470 | 0.17580 | 0.17530 | 0.17630 |
| 50 | 0.47259 | 0.47209 | 0.47309 | 0.52741 | 0.52691 | 0.52791 |
| 80 | 0.07692 | 0.07642 | 0.07742 | 0.923077 | 0.92258 | 0.92358 |

TABLE 6.8.7

MSFT Digital Options
Equilibrium Prices

| | CALLS | | | PUTS | | |
|---|---|---|---|---|---|---|
| STRIKE | IND MID | IND BID | IND OFFER | IND MID | IND BID | IND OFFER |
| 30 | 0.830503 | 0.830003 | 0.831003 | 0.169497 | 0.168997 | 0.169997 |
| 50 | 0.480504 | 0.480004 | 0.481004 | 0.519496 | 0.518996 | 0.519996 |
| 80 | 0.139493 | 0.138993 | 0.139993 | 0.860507 | 0.860007 | 0.861007 |

Thus, at these equilibrium "prices," the following table shows which of the original orders are executed or "filled":

TABLE 6.8.8

Filled Buy Orders

| Limit "Price" | 30 calls Quantity | Filled | Limit "Price" | 50 calls Quantity | Filled | Limit "Price" | 80 calls Quantity | Filled |
|---|---|---|---|---|---|---|---|---|
| 0.82 | 10000 | 0 | 0.43 | 10000 | 0 | 0.1 | 10000 | 0 |
| 0.835 | 10000 | 10000 | 0.47 | 10000 | 0 | 0.14 | 10000 | 8104 |
| 0.84 | 10000 | 10000 | 0.5 | 10000 | 10000 | | | |
| | 80 puts | Filled | | 50 puts | Filled | | 30 puts | Filled |
| 0.88 | 10000 | 10000 | 0.5 | 10000 | 0 | 0.16 | 10000 | 0 |
| 0.9 | 10000 | 10000 | 0.52 | 10000 | 2425 | 0.17 | 10000 | 2148 |
| 0.92 | 10000 | 10000 | 0.54 | 10000 | 10000 | | | |

TABLE 6.8.9

Filled Sell Orders

| Limit "Price" | 30 calls Quantity | Filled | Limit "Price" | 50 calls Quantity | Filled | Limit "Price" | 80 calls Quantity | Filled |
|---|---|---|---|---|---|---|---|---|
| 0.81 | 5000 | 5000 | 0.42 | 10000 | 10000 | 0.11 | 10000 | 10000 |
| | | | 0.44 | 10000 | 10000 | 0.12 | 10000 | 10000 |
| | 80 puts | Filled | | 50 puts | Filled | | 30 puts | Filled |
| 0.9 | 20000 | 0 | 0.45 | 10000 | 10000 | 0.15 | 5000 | 5000 |
| | | | 0.50 | 10000 | 10000 | 0.16 | 10000 | 10000 |

It may be possible only partially to execute or "fill" a trader's order at a given limit "price" or implied probability of the relevant states. For example, in the current illustration, the limit buy order for 50 puts at limit "price" equal to 0.52 for an order amount of 10000 may be only filled in the amount 2424 (see Table 6.8.8). If orders are made by more than one investor and not all of them can be filled or executed at a given equilibrium, in preferred embodiments it is necessary to decide how many of which investor's orders can be filled, and how many of which investor's orders will remain unfulfilled at that equilibrium. This may be accomplished in several ways, including by filling orders on a first-come-first-filled basis, or on a pro rata or other basis known or apparent to one of skill in the art. In preferred embodiments, investors are notified prior to the commencement of a trading period about the basis on which orders are filled when all investors' limit orders cannot be filled at a particular equilibrium.

6.9 Sensitivity Analysis and Depth of Limit Order Book

In preferred embodiments of the present invention, traders in DBAR digital options may be provided with information regarding the quantity of a trade that could be executed ("filled") at a given limit "price" or implied probability for a given option, spread or strip. For example, consider the MSFT digital call option with strike of 50 illustrated in Table 6.1.1 above. Assume the current "price" or implied probability of the call option is 0.4408 on the "offer" side of the market. A trader may desire, for example, to know what quantity of value units could be transacted and executed at any given moment for a limit "price" which is better than the market. In a more specific example, for a purchase of the 50 strike call option, a trader may want to know how much would be filled at that moment were the trader to specify a limit "price" or implied probably of, for example, 0.46. This information is not necessarily readily apparent, since the acceptance of conditional investments (i.e., the execution of limit orders) changes the implied probability or "price" of each of the states in the group. As the limit "price" is increased, the quantities specified in a buy order are more likely to be filled, and a curve can be drawn with the associated limit "price"/quantity pairs. The curve represents the amount that could be filled (for example, along the X-axis) versus the corresponding limit "price" or implied probability of the strike of the order (for example, along the Y-axis). Such a curve should be useful to traders, since it provides an indication of the "depth" of the DBAR-DOE for a given contract or group of contingent claims. In other words, the curve provides information on the "price" or implied probability, for example, that a buyer would be required to accept in order to execute a predetermined or specified number of value units of investment for the digital option.

6.10 Networking of DBAR Digital Options Exchanges

In preferred embodiments, one or more operators of two or more different DBAR Digital Options Exchanges may synchronize the time at which trading periods are conducted (e.g., agreeing on the same commencement and predetermined termination criteria) and the strike prices offered for a given underlying event to be observed at an agreed upon time. Each operator could therefore be positioned to offer the same trading period on the same underlying DBAR event of economic significance or financial instrument. Such synchronization would allow for the aggregation of liquidity of two or more different exchanges by means of computing DBAR-DOE equilibria for the combined set of orders on the participating exchanges. This aggregation of liquidity is designed to result in more efficient "pricing" so that implied probabilities of the various states reflect greater information about investor expectations than if a single exchange were used.

7. Detailed Description of the Drawings

Referring now to the drawings, similar components appearing in different drawings are identified by the same reference numbers.

Figure 2:
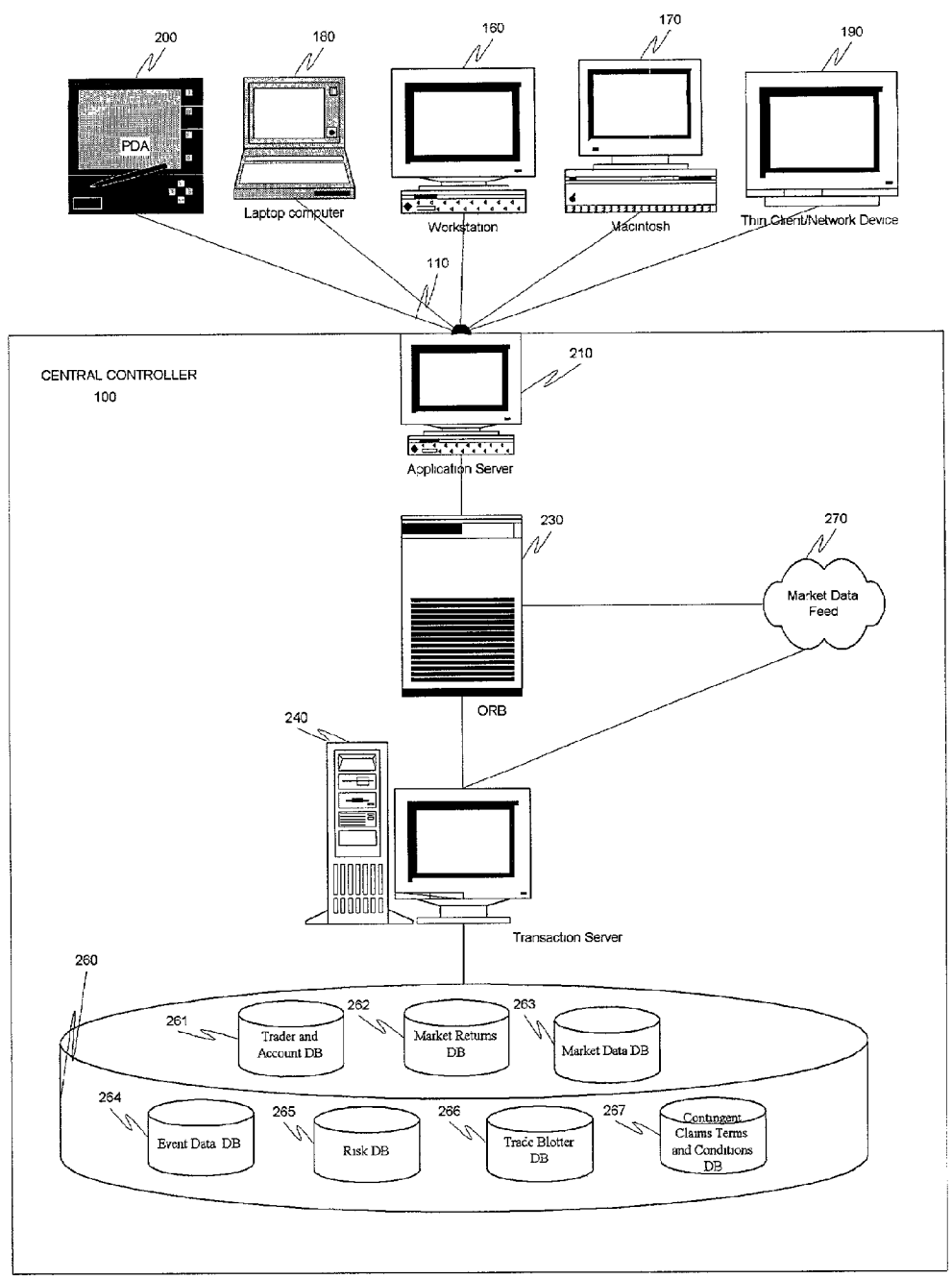
FIG. 2 is a schematic view of a central controller of a preferred embodiment of a DBAR contingent claims exchange network architecture implementing the present invention.

FIGS. 1 and 2 show schematically a preferred embodiment of a network architecture for a DBAR contingent claims exchange. As depicted in FIG. 1 and FIG. 2, the architecture conforms to a distributed Internet-based architecture using object oriented principles useful in carrying out the methods of the present invention.

In FIG. 1, a central controller 100 has a plurality software and hardware components and is embodied as a mainframe computer or a plurality of workstations. The central controller 100 is preferably located in a facility that has back-up power, disaster-recovery capabilities, and other similar infrastructure, and is connected via telecommunications links 110 with computers and devices 160, 170, 180, 190, and 200 of traders and investors in groups of DBAR contingent claims of the present invention. Signals transmitted using telecommunications links 110, can be encrypted using such algorithms as Blowfish and other forms of public and private key encryption. The telecommunications links 110 can be a dialup connection via a standard modem 120; a dedicated line connection establishing a local area network (LAN) or wide area network (WAN) 130 running, for example, the Ethernet network protocol; a public Internet connection 140; or wireless or cellular connection 150. Any of the computers and devices 160, 170, 180, 190 and 200, depicted in FIG. 1, can be connected using any of the links 120, 130, 140 and 150 as depicted in hub 111. Other telecommunications links, such as radio transmission, are known to those of skill in the art.

As depicted in FIG. 1, to establish telecommunications connections with the central controller 100, a trader or investor can use workstations 160 running, for example, UNIX, Windows NT, Linux, or other operating systems. In preferred embodiments, the computers used by traders or investors include basic input/output capability, can include a hard drive or other mass storage device, a central processor (e.g., an Intel-made Pentium III processor), random-access memory, network interface cards, and telecommunications access. A trader or investor can also use a mobile laptop computer 180, or network computer 190 having, for example, minimal memory and storage capability 190, or personal digital assistant 200 such as a Palm Pilot. Cellular phones or other network devices may also be used to process and display information from and communicate with the central controller 100.

FIG. 2 depicts a preferred embodiment of the central controller 100 comprising a plurality of software and hardware components. Computers comprising the central controller 100 are preferably high-end workstations with resources capable of running business operating systems and applications, such as UNIX, Windows NT, SQL Server, and Transaction Server. In a preferred embodiment, these computers are high-end personal computers with Intel-made (x86 "instruction set") CPUs, at least 128 megabytes of RAM, and several gigabytes of hard drive data storage space. In preferred embodiments, computers depicted in FIG. 2 are equipped with JAVA virtual machines, thereby enabling the processing of JAVA instructions. Other preferred embodiments of the central controller 100 may not require the use of JAVA instruction sets.

In a preferred embodiment of central controller 100 depicted in FIG. 2, a workstation software application server 210, such as the Weblogic Server available from BEA Systems, receives information via telecommunications links 110 from investors' computers and devices 160, 170, 180, 190 and 200. The software application server 210 is responsible for presenting human-readable user interfaces to investors' computers and devices, for processing requests for services from investors' computers and devices, and for routing the requests for services to other hardware and software components in the central controller 100. The user interfaces that can be available on the software application server 210 include hypertext markup language (HTML) pages, JAVA applets and servlets, JAVA or Active Server pages, or other forms of network-based graphical user interfaces known to those of skill in the art. For example, investors or traders connected via an Internet connection for HTML can submit requests to the software application server 210 via the Remote Method Invocation (RMI) and/or the Internet Inter-Orb Protocol (IIOP) running on top of the standard TCP/IP protocol. Other methods are known to those of skill in the art for transmitting investors' requests and instructions and presenting human readable interfaces from the application server 210 to the traders and investors. For example, the software application server 210 may host Active Server Pages and communicate with traders and investors using DCOM.

In a preferred embodiment, the user interfaces deployed by the software application server 210 present login, account management, trading, market data, and other input/output information necessary for the operation of a system for investing in groups of DBAR contingent claims according to the present invention. A preferred embodiment uses the HTML and JAVA applet/servlet interface. The HTML pages can be supplemented with embedded applications or "applets" using JAVA based or ActiveX standards or another suitable application, as known to one of skill in the art.

In a preferred embodiment, the software application server 210 relies on network-connected services with other computers within the central controller 100. The computers comprising the central controller 100 preferably reside on the same local area network (e.g., Ethernet LAN) but can be remotely connected over Internet, dedicated, dialup, or other similar connections. In preferred embodiments, network intercommunication among the computers comprising central controller 100 can be implemented using DCOM, CORBA, or TCP/IP or other stack services known to those of skill in the art.

Representative requests for services from the investors' computers to the software application server 210 include: (1) requests for HTML pages (e.g., navigating and searching a web site); (2) logging onto the system for trading DBAR contingent claims; (3) viewing real-time and historical market data and market news; (4) requesting analytical calculations such as returns, market risk, and credit risk; (5) choosing a group of DBAR contingent claims of interest by navigating HTML pages and activating JAVA applets; (6) making an investment in one or more defined states of a group of DBAR contingent claims; and (7) monitoring investments in groups of DBAR contingent claims.

In a preferred embodiment depicted in FIG. 2, an Object Request Broker (ORB) 230 can be a workstation computer operating specialized software for receiving, aggregating, and marshalling service requests from the software application server 210. For example, the ORB 230 can operate a software product called Visibroker, available from Inprise, and related software products that provide a number of functions and services according to the Common Object Request Broker Architecture (CORBA) standard. In a preferred embodiment, one function of the ORB 230 is to provide what are commonly known in the object-oriented software industry as directory services, which correlate computer code organized into class modules, known as "objects," with names used to access those objects. When an object is accessed in the form of a request by name, the object is instantiated (i.e., caused to run) by the ORB 230. For example, in a preferred embodiment, computer code organized into a JAVA class module for the purpose of computing returns using a canonical DRF is an object named "DRF_Returns," and the directory services of the ORB 230 would be responsible for invoking this object by this name whenever the application server 210 issues a request that returns be computed.

In a preferred embodiment, another function of the ORB 230 is to maintain what is commonly known in the object-oriented software industry as an interface repository, which contains a database of object interfaces. The object interfaces contain information regarding which code modules perform which functions. For example, in a preferred embodiment, a part of the interface of the object named "DRF_Returns" is a function which fetches the amount currently invested across the distribution of states for a group of DBAR contingent claims.

In a preferred embodiment, another function of the ORB 230 is to manage the length of runtime for objects which are instantiated by the ORB 230, and to manage other functions such as whether the objects are shared and how the objects manage memory. For example, in a preferred embodiment, the ORB 230 determines, depending upon the request from the software application server 210, whether an object which processes market data will share such data with other objects, such as objects that allocate returns to investments in defined states.

In a preferred embodiment, another function of the ORB 230 is to provide the ability for objects to communicate asynchronously by responding to messages or data at varying times and frequencies based upon the activity of other objects. For example, in a preferred embodiment, an object that computes returns for a group of DBAR contingent claims responds asynchronously in real-time to a new investment and recalculates returns automatically without a request by the software application server 210 or any other object. In preferred embodiments, such asynchronous processes are important where computations in real-time are made in response to other activity in the system, such as a trader making a new investment or the fulfillment of the predetermined termination criteria for a group of DBAR contingent claims.

In a preferred embodiment, another function of the ORB 230 is to provide functions related to what is commonly known in the object-oriented software industry as marshalling. Marshalling in general is the process of obtaining for an object the relevant data it needs to perform its designated function. In preferred embodiments of the present invention, such data includes for example, trader and account information and can itself be manipulated in the form of an object, as is common in the practice of object-oriented programming. Other functions and services may be provided by the ORB 230, such as the functions and services provided by the Visibroker product, according to the standards and practices of the object-oriented software industry or as known to those of skill in the art.

In a preferred embodiment depicted in FIG. 2, transaction server 240 is a computer running specialized software for performing various tasks including: (1) responding to data requests from the ORB 230, e.g., user, account, trade data and market data requests; (2) performing relevant computations concerning groups of DBAR contingent claims, such as intra-trading period and end-of-trading-period returns allocations and credit risk exposures; and (3) updating investor accounts based upon DRF payouts for groups of DBAR contingent claims and applying debits or credits for trader margin and positive outstanding investment balances. The transaction server 240 preferably processes all requests from the ORB 230 and, for those requests that require stored data (e.g., investor and account information), queries data storage devices 260. In a preferred embodiment depicted in FIG. 2, a market data feed 270 supplies real-time and historical market data, market news, and corporate action data, for the purpose of ascertaining event outcomes and updating trading period returns. The specialized software running on transaction server 240 preferably incorporates the use of object oriented techniques and principles available with computer languages such as C++ or Java for implementing the above-listed tasks.

As depicted in FIG. 2, in a preferred embodiment the data storage devices 260 can operate relational database software such as Microsoft's SQL Server or Oracle's 8i Enterprise Server. The types of databases within the data storage devices 260 that can be used to support the DBAR contingent claim and exchange preferably comprise: (1) Trader and Account databases 261; (2) Market Returns databases 262; (3) Market Data databases 263; (4) Event Data databases 264; (5) Risk databases 265; (6) Trade Blotter databases 266; and (7) Contingent claims Terms and Conditions databases 267. The kinds of data preferably stored in each database are shown in more detail in FIG. 4. In a preferred embodiment, connectivity between data storage devices 260 and transaction server 240 is accomplished via TCP/IP and standard Database Connectivity Protocols (DBC) such as the JAVA DBC (JDBC). Other systems and protocols for such connectivity are known to those of skill in the art.

In reference to FIG. 2, application server 210 and ORB 230 may be considered to form an interface processor, while transaction server 240 forms a demand-based transaction processor. Further, the databases hosted on data storage devices 260 may be considered to form a trade status database. Investors, also referred to as traders, communicating via telecommunications links 110 from computers and devices 160, 170, 180, 190, and 200, may be considered to perform a series of demand-based interactions, also referred to as demand-based transactions, with the demand-based transaction processor. A series of demand-based transactions may be used by a trader, for example, to obtain market data, to establish a trade, or to close out a trade.

Figure 3:
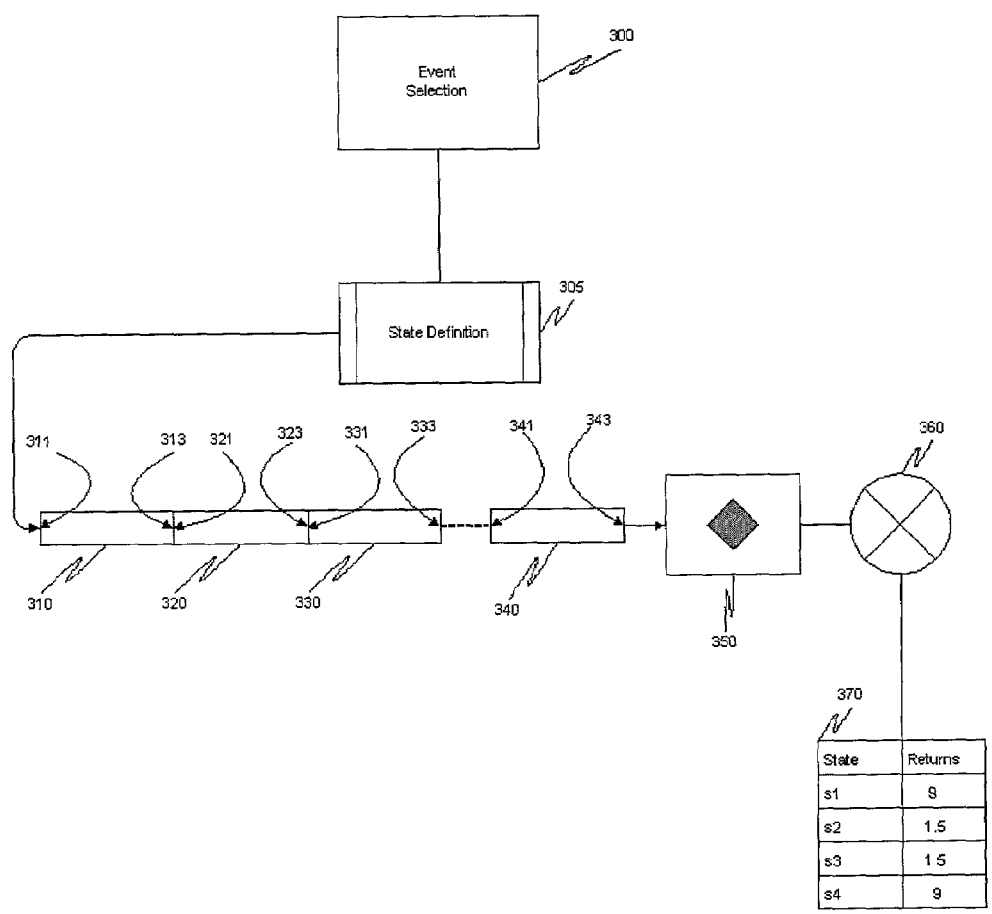
FIG. 3 is a schematic depiction of the trading process on a preferred embodiment of a DBAR contingent claims exchange.

FIG. 3 depicts a preferred embodiment of the implementation of a group of DBAR contingent claims. As depicted in FIG. 3, an exchange or issuer first selects an event of economic significance 300. In the preferred embodiment, the exchange then partitions the possible outcomes for the event into mutually exclusive and collectively exhaustive states 305, such that one state among the possible states in the partitioned distribution is guaranteed to occur, and the sum of probabilities of the occurrence of each partitioned state is unity. Trading can then commence with the beginning 311 of the first trading period 310. In the preferred embodiment depicted in FIG. 3, a group of DBAR contingent claims has trading periods 310, 320, 330, and 340, with trading period start date 311, 321, 331, 341 respectively, followed by a predetermined time interval by each trading period's respective trading end dates 313, 323, 333 and 343. The predetermined time interval is preferably of short duration in order to attain continuity. In the preferred embodiment, during each trading period the transaction server 240 running JAVA code implementing the DRF for the group of DBAR contingent claims adjusts returns immediately in response to changes in the amounts invested in each of the defined states. Changes in market conditions during a trading period, such as price and volatility changes, as well as changes in investor risk preferences and liquidity conditions in the underlying market, among other factors, will cause amounts invested in each defined state to change thereby reflecting changes in expectations of traders over the distribution of states defining the group of DBAR contingent claims.

In a preferred embodiment, the adjusted returns calculated during a trading period, i.e., intra-trading period returns, are of informational value only—only the returns which are finalized at the end of each trading period are used to allocate gains and losses for a trader's investments in a group or portfolio of groups of DBAR contingent claims. In a preferred embodiment, at the end of each trading period, for example, at trading end dates 313, 323, 333, and 343, finalized returns are allocated and locked in. The finalized returns are the rates of return to be allocated per unit of amount invested in each defined state should that state occur. In a preferred embodiment, each trading period can therefore have a different set of finalized returns as market conditions change, thereby enabling traders to make investments during later trading periods which hedge investments from earlier trading periods that have since closed.

In another preferred embodiment, not depicted, trading periods overlap so that more than one trading period is open for investment on the same set of predefined states. For example, an earlier trading period can remain open while a subsequent trading period opens and closes. Other permutations of overlapping trading periods are possible and are apparent to one of skill in the art from this specification or practice of the present invention.

The canonical DRF, as previously described, is a preferred embodiment of a DRF which takes investment across the distribution of states and each state, the transaction fee, and the event outcome and allocates a return for each state if it should occur. A canonical DRF of the present invention, as previously described, reallocates all amounts invested in states that did not occur to the state that did occur. Each trader that has made an investment in the state that did occur receives a pro-rata share of the trades from the non-occurring states in addition to the amount he originally invested in the occurring state, less the exchange fee.

In the preferred embodiment depicted in FIG. 3, at the close of the final trading period 343, trading ceases and the outcome for the event underlying the contingent claim is determined at close of observation period 350. In a preferred embodiment, only the outcome of the event underlying the group of contingent claims must be uncertain during the trading periods while returns are being locked in. In other words, the event underlying the contingent claims may actually have occurred before the end of trading so long as the actual outcome remains unknown, for example, due to the time lag in measuring or ascertaining the event's outcome. This could be the case, for instance, with macroeconomic statistics like consumer price inflation.

In the preferred embodiment depicted in FIG. 2, once the outcome is observed at time 350, process 360 operates on the finalized returns from all the trading periods and determines the payouts. In the case of a canonical DRF previously described, the amounts invested in the losing investments finance the payouts to the successful investments, less the exchange fee. In a canonical DRF, successful investments are those made during a trading period in a state which occurred as determined at time 350, and unsuccessful investments are those made in states which did not occur. Examples 3.1.1–3.1.21 above illustrate various preferred embodiments of a group of DBAR contingent claims using a canonical DRF. In the preferred embodiment depicted in FIG. 3, the results of process 360 are made available to traders by posting the results for all trading periods on display 370. In a preferred embodiment not depicted, trader accounts are subsequently updated to reflect these results.

Figure 4:
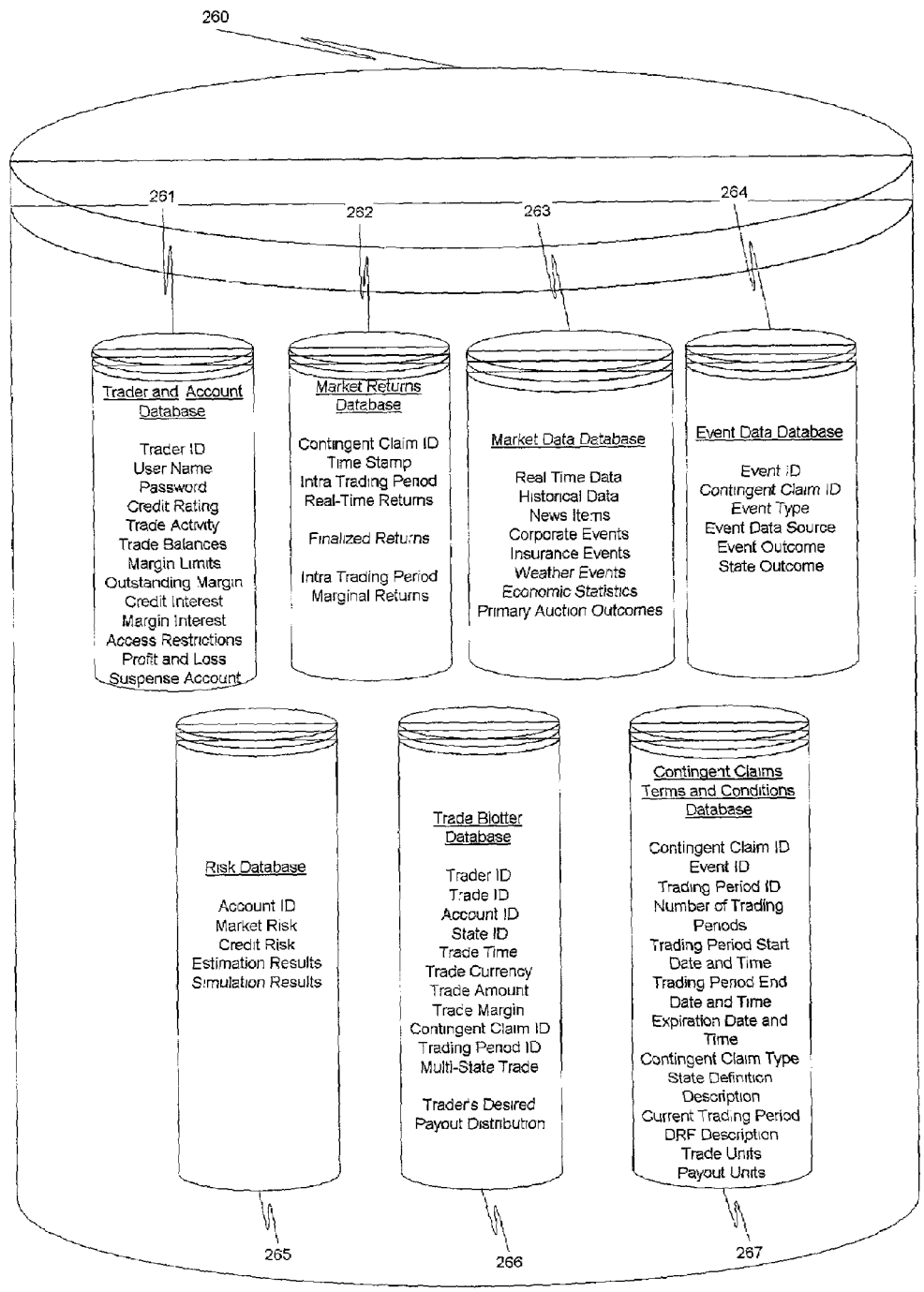
FIG. 4 depicts data storage devices of a preferred embodiment of a DBAR contingent claims exchange.

FIG. 4 provides a more detailed depiction of the data storage devices 260 of a preferred embodiment of a DBAR contingent claims exchange. In a preferred embodiment, data storage devices 260, on which relational database software is installed as described above, is a non-volatile hard drive data storage system, which may comprise a single device or medium, or may be distributed across a plurality of physical devices, such as a cluster of workstation computers operating relational database software, as described previously and as known in the art. In a preferred embodiment, the relational database software operating on the data storage devices 260 comprises relational database tables, stored procedures, and other database entities and objects that are commonly contained in relational database software packages. In the preferred embodiment depicted in FIG. 4, databases 261–267 each contain such tables and other relational database entities and objects necessary or desirable to implement an embodiment of the present invention. FIG. 4 identifies the kinds of information that can be stored in such devices. Of course, the kinds of data shown in the drawing are not exhaustive. The storage of other data on the same or additional databases may be useful depending on the nature of the contingent claim being traded. Moreover, in the preferred embodiment depicted in FIG. 4, certain data are shown in FIG. 4 as stored in more than one storage device. In various other preferred embodiments, such data may be stored in only one such device or may be calculated. Other database designs and architectures will be apparent to those of skill in the art from this specification or practice of the present invention.

In the preferred embodiment depicted in FIG. 4, the Trader and Account database 261 stores data related to the identification of a DBAR trader such as name, password, address, trader identification number, etc. Data related to the trader's credit rating can also be stored and updated in response to changes in the trader's credit status. Other information that can be stored in Trader and Account database 261 includes data related to the trader's account, for example, active and inactive investments, the trader's balance, the trader's margin limits, outstanding margin amounts, interest credited on outstanding trade balances and interest paid on outstanding margin balances, any restrictions the trader may have regarding access to his account, and the trader's profit and loss information regarding active and inactive investments. Information related to multi-state investments to be allocated can also be stored in Trader and Account database 261. The data stored in database 261 can be used, for example, to issue account related statements to traders.

In the preferred embodiment depicted in FIG. 4, the Market Returns database 262 contains information related to returns available at various times for active and inactive groups of DBAR contingent claims. In a preferred embodiment, each group of contingent claims in database 262 is identified using a unique identifier previously assigned to that group. Returns for each defined state for each group of contingent claims reflected are stored in database 262. Returns calculated and available for display to traders during a given trading period are stored in database 262 for each state and for each claim. At the end of each trading period, finalized returns are computed and stored in Market Returns database 262. Marginal returns, as previously described, can also be stored in database 262. The data in Market Returns database 262 may also include information relevant to a trader's decisions such as current and past intra-period returns, as well as information used to determine payouts by a DRF for a group of DBAR contingent claims.

In the preferred embodiment depicted in FIG. 4, Market Data database 263 stores market data from market data feed 270. In a preferred embodiment, the data in Market Data database 263 include data relevant for the types of contingent claims which can be traded on a particular exchange. In a preferred embodiment, real-time market data include data such as real-time prices, yields, index levels, and other similar information. In a preferred embodiment, such real-time data from Market Data database 263 are presented to traders to aid in making investment decisions and are used by the DRF to allocate returns for groups of contingent claims which depend on such information. Historical data relating to relevant groups of DBAR contingent claims can also be stored in Market Data database 263. In preferred embodiments, news items related to underlying groups of DBAR contingent claims (e.g., comments by the Federal Reserve) are also stored in Market Data database 263 and can be retrieved by traders.

In the preferred embodiment depicted in FIG. 4, Event Data database 264 stores data related to events underlying the groups of DBAR contingent claims that can be traded on an exchange. In a preferred embodiment, each event is identified by a previously assigned event identification number. Each event has one or more associated group of DBAR contingent claims based on that event and is so identified with a previously assigned contingent claim group identification number. The type of event can also be stored in Event database 264, for example, whether the event is based on a closing price of a security, a corporate earnings announcement, a previously calculated but yet to be released economic statistic, etc. The source of data used to determine the outcome of the event can also be stored in Event database 264. After an event outcome becomes known, it can also be stored in Event database 264 along with the defined state of the respective group of contingent claims corresponding to that outcome.

In the preferred embodiment depicted in FIG. 4, Risk database 265 stores the data and results and analyses related to the estimation and calculation of market risk and credit risk. In a preferred embodiment, Risk database 265 correlates the derived results with an account identification number. The market and credit risk quantities that can be stored are those related to the calculation of CAR and CCAR, such as the standard deviation of unit returns for each state, the standard deviation of dollar returns for each state, the standard deviation of dollar returns for a given contingent claim, and portfolio CAR. Intermediate estimation and simulation data such as correlation matrices used in VAR-based CAR and CCAR calculations and scenarios used in MCS-based calculations can also be stored in Risk database 265.

In the preferred embodiment depicted in FIG. 4, Trade Blotter database 266 contains data related to the investments, both active and inactive, made by traders for all the groups of DBAR contingent claims that can be traded on the particular exchange. Such data may include previously assigned trader identification numbers previously assigned investment identification numbers, previously assigned account identification numbers, previously assigned contingent claim identification numbers, state identification numbers previously assigned corresponding to each defined state, the time of each investment, the units of value used to make each investments (e.g., dollars), the investment amounts, how much margin is used to make the investments, and previously assigned trading period identification numbers. In addition, data related to whether an investment is a multi-state investment can also be stored. The payout distribution which a trader desires to replicate and which the exchange will implement using a multi-state investment allocation, as described above, can also be stored in Trade Blotter database 266.

In the preferred embodiment depicted in FIG. 4, Contingent claims Terms and Conditions database 267 stores data related to the definition and structure of each group of DBAR contingent claims. In a preferred embodiment, such data are called "terms and conditions" to indicate that they relate to the contractual terms and conditions under which traders agree to be bound, and roughly correspond to material found in prospectuses in traditional markets. In a preferred embodiment, the terms and conditions provide the fundamental information regarding the nature of the contingent claim to be traded, e.g., the number of trading periods, the trading period(s)' start and end times, the type of event underlying the contingent claim, how the DRF finances successful investments from unsuccessful investments, the time at which the event is observed for determining the outcome, other predetermined termination criteria, the partition of states in which investments can be made, and the investment and payout value units (e.g., dollars, numbers of shares, ounces of gold, etc.). In a preferred embodiment, contingent claim and event identification numbers are assigned and stored in Contingent claims Terms and Conditions database 267 so that they may be readily referred to in other tables of the data storage devices.

Figure 5:
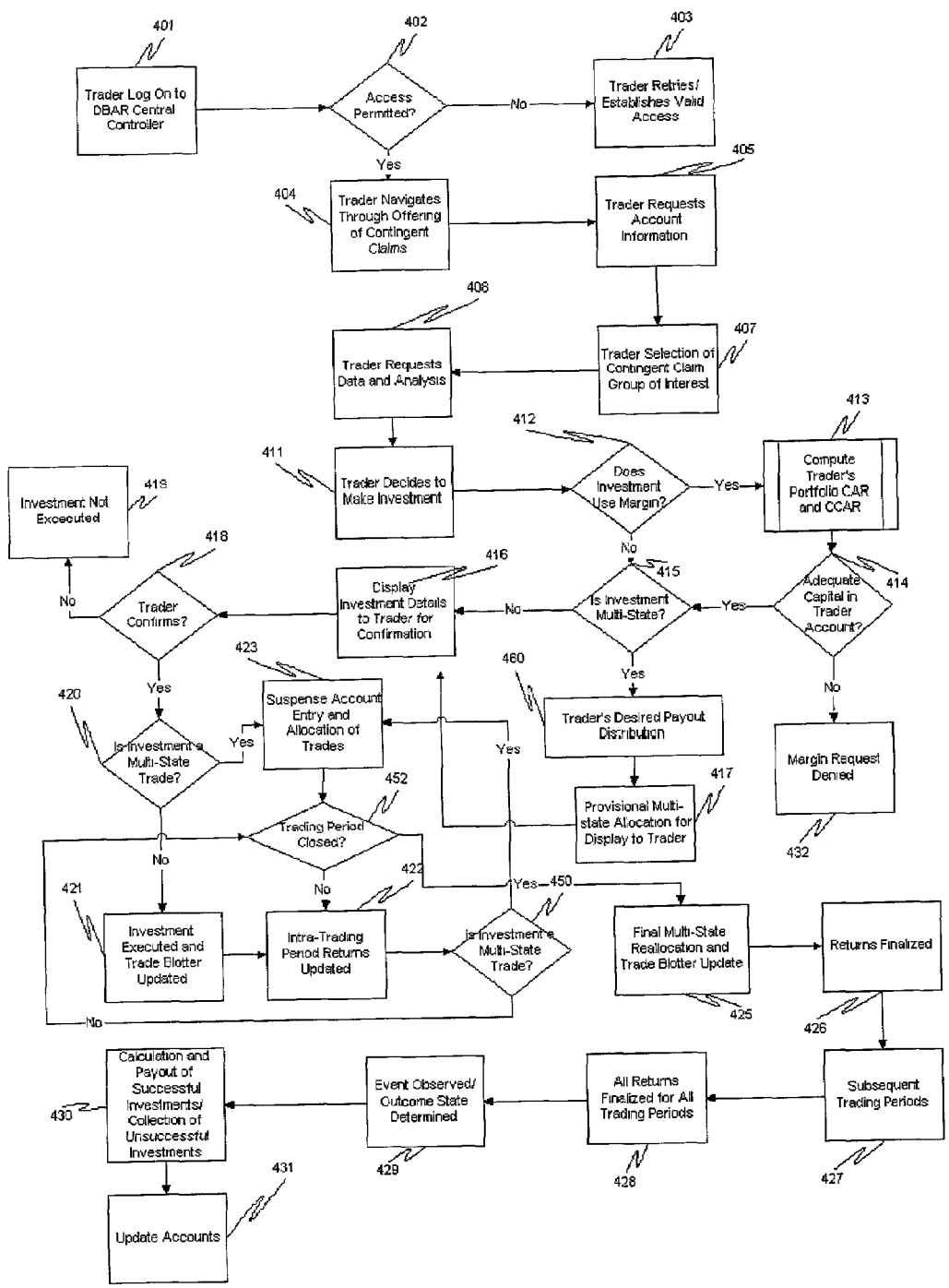
FIG. 5 is a flow diagram illustrating the processes of a preferred embodiment of DBAR contingent claims exchange in executing a DBAR range derivatives investment.

FIG. 5 shows a flow diagram depicting illustrative processes used and illustrative decisions made by a trader using a preferred embodiment of the present invention. For purposes of illustration in FIG. 5, it is assumed that the trader is making an investment in a DBAR range derivative (RD) examples of which are disclosed above. In particular, it is assumed for the purposes of illustration that the DBAR RD investment being made is in a contingent claim based upon the closing price of IBM common stock on Aug. 3, 1999 (as indicated in the display 501 of FIG. 6).

In process 401, depicted in FIG. 5, the trader requests access to the DBAR contingent claim exchange. As previously described in a preferred embodiment, the software application server 210 (depicted in FIG. 2) processes this request and routes it to the ORB 230, which instantiates an object responsible for the authentication of traders on the exchange on transaction server 240. The authentication object on transaction server 240, for example, queries the Trader and Account database 261 (depicted in FIG. 4) for the trader's username, password, and other identifying information supplied. The authentication object responds by either allowing or denying access as indicated in process 402 depicted in FIG. 5. If authentication fails in this illustration, process 403 prompts the trader to retry a logon or establish valid credentials for logging onto the system. If the trader has been granted access, the software application server 210 (depicted in FIG. 2) will display to the trader many user interfaces which may be of interest. For example, in a preferred embodiment, the trader can navigate through a sample of groups of DBAR contingent claims currently being traded, as represented in process 404. The trader may also check current market conditions by requesting those interfaces in process 404 that contain current market data as obtained from market data feed 270 (depicted in FIG. 2) and stored in Market Data database 263 (as depicted in FIG. 4). Process 405 of FIG. 5 represents the trader requesting the application server 210 for relevant information regarding the trader's account, such as the trader's current portfolio of trades, trade amounts, current amount of margin outstanding, and account balances. In a preferred embodiment, this information is obtained by objects running on transaction server 240 (FIG. 2) that query Trader and Account database 261 and Trade Blotter database 266 (FIG. 4).

As depicted in FIG. 5, process 407 represents the selection of a group of DBAR contingent claims by a trader for the purpose of making an investment. The application server 210 (depicted in FIG. 2) can present user interfaces to the trader such as the interface shown in FIG. 6 as is known in the art. Process 408 represents the trader requesting data and analysis which may include calculations as to the effect the trader's proposed investment would have on the current returns. The calculations can be made using the implied "bid" and "offer" demand response equations described above. The processes which perform these data requests and manipulation of such data are, in a preferred embodiment, objects running on transaction server 240 (as depicted in FIG. 2). These objects, for example, obtain data from database 262 (FIG. 4) by issuing a query that requests investment amounts across the distribution of states for a given trading period for a given group of contingent claims. With the investment amount data, other objects running on transaction server 240 (FIG. 2) can perform marginal returns calculations using the DRF of the group of contingent claims as described above. Such processes are objects managed by the ORB 230 (as depicted in FIG. 2).

Returning to the illustration depicted in FIG. 5, process 411 represents a trader's decision to make an investment for a given amount in one or more defined states of the group of DBAR contingent claims of interest. In a preferred embodiment, the trader's request to make an investment identifies the particular group of claims, the state or states in which investments are to be made, the amount to be invested in the state or states, and the amount of margin to be used, if any, for the investments.

Process 412 responds to any requests to make an investment on margin. The use of margin presents the risk that the exchange may not be able to collect the entire amount of a losing investment. Therefore, in preferred embodiments, an analysis is performed to determine the amount of risk to which a current trader is exposed in relation to the amount of margin loans the trader currently has outstanding. In process 413 such an analysis is carried out in response to a margin request by the trader.

The proposed trade or trades under consideration may have the effect of hedging or reducing the total amount of risk associated with the trader's active portfolio of investments in groups of DBAR contingent claims. Accordingly, in a preferred embodiment, the proposed trades and margin amounts should be included in a CAR analysis of the trader's portfolio.

In a preferred embodiment, the CAR analysis performed by process 413, depicted in FIG. 5, can be conducted according to the VAR, MCS, or HS methodologies previously discussed, using data stored in Risk database 265 (FIG. 2), such as correlation of state returns, correlation of underlying events, etc. In a preferred embodiment, the results of the CAR calculation are also stored in Risk database 265. As depicted in FIG. 5, process 414 determines whether the trader has sufficient equity capital in his account by comparing the computed CAR value and the trader's equity in accordance with the exchange's margin rules. In preferred embodiments, the exchange requires that all traders maintain a level of equity capital equal to some portion or multiple of the CAR value for their portfolios. For example, assuming CAR is computed with a 95% statistical confidence as described above, the exchange may require that traders have 10 times CAR as equity in their accounts. Such a requirement would mean that traders would suffer drawdowns to equity of 10% approximately 5% of the time, which might be regarded as a reasonable tradeoff between the benefits of extending margin to traders to increase liquidity and the risks and costs associated with trader default. In addition, in preferred embodiments, the exchange can also perform CCAR calculations to determine the amount of credit risk in the group of DBAR contingent claims due to each trader. In a preferred embodiment, if a trader does not have adequate equity in his account or the amount of credit risk posed by the trader is too great, the request for margin is denied, as depicted in process 432 (FIG. 5).

As further depicted in FIG. 5, if the trader has requested no margin or the trader has passed the margin tests applied in process 414, process 415 determines whether the investment is one to be made over multiple states simultaneously in order to replicate a trader's desired payout distribution over such states. If the investment is multi-state, process 460 requests trader to enter a desired payout distribution. Such communication will comprise, for example, a list of constituent states and desired payouts in the event that each constituent state occurs. For example, for a four-state group of DBAR contingent claims, the trader might submit the four dimensional vector (10, 0, 5, 2) indicating that the trader would like to replicate a payout of 10 value units (e.g., dollars) should state 1 occur, no payout should state 2 occur, 5 units should state 3 occur, and 2 units should state 4 occur. In a preferred embodiment, this information is stored in Trade Blotter database 266 (FIG. 4) where it will be available for the purposes of determining the investment amounts to be allocated among the constituent states for the purposed of replicating the desired payouts. As depicted in FIG. 5, if the investment is a multi-state investment, process 417 makes a provisional allocation of the proposed investment amount to each of the constituent states.

As further depicted in FIG. 5, the investment details and information (e.g., contingent claim, investment amount, selected state, amount of margin, provisional allocation, etc.) are then displayed to the trader for confirmation by process 416. Process 418 represents the trader's decision whether to make the investment as displayed. If the trader decides against making the investment, it is not executed as represented by process 419. If the trader decides to make the investment and process 420 determines that it is not a multi-state investment, the investment is executed, and the trader's investment amount is recorded in the relevant defined state of the group of DBAR contingent claims according to the investment details previously accepted. In a preferred embodiment, the Trade Blotter database 266 (FIG. 4) is then updated by process 421 with the new investment information such as the trader ID, trade ID, account identification, the state or states in which investments were made, the investment time, the amount invested, the contingent claim identification, etc.

In the illustration depicted in FIG. 5, if the trader decides to make the investment, and process 420 determines that it is a multi-state investment, process 423 allocates the invested amount to the constituent states comprising the multi-state investment in amounts that generate the trader's desired payout distribution previously communicated to the exchange in process 460 and stored in Trader Blotter database 266 (FIG. 4). For example, in a preferred embodiment, if the desired payouts are identical payouts no matter which state occurs among the constituent states, process 423 will update a suspense account entry and allocate the multi-state trade in proportion to the amounts previously invested in the constituent states. Given the payout distribution previously stored, the total amount to be invested, and the constituent states in which the "new" investment is to be made, then the amount to be invested in each constituent state can be calculated using the matrix formula provided in Example 3.1.21, for example. Since these calculations depend on the existing distributions of amounts invested both during and at the end of trading, in a preferred embodiment reallocations are performed whenever the distribution of amounts invested (and hence returns) change.

As further depicted in FIG. 5, in response to a new investment, Process 422 updates the returns for each state to reflect the new distribution of amounts invested across the defined states for the relevant group of DBAR contingent claims. In particular, process 422 receives the new trade information from Trade Blotter database 266 as updated by process 421, if the investment is not multi-state, or from Trader and Account database 261 as updated by suspense account process 423, if the investment is a multi-state investment. Process 422 involves the ORB 230 (FIG. 2) instantiating an object on transaction server 240 for calculating returns in response to new trades. In this illustration, the object queries the new trade data from the Trade Blotter database 266 or the suspense account in Trader and Account database 261 (FIG. 4), computes the new returns using the DRF for the group of contingent claims, and updates the intra-trading period returns stored in Market Returns database 262.

As depicted in FIG. 5, if the investment is a multi-state investment as determined by process 450, the exchange continues to update the suspense account to reflects the trader's desired payout distribution in response to subsequent investments entering the exchange. Any updated intra-trading period returns obtained from process 422 and stored in Market Returns database 262 are used by process 423 to perform a reallocation of multi-state investments to reflect the updated returns. If the trading period has not closed, as determined by process 452, the reallocated amounts obtained from the process 423 are used, along with information then simultaneously stored in Trade Blotter database 266 (FIG. 4), to perform further intra-trading period update of returns, per process 422 shown in FIG. 5. However, if the trading period has closed, as determined in this illustration by process 452, then the multi-state reallocation is performed by process 425 so that the returns for the trading period can be finalized per process 426.

In a preferred embodiment, the closing of the trading period is an important point since at that point the DRF object running on Transaction server 240 (FIG. 2) calculates the finalized returns and then updates Market Returns database 262 with those finalized returns, as represented by process 426 depicted in FIG. 5. The finalized returns are those which are used to compute payouts once the outcome of the event and, therefore, the state which occurred are known and all other predetermined termination criteria are fulfilled. Even though a multi-state reallocation process 425 is shown in FIG. 5 between process 452 and process 426, multi-state reallocation process 425 is not carried out if the investment is not a multi-state investment.

Continuing with the illustration depicted in FIG. 5, process 427 represents the possible existence of subsequent trading periods for the same event on which the given group of DBAR contingent claims is based. If such periods exist, traders may make investments during them, and each subsequent trading period would have its own distinct set of finalized returns. For example, the trader in a group of contingent claims may place a hedging investment in one or more of the subsequent trading periods in response to changes in returns across the trading periods in accordance with the method discussed in Example 3.1.19 above. The ability to place hedging trades in successive trading periods, each period having its own set of finalized returns, allows the trader to lock-in or realize profits and losses in virtually continuous time as returns change across the trading periods. In a preferred embodiment, the plurality of steps represented by process 427 are performed as previously described for the earlier portions of FIG. 5.

As further depicted in FIG. 5, process 428 marks the end of all the trading periods for a group of contingent claims. In a preferred embodiment, at the end of the last trading period, the Market Returns database 262 (FIG. 4) contains a set of finalized returns for each trading period of the group of contingent claims, and Trade Blotter database 266 contains data on every investment made by every trader on the illustrative group of DBAR contingent claims.

In FIG. 5, process 429 represents the observation period during which the outcome of the event underlying the contingent claim is observed, the occurring state of the DBAR contingent claim determined and any other predetermined termination criteria are fulfilled. In a preferred embodiment, the event outcome is determined by query of the Market Data database 263 (FIG. 4), which has been kept current by Market Data Feed 270. For example, for a group of contingent claims on the event of the closing price of IBM on Aug. 3, 1999, the Market Data database 263 will contain the closing price, 119⅜, as obtained from the specified event data source in Event Data database 264. The event data source might be Bloomberg, in which case an object residing on transaction server 240 previously instantiated by ORB 230 will have updated the Market Returns database 262 with the closing price from Bloomberg. Another similarly instantiated object on transaction server 240 will query the Market Returns database 262 for the event outcome (119⅜), will query the Contingent claims Terms and Conditions database 267 for the purpose of determining the state identification corresponding to the event outcome (e.g., Contingent claim # 1458, state #8) and update the event and state outcomes into the Event Data database 264.

As further depicted in FIG. 5, process 430 shows an object instantiated on transaction server 240 by ORB 230 performing payout calculations in accordance with the DRF and other terms and conditions as contained in Contingent claims Terms and Conditions database 267 for the given group of contingent claims. In a preferred embodiment, the object is responsible for calculating amounts to be paid to successful investments and amounts to be collected from unsuccessful investments, i.e., investments in the occurring and non-occurring states, respectively.

As further depicted in FIG. 5, process 431 shows trader account data stored in Trader and Account database 261 (FIG. 4) being updated by the object which determines the payouts in process 430. Additionally, in process 431 in this illustration and preferred embodiments, outstanding credit and debit interest corresponding to positive and margin balances are applied to the relevant accounts in Trader and Account database 261.

Figure 6:
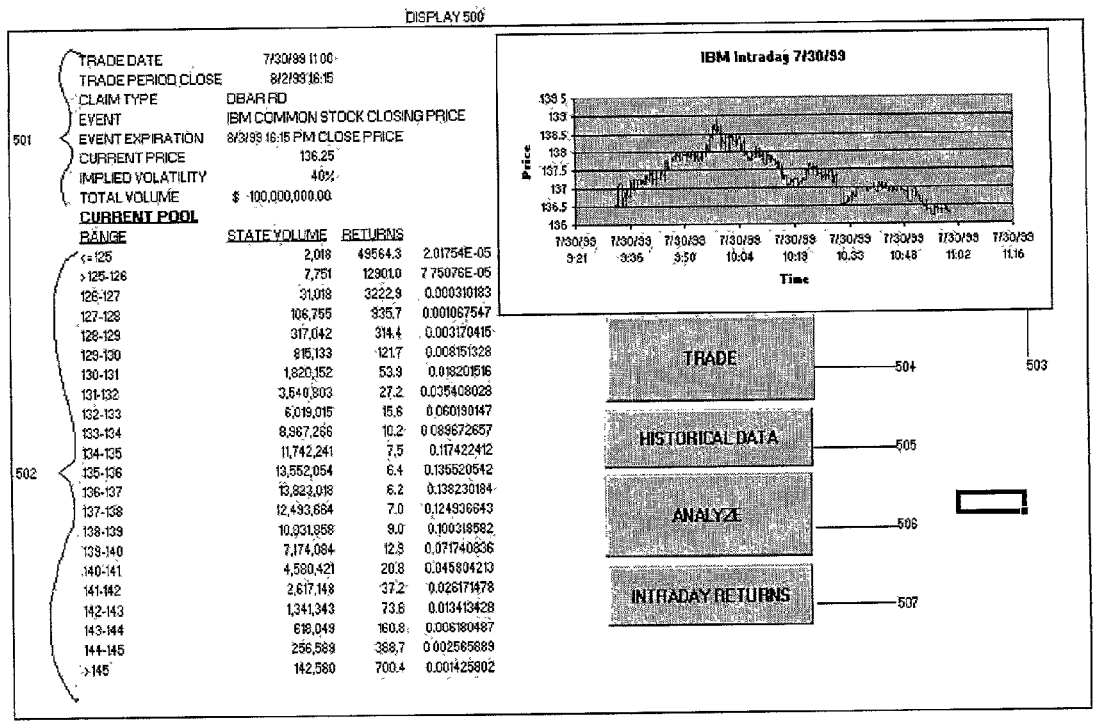
FIG. 6 is an illustrative HTML interface page of a preferred embodiment of a DBAR contingent claims exchange.
Figure 7:
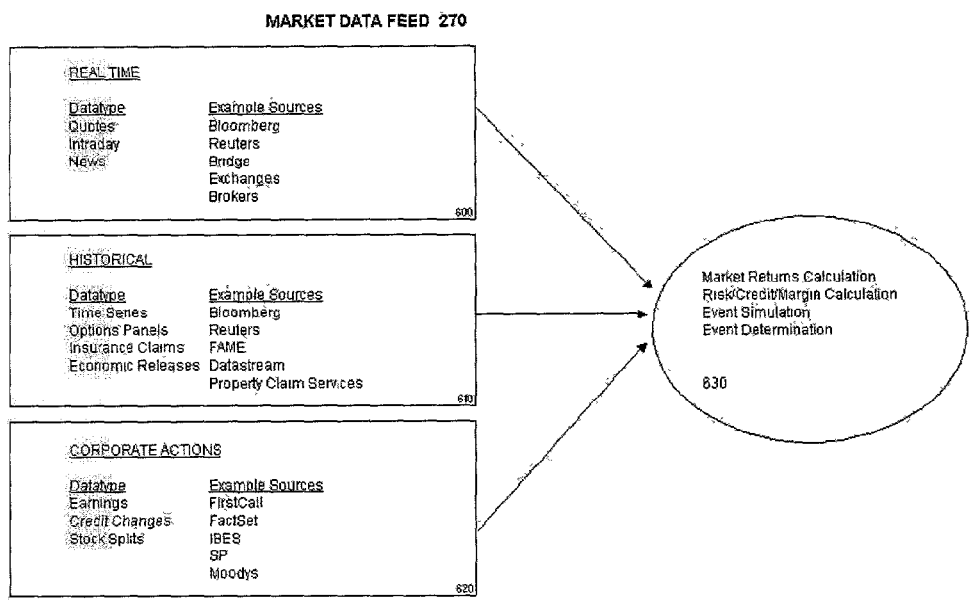
FIG. 7 is a schematic view of market data flow to a preferred embodiment of a DBAR contingent claims exchange.

FIG. 6 depicts as preferred embodiment of a sample HTML page used by traders in an exchange for groups of DBAR contingent claims which illustrates sample display 500 with associated input/output devices, such as display buttons 504–507. As depicted in FIG. 6, descriptive data 501 illustrate the basic investment and market information relevant to an investment. In the investment illustrated in FIG. 6, the event is the closing price of IBM common stock at 4:00 p.m. on Aug. 3, 1999. As depicted in FIG. 6, the sample HTML page displays amount invested in each defined state, and returns available from Market Returns database 262 depicted in FIG. 4. In this illustration and in preferred embodiments, returns are calculated on transaction server 240 (FIG. 2) using, for example, a canonical DRF. As also depicted in FIG. 6, real-time market data is displayed in an intraday "tick chart", represented by display 503, using data obtained from Market Data Feed 270, as depicted in FIG. 7, and processed by transaction server 240, depicted in FIG. 2. Market data may also be stored contemporaneously in Market Data database 263.

In the preferred embodiment depicted in FIG. 6, traders may make an investment by selecting Trade button 504. Historical returns and time series data, from Market Data database 263 may be viewed by selecting Display button 505. Analytical tools for calculating opening or indicative returns or simulating market events are available by request from Software Application Server 210 via ORB 230 and Transaction Server 240 (depicted in FIG. 2) by selecting Analyze button 506 in FIG. 6. As returns change throughout the trading period, a trader may want to display how these returns have changed. As depicted in FIG. 6, these intraday or intraperiod returns are available from Market Returns database 262 by selecting Intraday Returns button 507. In addition, marginal intra-period returns, as discussed previously, can be displayed using the same data in Market Returns database 262 (FIG. 2). In a preferred embodiment, it is also possible for each trader to view finalized returns from Market Returns database 262.

In preferred embodiments that are not depicted, display 500 also includes information identifying the group of contingent claims (such as the claim type and event) available from the Contingent claims Terms and Conditions database 267 or current returns available from Market Returns database 262 (FIG. 2). In other preferred embodiments, display 500 includes means for requesting other services which may be of interest to the trader, such as the calculation of marginal returns, for example by selecting Intraday Returns button 507, or the viewing of historical data, for example by selecting Historical Data button 505.

FIG. 7 depicts a preferred embodiment of the Market Data Feed 270 of FIG. 2 in greater detail. In a preferred embodiment depicted in FIG. 7, real-time data feed 600 comprises quotes of prices, yields, intraday tick graphs, and relevant market news and example sources. Historical data feed 610, which is used to supply market data database 263 with historical data, illustrates example sources for market time series data, derived returns calculations from options pricing data, and insurance claim data. Corporate action data feed 620 depicted in FIG. 7 illustrates the types of discrete corporate-related data (e.g., earnings announcements, credit downgrades) and their example sources which can form the basis for trading in groups of DBAR contingent claims of the present invention. In preferred embodiments, functions listed in process 630 are implemented on transaction server 240 (FIG. 2) which takes information from data feeds 600, 610, and 620 for the purposes of allocating returns, simulating outcomes, calculating risk, and determining event outcomes.

Figure 8:
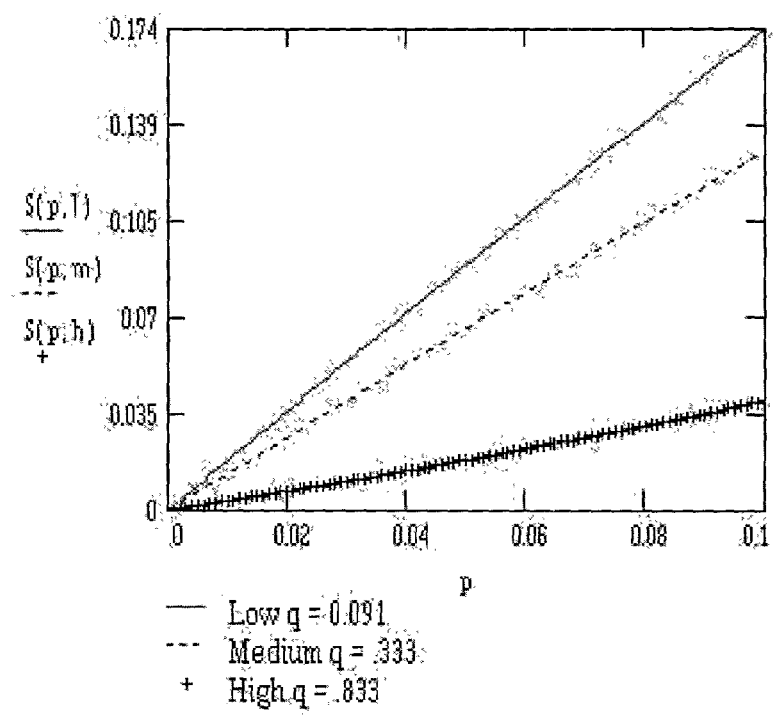
FIG. 8 is an illustrative graph of the implied liquidity effects for a group of DBAR contingent claims.

FIG. 8 depicts a preferred embodiment of an illustrative graph of implied liquidity effects of investments in a group of DBAR contingent claims. As discussed above, in preferred embodiments of the present invention, liquidity variations within a group of DBAR contingent claim impose few if any costs on traders since only the finalized or closing returns for a trading period matter to a trader's return. This contrasts with traditional financial markets, in which local liquidity variations may result in execution of trades at prices that do not fairly represent fair fundamental value, and may therefore impose permanent costs on traders.

Liquidity effects from investments in groups of DBAR contingent claims, as illustrated in FIG. 8, include those that occur when an investment materially and permanently affects the distribution of returns across the states. Returns would be materially and perhaps permanently affected by a trader's investment if, for example, very close to the trading period end time, a trader invested an amount in a state that represented a substantial percentage of aggregate amount previously invested in that state. The curves depicted FIG. 8 show in preferred embodiments the maximum effect a trader's investment can have on the distribution of returns to the various states in the group of DBAR contingent claims.

As depicted in FIG. 8, the horizontal axis, p, is the amount of the trader's investment expressed as a percentage of the total amount previously invested in the state (the trade could be a multi-state investment, but a single state is assumed in this illustration). The range of values on the horizontal axis depicted in FIG. 8 has a minimum of 0 (no amount invested)

to 10% of the total amount invested in a particular state. For example, assuming the total amount invested in a given state is $100 million, the horizontal axis of FIG. 8 ranges from a new investment amount of 0 to $10 million.

The vertical axis of FIG. 8 represents the ratio of the implied bid-offer spread to the implied probability of the state in which a new investment is to be made. In a preferred embodiment, the implied bid-offer spread is computed as the difference between the implied "offer" demand response, $q_i^O(\Delta T_i)$, and the implied "bid" demand response, $q_i^B(\Delta T_i)$, as defined above. In other words, values along the vertical axis depicted in FIG. 8 are defined by the following ratio:

$$\frac{q_i^O(\Delta T_i) - q_i^B(\Delta T_i)}{q_i}$$

As displayed in FIG. 8, this ratio is computed using three different levels of $q_i$, and the three corresponding lines for each level are drawn over the range of values of p: the ratio is computed assuming a low implied $q_i$ ($q_i$=0.091, denoted by the line marked S(p,l)), a middle-valued $q_i$ ($q_i$=0.333, denoted by the line marked S(p,m)), and a high value for $q_i$ ($q_i$=0.833 denoted by the line marked S(p,h)), as shown.

If a trader makes an investment in a group of DBAR contingent claims of the present invention and there is not enough time remaining in the trading period for returns to adjust to a fair value, then FIG. 8 provides a graphical depiction, in terms of the percentage of the implied state probability, of the maximum effect a trader's own investment can have on the distribution of implied state probabilities. The three separate curves drawn correspond to a high demand and high implied probability (S(p,h)), medium demand and medium implied probability (S(p,m)), and low demand and low implied probability (S(p,l)). As used in this context, the term "demand" means the amount previously invested in the particular state.

The graph depicted in FIG. 8 illustrates that the degree to which the amount of a trader's investment affects the existing distribution of implied probabilities (and hence returns) varies with the amount of demand for the existing state as well as the amount of the trader's investment. If the distribution of implied probabilities is greatly affected, this corresponds to a larger implied bid-offer spread, as graphed on the vertical axis of the graph of FIG. 8. For example, for any given investment amount p, expressed as a percentage of the existing demand for a particular state, the effect of the new investment amount is largest when existing state demand is smallest (line S(p,l), corresponding to a low demand/low implied probability state). By contrast, the effect of the amount of the new investment is smallest when the existing state demand is greatest (S(p,h), corresponding to a high demand/high implied probability state). FIG. 8 also confirms that, in preferred embodiments, for all levels of existing state demand, the effect of the amount invested on the existing distribution of implied probabilities increases as the amount to be invested increases.

FIG. 8 also illustrates two liquidity-related aspects of groups of DBAR contingent claims of the present invention. First, in contrast to the traditional markets, in preferred embodiments of the present invention the effect of a trader's investment on the existing market can be mathematically determined and calculated and displayed to all traders. Second, as indicated by FIG. 8, the magnitude of such effects are quite reasonable. For example, in preferred embodiments as depicted by FIG. 8, over a wide range of investment amounts ranging up to several percent of the existing demand for a given state, the effects on the market of such investments amounts are relatively small. If the market has time to adjust after such investments are added to demand for a state, the effects on the market will be only transitory and there may be no effect on the implied distribution of probabilities owing to the trader's investment. FIG. 8 illustrates a "worst case" scenario by implicitly assuming that the market does not adjust after the investment is added to the demand for the state.

FIGS. 9a to 9c illustrate, for a preferred embodiment of a group of DBAR contingent claims, the trader and credit relationships and how credit risk can be quantified, for example in process 413 of FIG. 5. FIG. 9a depicts a counterparty relationship for a traditional swap transaction, in which two counterparties have previously entered into a 10-year swap which pays a semi-annual fixed swap rate of 7.50%. The receiving counterparty 701 of the swap transaction receives the fixed rate and pays a floating rate, while the paying counterparty 702 pays the fixed rate and receives the floating rate. Assuming a $100 million swap trade and a current market fixed swap rate of 7.40%, based upon well-known swap valuation principles implemented in software packages such as are available from Sungard Data Systems, the receiving counterparty 701 would receive a profit of $700,000 while the paying swap counterparty 702 would have a loss of $700,000. The receiving swap counterparty 701 therefore has a credit risk exposure to the paying swap counterparty 702 as a function of $700,000, because the arrangement depends on the paying swap party 702 meeting its obligation.

FIG. 9b depicts illustrative trader relationships in which a preferred embodiment of a group of the DBAR contingent claims and exchange effects, as a practical matter, relationships among all the traders. As depicted in FIG. 9b, traders C1, C2, C3, C4, and C5 each have invested in one or more states of a group of DBAR contingent claims, with defined states S1 to S8 respectively corresponding to ranges of possible outcomes for the 10 year swap rate, one year forward. In this illustration, each of the traders has a credit risk exposure to all the others in relation to the amount of each trader's investment, how much of each investment is on margin, the probability of success of each investment at any point in time, the credit quality of each trader, and the correlation between and among the credit ratings of the traders. This information is readily available in preferred embodiments of DBAR contingent claim exchanges, for example in Trader and Account database 261 depicted in FIG. 2, and can be displayed to traders in a form similar to tabulation 720 shown in FIG. 9c, where the amount of investment margin in each state is displayed for each trader, juxtaposed with that trader's credit rating. For example, as depicted in FIG. 9c, trader C1 who has a AAA credit rating has invested $50,000 on margin in state 7 and $100,000 on margin in state 8. In a preferred embodiment, the amount of credit risk borne by each trader can be ascertained, for example using data from Market Data database 263 on the probability of changes in credit ratings (including probability of default), amounts recoverable in case of default, correlations of credit rating changes among the traders and the information displayed in tabulation 720.

To illustrate such determinations in the context of a group of DBAR contingent claims depicted in FIG. 9c, the following assumptions are made: (i) all the traders C1, C2, C3, C4 and C5 investing in the group of contingent claims have a credit rating correlation of 9; (ii) the probabilities of total default for the traders C1 to C5 are (0.001, 0.003, 0.007, 0.01, 0.02) respectively; (iii) the implied probabilities of states S1 to S8 (depicted in FIG. 9c) are (0.075, 0.05, 0.1, 0.25, 0.2, 0.15, 0.075, 0.1), respectively. A calculation can be made with these assumptions which approximates the total credit risk for all of the traders in the group of the DBAR contingent claims of FIG. 9c, following Steps (i)–(vi) previously described for using VAR methodology to determine Credit-Capital-at-Risk.

Step (i) involves obtaining for each trader the amount of margin used to make each trade. For this illustration, these data are assumed and are displayed in FIG. 9c, and in a preferred embodiment, are available from Trader and Account database 261 and Trade Blotter database 266.

Step (ii) involves obtaining data related to the probability of default and the percentage of outstanding margin loans that are recoverable in the event of default. In preferred embodiments, this information is available from such sources as the JP Morgan CreditMetrics database. For this illustration a recovery percentage of zero is assumed for each trader, so that if a trader defaults, no amount of the margin loan is recoverable.

Step (iii) involves scaling the standard deviation of returns (in units of the amounts invested) by the percentage of margin used for each investment, the probability of default for each trader, and the percentage not recoverable in the event of default. For this illustration, these steps involve computing the standard deviations of unit returns for each state, multiplying by the margin percentage in each state, and then multiplying this result by the probability of default for each trader. In this illustration, using the assumed implied probabilities for states 1 through 8, the standard deviations of unit returns are: (3.5118, 4.359, 3, 1.732, 2, 2.3805, 3.5118,3). In this illustration these unit returns are then scaled by multiplying each by (a) the amount of investment on margin in each state for each trader, and (b) the probability of default for each trader, yielding the following table:

|  | S1 | S2 | S3 | S4 | S5 | S6 | S7 | S8 |
|---|---|---|---|---|---|---|---|---|
| C1, AAA |  |  |  |  |  |  | 175.59 | 300 |
| C2, AA |  |  |  |  |  |  | 285.66 | 263.385 |
| C3, AA |  |  |  |  | 1400 | 999.81 |  |  |
| C4, A+ |  |  |  | 2598 | 2000 |  |  |  |
| C5, A | 7023.6 | 4359 | 4800 |  |  |  |  |  |

Step (iv) involves using the scaled amounts, as shown in the above table and a correlation matrix $C_s$ containing a correlation of returns between each pair of defined states, in order to compute a Credit-Capital-At-Risk. As previously discussed, this Step (iv) is performed by first arranging the scaled amounts for each trader for each state into a vector U as previously defined, which has dimension equal to the number of states (e.g., 8 in this example). For each trader, the correlation matrix $C_s$ is pre-multiplied by the transpose of U and post-multiplied by U. The square root of the result is a correlation-adjusted CCAR value for each trader, which represents the amount of credit risk contributed by each trader. To perform these calculations in this illustration, the matrix $C_s$ having 8 rows and 8 columns and 1's along the diagonal is constructed using the methods previously described:

$$C_s = \begin{pmatrix} 1 & -.065 & -.095 & -.164 & -.142 & -.12 & -.081 & -.095 \\ -.065 & 1 & -.076 & -.132 & -.115 & -.096 & -.065 & -.076 \\ -.095 & -.076 & 1 & -.192 & -.167 & -.14 & -.095 & -.111 \\ -.164 & -.132 & -.192 & 1 & -.289 & -.243 & -.164 & -.192 \\ -.142 & -.115 & -.167 & -.289 & 1 & -.21 & -.142 & -.167 \\ -.12 & -.096 & -.14 & -.243 & -.21 & 1 & -.12 & -.14 \\ -.081 & -.65 & -.095 & -.164 & -.142 & -.12 & 1 & -.095 \\ -.095 & -.076 & -.111 & -.192 & -.167 & -.14 & -.095 & 1 \end{pmatrix}$$

The vectors $U_1$, $U_2$, $U_3$, $U_4$, and $U_5$ for each of the 5 traders in this illustration, respectively, are as follows:

$$U_1 = \begin{pmatrix} 0 \\ 0 \\ 0 \\ 0 \\ 0 \\ 0 \\ 175.59 \\ 300 \end{pmatrix} U_2 = \begin{pmatrix} 0 \\ 0 \\ 0 \\ 0 \\ 0 \\ 285.66 \\ 263.385 \\ 0 \end{pmatrix} U_3 = \begin{pmatrix} 0 \\ 0 \\ 0 \\ 0 \\ 1400 \\ 999.81 \\ 0 \\ 0 \end{pmatrix} U_4 = \begin{pmatrix} 0 \\ 0 \\ 0 \\ 2598 \\ 2000 \\ 0 \\ 0 \\ 0 \end{pmatrix} U_5 = \begin{pmatrix} 7023.6 \\ 4359 \\ 4800 \\ 0 \\ 0 \\ 0 \\ 0 \\ 0 \end{pmatrix}$$

Continuing with the methodology of Step (iv) for this illustration, five matrix computations are performed as follows:

$$CCAR_i = \sqrt{U_i^T * C_s * U_i}$$

for i=1.5. The left hand side of the above equation is the credit capital at risk corresponding to each of the five traders.

Pursuant to Step (v) of the CCAR methodology as applied to this example, the five CCAR values are arranged into a column vector of dimension five, as follows:

$$w_{CCAR} = \begin{pmatrix} 332.9 \\ 364.58 \\ 1540.04 \\ 2783.22 \\ 8820.77 \end{pmatrix}$$

Continuing with this step, a correlation matrix (CCAR) with a number of rows and columns equal to the number of traders is constructed which contains the statistical correlation of changes in credit ratings between every pair of traders on the off-diagonals and 1's along the diagonal. For the present example, the final Step (vi) involves the pre-multiplication of CCAR by the transpose of $w_{CCAR}$ and the post multiplication of $C_{CCAR}$ by $w_{CCAR}$, and taking the square root of that product, as follows:

$$CCAR_{TOTAL} = \sqrt{w_{CCAR}^T * C_{CCAR} * w_{CCAR}}$$

In this illustration, the result of this calculation is:

$$CCAR_{TOTAL} = \sqrt{\begin{bmatrix} 332.9 & 364.58 & 1540.04 & 2783.22 & 8820.77 \end{bmatrix} * \begin{bmatrix} 1 & .9 & .9 & .9 & .9 \\ .9 & 1 & .9 & .9 & .9 \\ .9 & .9 & 1 & .9 & .9 \\ .9 & .9 & .9 & 1 & .9 \\ .9 & .9 & .9 & .9 & 1 \end{bmatrix} * \begin{bmatrix} 332.9 \\ 364.58 \\ 1540.04 \\ 2783.22 \\ 8820.77 \end{bmatrix}} = 13462.74$$

In other words, in this illustration, the margin total and distribution showing in FIG. 9c has a single standard deviation Credit-Capital-At-Risk of $13,462.74. As described previously in the discussion of Credit-Capital-At-Risk using VAR methodology, this amount may be multiplied by a number derived using methods known to those of skill in the art in order to obtain a predetermined percentile of credit loss which a trader could believe would not be exceeded with a predetermined level of statistical confidence. For example, in this illustration, if a trader is interested in knowing, with a 95% statistical confidence, what loss amount would not be exceeded, the single deviation Credit-Capital-At-Risk figure of $13,462.74 would be multiplied by 1.645, to yield a figure of $22,146.21.

A trader may also be interested in knowing how much credit risk the other traders represent among themselves. In a preferred embodiment, the preceding steps (i)–(vi) can be performed excluding one or more of the traders. For example, in this illustration, the most risky trader, measured by the amount of CCAR associated with it, is trader C5. The amount of credit risk due to C1 through C4 can be determined by performing the matrix calculation of Step (v) above, by entering 0 for the CCAR amount of trader C5. This yields, for example, a CCAR for traders C1 through C4 of $4,870.65.

Figure 10:
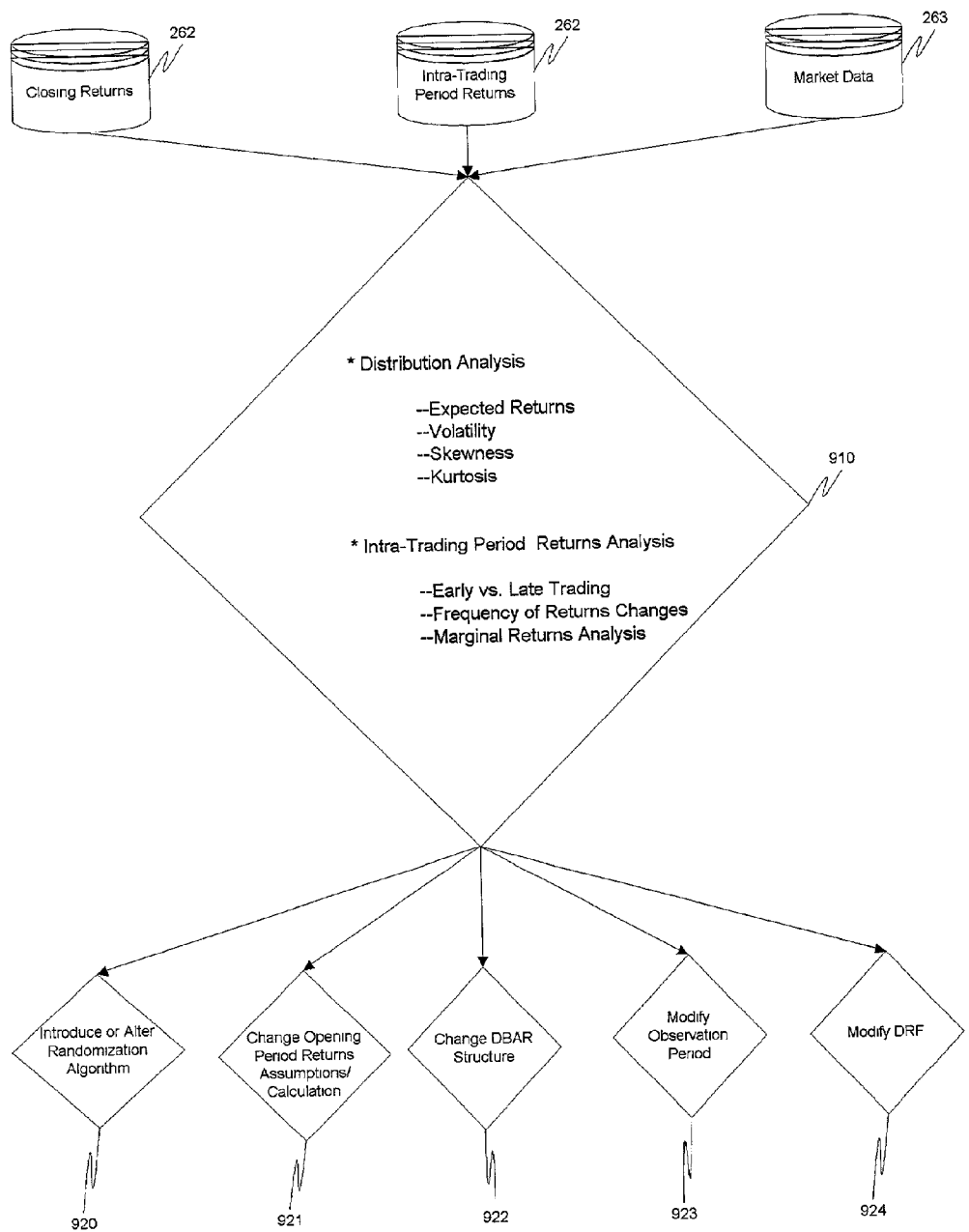
FIG. 10 is a schematic view of a feedback process for a preferred embodiment of DBAR contingent claims exchange.

FIG. 10 depicts a preferred embodiment of a feedback process for improving of a system or exchange for implementing the present invention. As depicted in FIG. 10, in a preferred embodiment, closing and intraperiod returns from Market Returns database 262 and market data from Market Data database 263 (depicted in FIG. 2) are used by process 910 for the purpose of evaluating the efficiency and fairness of the DBAR exchange. One preferred measure of efficiency is whether a distribution of actual outcomes corresponds to the distribution as reflected in the finalized returns. Distribution testing routines, such as Kolmogorov-Smirnoff tests, preferably are performed in process 910 to determine whether the distributions implied by trading activity in the form of returns across the defined states for a group of DBAR contingent claims are significantly different from the actual distributions of outcomes for the underlying events, experienced over time. Additionally, in preferred embodiments, marginal returns are also analyzed in process 910 in order to determine whether traders who make investments late in the trading period earn returns statistically different from other traders. These "late traders," for example, might be capturing informational advantages not available to early traders. In response to findings from analyses in process 910, a system according to the present invention for trading and investing in groups of the DBAR contingent claims can be modified to improve its efficiency and fairness. For example, if "late traders" earn unusually large profits, it could mean that such a system is being unfairly manipulated, perhaps in conjunction with trading in traditional security markets. Process 920 depicted in FIG. 10 represents a preferred embodiment of a counter-measure which randomizes the exact time at which a trading period ends for the purposes of preventing manipulation of closing returns. For example, in a preferred embodiment, an exchange announces a trading closing end time falling randomly between 2:00 p.m and 4:00 p.m on a given date.

As depicted in FIG. 10, process 923 is a preferred embodiment of another process to reduce risk of market manipulation. Process 923 represents the step of changing the observation period or time for the outcome. For example, rather than observing the outcome at a discrete time, the exchange may specify that a range of times for observation will used, perhaps spanning many hours, day, or weeks (or any arbitrary time frame), and then using the average of the observed outcomes to determine the occurrence of a state.

As further depicted in FIG. 10, in response to process 910, steps could be taken in process 924 to modify DRFs in order, for example, to encourage traders to invest earlier in a trading period. For example, a DRF could be modified to provide somewhat increased returns to these "early" traders and proportionately decreased returns to "late" traders. Such incentives, and others apparent to those skilled in the art, could be reflected in more sophisticated DRFs.

In a preferred embodiment depicted in FIG. 10, process 921 represents, responsive to process 910, steps to change the assumptions under which opening returns are computed for the purpose of providing better opening returns at the opening of the trading period. For example, the results of process 910 might indicate that traders have excessively traded the extremes of a distribution in relation to actual outcomes. There is nothing inherently problematic about this, since trader expectations for future possible outcomes might reflect risk preferences that cannot be extracted or analyzed with actual data. However, as apparent to one of skill in the art, it is possible to adjust the initial returns to provide better estimates of the future distribution of states, by, for example, adjusting the skew, kurtosis, or other statistical moments of the distribution.

As depicted in FIG. 10, process 922 illustrates changing entirely the structure of one or more groups of DBAR contingent claims. Such a countermeasure can be used on an ad hoc basis in response to grave inefficiencies or unfair market manipulation. For example, process 922 can include changes in the number of trading periods, the timing of trading periods, the duration of a group of DBAR contingent claims, the number of and nature of the defined state partitions in order to achieve better liquidity and less unfair market manipulation for groups of DBAR contingent claims of the present invention.

As discussed above (Section 6), in a preferred embodiment of a DBAR Digital Options Exchange ("DBAR-DOE"), traders may buy and "sell" digital options, spreads, and strips by either placing market orders or limit orders. A market order typically is an order which is unconditional, i.e., it is executed and is viable regardless of DBAR contingent claim "prices" or implied probabilities. A limit order, by contrast, typically is a conditional investment in a DBAR-DOE in which the trader specifies a condition upon which the viability or execution (i.e., finality) of the order depends. In a preferred embodiment, such conditions typically stipulate that an order is conditional upon the "price" for a given contingent claim after the trading period has been completed upon fulfillment of the trading period termination criteria. At this point, all of the orders are processed and a distribution of DBAR contingent claim "prices"—which for DBAR digital options is the implied probability that the option is "in the money"—are determined.

In a preferred embodiment of a DBAR-DOE of the present invention, limit orders may be the only order type that is processed. In a preferred embodiment, limit orders are executed and are part of the equilibrium for a group of DBAR contingent claims if their stipulated "price" conditions (i.e., probability of being in the money) are satisfied. For example, a trader may have placed limit buy order at 0.42 for MSFT digital call options with a strike price of 50. With a the limit condition at 0.42, the trader's order will be filled only if the final DBAR contingent claim distribution results in the 50 calls having a "price" which is 0.42 or "better," which, for a buyer of the call, means 0.42 or lower.

Whether a limit order is included in the final DBAR equilibrium affects the final probability distribution or "prices." Since those "prices" determine whether such limit orders are to be executed and therefore included in the final equilibrium, in a preferred embodiment an iterative procedure, as described in detail below, may be carried out until an equilibrium is achieved.

As described above, in a preferred embodiment, A DBAR-DOE equilibrium results for a contract, or group of DBAR contingent claims including limit orders, when at least the following conditions have been met:

(1) At least some buy ("sell") orders with a limit "price" greater (less) than or equal to the equilibrium "price" for the given option, spread or strip are executed or "filled."

(2) No buy ("sell") orders with limit "prices" less (greater) than the equilibrium "price" for the given option, spread or strip are executed.

(3) The total amount of executed lots equals the total amount invested across the distribution of defined states.

(4) The ratio of payouts should each constituent state of a given option, spread, or strike occur is as specified by the trader, (including equal payouts in the case of digital options), within a tolerable degree of deviation.

(5) Conversion of filled limit orders to market orders for the respective filled quantities and recalculating the equilibrium does not materially change the equilibrium.

(6) Adding one or more lots to any of the filled limit orders converted to market orders in step (5) and recalculating of the equilibrium "prices" results in "prices" which violate the limit "price" of the order to which the lot was added (i.e., no more lots can be "squeaked in" without forcing market prices to go above the limit "prices" of buy orders or below the limit "prices" of sell orders).

In a preferred embodiment, the DBAR-DOE equilibrium is computed through the application of limit and market order processing steps, multistate composite equilibrium calculation steps, steps which convert "sell" orders so that they may be processed as buy orders, and steps which provide for the accurate processing of limit orders in the presence of transaction costs. The descriptions of FIGS. 11–18 which follow explain these steps in detail. Generally speaking, in a preferred embodiment, as described in Section 6, the DBAR-DOE equilibrium including limit orders is arrived at by:

(i) converting any "sell" orders to buy orders;

(ii) aggregating the buy orders (including the converted "sell" orders) into groups for which the contingent claims specified in the orders share the same range of defined states;

(iii) adjusting the limit orders for the effect of transaction costs by subtracting the order fee from the order's limit "price;"

(iv) sorting the orders upon the basis of the (adjusted) limit order "prices" from best (highest) to worst (lowest);

(v) searching for an order with a limit "price" better (i.e., higher) than the market or current equilibrium "price" for the contingent claim specified in the order;

(vi) if such a better order can be found, adding as many incremental value units or "lots" of that order for inclusion into the equilibrium calculation as possible without newly calculated market or equilibrium "price" exceeding the specified limit "price" of the order (this is known as the "add" step);

(vii) searching for an order with previously included lots which now has a limit "price" worse than the market "price" for the contingent claim specified in the order (i.e., lower than the market "price");

(viii) removing the smallest number of lots from the order with the worse limit "price" so that the newly calculated equilibrium "price," after such iterative removal of lots, is just below the order's limit "price" (this is known as the "prune" step, in the sense that lots previously added are removed or "pruned" away);

(ix) repeating the "add" and "prune" steps until no further orders remain which are either better than the market which have lots to add, or worse than the market which have lots to remove;

(x) taking the "prices" resulting from the final equilibrium resulting from step (ix) and adding any applicable transaction fee to obtain the offer "price" for each respective contingent claim ordered and subtracting any applicable transaction fee to obtain the bid "price" for each respective contingent claim ordered; and (xi) upon fulfillment of all of the termination criteria related to the event of economic significance or state of a selected financial product, allocating payouts to those orders which have investments on the realized state, where such payouts are responsive to the final equilibrium "prices" of the orders' contingent claims and the transaction fees for such orders.

Referring to FIG. 11, illustrative data structures are depicted which may be used in a preferred embodiment to store and manipulate the data relevant to the DBAR-DOE embodiment. The data structure for a "contract" or group of DBAR contingent claims, shown in 1101, contains data members which store data which are relevant to the construction of the DBAR-DOE contract or group of claims. Specifically, the contract data structure contains (i) the number of defined states (contract.numStates); (ii) the total amount invested in the contract at any given time (contract.totalInvested); (iii) the aggregate profile trade investments required to satisfy the aggregate profile trade requests for profile trades (a type of trade which is described in detail below) (iv) the aggregate payout requests made by profile trades; (v) the total amount invested or allocated in each defined state at any given time (contract.stateTotal); (vi) the number of orders submitted at any given time (contract.numOrders); and (vii) a list of the orders, which is itself a structure containing data relevant to the orders (contract.orders[ ]).

A preferred embodiment of "order" data structures, shown in 1102 of FIG. 11, illustrates the data which are typically needed to process a trader's order using the methods of the DBAR-DOE of the present invention. Specifically, the order data structure contains the following relevant members for order processing:

(i) the amount of the order which the trader desires to transact. For orders which request the purchase ("buys") of a digital option, strip, or spread, the amount is interpreted as the amount to invest in the desired contingent claim. Thus, for buys, the order amount is analogous to the option premium for conventional options. For orders which request "sales" of a DBAR contingent claim, the order amount is to be interpreted as the amount of net payout that the trader desires to "sell." Selling a net payout in the context of a DBAR-DOE of the present invention means that the loss that a trader suffers should the digital option, strip or spread "sold" expire in the money is equal to the payout "sold." In other words, by selling a net payout, the trader is able to specify the amount of net loss that would occur should the option "sold" expire in the money. If the contingent claim "sold" expires out of the money, the trader would receive a profit equal to the net payout multiplied by the ratio of (a) the final implied probability of the option expiring in the money and (b) the implied probability of the option expiring out of the money. In other words, in a preferred embodiment of a DBAR-DOE, "buys are for premium, and sells are for net payout" which means that buy orders and sell orders in terms of the order amount are interpreted somewhat differently. For a buy order, the premium is specified and the payout, should the option expire in the money, is not known until all of the predetermined termination criteria have been met at the end of trading. For a "sell" order, in contrast, the payout to be "sold" is specified (and is equal to the net loss should the option "sold" expire in the money), while the premium, which is equal to the trader's profit should the option "sold" expire out of the money, is not known until all of the predetermined termination criteria have been met (e.g., at the end of trading);

(ii) the amount which must be invested in each defined state to generate the desired digital option, spread or strip specified in the order is contained in data member order.invest[ ];

(iii) the data members order.buySell indicates whether the order is a buy or a "sell";

(iv) the data members order.marketLimit indicates whether the order is a limit order whose viability for execution is conditional upon the final equilibrium "price" after all predetermined termination criteria have been met, or a market order, which is unconditional;

(v) the current equilibrium "price" of the digital option, spread or strip specified in the order;

(vi) a vector which specifies the type of contingent claim to be traded (order.ratio[ ]). For example, in a preferred embodiment involving a contract with seven defined states, an order for a digital call option which would expire in the money should any of the last four states occur would be rendered in the data member order.ratio[ ] as order.ratio[0,0,0,1,1,1,1] where the 1's indicate that the same payout should be generated by the multistate allocation process when the digital option is in the money, and the 0's indicate that the option is out of the money, or expires on one of the respective out of the money states. As another example in a preferred embodiment, a spread which is in the money should states either states 1,2, 6, or 7 occur would be rendered as order.ratio[1,1,0,0,0,1,1]. As another example in a preferred embodiment, a digital option strip, which allows a trader to specify the relative ratios of the final payouts owing to an investment in such a contingent claim would be rendered using the ratios over which the strip is in the money. For example, if a trader desires a strip which pays out three times much as state 3 should state 1 occur, and twice as much as state 3 if state 2 occurs, the strip would be rendered as order.ratio [3,2,1,0,0,0,0];

(vii) the amount of the order than can be executed or filled at equilibrium. For market orders, the entire order amount will be filled, since such orders are unconditional. For limit orders, none, all, or part of the order amount may be filled depending upon the equilibrium "prices" prevailing when the termination criteria are fulfilled;

(viii) the transaction fee applicable to the order;

(ix) the payout for the order, net of fees, after all predetermined termination criteria have been met; and (x) a data structure which, for trades of the profile type (described below in detail), contains the desired amount of payout requested by the order should each state occur.

FIG. 12 depicts a logical diagram of the basic steps for limit and market order processing in a preferred embodiment of a DBAR-DOE of the present invention. Step 1201 of FIG. 12 loads the relevant data into the contract and order data structures of FIG. 11. Step 1202 initializes the set of DBAR contingent claims, or the "contract," by placing initial amounts of value units (i.e., initial liquidity) in each state of the set of defined states. The placement of initial liquidity avoids a singularity in any of the defined states (e.g., an invested amount in a given defined state equal to zero) which may tend to impede multistate allocation calculations. The initialization of step 1202 may be done in a variety of different ways. In a preferred embodiment, a small quantity of value units is placed in each of the defined states. For example, a single value unit ("lot") may be placed in each defined state where the single value unit is expected to be small in relation to the total amount of volume to be transacted. In step 1202 of FIG. 12, the initial value units are represented in the vector init[contract.numStates].

In a preferred embodiment, step 1203 of FIG. 12 invokes the function convertSales( ), which converts all of the "sell" orders to complementary buy orders. The function convertSales( ) is described in detail in FIG. 15, below. After the completion of step 1203, all of the orders for contingent claims—whether buy or "sell" orders, can be processed as buy orders.

In a preferred embodiment, step 1204 groups these buy orders based upon the distinct ranges of states spanned by the contingent claims specified in the orders. The range of states comprising the order are contained in the data member order.ratio[] of the order data structure 1102 depicted in FIG. 11.

In a preferred embodiment, for each order[j] there is associated a vector of length equal to the number of defined states in the contract or group of DBAR contingent claims (contract.numStates). This vector, which is stored in order [j].ratio[ ], contains integers which indicate the range of states in which an investment is to be made in order to generate the expected payout profile of the contingent claim desired by the trader placing the order.

In a preferred embodiment depicted in FIG. 12, a separate grouping in step 1204 is required for each distinct order[j] .ratio[ ] vector. Two order[j].ratio[ ] vectors are distinct for different orders when their difference yields a vector that does not contain zero in every element. For example, for a contract which contains seven defined states, a digital put option which spans that first three states has an order[1] .ratio[ ] vector equal to (1,1,1,0,0,0,0). A digital call option which spans the last five states has an order[2].ratio[ ] vector equal to (0,0,1,1,1,1,1). Because the difference of these two vectors is equal to (1,1,0,−1,−1,−1,−1), these two orders should be placed into distinct groups, as indicated in step 1204.

In a preferred embodiment depicted in FIG. 12, step 1204 aggregates orders into relevant groups for processing. For the purposes of processing limit orders: (i) all orders may be treated as limit orders since orders without limit "price" conditions, e.g., "market orders," can be rendered as limit buy orders (including "sale" orders converted to buy orders in step 1203) with limit "prices" of 1, and (ii) all order sizes are processed by treating them as multiple orders of the smallest value unit or "lot."

The relevant groups of step 1204 of FIG. 12 are termed "composite" since they may span, or comprise, more than one of the defined states. For example, the MSFT Digital Option contract depicted above in Table 6.2.1, for example, has defined states (0,30], (30,40], (40,50], (50,60], (60, 70], (70, 80], and (80,00]. The 40 strike call options therefore span the five states (40,50], (50,60], (60, 70], (70, 80], and (80,00]. A "sale" of a 40 strike put, for example, would be converted at step 1203 into a complementary buy of a 40 strike call (with a limit "price" equal to one minus the limit "price" of the sold put), so both the "sale" of the 40 strike put and the buy of a 40 strike call would be aggregated into the same group for the purposes of step 1204 of FIG. 12.

In the preferred embodiment depicted in FIG. 12, step 1205 invokes the function feeAdjustOrders( ). This function is required so as to incorporate the effect of transaction or exchange fees for limit orders. The function feeAdjustOrders( )shown in FIG. 12, described in detail with reference to FIG. 16, basically subtracts from the limit "price" of each order the fee for that order's contingent claim. The limit "price" is then set to this adjusted, lower limit "price" for the purposes of the ensuing equilibrium calculations.

At the point of step 1206 of the preferred embodiment depicted in FIG. 12, all of the orders may be processed as buy orders (because any "sell" orders have been converted to buy orders in step 1203 of FIG. 12) and all limit "prices" have been adjusted (with the exception of market orders which, in a preferred embodiment of the DBAR-DOE of the present invention, have a limit "price" equal to one) to reflect transaction costs equal to the fee specified for the order's contingent claim (as contained in the data member order[j].fee). For example, consider the steps depicted in FIG. 12 leading up to step 1206 on three hypothetical orders: (1) a buy order for a digital call with strike price of 50 with a limit "price" of 0.42 for 100,000 value units (lots) (on the illustrative MSFT example described above); (2) a "sale" order for a digital put with a strike price of 40 with a limit price of 0.26 for 200,000 value units (lots); and (3) a market buy order for a digital spread which is in the money should MSFT stock expire greater than or equal to 40 and less than or equal to 70. In a preferred embodiment, the representations of the range of states for the contingent claims specified in the three orders are as follows: (1) buy order for 50-strike digital call: order[1].ratio[ ]=(0,0,0,1,1,1,1); (2) "sell" order for 40-strike digital put: order[2].ratio[ ]=(0,0, 1,1,1,1,1); and (3) market buy order for a digital spread in the money on the interval [40,70): order[3].ratio[ ]=(0,0,1, 1,1,1,0). Also in this preferred embodiment, the "sell" order of the put covers the states as a "converted" buy order which are complementary to the states being sold (sold states=order.ratio[ ]=(1,1,0,0,0,0,0)), and the limit "price" of the converted order is equal to one minus the limit "price" of the original order (i.e., 1−0.26=0.74). Then in a preferred embodiment, all of the orders' limit "prices" are adjusted for the effect of transaction fees so that, assuming a fee for all of the orders equal to 0.0005 (i.e., 5 basis points of notional payout), the fee-adjusted limit prices of the orders are equal to (1) for the 50-strike call: 0.4195 (0.42−0.0005); (2) for the converted sale of 40-strike put: 0.7395 (1−0.26−0.0005); and (3) for the market order for digital spread: 1 (limit "price" is set to unity). In a preferred embodiment depicted in FIG. 12, step 1204 then would aggregate these hypothetical orders into distinct groups, where orders in each group share the same range of defined states which comprise the orders' contingent claim. In other words as a result of step 1204, each group contains orders which have identical vectors in order.ratio[ ]. For the illustrative three hypothetical orders, the orders would be placed as a result of step 1204 into three separate groups, since each order ranges over distinct sets of defined states as indicated in their respective order[j].ratio[ ] vectors (i.e., (0,0,0,1,1,1,1), (0,0,1,1,1,1,1), and (0,0,1,1,1,1,0), respectively).

For the purposes of step 1206 of the preferred embodiment depicted in FIG. 12, all of the order have been converted to buy orders and have had their limit "prices" adjusted to reflect transaction fees, if any. In addition, such orders have been placed into groups which share the same range of defined states which comprise the contingent claim specified in the orders (i.e., have the same order[j].ratio[ ] vector). In this preferred embodiment depicted in FIG. 12, step 1206 sorts each group's orders based upon their fee-adjusted limit "prices," from best (highest "prices") to worst (lowest "prices"). For example, consider a set of orders in which only digital calls and puts have been ordered, both to buy and to "sell," for the MSFT example of Table 6.2.1 in which strike prices of 30, 40, 50, 60, 70, and 80 are available. A "sale" of a call is converted to a buy of a put, and a "sale" of a put is converted into a purchase of a call by step 1204 of the preferred embodiment depicted in FIG. 12. Thus, in this embodiment all of the grouped orders preferably are grouped in terms of calls and puts at the indicated strike prices of the orders.

The grouped orders, after conversion and adjustment for fees, can be illustrated in the following Diagram 1, which depicts the results of a grouping process for a set of illustrative and assumed digital puts and calls.

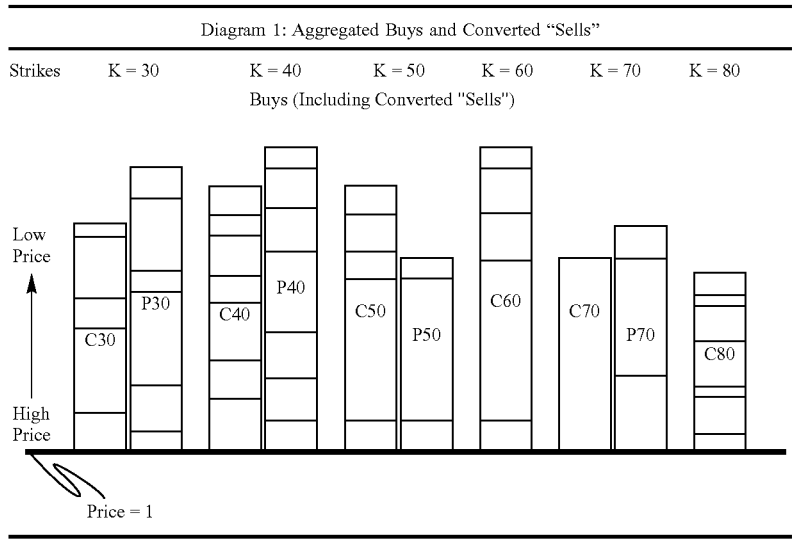

Diagram 1: Aggregated Buys and Converted "Sells"

Referring to Diagram 1 the call and put limit orders have been grouped by strike price (distinct order[j] .ratio[ ] vectors) and then ordered from "best price" to "worst," moving away from the horizontal axis. As shown in the table , "best price" for buy orders are those with higher prices (i.e., buyers with a higher willingness to pay). Diagram 1 includes "sales" of puts which have been converted to complementary purchases of calls and "sales" of calls which have been converted to complementary purchases of puts, i.e., all orders for the purposes of Diagram 1 may be treated as buy orders.

For example, as depicted in Diagram 1 the grouping which includes the purchase of the 40 calls (labeled "C40") would also include any converted "sales" of the 40 puts (i.e., "sale" of the 40 puts has an order.ratio[ ] vector which originally is equal to (1,1,0,0,0,0,0) and is then converted to the complementary order.ratio[ ] vector (0,0,1,1,1,1,1) which corresponds to the purchase of a 40-strike call).

Diagram 1 illustrates the groupings which span distinct sets of defined states with a vertical bar. The labels within each vertical bar in Diagram 1 such as "C50", indicate whether the grouping corresponds to a call ("C") or put ("P") and the relevant strike price, e.g., "C50" indicates a digital call option with strike price of 50.

The horizontal lines within each vertical bar shown on Diagram 1 indicates the sorting by price within each group. Thus, for the vertical bar above the horizontal axis marked "C50" in Diagram 1, there are five distinct rectangular groupings within the vertical bar. Each of these groupings is an order for the digital call options with strike price 50 at a particular limit "price." By using the DBAR methods of the present invention, there is no matching of buyers and "sellers," or buy orders and "sell" orders, which is typically required in the traditional markets in order for transactions to take place. For example, Diagram 1 illustrates a set of orders which contains only buy orders for the digital puts struck at 70 ("P70").

In a preferred embodiment of a DBAR-DOE of the present invention, the aggregation of orders into groups referred to by step 1204 of the preferred embodiment depicted in FIG. 12 corresponds to DBAR digital options, spread, and strip trades which span distinct ranges of the defined states. For example, the 40 puts and the 40 calls are represented as distinct state sets since they span or comprise different ranges of defined states.

Proceeding with the next step of the preferred embodiment depicted in FIG. 12, step 1207 queries whether there is at least a single order which has a limit "price" which is "better" than the current equilibrium "price" for the ordered option. In a preferred embodiment for the first iteration of step 1207 for a trading period for a group of DBAR contingent claims, the current equilibrium "prices" reflect the placement of the initial liquidity from step 1202. For example, with the seven defined states of the MSFT example described above, one value unit may have been initialized in each of the seven defined states. The "prices" of the 30, 40, 50, 60, 70, and 80 digital call options, are therefore 6/7, 5/7, 4/7, 3/7, 2/7, and 1/7, respectively. The initial "prices" of the 30, 40, 50, 60, 70, and 80 digital puts are 1/7, 2/7, 3/7, 4/7, 5/7, 6/7, respectively. Thus, step 1207 may identify a buy order for a 60 digital call option with limit "price" greater than 3/7 (0.42857) or a "sell" order, for example, for the 40 digital put option with limit "price" less than 2/7 (0.28571) (which would be converted into a buy order of the 40 calls with limit "price" of 5/7 (i.e, 1−2/7)). In a preferred embodiment an order's limit "price" or implied probability would take into account transaction or exchange fees, since the limit "prices" of the original orders would have been already adjusted by the amount of the transaction fee (as contained in order[j].fee) from step 1205 of FIG. 12, where the function fee Adjust Orders( ) is invoked.

As discussed above, transaction or exchange fees, and consequently bid/offer "prices" or implied probability, can be computed in a variety of ways. In a preferred embodiment, such fees are computed as a fixed percentage of the total amount invested over all of the defined states. The offer (bid) side of the market for a given digital option (or strip or spread) is computed in this embodiment by taking the total amount invested less (plus) this fixed percentage, and dividing it by the total amount invested over the range of states comprising the given option (or strip or spread). This reciprocal of this quantity then equals the offer (bid) "price" in this embodiment. In another preferred embodiment, transaction fees are computed as a fixed percentage of the payout of a given digital option, strip or spread. In this embodiment, if the transaction fee is f basis points of the payout, then the offer (bid) price is equal to the total amount invested over the range of state comprising the digital option (strip or spread) plus (minus) f basis points. For example, assume that f is equal to 5 basis points or 0.0005. Thus, the offer "price" of an in-the-money option whose equilibrium "price" is 0.50 might be equal to 0.50+0.0005 or 0.5005 and the bid "price" equal to 0.50−0.0005 or 0.4995. An out-of-the-money option having an equilibrium "price" equal to 0.05 might therefore have an offer "price" equal to 0.05+0.0005 or 0.0505 and a bid "price" equal to 0.05−0.0005 or 0.0495. Thus, the embodiment in which transaction fees are a fixed percentage of the payout yields bid/offer spreads which are a higher percentage of the out-of-the-money option "prices" than of the in-the-money option prices.

The bid/offer "prices" affect not only the costs to the trader of using a DBAR digital options exchange, but also the nature of the limit order process. Buy limit orders (including those buy orders which are converted "sells") must be compared to the offer "prices" for the option, strip or spread contained in the order. Thus a buy order has a limit "price" which is "better" than the market if the limit "price" condition is greater than or equal to the offer side of the market for the option specified in the order. Conversely, a "sell" order has a limit "price" which is better than the market if the limit "price" condition is less than or equal to the bid side of the market for the option specified in the order. In the preferred embodiment depicted in FIG. 12, the effect of transaction fees is captured by the adjustment of the limit "prices" in step 1205, in that in equilibrium an order should be filled only if its limit "price" is better than the offer "price", which includes the transaction fee.

In the preferred embodiment depicted in FIG. 12, if step 1207 identifies at least one order which has a limit "price" better than the current set of equilibrium "prices" (whether the initial set of "prices" upon the first iteration or the "prices" resulting from subsequent iterations) then step 1208 invokes the function fillRemoveLots. The function fillRemoveLots, when called with the first parameter equal to one as in step 1208, will attempt to add lots from the order identified in step 1207 which has limit "price" better than the current set of equilibrium prices. The fillRemoveLots function is described in detail in FIG. 17, below. Basically, the function finds the number of lots of the order than can be added for a buy order (including all "sale" order converted to buy orders) such that when a new equilibrium set of "prices" is calculated for the group of DBAR contingent claims with the added lots (by invoking the function compEq( ) of FIG. 13), no further lots can be added without causing the new equilibrium "price" with those added lots to exceed the limit "price" of the buy order being filled.

In preferred embodiments, finding the maximum amount of lots to add so that the limit "price" is just better than the new equilibrium is accomplished using the method of binary search, as described in detail with reference to FIG. 17, below. Also in preferred embodiments the step of "filling" lots refers to the execution, incrementally and iteratively, using the method of binary search, of that part of the order quantity which can be executed or "filled." In a preferred embodiment, the filling of a buy order therefore requires the testing, via the method of binary search, to determine whether additional unit lots can be added over the relevant range of defined states spanning the particular option for the purposes of equilibrium calculation, without causing the resulting equilibrium "price" for the order to exceed the limit "price."

Figure 13:
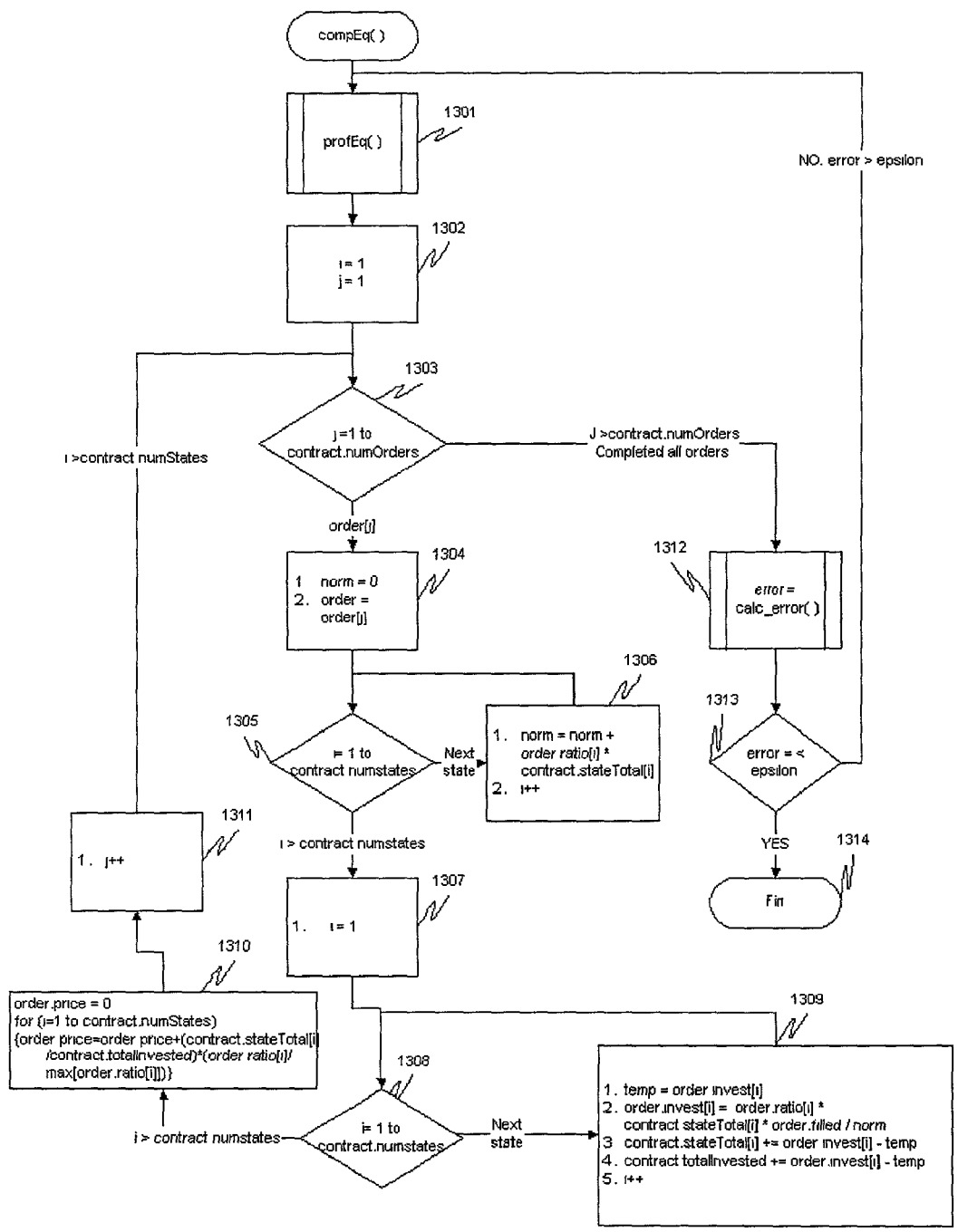
FIG. 13 depicts a preferred embodiment of a method for calculating a multistate composite equilibrium in a Demand-Based Adjustable Return Digital Options Exchange of the present invention.

In the preferred embodiment depicted in FIG. 12, step 1209 is executed following step 1208 if lots are filled, or following step 1207 if no orders were identified with limit "prices" which are better than the current equilibrium "prices." Step 1209 of FIG. 12 identifies orders filled at least partially at limit "prices" which are worse (i.e., less) than the current equilibrium "prices." In preferred embodiments, the filling of lots in step 1208, if performed prior to step 1209, involves the iterative recalculation of the equilibrium "prices" by invoking the function compEq( ), which is described in detail with reference to FIG. 13.

In the preferred embodiment depicted in FIG. 12, the equilibrium computations in step 1208 performed in the process of filling lots may cause a change in the equilibrium "prices" which in turn may cause previously filled orders to have limit "prices" which are now worse (i.e., lower) than the new equilibrium. Step 1209 identifies these orders. In order for the order to comply with the equilibrium, its limit "price" may not be worse (i.e., less) than the current equilibrium. Thus, in a preferred embodiment of the DBAR-DOE of the present invention, lots for such an order are removed. This is performed in step 1210 with the invocation of function fillRemoveLots. Similar to step 1208, in a preferred embodiment the processing step 1210 uses the method of binary search to find the minimum amount of lots to be removed from the quantity of the order that has already been filled such that the order's limit "price" is no longer worse (i.e., less) than the equilibrium "price," which is recomputed iteratively. For buy orders and all buy orders converted from "sell" orders processed in step 1210, a new filled quantity is found which is smaller than the original filled quantity so that the buy order's new equilibrium "price" does not exceed the buy order's specified limit "price."

The logic of steps 1207–1210 of FIG. 12 may be summarized as follows. An order is identified which can be filled (step 1207), i.e., an order which has a limit "price" better than the current equilibrium "price" for the option specified in the order. If such an order is identified, it is filled to the maximum extent possible without violating the limit "price" condition of the order itself (step 1208). A buy order's limit "price" condition is violated if an incremental lot is filled which causes the equilibrium "price," taking account of this additional lot, to exceed the buy order's limit "price." Any previously filled orders may now have limit order conditions which are violated as a result of lots being filled in step 1208. These orders are identified, one order at a time, in step 1209. The filled amounts of such orders with violated limit order "price" conditions are reduced or "pruned" so that the limit order "price" conditions are no longer violated. This "pruning" is performed in step 1210. The steps 1207 to 1210 constitute an "add and prune" cycle in which an order with a limit "price" better than the equilibrium of the current iteration has its filled amount increased, followed by the reduction or pruning of any filled amounts for orders with a limit "price" condition which is worse than the equilibrium "price" of the current iteration. In preferred embodiment, the "add and prune" cycle continues until there remain no further orders with limit "price" conditions which are either better or worse than the equilibrium, i.e., no further adding or pruning can be performed.

When no further adding or pruning can be performed, an equilibrium has been achieved, i.e., all of the orders with limit "prices" worse than the equilibrium are not executed and at least some part of all of the orders with limit "prices" better or equal to the equilibrium are executed. In the preferred embodiment of FIG. 12, completion of the "add and prune" cycle terminates limit and market order processing as indicated in step 1211. The final "prices" of the equilibrium calculation resulting from the "add and prune" cycle of steps 1207–1210 can be designated as the mid-market "prices." The bid "prices" for each contingent claim are computed by subtracting a fee from the mid-market "prices," and the offer "prices" are computed by adding a fee to the mid-market "prices." Thus, equilibrium mid-market, bid, and offer "prices" may then be published to traders in a preferred embodiment of a DBAR-DOE.

Referring now to the preferred embodiment of a method of composite multistate equilibrium calculation depicted FIG. 13, the function compEq( ), which is a multistate allocation algorithm, is described. In a preferred embodiment of a DBAR-DOE, digital options span or comprise more than one defined state, with each of the defined states corresponding to at least one possible outcome of an event of economic significance or a financial instrument. As depicted in Table 6.2.1 above, for example, the MSFT digital call option with strike price of 40 spans the five states above 40 or (40,50], (50,60], (60, 70], (70, 80], and (80,00]. To achieve a profit and loss scenario that traders conventionally expect from a digital option, in a preferred embodiment of the present invention a digital option investment of value units designates a set of defined states and a desired return-on-investment from the designated set of defined states, and the allocation of investments across these states is responsive to the desired return-on-investment from the designated set of defined states. For a digital option, the desired return on investment is often expressed as a desire to receive the same payout regardless of the state which occurs among the set of defined states which comprise the digital option. For instance, in the illustrative example of the MSFT stock prices shown in FIG. 6.2.1, a digital call option with strike price of 40 would be, in a preferred embodiment, allocated the same payout irrespective of which state of the five states above 40 occurs.

In preferred embodiments of the DBAR-DOE of the present invention, traders who invest in digital call options (or strips or spreads) specify a total amount of investment to be made (if the amount is for a buy order) or notional payout to be "sold" (if the amount is for a "sell" order). In a preferred embodiment, the total investment is then allocated using the compEq( ) multistate allocation method depicted in FIG. 13. In another preferred embodiment, the total amount of the payout to be received, should the digital option expire in the money, is specified by the investor, and in a preferred embodiment the investment amount required to produce such payouts are computed by the multistate allocation method depicted in FIG. 14.

Figure 14:
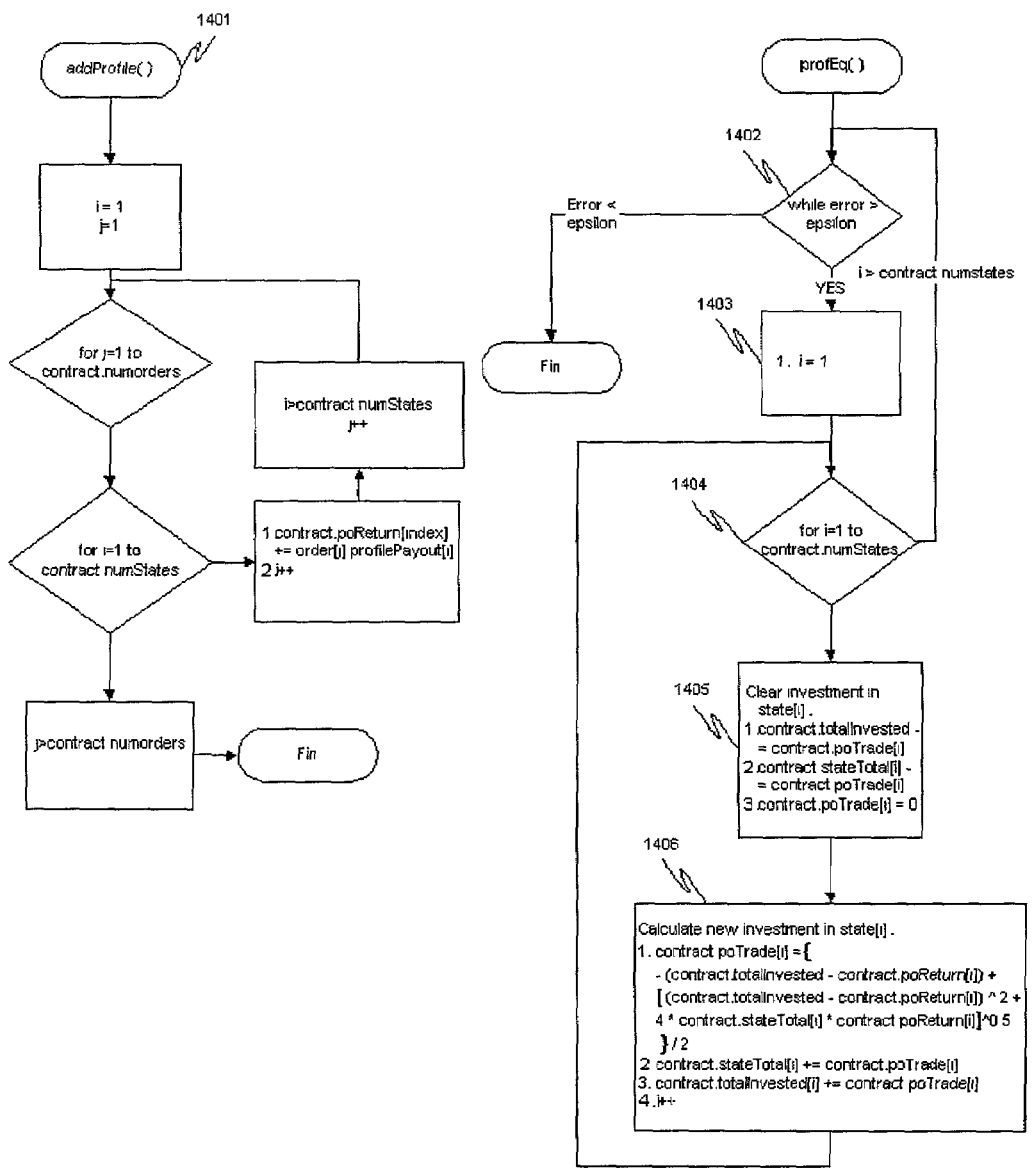
FIG. 14 depicts a preferred embodiment of a method for calculating a multistate profile equilibrium in a Demand-Based Adjustable Return Digital Options Exchange of the present invention.

In either embodiment, the investor specifies a desired return on investment from a designated set of defined states. A return on investment is the amount of value units received from the investment less the amount of value units invested, divided by the amount invested. In the embodiment depicted in FIG. 13, the amount of value units invested is specified and the amount of value units received, or the payout from the investment, is unknown until the termination criteria are fulfilled and the payouts are calculated. In the embodiment depicted in FIG. 14, the amount of value units to be paid out is specified but the investment amount to achieve that payout it is unknown until the termination criteria are fulfilled. The embodiment depicted in FIG. 13 is known as a composite trade, and the embodiment depicted in FIG. 14 is known as a profile trade.

Referring back to FIG. 13, step 1301 invokes a function call to the function profEq( ). This function handles those types of trades in which a desired return-on-investment for a designated set of defined states is specified by the trader indicating the payout amount to be received should any of the designated set of defined states occur. For example, a trader may indicate that a payout of $10,000 should be received should the MSFT digital calls stuck at 40 finish in the money. Thus, if MSFT stock is observed at the expiration date to have a price of 45, the investor receives $10,000. If the stock price were to be below 40, the investor would lose the amount invested, which is calculated using the function profEq( ). This type of desired return-on-investment trade is referred to as a multistate profile trade, and FIG. 14 depicts the detailed logical steps for a preferred embodiment of the profEq( ) function. In preferred embodiments of a DBAR-DOE of the present invention, there need not be any profile trades.

Referring back to FIG. 13, step 1302 initializes control loop counter variables. Step 1303 indicates a control loop which executes for each order. Step 1304 initializes the variable "norm" to zero and assigns the order being processed, order[j], to the order data structure. Step 1305 begins a control loop that executes for each of defined states which comprise a given order. For example, the MSFT digital call option with strike of 40 illustrated in Table 6.2.1 spans the five states which range from 40 and higher.

In the preferred embodiment depicted in FIG. 13, step 1306 executes while the number of states in the order are being processed to calculate of the variable norm, which is the weighted sum of the total investments for each state of the range of defined states which comprise the order. The weights are contained in order.ratio[i], which is a vector type member of the order data structure illustrated in FIG. 11 as previously described. For digital call options, whose payout is the same regardless of the defined state which occurs over the range of states for which the digital option is in the money, all of the elements of order.ratio[ ] are equal over the range. For trades involving digital strips, the ratios in order.ratio[ ] need not be equal. For example, a trader may desire a payout which is twice as great should a range of states occur compared to another range of states. The data member order.ratio[ ] would therefore contain information about this desired payout ratio.

In the preferred embodiment depicted in FIG. 13, after all of the states in the range of states spanning the order have been processed, the control loop counter variable is re-initialized in step 1307, step 1308 begins another control loop the defined states spanning the order. In preferred embodiments, step 1309 calculates the amount of the investment specified by the order which must be invested in each defined state spanning the range of states for the order. Sub-step 2 of step 1309 contains the allocation which is assigned to order.invest[i], for each of these states. This sub-step allocates the amount to be invested in an in-the-money state in proportion to the existing total investment in that state divided by the sum of all of the investment in the in-the-money states. Sub-steps 3 and 4 of step 1309 add this allocation to the investment totals for each state (contract.stateTotal[state]) and for all of the states (contract.totalInvested) after subtracting out the allocation from the previous iteration (temp). In this manner, the allocation steps proceed iteratively until a tolerable level of error convergence is achieved.

After all of the states in the order have been allocated in 1309, step 1310 of the preferred embodiment depicted in FIG. 13 calculates the "price" or implied probability of the order. The "price" of the order is equal to the vector product of the order ratio (a vector quantity contained in order.ratio[

]) and the total invested in each state (a vector quantity contained in contract.stateTotal[ ]) divided by the total amount invested over all of the defined states (contained in contract.totalInvested), after normalization by the maximum value in the vector order.ratio[ ]. As further depicted in step 1310 the resulting "price" for the digital option, strip, or spread is stored in the price member of the order data structure (order.price).

In the preferred embodiment of the method of multistate composite equilibrium calculation for a DBAR-DOE of the present invention. Step 1311 moves the order processing step to the next order. After all of the orders have been processed, step 1312 of the preferred embodiment depicted in FIG. 13 calculates the level of error, which is based upon the percentage deviations of the payouts resulting from the previous iteration to the payouts expected by the trader. If the error is tolerably low (e.g., epsilon=$10^{-8}$), the compEq( ) function terminates (step 1314). If the error is not tolerably low, then compEq( ) is iterated again, as shown in step 1313.

FIG. 14 depicts a preferred embodiment of a method of multistate profile equilibrium calculation in a DBAR-DOE of the present invention. As shown in FIG. 14, when a new multistate profile trade is added, the function addProfile( ) of step 1401 adds information about the trade to the data structure members of the contract data structure, as described above in FIG. 11. The first step of the profEq( ) function, step 1402, shows that the profEq( ) function proceeds iteratively until a tolerable level of convergence is achieved, i.e., an error below some error parameter epsilon (e.g., $10^{-8}$). If the error objective has not been met, in a preferred embodiment all of the previous allocations from any prior invocations of profEq( ) are subtracted from the total investments in each state and from the total investment for all of the states, as indicated in step 1405. This is done for each of the states, as indicated in control loop 1404 after initialization of the loop counter (step 1403).

in a preferred embodiment, the next step, step 1406, computes the investment amount necessary to generate the desired return-on-investment with a fixed payout profile. Sub-step 1 of 1406 shows that the investment amount required to achieve this payout profile for a state is a positive solution to the quadratic equation CDRF 3 set forth in Section 2.4 above. In the preferred embodiment depicted in FIG. 14, the solution, contract.poTrade[i], is then added to the total investment amount in that state as indicated in sub-step 2 of step 1406. The total investment amount for all of the states is also increased by contract.poTrade[i], and sub-step 4 of 1406 increments the control loop counter for the number of states. In the preferred embodiment depicted in FIG. 14, the calculation of the quadratic equation of sub-step 3 of step 1406 is completed for each of the states, and then repeated iteratively until a tolerable level of error is achieved.

Figure 15:
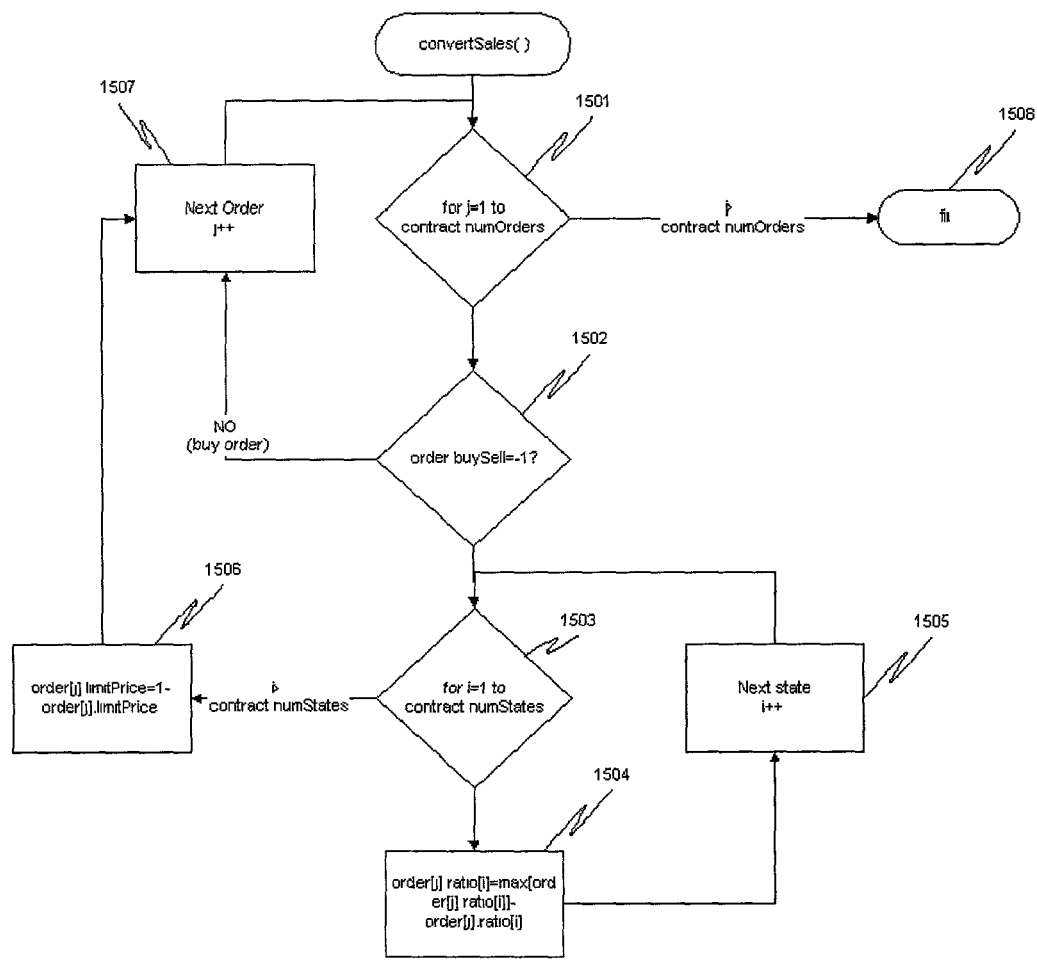
FIG. 15 depicts a preferred embodiment of a method for converting "sale" orders to buy orders in a Demand-Based Adjustable Return Digital Options Exchange of the present invention.

FIG. 15 depicts a preferred embodiment of a method for converting "sell" orders to buy orders in a DBAR-DOE of the present invention. The method is contained in the function convertSales( ), called within the limit and market order processing steps previously discussed with reference to FIG. 11.

As discussed above in a preferred embodiment of a DBAR-DOE, buy orders and "sell" order are interpreted somewhat differently. The amount of a buy order (as contained in the data structure member order.orderAmount) is interpreted as the amount of the investment to be allocated over the range of states spanning the contingent claim specified in the order. For example, a buy order for 100,000 value units for an MSFT digital call with strike price of 60 (order.ratio[ ]=(0,0,0,0,1,1,1) in the MSFT stock example depicted in Table 6.2.1) will be allocated among the states comprising the order so that, in the case of a digital option, the same payout is received regardless of which constituent state of the range of states is realized. For a "sell" order the order amount (as also contained in the member data structure order.orderAmount) is interpreted to be the amount which the trader making the sale stands to lose if the contingent claim (i.e., digital option, spread, or strip) being "sold" expires in the money (i.e., any of the constituent states comprising the sale order is realized). Thus, the "sale" order amount is interpreted as a payout (or "notional" or "notional payout") less the option premium "sold," which is the amount that may be lost should the contingent claim "sold" expire in the money (assuming, that is, the entire order amount can be executed if the order is a limit order). A buy order, by contrast, has an order amount which is interpreted as an investment amount which will generate a payout whose magnitude is known only after the termination of trading and the final equilibrium prices finalized, should the option expire in the money. Thus, a buy order has a trade amount which is interpreted as in investment amount or option "premium" (using the language of the conventional options markets) whereas a DBAR-DOE "sell" order has an order amount which is interpreted to be a net payout equal to the gross payout lost, should the option sold expire in the money, less the premium received from the "sale." Thus, in a preferred embodiment of a DBAR-DOE, buy orders have order amounts corresponding to premium amounts, while "sell" orders have order amounts corresponding to net payouts.

One advantage of interpreting the order amount of the buy and "sell" orders differently is to facilitate the subsequent "sale" of a buy order which has been executed (in all or part) in a previous trading period. In the case where a subsequent trading period on the same underlying event of economic significance or state of a financial product is available, a "sale" may be made of a previously executed buy order from a previous and already terminated and finalized trading period, even though the observation period may not be over so that it is not known whether the option finished in the money. The previously executed buy order, from the earlier and finalized trading period, has a known payout amount, should the option expire in the money. This payout amount is known since the earlier trading period has ended and the final equilibrium "prices" have been calculated. Once a subsequent trading period on the same underlying event of economic significance is open for trading (if such a trading period is made available), a trader who has executed the buy order may then sell it by entering a "sell" order with an order. The amount of the "sell" order can be a function of the finalized payout amount of the buy order (which is now known with certainty, should the previously bought contingent claim expire in the money), and the current market price of the contingent claim being "sold." Setting this order amount of the "sale" equal to y, the trader may enter a "sale" such that y is equal to:

$$y=P*(1-q)$$

where P is the known payout from the previously finalized buy order from a preceding trading period, and q is the "price" of the contingent claim being "sold" during the subsequent trading period. In preferred embodiments, the "seller" of the contingent claim in the second period may enter in a "sale" order with order amount equal to y and a limit "price" equal to q. In this manner the trader is assured of "selling" his claim at a "price" no worse than the limit "price" equal to q.

Turning now to the preferred embodiment of a method for converting "sale" orders to buy orders depicted in FIG. 15, in step 1501 a control loop is initiated of orders (contract-.numOrders). Step 1502 queries whether the order under consideration in the loop is a buy (order.buySell=1) or a "sell" order (order.buysell=−1). If the order is a buy order then no conversion is necessary, and the loop is incremented to the next order as indicated in step 1507.

If, on the other hand, the order is a "sell" order, then in preferred embodiments of the DBAR-DOE of the present invention conversion is necessary. First, the range of states comprising the contingent claim must be changed to the complement range of states, since a "sale" of a given range of states is treated as equivalent to a buy order for the complementary range of states. In the preferred embodiment of FIG. 15, step 1503 initiates a control loop to execute for each of the defined states in the contract (contract.num-States), step 1504 does the switching of the range of states sold to the complementary states to be bought. This is achieved by overwriting the original range of states contained in order[j].ratio[ ] to a complement range of states. In this preferred embodiment, the complement is equal to the maximum entry for any state in the original order[ ].ratio[ ] vector (for each order) minus the entry for each state in order[j].ratio[ ]. For example, if a trader has entered an order to sell 50-strike puts in MSFT example depicted in Table 6.2.1, then originally order.ratio[ ] is the vector (1,1,1,0,0, 0,0), i.e., 1's are entered which span the states (0,30], (30,40], (40,50] and zeroes are entered elsewhere. To obtain the complement states to be bought, the maximum entry in the original order.ratio[ ] vector for the order is obtained. For the put option to be "sold," the maximum of (1,1,1,0,0,0,0) is clearly 1. Each element of the original order.ratio[ ] vector is then subtracted from the maximum to produce the complementary states to be bought. For this example, the result of this calculation is (0,0,0,1,1,1,1), i.e., a purchase of a 50-strike call is complementary to the "sale" of the 50-strike put. If for example, the original order was for a strip in which the entries in order.ratio[] are not equal, in a preferred embodiment the same calculation method would be applied. For example, a trader may desire to "sell" a payout should any of the same three states which span the 50-strike put occur, but desires to sell a payout of three times the amount of state (40,50] should state (0,30] occur and sell twice the payout of (40,50] should state (30,40] occur. In this example, the original order.ratio for the "sale" of a strip is equal to (3,2,1,0,0,0,0). The maximum value for any state of this vector is equal to 3. The complementary buy vector is then equal to each element of the original vector subtracted from the maximum, or (0,1,2,3,3,3,3,). Thus, a "sale" of the strip (3,2,1,0,0,0,0) is revised to a purchase of a strip with order.ratio[ ] equal to (0,1,2,3,3,3,3).

In the preferred embodiment depicted in FIG. 15, after the loop has iterated through all of the states (the state counter is incremented in step 1505) the loop terminates. After looping through all of the states, the limit order "price" of the "sale" must be revised so that it may be converted into a complementary buy. This step is depicted in step 1506, where the revised limit order "price" for the complementary buy is equal to one minus the original limit order "price" for the "sell". After finishing the switching of each state in order.ratio[ ] and setting the limit order "price" for each order, the loop which increments over the orders goes to the next order, as indicated in step 1507. The conversion of "sell" orders to buy orders terminates when all orders have been processed as indicated in step 1508.

Figure 16:
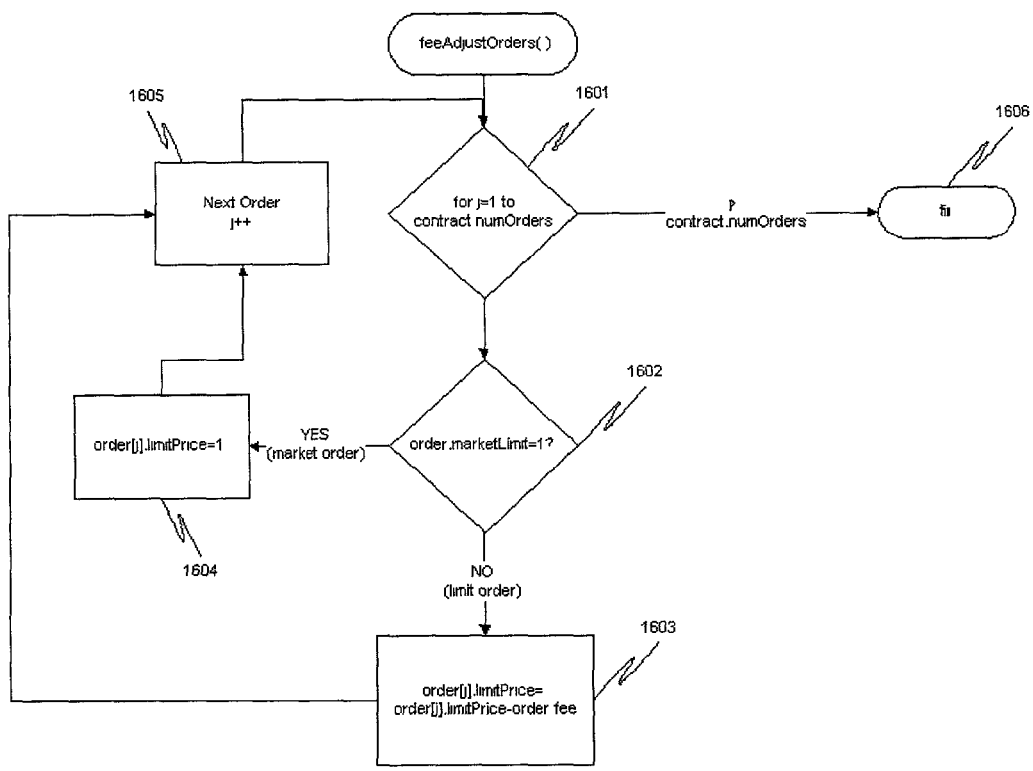
FIG. 16 depicts a preferred embodiment of a method for adjusting implied probabilities for demand-based adjustable return contingent claims to account for transaction or exchange fees in a Demand-Based Adjustable Return Digital Options Exchange of the present invention.

FIG. 16 depicts a preferred embodiment of a method for adjusting limit orders in the presence of transaction fees in a DBAR-DOE of the present invention. The function which implements this embodiment is feeAdjustOrders( ), and is invoked in the method for processing limit and market orders depicted and discussed with reference to FIG. 11. Limit order are adjusted for transaction fees to reflect the preference that orders (after all "sell" orders have been converted to buy orders) should only be executed when the trader specifies that he is willing to pay the equilibrium "price," inclusive of transaction fees. The inclusion of fees in the "price" produces the "offer" price. Therefore, in a preferred embodiment, all or part of an order with a limit "price" which is greater than or equal to the "offer" price should be executed in the final equilibrium, and an order with a limit "price" lower than the "offer" price of the final equilibrium should not be executed at all. To ensure that this equilibrium condition obtains, in a preferred embodiment the limit order "prices" specified by the traders are adjusted for the transaction fee assessed for each order before they are processed by the equilibrium calculation, specifically the "add and prune" cycle discussed in Section 6 above and with reference to FIG. 17 below, which involves the recomputation of equilibrium "prices." Thus, the "add and prune" cycle is performed with the adjusted limit order "prices."

Referring back to FIG. 16, which discloses the steps of the function feeAdjustOrders( ), step 1601 initiates a control loop for each order in the contract (contract.numOrders). The next step 1602 queries whether the order being considered is a market order (order.marketLimit=1) or a limit order (order.marketLimit=0). A market order is unconditional and in a preferred embodiment need not be adjusted for the presence of transaction fee, i.e., it is executed in full regardless of the "offer" side of the market. Thus, if the order is market order, its "limit" price or implied probability is set equal to one as shown in step 1604 (order[j].limitPrice=1). If the order being processed in the control loop of step 1601 is a limit order, then step 1603 revises the initial limit order by setting the new limit order "price" equal to the initial limit order "price" less the transaction fee (order.fee). In a preferred embodiment, this function is called after all "sell" orders have been converted to buy orders, so that the adjustment for all orders may involve only making the buy orders less likely to be executed by adjusting their respective limit "prices" down by the amount of the fee. After each adjustment is made, the loop over the orders is incremented, as shown in step 1605. After all of the orders have been processed, the function feeAdjustOrders( ) terminates as shown in step 1606.

FIG. 17 discloses a preferred embodiment of a method for filling or addition and removal of lots in a DBAR-DOE of the present invention. The function fillRemoveLots( ), which is invoked in the central "add and prune" cycle of FIG. 1, is depicted in detail in FIG. 17. The function fillRemoveLots( ) implements the method of binary search to determine the appropriate number of lots to add (or "fill") or remove. in the preferred embodiment depicted in FIG. 17, lots are filled or added when the function is called with the first parameter equal to 1 and lots are removed when the function is called with the first parameter equal to zero. The first step of function fillRemoveLots( ), is indicated in step 1701. If lots are to be removed, then the method of binary search will try to find the minimum number of lots to be removed such that the limit "price" of the order (order.limitPrice) is greater than or equal to the recalculated equilibrium "price" (order- .price). Thus, if orders are to be removed, step 1701 sets the maxPremium variable to the number of lots which are currently filled in the order, and sets the minPremium variable to zero. In other words, in preferred embodiments in a first iteration the method of binary search will try to find a new number of lots somewhere on the interval between the currently filled number of lots and zero, so that the number of lots to be filled after the step is completed is the same or lower than the number of lots currently filled. If lots are to be filled or added, then the method of binary search sets the maxPremium variable to the order amount (order.amount) since this is the maximum amount that can be filled for any given order, and the minimum amount equal to the currently filled amount (minPremium=order.filled). That is, if lots are to be filled or added, the method of binary search will try to find the maximum number of lots that can be filled or added so that the new number of filled between the current number of lots filled and the number of lots requested in the order.

In the preferred embodiment depicted in FIG. 17, step 1702 bisects the intervals for binary search created in step 1701 by setting the variable midPremium equal to the mid point of the interval created in step 1701. A calculation of equilibrium "prices" or implied probabilities for the group of DBAR contingent claims equilibrium calculation will then be attempted with the number of lots for the relevant orders reflected by this midpoint, which will be greater than the current amount filled if lots are to be added and less than the current amount filled if lots are to be removed.

Step 1703 queries whether any change (to within a tolerance) in the mid-point of the interval has occurred between the last and current iteration of the process. If no change has occurred, a new order amount that can be filled has been found and is revised in step 1708, and the function fillRemoveLots( ) terminates in step 1709. If the is different from the midpoint of last iteration, then the new equilibrium is calculated with the greater (in the case of addition) or lower (in the case of removal) number of lots as specified in step 1702 of the binary search. In a preferred embodiment the equilibrium "prices" are calculated with these new fill amounts by the multistate allocation function, compEq( ), which is described in detail with reference to FIG. 13. After the invocation of the function compEq( ), each order will have a current equilibrium "price" as reflected in the data structure member order.price. The limit "price" of the order under consideration (order[j])) is then compared to the new equilibrium "price" of the order under consideration (order [j].price), as shown in step 1705. If the limit "price" is worse, i.e., less than the new equilibrium or market "price," then the binary search has attempted to add too many lots and tries again with fewer lots. The lesser number of lots with which to attempt the next iteration is obtained by setting the new top end of the interval being bisected to the number of lots just attempted (which turned out to be too large). This step is depicted in step 1706 of the preferred embodiment of FIG. 17. With the interval thus redefined and shifted lower, a new midpoint is obtained in step 1702, and a new iteration is performed. If, in step 1705, the newly calculated equilibrium "price" is less than or equal to the order's limit price, then the binary search will attempt to add or fill additional lots. In the preferred embodiment depicted in FIG. 17, the higher number of lots to add is obtained in step 1707 by setting the lower end of the search interval equal to the number of lots for which an equilibrium calculation was performed in the previous iteration. A new midpoint of the newly shifted higher interval is then obtained in step 1702, so that the another iteration of the search may be performed with a higher number of lots. As previously indicated, once further iterations no longer change the number of lots that are filled, as indicated in step 1703, the number of lots of the current iteration is stored, as indicated in step 1708, and the function fillRemoveLots( ) terminates, as indicated in step 1709.

Figure 18:
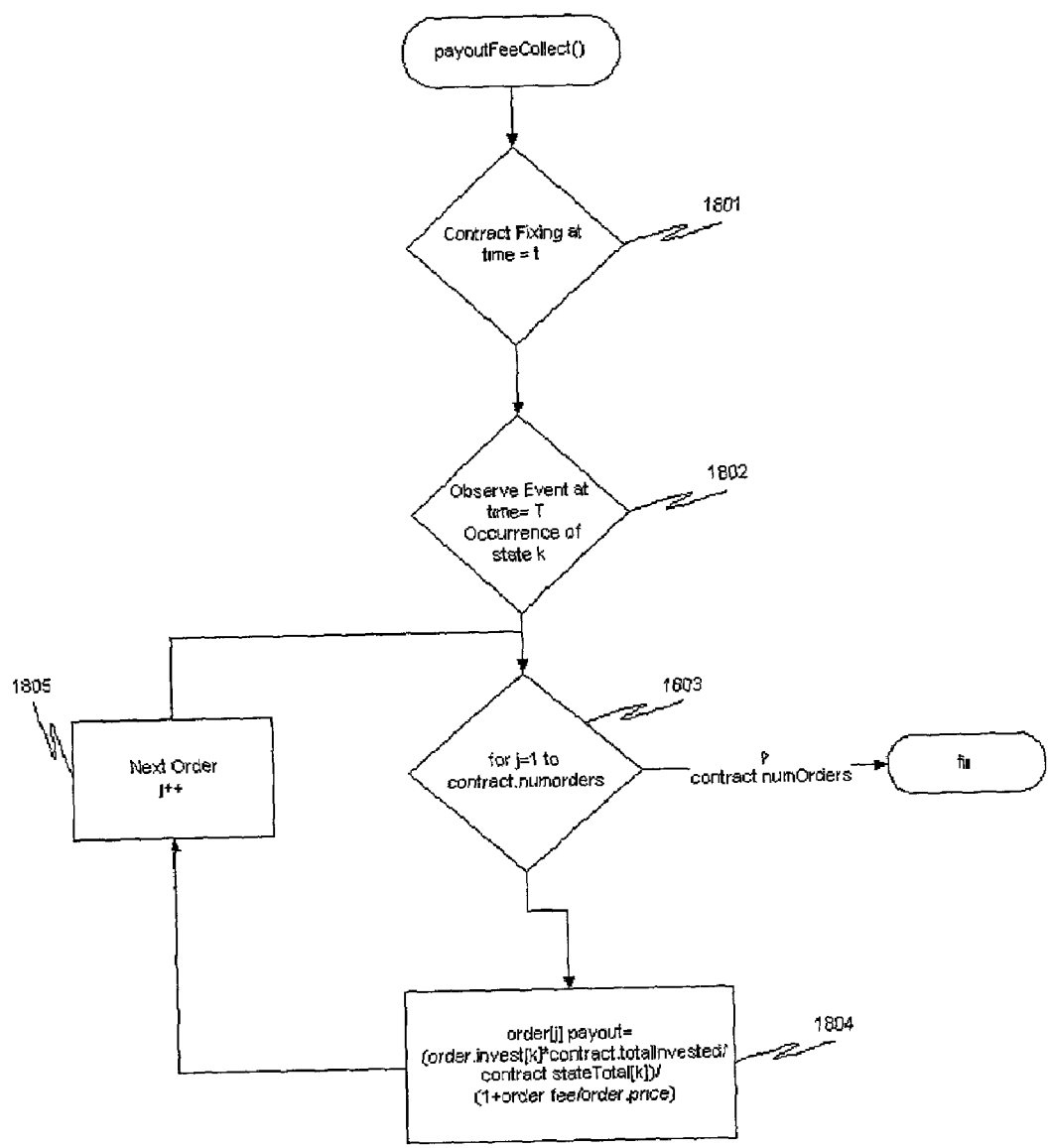
FIG. 18 depicts a preferred embodiment of a method of payout distribution and fee collection in a Demand-Based Adjustable Return Digital Options Exchange of the present invention.

FIG. 18 depicts a preferred embodiment of a method of calculating payouts to traders in a DBAR-DOE of the present invention, once the realized state corresponding to the event of economic significance or state of a selected financial product is known. Step 1801 of FIG. 18 shows that the predetermined termination criteria with respect to the submission of orders by traders have been fulfilled, for example, the trading period has ended at a previous time (time=t) and the final contingent claim prices have been computed and finalized. Step 1802 confirms that the event of economic significance or state of a financial product has occurred (at a later time=T, where $T \geq t$) and that the realized state is determined to be equal to state k. Thus, according to step 1802, state k is the realized state. In the preferred embodiment depicted in FIG. 18, step 1803 initializes a control loop for each order in the contract (contract.numOrders). For each order, the payout to the trader is calculated. In preferred embodiments, the payout is a function of the amount allocated to the realized state (order.invest[k]), the unit payout of the realized state (contract.totalInvested/contract.stateTotal[k]), and the transaction fee of the order as a percentage of the order price (order.fee/order.price). Other methods of allocating payouts net of transaction fees are possible and would be apparent to one of ordinary skill in the art.

The foregoing detailed description of the figures, and the figures themselves, are designed to provide and explain specific illustrations and examples of preferred embodiments of methods and systems of the present invention. The purpose is to facilitate increased understanding and appreciation of the present invention. The detailed description and figures are not meant to limit either the scope of the invention, its embodiments, or the ways in which it may be implemented or practiced. To the contrary, additional embodiments and their equivalents within the scope of this invention will be apparent to those of skill in the art from reviewing this specification or practicing this invention.

8. Advantages of Preferred Embodiments

This specification sets forth principles, methods, and systems that provide trading and investment in groups of DBAR contingent claims, and the establishment and operation of markets and exchanges for such claims. Advantages of the present invention as it applies to the trading and investment in derivatives and other contingent claims include:

(1) Increased Liquidity: Groups of DBAR contingent claims and exchanges for investing in them according to the present invention offer increased liquidity for the following reasons:

(i) Reduced dynamic hedging by market makers. In preferred embodiments, an exchange or market maker for contingent claims does not need to hedge in the market. In such embodiments, all that is required for a well-functioning contingent claims market is a set of observable underlying real-world events reflecting sources of financial or economic risk. For example, the quantity of any given financial product available at any given price can be irrelevant in a system of the present invention.

(ii) Reduced order crossing. Traditional and electronic exchanges typically employ sophisticated algorithms for market and limit order book bid/offer crossing. In preferred embodiments of the present invention, there are no bids and offers to cross. A trader who desires to "unwind" an investment will instead make a complementary investment, thereby hedging his exposure.

(iii) No permanent liquidity charge: In the DBAR market, only the final returns are used to compute payouts. Liquidity variations and the vagaries of execution in the traditional markets do not, in preferred embodiments, impose a permanent tax or toll as they typically do in traditional markets. In any event, in preferred embodiments of the present invention, liquidity effects of amounts invested in groups of DBAR claims are readily calculable and available to all traders. Such information is not readily available in traditional markets.

(2) Reduced Credit Risk: In preferred embodiments of the present invention, the exchange or dealer has greatly increased assurance of recovering its transaction fee. It therefore has reduced exposure to market risk. In preferred embodiments, the primary function of the exchange is to redistribute returns to successful investments from losses incurred by unsuccessful investments. By implication, traders who use systems of the present invention can enjoy limited liability, even for short positions, and a diversification of counterparty credit risk.

(3) Increased Scalability: The pricing methods in preferred embodiments of systems and methods of the present invention for investing in groups of DBAR contingent claims are not tied to the physical quantity of underlying financial products available for hedging. In preferred embodiments an exchange therefore can accommodate a very large community of users at lower marginal costs.

(4) Improved Information Aggregation: Markets and exchanges according to the present invention provide mechanisms for efficient aggregation of information related to investor demand, implied probabilities of various outcomes, and price.

(5) Increased Price Transparency: Preferred embodiments of systems and methods of the present invention for investing in groups of DBAR contingent claims determine returns as functions of amounts invested. By contrast, prices in traditional derivatives markets are customarily available for fixed quantities only and are typically determined by complex interactions of supply/demand and overall liquidity conditions. For example, in a preferred embodiment of a canonical DRF for a group of DBAR contingent claims of the present invention, returns for a particular defined state are allocated based on a function of the ratio of the total amount invested across the distribution of states to the amount on the particular state.

(6) Reduced Settlement or Clearing Costs: In preferred embodiments of systems and methods for investing in groups of DBAR contingent claims, an exchange need not, and typically will not, have a need to transact in the underlying physical financial products on which a group of DBAR contingent claims may be based. Securities and derivatives in those products need not be transferred, pledged, or otherwise assigned for value by the exchange, so that, in preferred embodiments, it does not need the infrastructure which is typically required for these back office activities.

(7) Reduced Hedging Costs: In traditional derivatives markets, market makers continually adjust their portfolio of risk exposures in order to mitigate risks of bankruptcy and to maximize expected profit. Portfolio adjustments, or dynamic hedges, however, are usually very costly. In preferred embodiments of systems and methods for investing in groups of DBAR contingent claims, unsuccessful investments hedge the successful investments. As a consequence, in such preferred embodiments, the need for an exchange or market maker to hedge is greatly reduced, if not eliminated.

(8) Reduced Model Risk: In traditional markets, derivatives dealers often add "model insurance" to the prices they quote to customers to protect against unhedgable deviations from prices otherwise indicated by valuation models. In the present invention, the price of an investment in a defined state derives directly from the expectations of other traders as to the expected distribution of market returns. As a result, in such embodiments, sophisticated derivative valuation models are not essential. Transaction costs are thereby lowered due to the increased price transparency and tractability offered by the systems and methods of the present invention.

(9) Reduced Event Risk: In preferred embodiments of systems and methods of the present invention for investing in groups of DBAR contingent claims, trader expectations are solicited over an entire distribution of future event outcomes. In such embodiments, expectations of market crashes, for example, are directly observable from indicated returns, which transparently reveal trader expectations for an entire distributions of future event outcomes. Additionally, in such embodiments, a market maker or exchange bears greatly reduced market crash or "gap" risk, and the costs of derivatives need not reflect an insurance premium for discontinuous market events.

(10) Generation of Valuable Data: Traditional financial product exchanges usually attach a proprietary interest in the real-time and historical data that is generated as a by-product from trading activity and market making. These data include, for example, price and volume quotations at the bid and offer side of the market. In traditional markets, price is a "sufficient statistic" for market participants and this is the information that is most desired by data subscribers. In preferred embodiments of systems and methods of the present invention for investing in groups of DBAR contingent claims, the scope of data generation may be greatly expanded to include investor expectations of the entire distribution of possible outcomes for respective future events on which a group of DBAR contingent claims can be based. This type of information (e.g., did the distribution at time t reflect traders' expectations of a market crash which occurred at time t+1?) can be used to improve market operation. Currently, this type of distributional information can be derived only with great difficulty by collecting panels of option price data at different strike prices for a given financial product, using the methods originated in 1978 by the economists Litzenberger and Breeden and other similar methods known to someone of skill in the art. Investors and others must then perform difficult calculations on these data to extract underlying distributions. In preferred embodiments of the present invention, such distributions are directly available.

(11) Expanded Market For Contingent Claims: Another advantage of the present invention is that it enables a well functioning market for contingent claims. Such a market enables traders to hedge directly against events that are not readily hedgeable or insurable in traditional markets, such as changes in mortgage payment indices, changes in real estate valuation indices, and corporate earnings announcements. A contingent claims market operating according to the systems and methods of the present invention can in principle cover all events of economic significance for which there exists a demand for insurance or hedging.

(12) Price Discovery: Another advantage of systems and methods of the present invention for investing in groups of DBAR contingent claims is the provision, in preferred embodiments, of a returns adjustment mechanism ("price discovery"). In traditional capital markets, a trader who takes a large position in relation to overall liquidity often creates the risk to the market that price discovery will break down in the event of a shock or liquidity crisis. For example, during the fall of 1998, Long Term Capital Management (LTCM) was unable to liquidate its inordinately large positions in response to an external shock to the credit market, i.e., the pending default of Russia on some of its debt obligations. This risk to the system was externalized to not only the creditors of LTCM, but also to others in the credit markets for whom liquid markets disappeared. By contrast, in a preferred embodiment of a group of DBAR contingent claims according to the present invention, LTCM's own trades in a group of DBAR contingent claims would have lowered the returns to the states invested in dramatically, thereby reducing the incentive to make further large, and possibly destabilizing, investments in those same states. Furthermore, an exchange for a group of DBAR contingent claims according to the present invention could still have operated, albeit at frequently adjusted returns, even during the most acute phases of the 1998 Russian bond crisis. For example, had a market in a DBAR range derivative existed which elicited trader expectations on the distribution of spreads between high-grade United States Treasury securities and lower-grade debt instruments, LTCM could have "hedged" its own speculative positions in the lower-grade instruments by making investment in the DBAR range derivatives in which it would profit as credit spreads widened. Of course, its positions by necessity would have been sizable thereby driving the returns on its position dramatically lower (i.e., effectively liquidating its existing position at less favorable prices). Nevertheless, an exchange according to preferred embodiments of the present invention could have provided increased liquidity compared to that of the traditional markets.

(13) Improved Offers of Liquidity to the Market: As explained above, in preferred embodiments of groups of DBAR contingent claims according to the present invention, once an investment has been made it can be offset by making an investment in proportion to the prevailing traded amounts invested in the complement states and the original invested state. By not allowing trades to be removed or cancelled outright, preferred embodiments promote two advantages:
  (1) reducing strategic behavior ("returns-jiggling")
  (2) increasing liquidity to the market
  In other words, preferred embodiments of the present invention reduce the ability of traders to make and withdraw large investments merely to create false-signals to other participants in the hopes of creating last-minute changes in closing returns. Moreover, in preferred embodiments, the liquidity of the market over the entire distribution of states is information readily available to traders and such liquidity, in preferred embodiments, may not be withdrawn during the trading periods. Such preferred embodiments of the present invention thus provide essentially binding commitments of liquidity to the market guaranteed not to disappear.

(14) Increased Liquidity Incentives: In preferred embodiments of the systems and methods of the present invention for trading or investing in groups of DBAR contingent claims, incentives are created to provide liquidity over the distribution of states where it is needed most. On average, in preferred embodiments, the implied probabilities resulting from invested amounts in each defined state should be related to the actual probabilities of the states, so liquidity should be provided in proportion to the actual probabilities of each state across the distribution. The traditional markets do not have such ready self-equilibrating liquidity mechanisms—e.g., far out-of-the-money options might have no liquidity or might be excessively traded. In any event, traditional markets do not generally provide the strong (analytical) relationship between liquidity, prices, and probabilities so readily available in trading in groups of DBAR contingent claims according to the present invention.

(15) Improved Self-consistency: Traditional markets customarily have "no-arbitrage" relationships such as put-call parity for options and interest-rate parity for interest rates and currencies. These relationships typically must (and do) hold to prevent risk-less arbitrage and to provide consistency checks or benchmarks for no-arbitrage pricing. In preferred embodiments of systems and methods of the present invention for trading or investing in groups of DBAR contingent claims, in addition to such "no-arbitrage" relationships, the sum of the implied probabilities over the distribution of defined states is known to all traders to equal unity. Using the notation developed above, the following relations hold for a group of DBAR contingent claims using a canonical DRF:

$$r_i = \frac{(1-f)*\sum_i T_i}{T_i} - 1$$

$$q_i = \frac{1-f}{r_i+1} = \frac{T_i}{\sum_i T_i} \sum_i q_i = 1$$

In other words, in a preferred embodiment, the sum across a simple function of all implied probabilities is equal to the sum of the amount traded for each defined state divided by the total amount traded. In such an embodiment, this sum equals 1. This internal consistency check has no salient equivalent in the traditional markets where complex calculations are typically required to be performed on illiquid options price data in order to recover the implied probability distributions.

(16) Facilitated Marginal Returns Calculations: In preferred embodiments of systems and methods of the present invention for trading and investing in groups of DBAR contingent claims, marginal returns may also be calculated readily. Marginal returns $r^m$ are those that prevail in any sub-period of a trading period, and can be calculated as follows:

$$r^m_{i,t-1,t} = \frac{r_{i,t} * T_{i,t} - r_{i,t-1} * T_{i,t-1}}{T_{i,t} - T_{i,t-1}}$$

where the left hand side is the marginal returns for state i between times t−1 and t; $r_{i,t}$ and $r_{i,t-1}$ are the unit returns for state i at times t, and t−1, and $T_{i,t}$ and $T_{i,t-1}$ are the amounts invested in state i at times t and t−1, respectively.

In preferred embodiments, the marginal returns can be displayed to provide important information to traders and others as to the adjustment throughout a trading period. In systems and methods of the present invention, marginal returns may be more variable (depending on the size of the time increment among other factors) than the returns which apply to the entire trading period.

(17) Reduced Influence by Market Makers: In preferred embodiments of the systems and methods of the present invention, because returns are driven by demand, the role of the supply side market maker is reduced if not eliminated. A typical market maker in the traditional markets (such as an NYSE specialist or a swaps bookrunner) typically has privileged access to information (e.g., the limit order book) and potential conflicts of interest deriving from dual roles as principal (i.e., proprietary trader) and market maker. In preferred embodiments of the present invention, all traders have greater information (e.g., investment amounts across entire distribution of states) and there is no supply-side conflict of interest.

(18) Increased Ability to Generate and Replicate Arbitrary Payout Distributions: In preferred embodiments of the systems and methods of the present invention for investing and trading in groups of DBAR contingent claims, traders may generate their own desired distributions of payouts, i.e., payouts can be customized very readily by varying amounts invested across the distribution of defined states. This is significant since groups of DBAR contingent claims can be used to readily replicate payout distributions with which traders are familiar from the traditional markets, such as long stock positions, long and short futures positions, long options straddle positions, etc. Importantly, as discussed above, in preferred embodiments of the present invention, the payout distributions corresponding to such positions can be effectively replicated with minimal expense and difficulty by having a DBAR contingent claim exchange perform multi-state allocations. For example, as discussed in detail in Section 6 and with reference to FIGS. 11–18, in preferred embodiments of the system and methods of the present invention, payout distributions of investments in DBAR contingent claims can be comparable to the payout distributions expected by traders for purchases and sales of digital put and call options in conventional derivatives markets. While the payout distributions may be comparable, the systems and methods of the present invention, unlike conventional markets, do not require the presence of sellers of the options or the matching of buy and sell orders.

9. Technical Appendix

This technical appendix provides the mathematical foundation underlying the computer code listing of Table 1: Illustrative Visual Basic Computer Code for Solving CDRF 2. That computer code listing implements a procedure for solving the Canonical Demand Reallocation Function (CDRF 2) by preferred means which one of ordinary skill in the art will recognize are based upon the application of a mathematical method known as fixed point iteration.

As previously indicated in the specification, the simultaneous system embodied by CDRF 2 does not provide an explicit solution and typically would require the use of numerical methods to solve the simultaneous quadratic equations included in the system. In general, such systems would typically be solved by what are commonly known as "grid search" routines such as the Newton-Raphson method, in which an initial solution or guess at a solution is improved by extracting information from the numerical derivatives of the functions embodied in the simultaneous system.

One of the important advantages of the demand-based trading methods of the present invention is the careful construction of CDRF 2 which allows for the application of fixed point iteration as a means for providing a numerical solution of CDRF 2. Fixed point iteration means are generally more reliable and computationally less burdensome than grid search routines, as the computer code listing in Table I illustrates.

A. Fixed Point Iteration

The solution to CDRF 2 requires finding a fixed point to a system of equations. Fixed points represent solutions since they convey the concept of a system at "rest" or equilibrium, i.e., a fixed point of a system of functions or transformations denoted g(a) exists if $$\alpha = g(\alpha)$$

Mathematically, the function g(a) can be said to be a map on the real line over the domain of a. The map, g(x), generates a new point, say, y, on the real line. If x=y, then x is called a fixed point of the function g(a). In terms of numerical solution techniques, if g(a) is a non-linear system of equations and if x is a fixed point of g(a), then a is also the zero of the function. If no fixed points such as x exist for the function g(a), then grid search type routines can be used to solve the system (e.g., the Newton-Raphson Method, the Secant Method, etc.). If a fixed point exists, however, its existence can be exploited in solving for the zero of a simultaneous non-linear system, as follows.

Choose an initial starting point, $x_0$, which is believed to be somewhere in the neighborhood of the fixed point of the function g(a). Then, assuming there does exist a fixed point of the function g(a), employ the following simple iterative scheme:

$$x_{i+1} = g(x_i), \text{ where } x_0 \text{ is chosen as starting point}$$

where i=0, 1, 2, . . . n. The iteration can be continued until a desired precision level, $\epsilon$, is achieved, i.e., $$x_n = g(x_{n-1}), \text{ until } |g(x_{n-1}) - x_n| < \epsilon$$

The question whether fixed point iteration will converge, of course, depends crucially on the value of the first derivative of the function g(x) in the neighborhood of the fixed point as shown in the following figure:

TABLE 9.1

Fixed Point Iteration for General Function g(x)

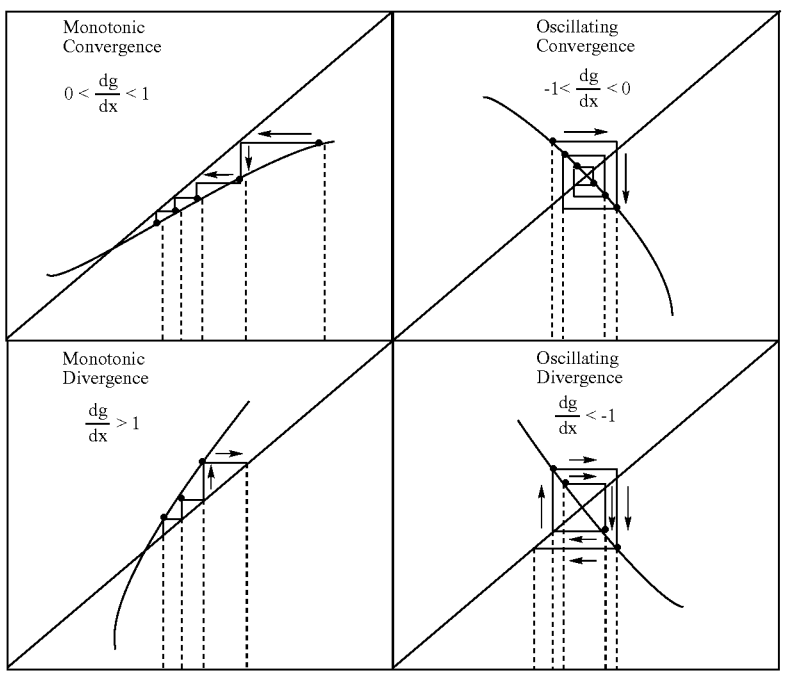

As previously indicated, an advantage of the present invention is the construction of CDRF 2 in such a way so that it may be represented in terms of a multivariate function, g(x), which is continuous and has a derivative whose value is between 0 and 1, as shown below.

B. Fixed Point Iteration as Applied to CDRF 2

This section will demonstrate that (1) the system of equations embodied in CDRF 2 possesses a fixed point solution and (2) that this fixed point solution can be located using the method of fixed point iteration described in Section A, above.

The well known fixed point theorem provides that, if g: [a, b]—>[a, b] is continuous on [a, b] and differentiable on (a, b) and there is a constant k<1 such that for all x in (a, b), $$|g'(x)| \leq k$$

then g has a unique fixed point x* in [a, b]. Moreover, for any x in [a, b] the sequence defined by $$x_0 = x \text{ and } x_{n+1} = g(x_n)$$

converges to x* and for all n $$|x_n - x^*| \leq \frac{k^n * |x_1 - x_0|}{1 - k}.$$

The theorem can be applied CDRF 2 as follows. First, CDRF 2 in a preferred embodiment relates the amount or amounts to be invested across the distribution of states for the CDRF, given a payout distribution, by inverting the expression for the CDRF and solving for the traded amount matrix A:

$$A = P * \Pi(A, f)^{-1} \qquad \text{(CDRF 2)}$$

CDRF 2 may be rewritten, therefore, in the following form:

$$A = g(A)$$

where g is a continuous and differentiable function. By the aforementioned fixed point theorem, CDRF 2 may be solved by means of fixed point iteration if:

$$g'(A) < 1$$

i.e., the multivariate function g(A) has a first derivative less than 1. Whether g(A) has a derivative less than 1 with respect to A can be analyzed as follows. As previously indicated in the specification, for any given trader and any given state i, CDRF2 contains equations of the following form relating the desired payout p (assumed to be greater than 0) to the traded amount a required to generate the desired payout, given a total traded amount already traded for state i of $T_i$ (also assumed to be greater than 0) and the total traded amount for all the states of T:

$$\alpha = \left(\frac{T_i + \alpha}{T + \alpha}\right) * p$$

so that $$g(\alpha) = \left(\frac{T_i + \alpha}{T + \alpha}\right) * p$$

Differentiating g(α) with respect to α yields:

$$g'(\alpha) = \left(\frac{T - T_i}{T + \alpha}\right) * \frac{p}{T + \alpha}$$

Since the DRF Constraint defined previously in the specification requires that payout amount p not exceed the total amount traded for all of the states, the following condition holds:

$$\frac{p}{T+\alpha} \leq 1$$

and therefore since $$\left(\frac{T-T_i}{T+\alpha}\right) < 1$$

it is the case that $$0 < g'(\alpha) < 1$$

so that the solution to CDRF 2 can be obtained by means of fixed point iteration as embodied in the computer code listing of Table 1.

Preferred embodiments of the invention have been described in detail above, various changes thereto and equivalents thereof will be readily apparent to one of ordinary skill in the art and are encompassed within the scope of this invention and the appended claim. For example, many types of demand reallocation functions (DRFs) can be employed to finance gains to successful investments with losses from unsuccessful investments, thereby achieving different risk and return profiles to traders. Additionally, this disclosure has primarily discussed methods and systems for groups and portfolios of DBAR contingent claims, and markets and exchanges for those groups. The methods and systems of the present invention can readily be adapted by financial intermediaries for use within the traditional capital and insurance markets. For example, a group of DBAR contingent claims can be embedded within a traditional security, such as a bond for a given corporate issuer, and underwritten and issued by an underwriter as previously discussed. It is also intended that such embodiments and their equivalents are encompassed by the present invention and the appended claims.

The present invention has been described above in the context of trading derivative securities, specifically the implementation of an electronic derivatives exchange which facilitates the efficient trading of (i) financial-related contingent claims such as stocks, bonds, and derivatives thereon, (ii) non-financial related contingent claims such as energy, commodity, and weather derivatives, and (iii) traditional insurance and reinsurance contracts such as market loss warranties for property-casualty catastrophe risk. The present invention has also been described above in the context of a DBAR digital options exchange. The present invention is not limited to these contexts, however, and can be readily adapted to any contingent claim relating to events which are currently uninsurable or unhedgable, such as corporate earnings announcements, future semiconductor demand, and changes in technology. These and all other such modifications are intended to fall within the scope of the present invention.

I claim:

1. A method for conducting demand-based trading, comprising the steps of:

establishing a plurality of defined states and a plurality of predetermined termination criteria, wherein each of the defined states corresponds to at least one possible outcome of an event of economic significance;

accepting, prior to fulfillment of all of the predetermined termination criteria, an investment of value units by each of a plurality of traders in at least one of the plurality of defined states, wherein at least one investment of value units designates a range of possible outcomes corresponding to a set of defined states; and allocating a payout to each investment, responsive to
   the total number of value units invested in the plurality of defined states,
   the relative number of value units invested in each of the plurality of defined states, and
   an identification of the defined state that occurred upon the fulfillment of all of the predetermined termination criteria;

wherein substantially the same payout is allocated to each state of the set of defined states.

2. A method for conducting demand-based trading, comprising the steps of:

establishing a plurality of defined states and a plurality of predetermined termination criteria, wherein each of the defined states corresponds to at least one possible state of a selected financial product when each of the predetermined termination criteria is fulfilled;

accepting, prior to fulfillment of all of the predetermined termination criteria, an investment of value units by each of a plurality of traders in at least one of the plurality of defined states, wherein at least one investment of value units designates a range of possible states of the selected financial instrument corresponding to a set of the defined states; and allocating a payout to each investment, responsive to
   the total number of value units invested in the plurality of defined states,
   the relative number of value units invested in each of the plurality of defined states, and
   an identification of the defined state that occurred upon the fulfillment of all of the predetermined termination criteria;

wherein substantially the same payout is allocated to each state of the set of defined states.

3. A method for conducting demand-based trading, comprising the steps of:

establishing a plurality of defined states and a plurality of predetermined termination criteria, wherein each of the defined states corresponds to at least one possible outcome of an event of economic significance;

accepting, prior to fulfillment of all of the predetermined termination criteria, a conditional investment order by a trader in at least one of the plurality of defined states;

computing prior to fulfillment of all of the predetermined termination criteria a probability corresponding to each defined state, responsive to
   the total number of value units invested in the plurality of defined states, and
   the relative number of value units invested in each of the plurality of defined states; and executing, prior to fulfillment of all of the predetermined termination criteria, the conditional investment order responsive to the computing step.

4. A method for conducting demand-based trading, comprising the steps of:

establishing a plurality of defined states and a plurality of predetermined termination criteria, wherein each of the defined states corresponds to at least one possible state of an event of economic significance;

accepting, prior to fulfillment of all of the predetermined termination criteria, a conditional investment by a trader in at least one of the plurality of defined states;

computing prior to fulfillment of all of the predetermined termination criteria a probability corresponding to each defined state, responsive to
- the total number of value units invested in the plurality of defined states, and
- the relative number of value units invested in each of the plurality of defined states; and withdrawing, prior to fulfillment of all of the predetermined termination criteria, the conditional investment, responsive to the computing step.

5. A method for conducting demand-based trading, comprising the steps of:

establishing a plurality of defined states and a plurality of predetermined termination criteria, wherein each of the defined states corresponds to at least one possible state of a selected financial instrument when each of the predetermined termination criteria is fulfilled;

accepting, prior to fulfillment of all of the predetermined termination criteria, a conditional investment order by a trader in at least one of the plurality of defined states;

computing prior to fulfillment of all of the predetermined termination criteria a probability corresponding to each defined state, responsive to
- the total number of value units invested in the plurality of defined states, and
- the relative number of value units invested in each of the plurality of defined states; and executing, prior to fulfillment of all of the predetermined termination criteria, the conditional investment order responsive to the computing step.

6. A method for conducting demand-based trading, comprising the steps of:

establishing a plurality of defined states and a plurality of predetermined termination criteria, wherein each of the defined states corresponds to at least one possible state of a selected financial instrument when each of the predetermined termination criteria is fulfilled;

accepting, prior to fulfillment of all of the predetermined termination criteria, a conditional investment by a trader in at least one of the plurality of defined states;

computing prior to fulfillment of all of the predetermined termination criteria a probability corresponding to each defined state, responsive to
- the total number of value units invested in the plurality of defined states, and
- the relative number of value units invested in each of the plurality of defined states; and withdrawing, prior to fulfillment of all of the predetermined termination criteria, the conditional investment, responsive to the computing step.

7. A method for conducting demand-based trading, comprising the steps of:

establishing a plurality of defined states and a plurality of predetermined termination criteria, wherein each of the defined states corresponds to at least one possible outcome of an event of economic significance;

accepting, prior to fulfillment of all of the predetermined termination criteria, an order by one of a plurality of traders that associates a specified number of value units with at least one selected state of the plurality of defined states, wherein states not selected constitute complementary states;

investing the specified number of value units in the complementary states; and allocating a payout to the order responsive to:
- the total number of value units invested the plurality of defined states,
- the relative number of value units invested in each of the plurality of defined states, and
- an identification of the defined state that occurred upon fulfillment of all of the predetermined termination criteria.

8. The method of claim 7, wherein:

the payout, if the defined state that occurred upon fulfillment of all of the predetermined termination criteria is a selected state, is a loss that is a first function of the specified number of value units; and the payout, if the defined state that occurred upon fulfillment of all of the predetermined termination is a complementary state, is a second function of (a) the total number of value units invested in the plurality of defined states divided by the number of value units invested in the defined state that occurred upon fulfillment of all of the predetermined termination criteria, and (b) the specified number of value units.

9. A method for conducting demand-based trading, comprising the steps of:

establishing a plurality of defined states and a plurality of predetermined termination criteria, wherein each of the defined states corresponds to at least one possible outcome of a financial product;

accepting, prior to fulfillment of all of the predetermined termination criteria, an order by one of a plurality of traders that associates a specified number of value units with at least one selected state of the plurality of defined states, wherein states not selected constitute complementary states;

investing the specified number of value units in the complementary states; and allocating a payout to the order responsive to:
- the total number of value units invested the plurality of defined states,
- the relative number of value units invested in each of the plurality of defined states, and
- an identification of the defined state that occurred upon fulfillment of all of the predetermined termination criteria.

10. The method of claim 9, wherein:

the payout, if the defined state that occurred upon fulfillment of all of the predetermined termination criteria is a selected state, is a loss that is a first function of the specified number of value units; and the payout, if the defined state that occurred upon fulfillment of all of the predetermined termination is a complementary state, is a second function of (a) the total number of value units invested in the plurality of defined states divided by the number of value units invested in the defined state that occurred upon fulfillment of all of the predetermined termination criteria, and (b) the specified number of value units.

11. A computer system for demand-based trading, comprising:

at least one processor;

at least one database module; and at least one terminal; wherein the processor is operative with the at least one database and at least one terminal to
- establish a plurality of defined states and a plurality of predetermined termination criteria, wherein each of the defined states corresponds to at least one possible outcome of an event of economic significance;

communicate the defined states and the predetermined termination criteria to a plurality of traders;

accept, prior to fulfillment of all of the predetermined termination criteria, an investment of value units one of the plurality of traders in at least one of the plurality of defined states, wherein at least one investment of value units designates a range of possible outcomes corresponding to a set of defined states; and allocate a payout to each investment, responsive to
- the total number of value units invested in the plurality of defined states,
- the relative number of value units invested in each of the plurality of defined states, and
- an identification of the defined state that occurred upon the fulfillment of all of the predetermined termination criteria;

wherein substantially the same payout is allocated to each state of the set of defined states.

12. A computer system for demand-based trading, comprising:

at least one processor;

at least one database module; and at least one terminal; wherein the processor is operative with the at least one database and at least one terminal to establish a plurality of defined states and a plurality of predetermined termination criteria, wherein each of the defined states corresponds to at least one possible outcome of a selected financial product;

communicate the defined states and the predetermined termination criteria to a plurality of traders;

accept, prior to fulfillment of all of the predetermined termination criteria, an investment of value units one of the plurality of traders in at least one of the plurality of defined states, wherein at least one investment of value units designates a range of possible outcomes corresponding to a set of defined states; and allocate a payout to each investment, responsive to
- the total number of value units invested in the plurality of defined states,
- the relative number of value units invested in each of the plurality of defined states, and
- an identification of the defined state that occurred upon the fulfillment of all of the predetermined termination criteria;

wherein substantially the same payout is allocated to each state of the set of defined states.

13. A computer system for demand-based trading, comprising:

at least one processor;

at least one database module; and at least one terminal; wherein the processor is operative with the at least one database and at least one terminal to establish a plurality of defined states and a plurality of predetermined termination criteria, wherein each of the defined states corresponds to at least one possible outcome of an event of economic significance;

communicate the defined states and the predetermined termination criteria to a plurality of traders;

accept, prior to fulfillment of all of the predetermined termination criteria, a conditional investment order by a trader in at least one of the plurality of defined states;

compute prior to fulfillment of all of the predetermined termination criteria a probability corresponding to each defined state, responsive to
- the total number of value units invested in the plurality of defined states, and
- the relative number of value units invested in each of the plurality of defined states; and accept, prior to fulfillment of all of the predetermined termination criteria, the conditional investment order responsive to the computing step.

14. A computer system for demand-based trading, comprising:

at least one processor;

at least one database module; and at least one terminal; wherein the processor is operative with the at least one database and at least one terminal to establish a plurality of defined states and a plurality of predetermined termination criteria, wherein each of the defined states corresponds to at least one possible outcome of a selected financial product;

communicate the defined states and the predetermined termination criteria to a plurality of traders;

accept, prior to fulfillment of all of the predetermined termination criteria, a conditional investment order by a trader in at least one of the plurality of defined states;

compute prior to fulfillment of all of the predetermined termination criteria a probability corresponding to each defined state, responsive to
- the total number of value units invested in the plurality of defined states, and
- the relative number of value units invested in each of the plurality of defined states; and accept, prior to fulfillment of all of the predetermined termination criteria, the conditional investment order responsive to the compute step.

15. A computer system for demand-based trading, comprising:

at least one processor;

at least one database module; and at least one terminal; wherein the processor is operative with the at least one database and at least one terminal to establish a plurality of defined states and a plurality of predetermined termination criteria, wherein each of the defined states corresponds to at least one possible outcome of an event of economic significance;

communicate the defined states and the predetermined termination criteria to a plurality of traders;

accept, prior to fulfillment of all of the predetermined termination criteria, a conditional investment order by a trader in at least one of the plurality of defined states;

compute prior to fulfillment of all of the predetermined termination criteria a probability corresponding to each defined state, responsive to
- the total number of value units invested in the plurality of defined states, and
- the relative number of value units invested in each of the plurality of defined states; and withdraw, prior to fulfillment of all of the predetermined termination criteria, the conditional investment order responsive to the compute step.

16. A computer system for demand-based trading, comprising:

at least one processor;

at least one database module; and
at least one terminal; wherein
the processor is operative with the at least one database and at least one terminal to
  establish a plurality of defined states and a plurality of predetermined termination criteria, wherein each of the defined states corresponds to at least one possible outcome of a selected financial product;
  communicate the defined states and the predetermined termination criteria to a plurality of traders;
  accept, prior to fulfillment of all of the predetermined termination criteria, a conditional investment order by a trader in at least one of the plurality of defined states;
  compute prior to fulfillment of all of the predetermined termination criteria a probability corresponding to each defined state, responsive to
    the total number of value units invested in the plurality of defined states, and
    the relative number of value units invested in each of the plurality of defined states; and
  withdraw, prior to fulfillment of all of the predetermined termination criteria, the conditional investment order responsive to the compute step.

17. A computer system for demand-based trading, comprising:
at least one processor;
at least one database module; and
at least one terminal; wherein
the processor is operative with the at least one database and at least one terminal to
  establish a plurality of defined states and a plurality of predetermined termination criteria, wherein each of the defined states corresponds to at least one possible outcome of an event of economic significance;
  accept, prior to fulfillment of all of the predetermined termination criteria, an order by one of a plurality of traders that associates a specified number of value units with at least one selected state of the plurality of defined states, wherein states not selected constitute complementary states;
  assign the specified number of value units to the complementary states; and
  compute a payout associated with the order responsive to:
    the total number of value units invested the plurality of defined states,
    the relative number of value units invested in each of the plurality of defined states, and
    an identification of the defined state that occurred upon fulfillment of all of the predetermined termination criteria.

18. The system of claim 17, wherein:
the payout, if the defined state that occurred upon fulfillment of all of the predetermined termination criteria is a selected state, is a loss that is a first function of the specified number of value units; and
the payout, if the defined state that occurred upon fulfillment of all of the predetermined termination is a complementary state, is a second function of (a) the total number of value units invested in the plurality of defined states divided by the number of value units invested in the defined state that occurred upon fulfillment of all of the predetermined termination criteria, and (b) the specified number of value units.

19. A computer system for demand-based trading, comprising:
at least one processor;
at least one database module; and
at least one terminal; wherein
the processor is operative with the at least one database and at least one terminal to
  establish a plurality of defined states and a plurality of predetermined termination criteria, wherein each of the defined states corresponds to at least one possible outcome of a selected financial product;
  accept, prior to fulfillment of all of the predetermined termination criteria, an order by one of a plurality of traders that associates a specified number of value units with at least one selected state of the plurality of defined states, wherein states not selected constitute complementary states;
  assign the specified number of value units to the complementary states; and
  compute a payout associated with the order responsive to:
    the total number of value units invested the plurality of defined states,
    the relative number of value units invested in each of the plurality of defined states, and
    an identification of the defined state that occurred upon fulfillment of all of the predetermined termination criteria.

20. The system of claim 19, wherein:
the payout, if the defined state that occurred upon fulfillment of all of the predetermined termination criteria is a selected state, is a loss that is a first function of the specified number of value units; and
the payout, if the defined state that occurred upon fulfillment of all of the predetermined termination is a complementary state, is a second function of (a) the total number of value units invested in the plurality of defined states divided by the number of value units invested in the defined state that occurred upon fulfillment of all of the predetermined termination criteria, and (b) the specified number of value units.

21. A computer program product comprising a computer useable medium having computer program logic recorded thereon for enabling a processor in a computer system to facilitate demand-based trading, the computer program logic comprising:
storing means for enabling the processor to receive and store a plurality of defined states and a plurality of predetermined termination criteria, wherein each of the defined states corresponds to at least one possible outcome of an event of economic significance;
storing means for enabling the processor to receive and store information relating to an investment of value units by the plurality of traders in at least one of the plurality of defined states, wherein at least one investment of value units designates a range of possible outcomes corresponding to a set of defined states; and
computing means for enabling the processor to compute a payout to be made to each investment, responsive to information including
  the total number of value units invested in the plurality of defined states,
  the relative number of value units invested in each of the plurality of defined states, and
  an identification of the defined state that occurred upon the fulfillment of all of the predetermined termination criteria;

wherein substantially the same payout is computed for each state of the set of defined states.

22. A computer program product comprising a computer useable medium having computer program logic recorded thereon for enabling a processor in a computer system to facilitate demand-based trading, the computer program logic comprising:

storing means for enabling the processor to receive and store a plurality of defined states and a plurality of predetermined termination criteria, wherein each of the defined states corresponds to at least one possible outcome of a selected financial product;

storing means for enabling the processor to receive and store information relating to an investment of value units by the plurality of traders in at least one of the plurality of defined states, wherein at least one investment of value units designates a range of possible outcomes corresponding to a set of defined states; and computing means for enabling the processor to compute a payout to be made to each investment, responsive to information including the total number of value units invested in the plurality of defined states, the relative number of value units invested in each of the plurality of defined states, and an identification of the defined state that occurred upon the fulfillment of all of the predetermined termination criteria;

wherein substantially the same payout is computed for each state of the set of defined states.

* * * * *